United States Patent
Hillman et al.

(10) Patent No.: US 7,218,510 B2
(45) Date of Patent: May 15, 2007

(54) COMPUTER CONTROLLED DISPLAY DEVICE

(75) Inventors: Michael D. Hillman, Campbell, CA (US); Frank Tsai, Sunnyvale, CA (US); Michael D. McBroom, Leonard, TX (US); Daniel L. McBroom, Leonard, TX (US); Brian T. Sudderth, Leonard, TX (US); Bartley K. Andre, Menlo Park, CA (US); Christopher Stringer, Pacifica, CA (US); Daniel Riccio, Los Gatos, CA (US); Sung Kim, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 73 days.

(21) Appl. No.: 10/742,438

(22) Filed: Dec. 19, 2003
(Under 37 CFR 1.47)

(65) Prior Publication Data

US 2004/0228080 A1    Nov. 18, 2004

Related U.S. Application Data

(63) Continuation-in-part of application No. 10/035,417, filed on Nov. 8, 2001, now Pat. No. 6,819,550.

(60) Provisional application No. 60/438,586, filed on Jan. 6, 2003.

(51) Int. Cl.
*G06F 1/16* (2006.01)

(52) U.S. Cl. ...................... 361/681; 361/683; 248/160

(58) Field of Classification Search ........ 361/679–683; 600/148, 585; 248/160
See application file for complete search history.

(56) References Cited

U.S. PATENT DOCUMENTS

| | | | | | |
|---|---|---|---|---|---|
| 3,638,973 | A | * | 2/1972 | Poletti ........................ | 285/184 |
| 3,929,164 | A | * | 12/1975 | Richter ....................... | 138/120 |
| 4,682,749 | A | * | 7/1987 | Strater ..................... | 248/284.1 |
| 4,706,920 | A | * | 11/1987 | Ojima et al. ................ | 248/371 |
| 4,834,329 | A | * | 5/1989 | Delapp .................... | 248/183.3 |
| 5,743,503 | A | * | 4/1998 | Voeller et al. ........... | 248/284.1 |
| 5,947,429 | A | * | 9/1999 | Sweere et al. ......... | 248/123.11 |
| 5,971,298 | A |   | 10/1999 | Millan et al. | |
| 6,082,692 | A | * | 7/2000 | Price ....................... | 248/278.1 |
| 6,116,695 | A | * | 9/2000 | Heidmann et al. ....... | 297/463.1 |

(Continued)

OTHER PUBLICATIONS

Written Opinion, PCT/US02/33581, Oct. 17, 2002, 7 pages.

*Primary Examiner*—Boris Chérvinsky
*Assistant Examiner*—Anthony Q. Edwards
(74) *Attorney, Agent, or Firm*—Blakely, Sokoloff, Taylor & Zafman LLP

(57) ABSTRACT

The present invention is a computer controlled display device. In one embodiment, the display device includes a flat panel display having an input for receiving display data. Additionally, a moveable assembly may be coupled to the display. The moveable assembly may provide at least three degrees of freedom of movement for the flat panel display device. Additionally, the moveable assembly may have a cross-sectional area, which is substantially less than a cross-sectional area of a display structure of the flat panel display.

33 Claims, 86 Drawing Sheets

U.S. PATENT DOCUMENTS

| | | |
|---|---|---|
| 6,250,175 B1 | 6/2001 | Noetzold |
| 6,268,998 B1 * | 7/2001 | Cho .......................... 361/681 |
| 6,430,038 B1 * | 8/2002 | Helot et al. ................. 361/681 |
| 6,648,376 B2 * | 11/2003 | Christianson ............ 285/146.1 |
| 6,743,169 B1 * | 6/2004 | Taylor et al. ................ 600/204 |
| 2003/0007321 A1 * | 1/2003 | Dayley ....................... 361/683 |
| 2003/0021083 A1 * | 1/2003 | Landry et al. .............. 361/683 |
| 2003/0233057 A1 * | 12/2003 | Saadat et al. ................ 600/585 |

* cited by examiner

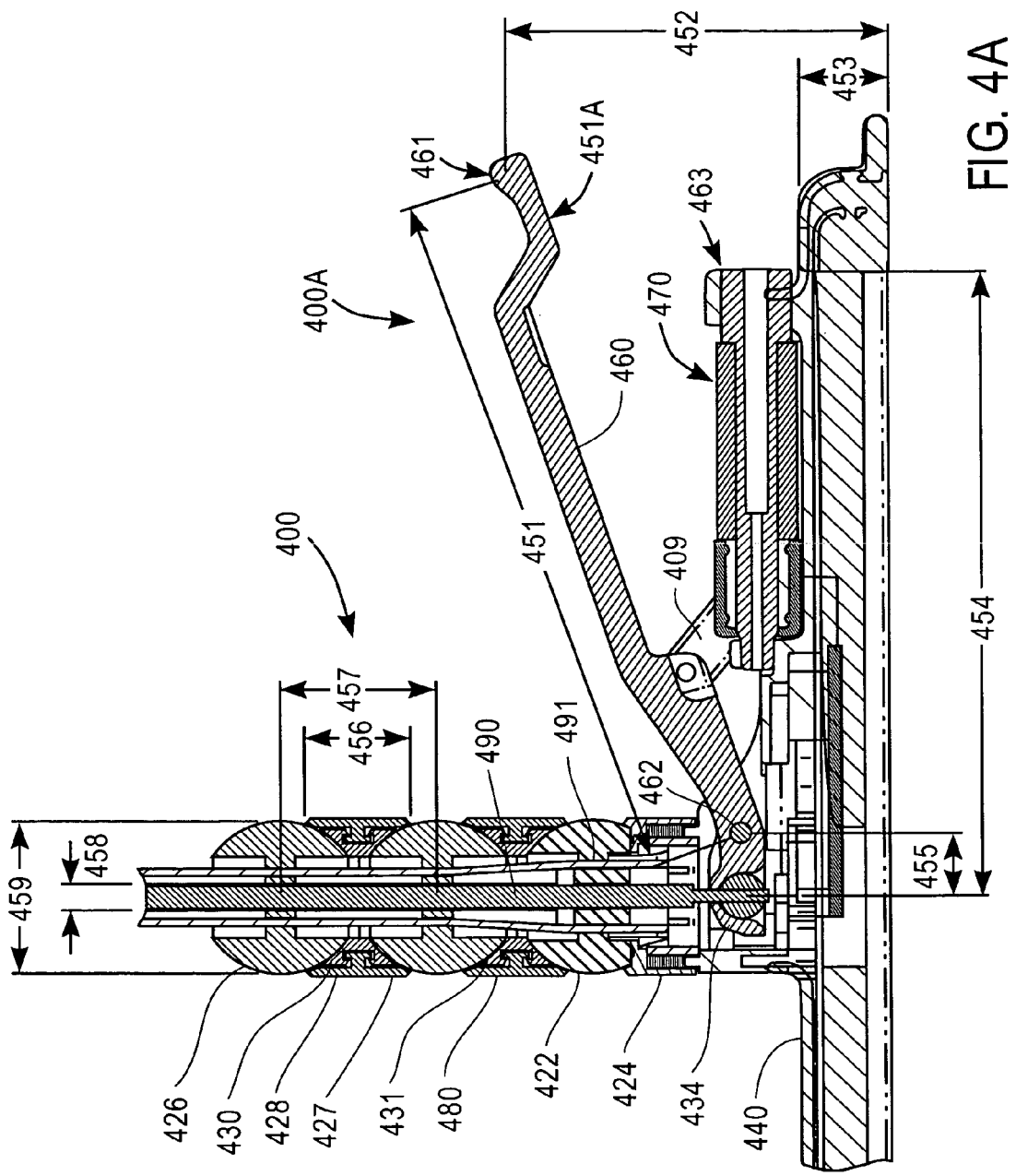

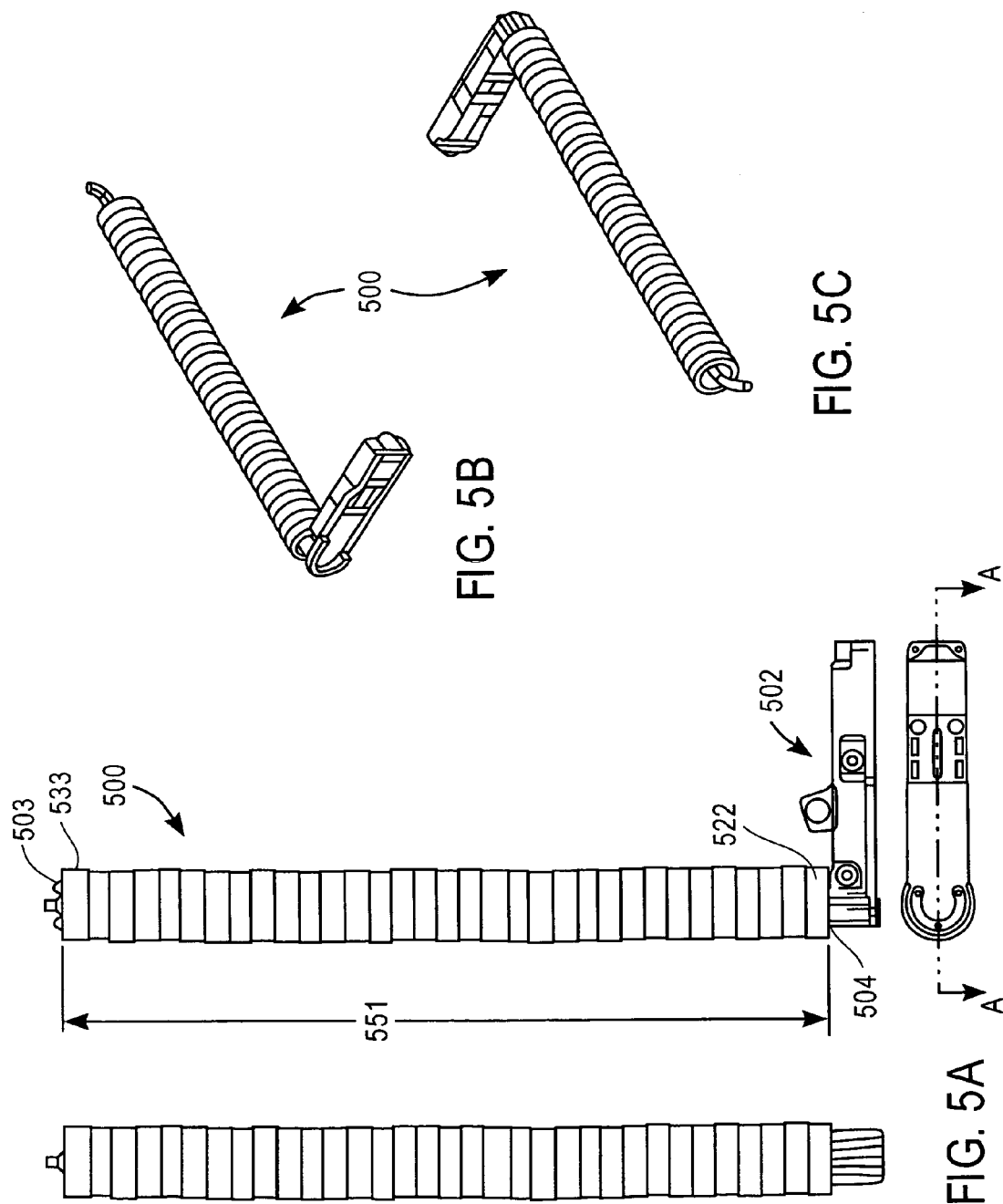

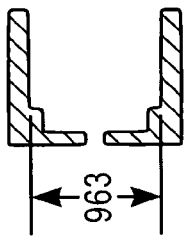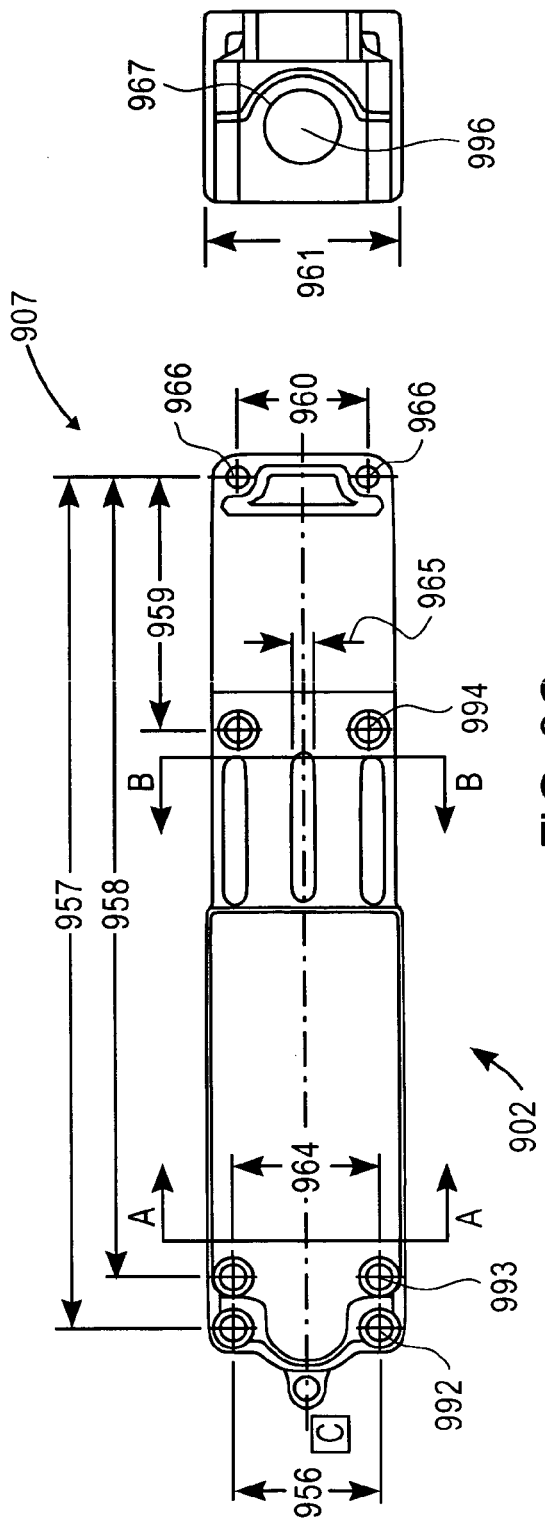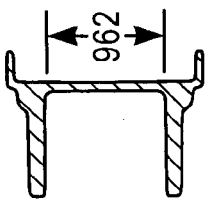

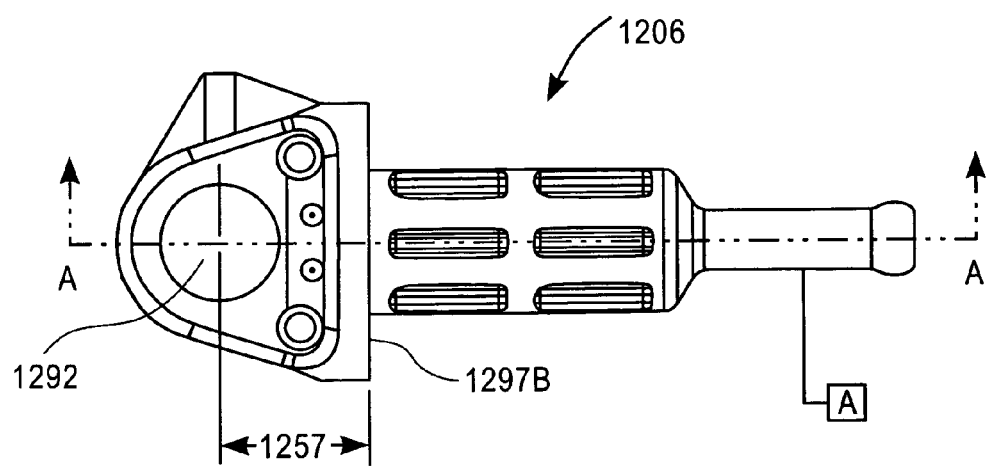
FIG. 12B
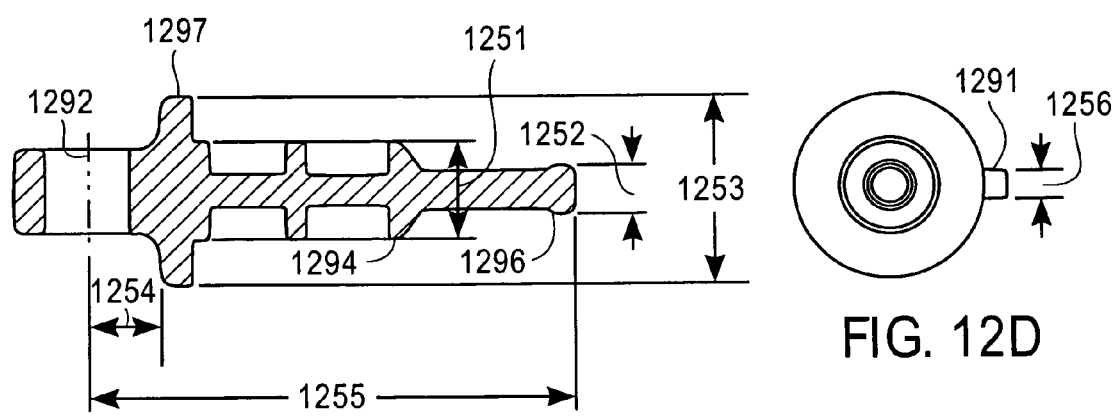
SECTION A-A
FIG. 12C
FIG. 12D

SECTION A-A

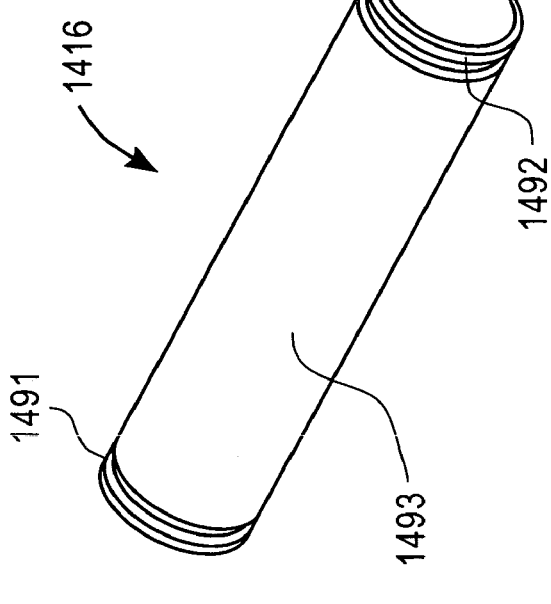
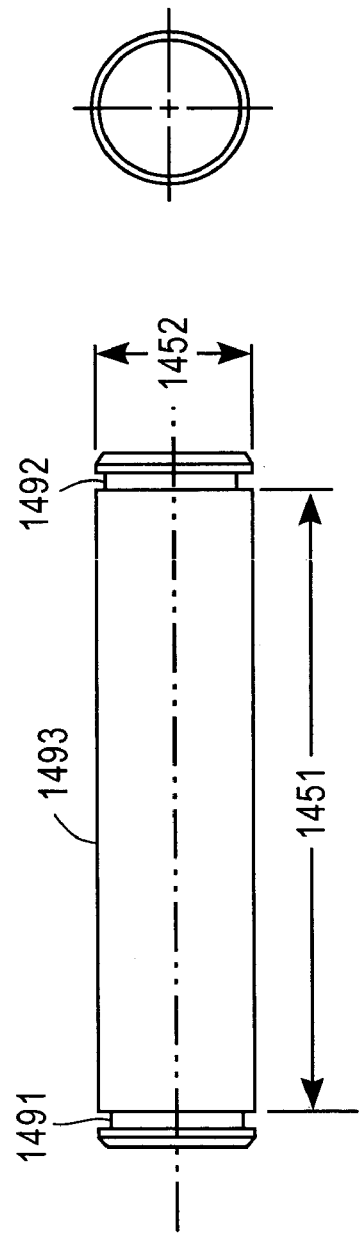
FIG. 14A
FIG. 14B

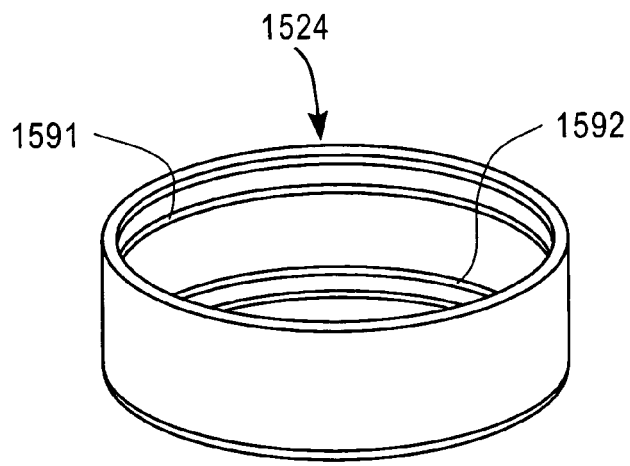
FIG. 15A
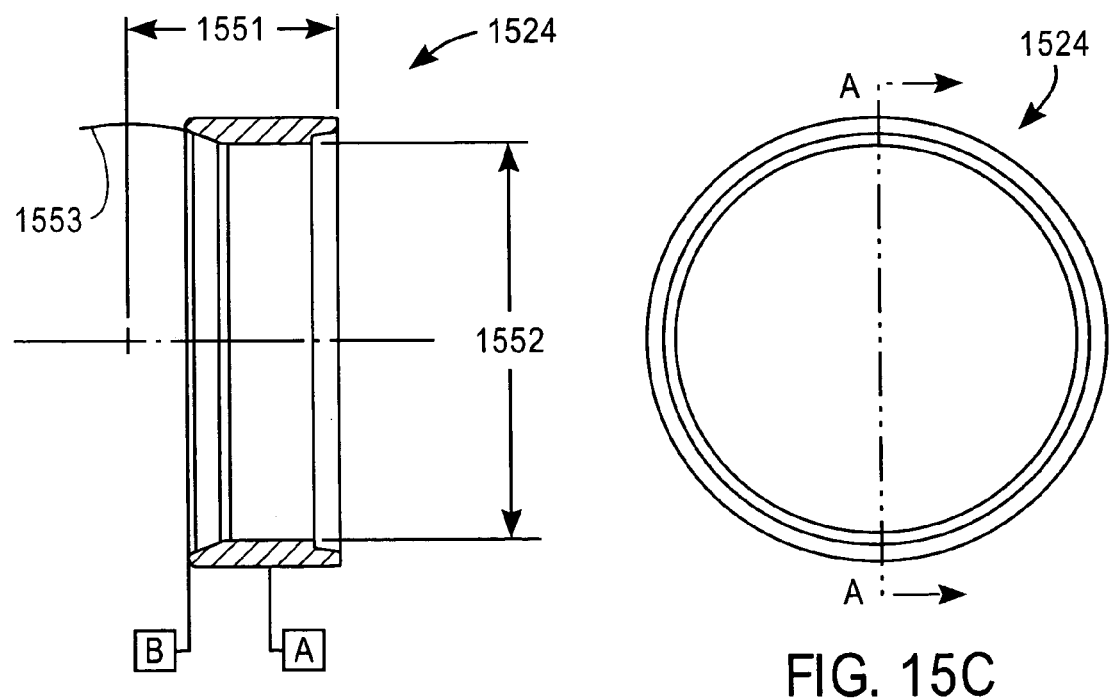
SECTION A-A
FIG. 15B
FIG. 15C

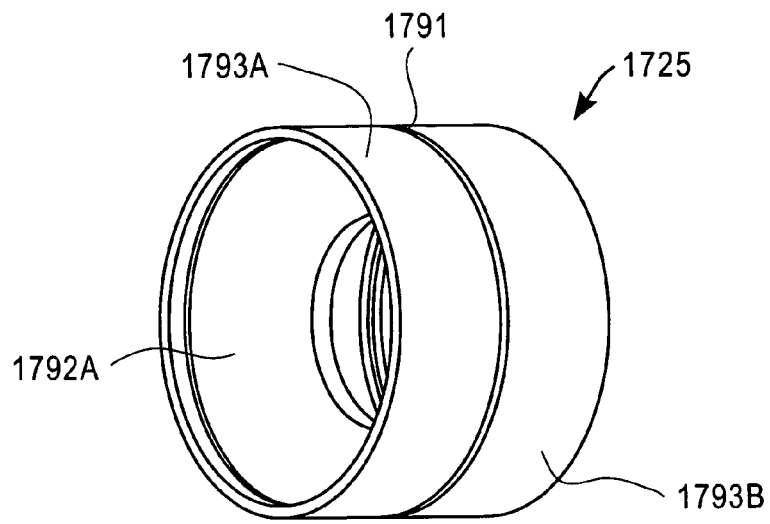
FIG. 17A
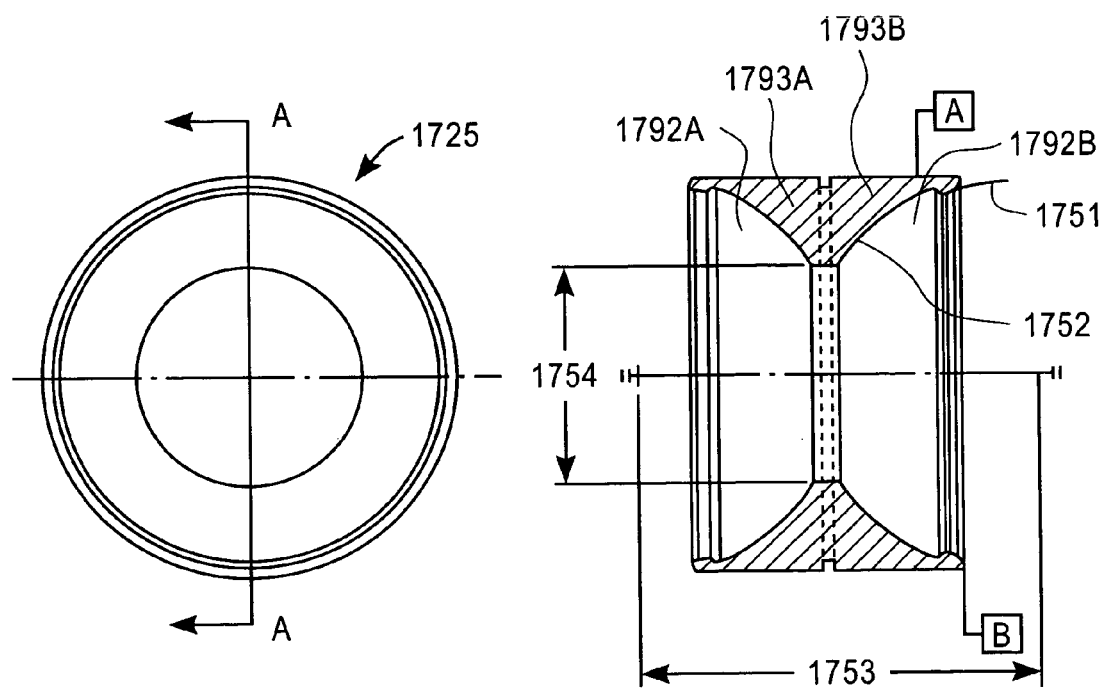
FIG. 17B
SECTION A-A
FIG. 17C

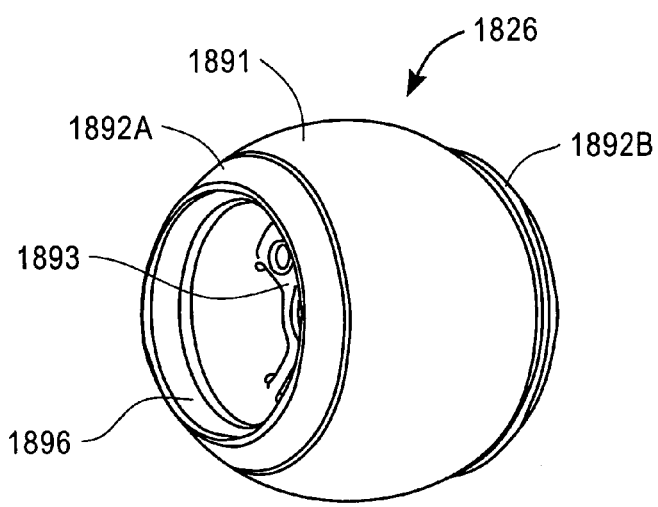
FIG. 18A
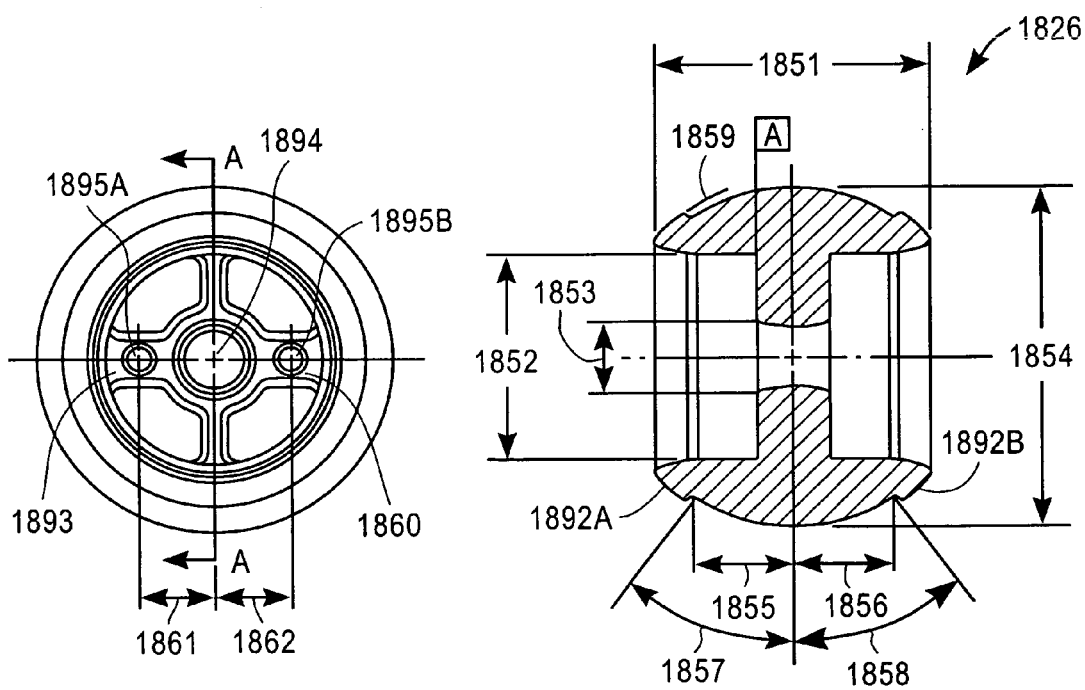
FIG. 18B
SECTION A-A
FIG. 18C

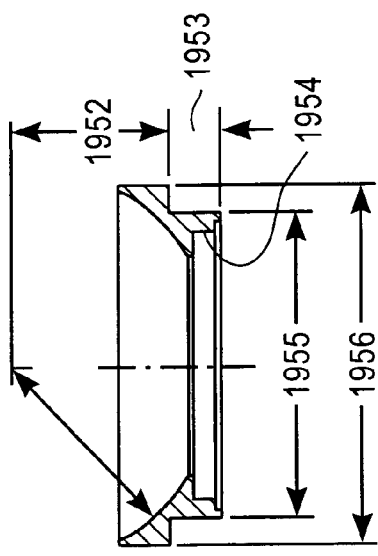
FIG. 19C SECTION A-A
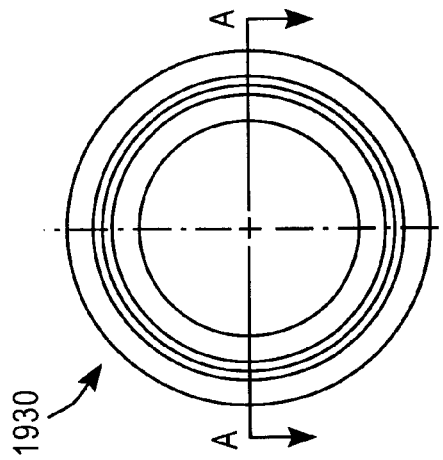
FIG. 19F
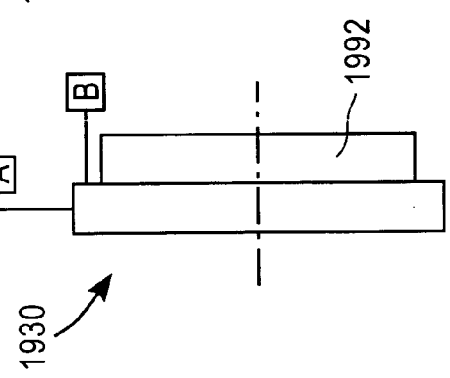
FIG. 19E
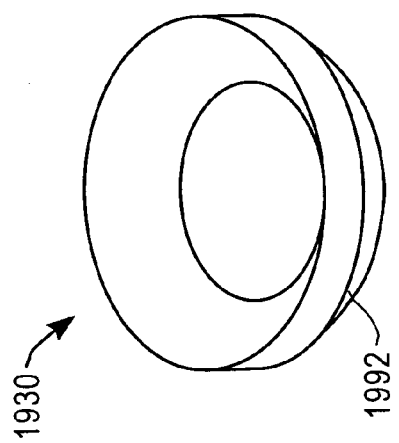
FIG. 19B
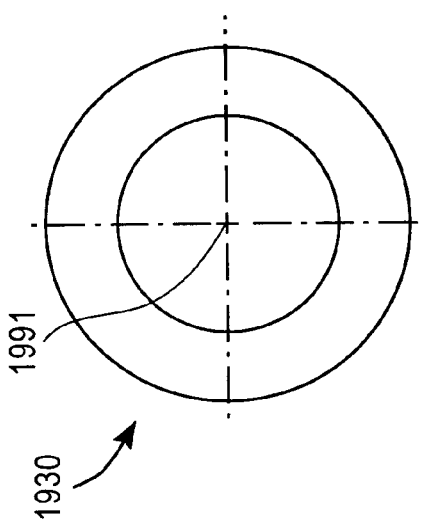
FIG. 19D

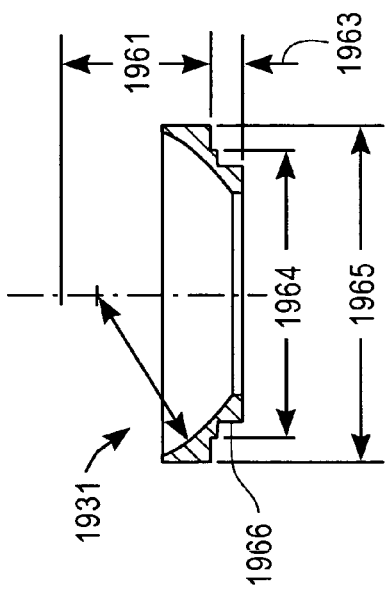
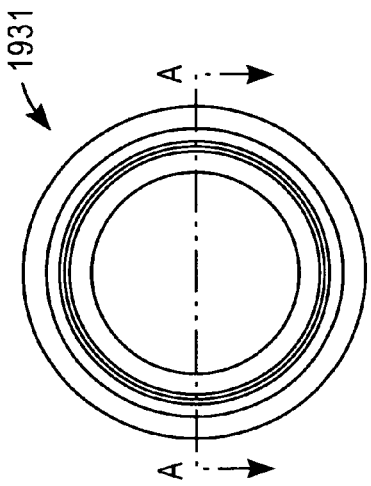
SECTION A-A
FIG. 19H
FIG. 19K
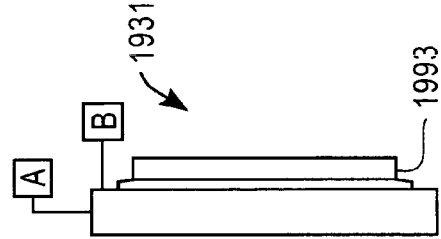
FIG. 19J
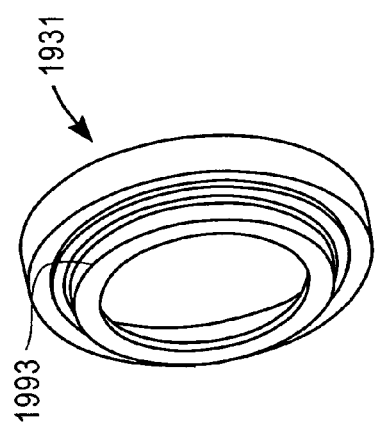
FIG. 19G
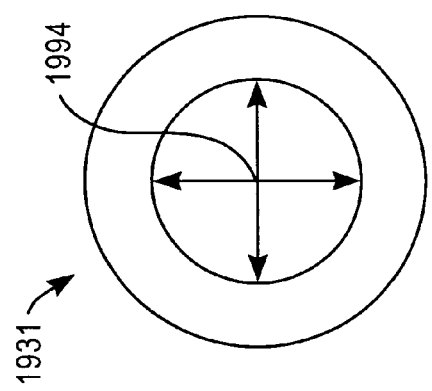
FIG. 19I

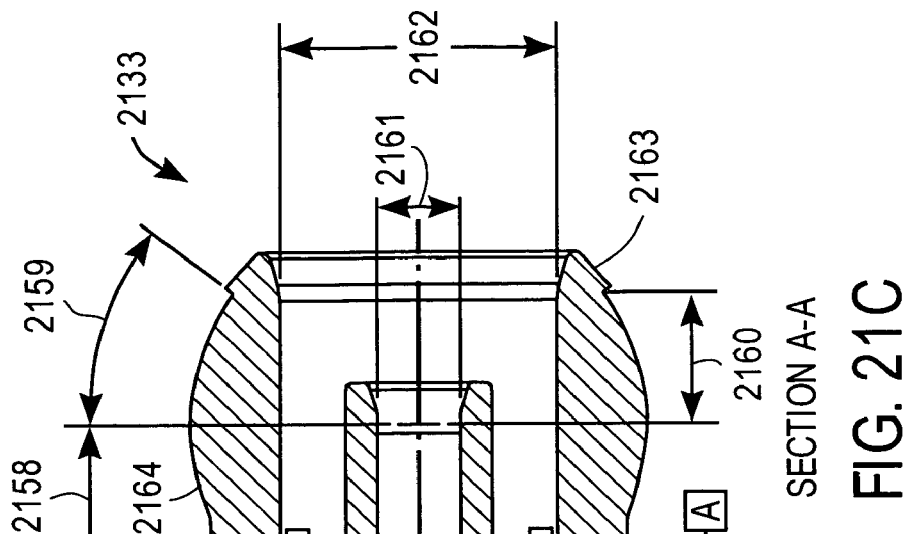
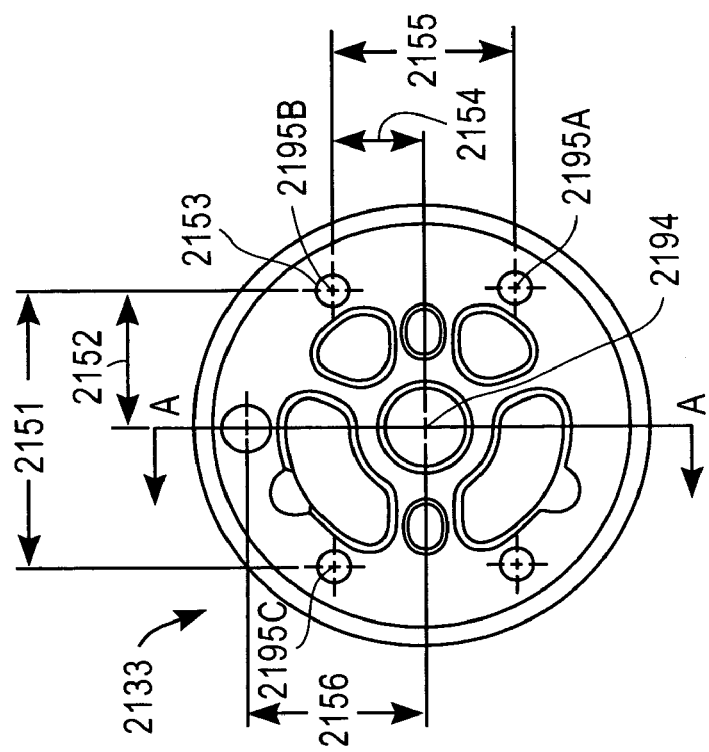
FIG. 21C
FIG. 21B

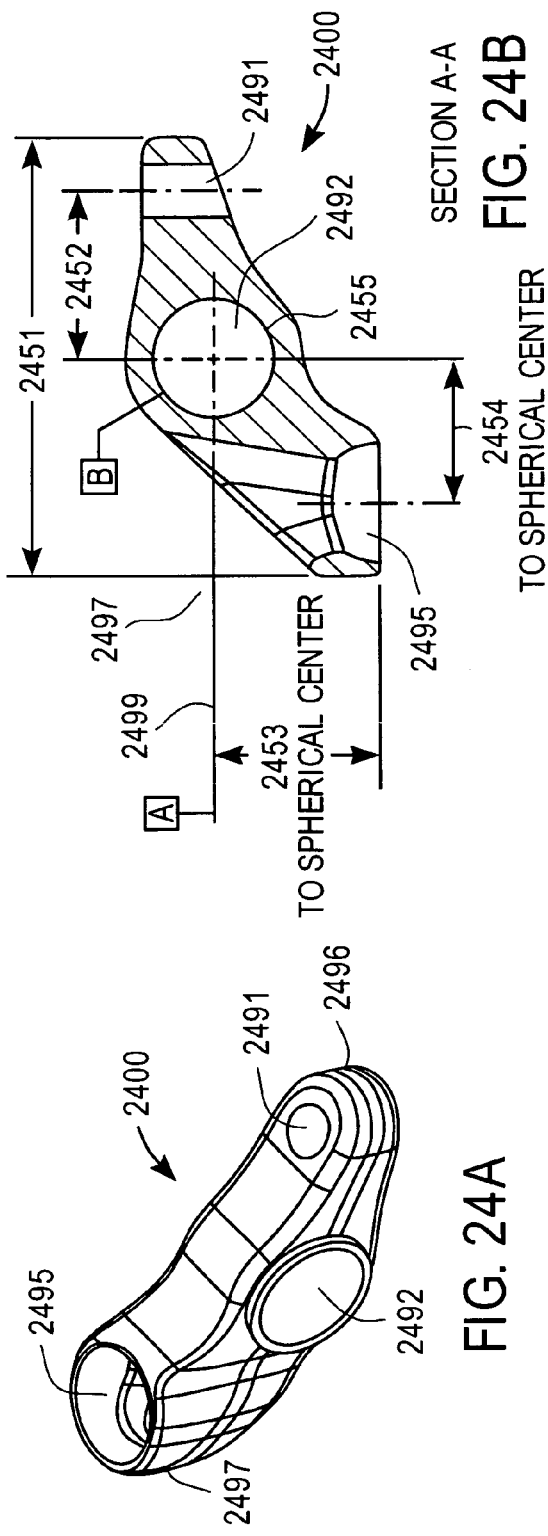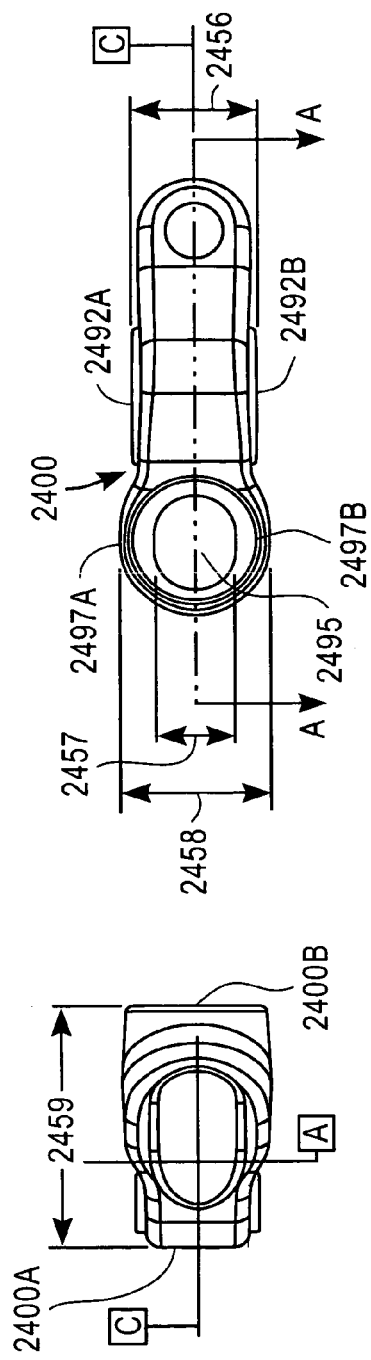
FIG. 24A
FIG. 24B SECTION A-A
FIG. 24C
FIG. 24D

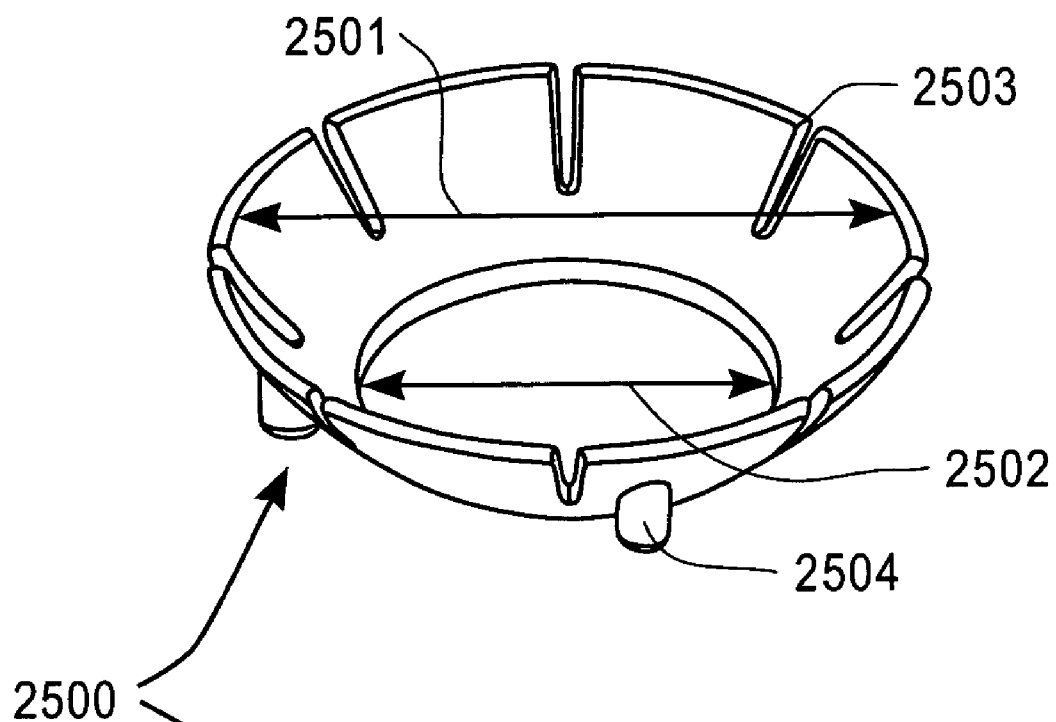
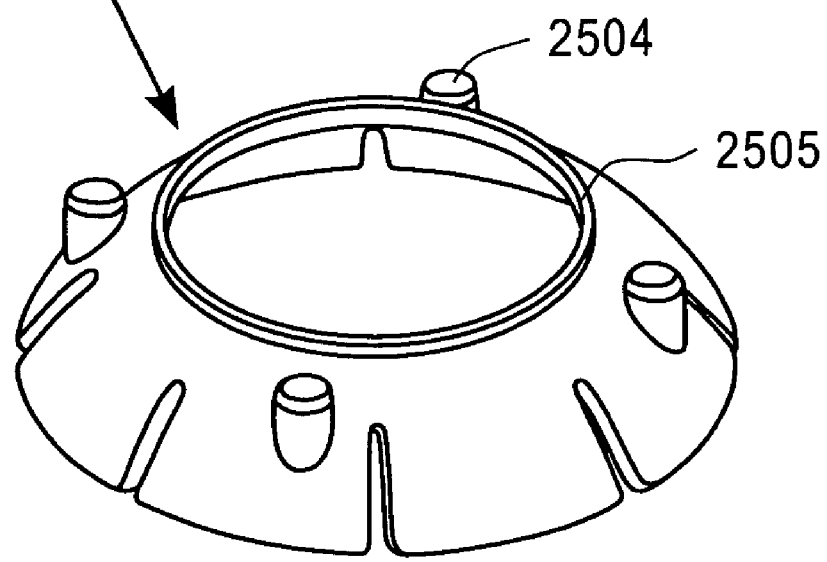
FIG. 25A

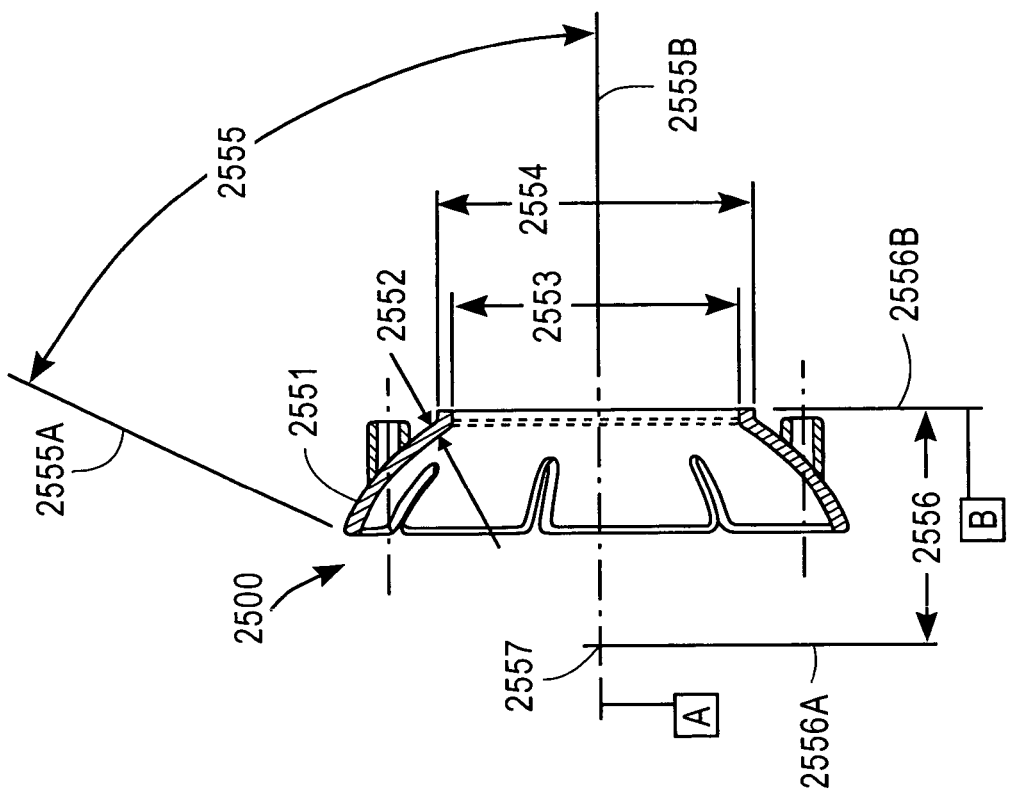
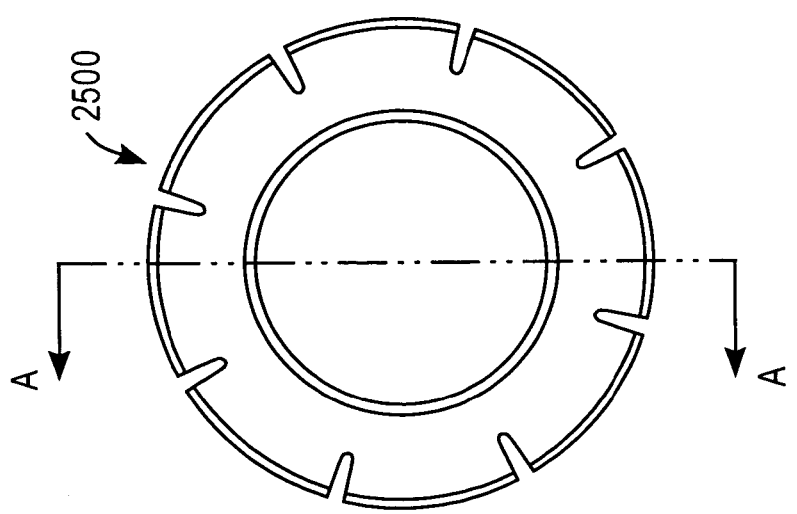
FIG. 25E SECTION A-A
FIG. 25D

DETAIL A

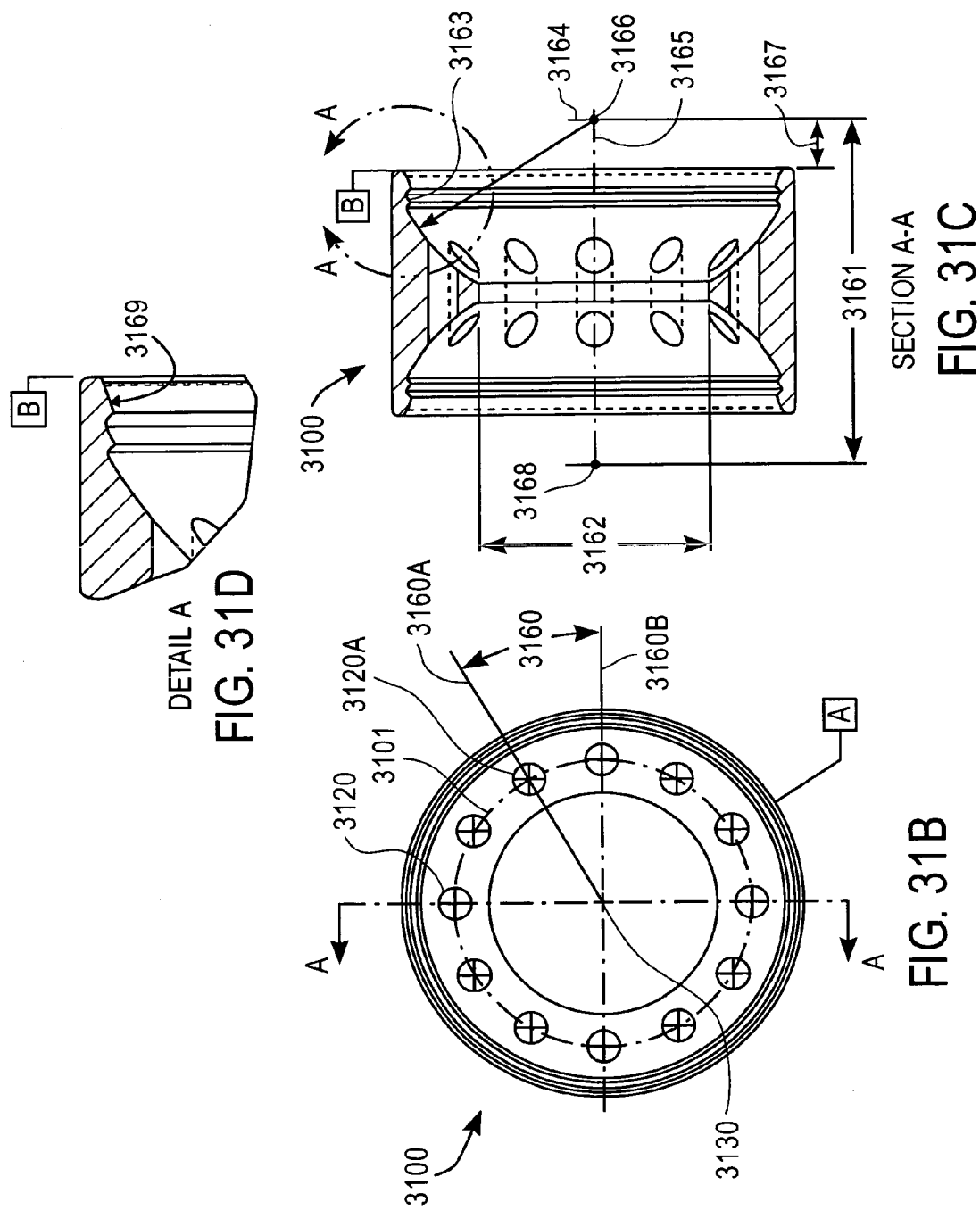

CROSS SECTION A-A

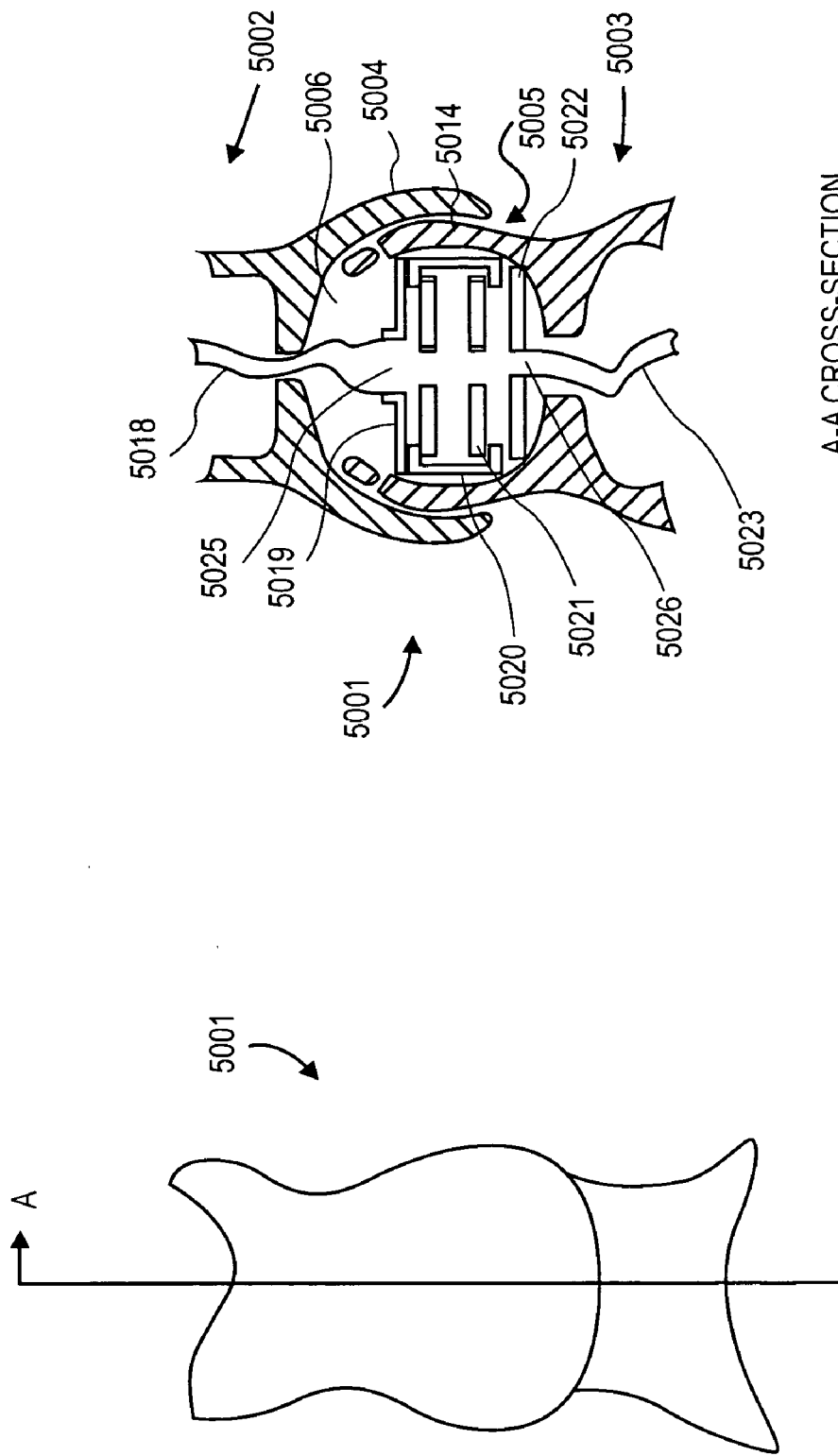

COMPUTER CONTROLLED DISPLAY DEVICE

RELATED APPLICATIONS

This application is related to and claims the benefit of U.S. Provisional Patent Application 60/438,586 entitled "COMPUTER CONTROLLED DISPLAY DEVICE," filed Jan. 6, 2003, the contents of which are incorporated by reference herein. This application is a Continuation-In-Part of U.S. patent application Ser. No. 10/035,417 entitled "COMPUTER CONTROLLED DISPLAY DEVICE," filed Nov. 8, 2001 now U.S. Pat. No. 6,819,550, the contents of which are incorporated by reference herein.

FIELD OF THE INVENTION

The field of the invention relates to computers and data processing systems, and more particularly to support mechanisms for supporting display devices for computers or data processing systems.

BACKGROUND

The advent of flat panel display devices has revolutionized the architecture and aesthetic appearance of computers. Lightweight and versatile, flat panel display devices (FPDDs) may be mounted almost anywhere. A variety of mechanical support devices have been designed to hold FPDDs in suitable viewing positions.

Many FPDDs are supported by rigid assemblies or mechanisms which may be affixed to furniture, walls, or ceilings. Recently, semi-moveable support devices (e.g. swing arm devices) have made their debut. Such devices are typically hinged in one or more places, and their display ends may be equipped with swivel joints. Though offering a greater number of viewing positions, semi-moveable support devices often prove difficult to adjust, and routing data and power cables along exterior portions of the devices can mar aesthetic appearances.

In many semi-moveable support devices, two hands are required to adjust the display's viewing position. Typically, one hand supports the FPDD while the other manipulates a locking device on a hinged joint. Twist-and-lock swivel joints have a knob or handle which may be rotated in one direction to increase the holding friction, or in the opposite direction to decrease holding friction. Increasing the holding friction locks the support device in a desired position. Similarly, decreasing the holding friction allows the swivel joint to move freely through a predetermined range of movement.

Twist-and-lock swivel joints are effective, but awkward to use, and difficult to break free if overtightened. On the other hand, if undertightened, twist-and-lock swivel joints will allow a supported FPDD to sag and droop. Moreover, it is not uncommon for a semi-moveable support device to have a plurality of twist-and-lock swivel joints, which makes it virtually impossible for a single user to tighten or loosen all the joints simultaneously. With a plurality of swivel joints, adjustment times are considerably lengthened because the swivel joints must be adjusted individually.

A swivel ball joint (e.g. gimbal) affixed to the display end of the arm mechanism allows a supported FPDD to be tilted or angled as desired. Because the holding friction exerted by the swivel ball joint is more or less constant, the user force needed to tilt the FPDD sometimes dislodges the support arm mechanism from its fixed position. Set screws may be provided to adjust a swivel joint's applied holding friction. However, one shortcoming of swivel joints equipped with set screws is that movement of the joints often feels rough, gritty, or ratchety.

Referring now to FIG. 1A, there is shown a set of pictures illustrating exemplary environments in which support mechanisms for flat panel display devices (FPDDS) may be used. As shown in picture 110, flat screen monitor arms are used in offices, schools, universities, government agencies, and other environments to provide adjustable support and correct length between the display and the viewer. As shown in picture 111, additional mounting solutions may be provided to incorporate FPDDs into corporate environments such as banks, financial institutions, trade and brokerage companies, and similar businesses.

FIG. 1B illustrates two further pictures illustrating additional environments in which FPDDs may be used. Picture 112 shows that FPDDs may be used in industrial areas such as manufacturing facilities, production lines, and assembly lines. Picture 113 represents the use of flat panel display devices in hospitals, health care facilities, and medical centers. In each case, the FPDD is attached to a moveable support device that is fixedly attached to a large, heavy object, such as the wall or floor of a building.

FIG. 1C is a diagram of a prior art moveable support device 100. Moveable support device 100 may be attached to a horizontal planar surface, such as a desktop, using clamp 106, which adjusts to accommodate different thicknesses of various support surfaces. The base of moveable support device 100 includes a housing 105, which is a removeable cosmetic covering that conceals a hollow screw mechanism used to affix clamp 106 to a support surface. The base of moveable support device 100 includes a cylindrical steel rod that removably slides within the hollow screw mechanism described above. In the embodiment shown, an arc of vertical movement measuring approximately 72.5 degrees may be provided by turn and lock swivel joint 103. Similarly, a second arc of vertical movement measuring approximately 115.0 degrees may be provided by turn and lock swivel joint 107.

Moveable support device 100 is made up of three arm members 101, 102, and 117, connected to each other by two twist and lock swivel joints 107 and 103. A ball swivel joint (e.g. gimbal) 108 attached to the display end of arm member 101 provides a supported FPDD 109 with an arc of movement, measuring in one dimension, approximately 78.0 degrees. The weight of the supported FPDD 109 is counterbalanced using an internal spring and pulley mechanism (not shown). Cables 120 and 121, which provide power and data, respectively, to FPDD 109, are attached to the exterior of moveable support device 100 using a plurality of retention guides 123. The various components of moveable support device 100 are manufactured from various materials, including, but not limited to: metals, plastics, and composite materials.

FIG. 1D is a diagram illustrating a prior art gooseneck lamp 118. However, the inclusion of this lamp is not to be construed as an admission that lamps are analogous art to the present invention. Typically, components of lamp 118 include a weighted or magnetic base 116, a hollow, moveable assembly portion 115, and a bulb housing 114. An electrical wire may run inside or outside the neck portion 115. Typically, the weight of bulb housing 114 is negligible compared to the weight of the base 116 and of the neck portion 115 itself. Otherwise, neck portion 115 would droop, or lamp 118 would topple over.

In most cases, neck portion 115 is manufactured of a jointed, spiral-cut metal skin that is easily flexed into one of a number of desired positions. A plurality of plastic or metal ball-and-socket assemblies may be used to form neck portion 115. Where ball-and-socket assemblies are used, the holding force may be provided by a tension cable running through the ball-and-socket assemblies that loops about a cam attached to a twist-lever disposed on or near the base 116. Twisting the twist-lever in one direction stretches the cable and stiffens neck portion 115. Twisting the twist-lever in the opposite direction relaxes the cable, thereby dissolving the holding force, and allowing the neck portion 115 to collapse.

The ball-and-socket assemblies may be formed of either metal or plastic, but metal is typically used because it is stronger and more durable than plastic. A problem with prior art ball-and-socket assemblies is that the friction provided by a metal ball mating with a metal socket will not sustain heavy loads. While capable of supporting a lightbulb or other small lightweight object, prior art ball-and-socket assemblies are simply incapable of supporting large heavy objects, such as FPDDs, which typically weigh in excess of two pounds.

SUMMARY

The present invention is a computer controlled display device. In one embodiment, the display device includes a flat panel display having an input for receiving display data. Additionally, a moveable assembly may be coupled to the display. The moveable assembly may provide at least three degrees of freedom of movement for the flat panel display device. Additionally, the moveable assembly may have a cross-sectional area, which is substantially less than a cross-sectional area of a display structure of the flat panel display. Other embodiments and aspects of the invention are described below.

BRIEF DESCRIPTION OF THE DRAWINGS

Various aspects of the present invention are set forth in the following drawings in which:

FIG. 4A is a diagram illustrating a sectional side view of the actuator assembly and moveable assembly, according to another embodiment of the invention.

FIG. 5A is a diagram illustrating a moveable assembly 500, according to one embodiment of the invention.

FIG. 5B and FIG. 5C are perspective views of the moveable assembly 500 shown in FIG. 5A.

FIG. 9C is a plan view of the actuator housing of FIG. 9A, according to one embodiment of the present invention.

FIG. 9D is a cross-sectional view of the actuator housing of FIG. 9A taken along the lines A—A in FIG. 9C, according to one embodiment of the present invention.

FIG. 9E is a cross-sectional view of the actuator housing of FIG. 9A taken along the line B—B in FIG. 9C, according to one embodiment of the present invention.

FIG. 12B is a side view of the spring shaft of FIG. 12A, according to one embodiment of the present invention.

FIG. 12C is a sectional view of the spring shaft of FIG. 12A taken along the line A—A in FIG. 12B, according to one embodiment of the present invention.

FIG. 12D is an end view of the spring shaft of FIG. 12A, according to one embodiment of the present invention.

FIG. 14A is a perspective view of a shaft, according to one embodiment of the present invention.

FIG. 14B is a side view of the shaft of FIG. 14A, according to one embodiment of the present invention.

FIG. 15A is a perspective view of a display termination socket, according to one embodiment of the present invention.

FIG. 15B is a sectional view of the display termination socket of FIG. 15A taken along the line A—A in FIG. 15C.

FIG. 15C is a plan view of the display termination socket of FIG. 15A according to one embodiment of the present invention.

FIG. 17A is a perspective view of a friction limit socket, according to one embodiment of the present invention.

FIG. 17B is a plan view of a friction limit socket of FIG. 17A, according to one embodiment of the present invention.

FIG. 17C is a sectional view of the friction limit socket of FIG. 17A, according to one embodiment of the present invention.

FIG. 18A is a perspective view of a limit ball, according to one embodiment of the present invention.

FIG. 18B is a plan view of the limit ball of FIG. 18A, according to one embodiment of the present invention.

FIG. 18C is a sectional view of the limit ball of FIG. 18A, according to one embodiment of the present invention.

FIG. 19B is a perspective view of a first friction insert, according to one embodiment of the present invention.

FIG. 19C is a sectional side view of the friction insert of FIG. 19A taken along the line A—A in FIG. 19F.

FIG. 19D is a top view of the friction insert of FIG. 19A, according to one embodiment of the present invention.

FIG. 19E is a side view of the friction insert of FIG. 19A, according to one embodiment of the present invention.

FIG. 19F is a bottom view of the friction insert of FIG. 19A, according to one embodiment of the present invention.

FIG. 19G is a perspective view of a second friction insert of FIG. 19A, according to one embodiment of the present invention.

FIG. 19H is a sectional side view of the friction insert of FIG. 19G taken along the line A—A in FIG. 19K, according to one embodiment of the present invention.

FIG. 19I is a top view of the friction insert of FIG. 19G, according to one embodiment of the present invention.

FIG. 19J is a side view of the friction insert of FIG. 19G, according to one embodiment of the present invention.

FIG. 19K is a bottom view of the friction insert of FIG. 19G, according to one embodiment of the present invention.

FIG. 21B is a bottom view of the base termination ball of FIG. 21A according to one embodiment of the present invention.

FIG. 21C is a sectional view of the base termination ball of FIG. 21A taken along the line A—A, according to one embodiment of the present invention.

FIG. 24A is a perspective view of another embodiment of a tongue 2400, according to one embodiment of the present invention.

FIG. 24B is a cross-sectional view of a tongue of FIG. 24A, according to one embodiment of the invention.

FIG. 24C is a top view of a tongue of FIG. 24A, according to one embodiment of the invention.

FIG. 24D is an end view of a tongue of FIG. 24A, according to one embodiment of the invention.

FIG. 25A is a perspective view of a spherical glide bearing 2500, according to one embodiment of the invention.

FIG. 25D is a top view of a spherical glide bearing of FIG. 25A, according to one embodiment of the invention.

FIG. 25E is a sectional side view of a spherical glide bearing of FIG. 25A, taken along the line A—A in FIG. 25D.

FIG. 31B is a top view of a friction limit socket of FIG. 31A, according to one embodiment of the invention.

FIG. 31C is a cross-sectional view of a friction limit socket of FIG. 31A, according to one embodiment of the invention.

FIG. 31D is a detailed view of an area A circled in FIG. 31C, according to one embodiment of the invention.

FIG. 43A depicts one embodiment of a counterbalance adjustment mechanism in a first position.

FIG. 43B depicts one embodiment of a counterbalance adjustment mechanism in a second position.

FIG. 44 is a graph depicting counter-balance with manufacturing error bars after tuning for a moveable assembly, according to one embodiment of the invention.

FIG. 45 is a graph depicting the pitch counter-balance sum of moments for one embodiment of a moveable assembly.

FIG. 46 is a cross-sectional view of the moveable assembly 3401 of FIG. 34, showing placement of data, power, and other computer system-related cables therein, according to one embodiment of the invention.

FIG. 47 is a side view of one embodiment of a computer controlled display system.

FIG. 48A is a perspective view of one embodiment of a link 4801 of the moveable assembly 4702 shown in FIG. 47.

FIG. 48B is a cross-sectional side view of link 4801 taken along the line A—A in FIG. 48A.

FIG. 49 is an exploded perspective view of an embodiment of a link 4901 and a brake assembly 4914.

FIG. 50A is a side view of one embodiment of a ball-and-socket assembly 5001 of the moveable assembly 4702 shown in FIG. 47.

FIG. 50B is a cross-sectional side view of ball-and-socket assembly 5001 taken along the line A—A in FIG. 50A.

FIG. 51A is a cross-sectional view of an embodiment of an alternative configuration of a bladder 5103 within a ball-and-socket assembly 5100.

Figure 51B:
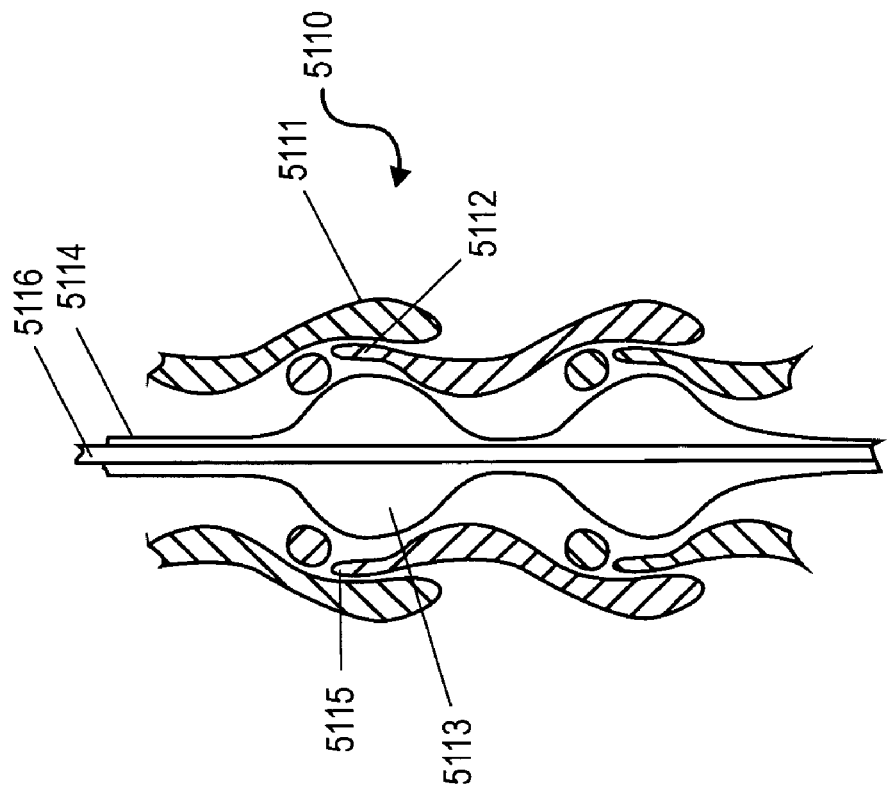

FIG. 51B is a cross-sectional view of an embodiment of an alternative configuration of a bladder 5113 within a ball-and-socket assembly 5110.

Figure 47:
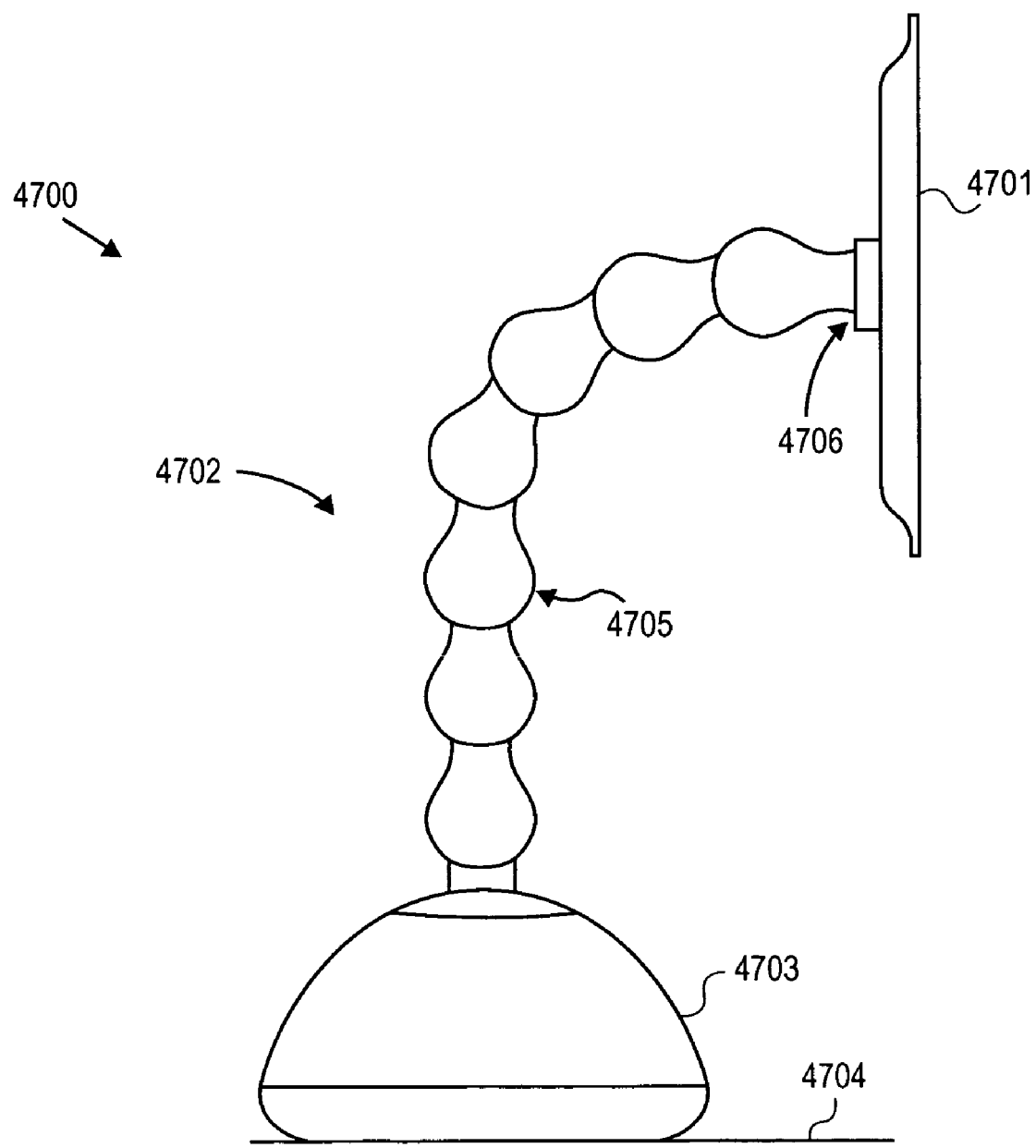
Figure 52B:
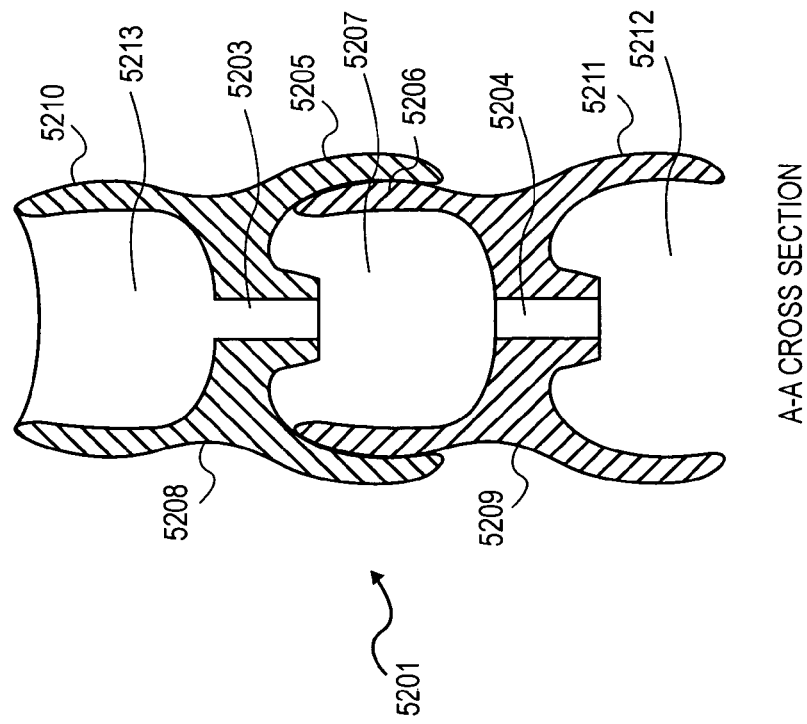
Figure 52A:
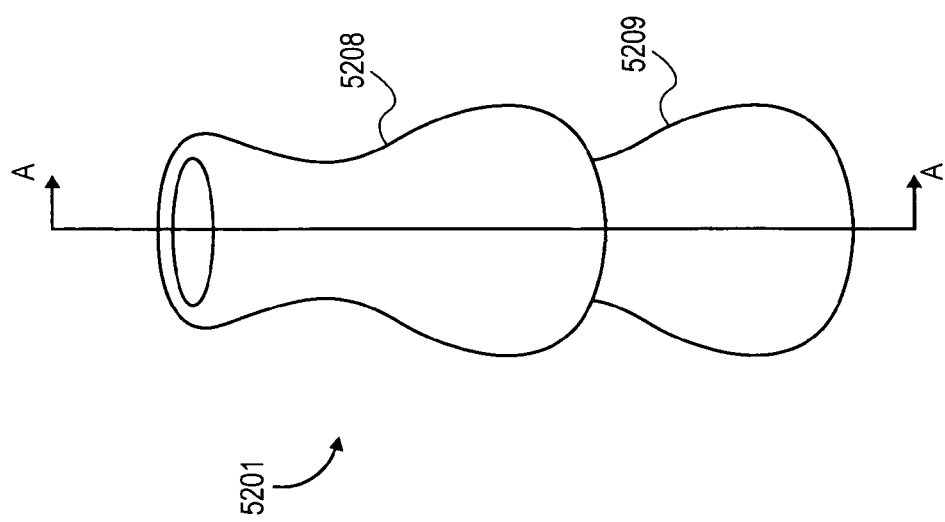

FIG. 52A is a side view of one embodiment of a ball-and-socket assembly 5201 of the moveable assembly 4702 shown in FIG. 47.

FIG. 52B is a cross-sectional side view of ball-and-socket assembly 5201 taken along the line A—A in FIG. 52A.

DETAILED DESCRIPTION

An apparatus and method for supporting flat panel display devices is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

Figure 1A:
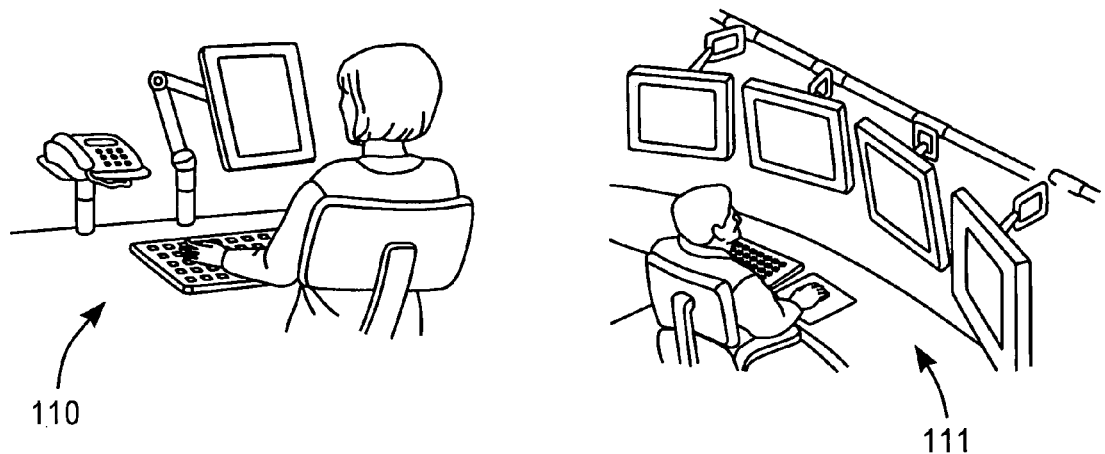
FIG. 1A is a diagram illustrating a moveable support device, common in the prior art, and used to support a computer display in a home or office environment, or in a corporate environment.
Figure 1B:
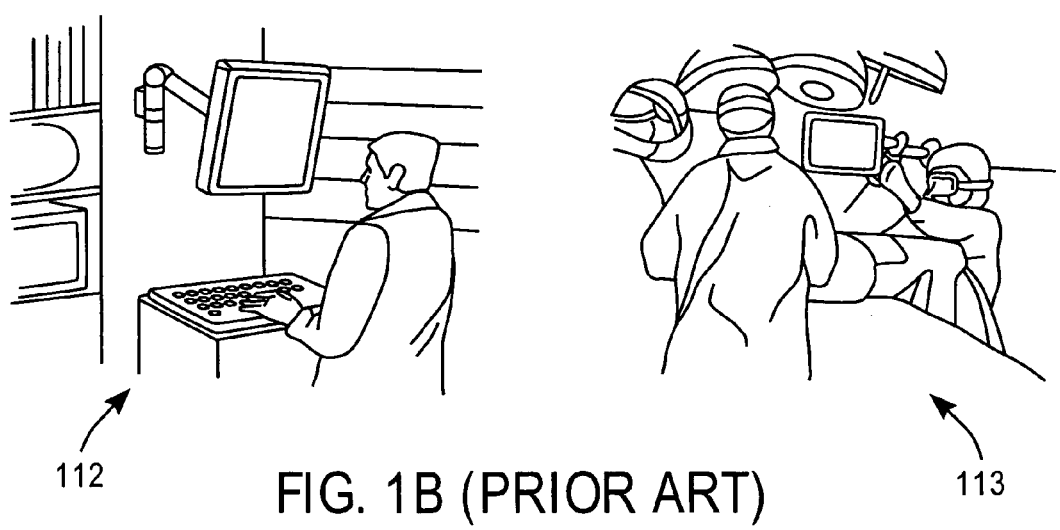
FIG. 1B is a diagram illustrating a prior art wall mounted support device for displaying computer displays in a manufacturing or industrial environment, or in a medical environment.
Figure 1C:
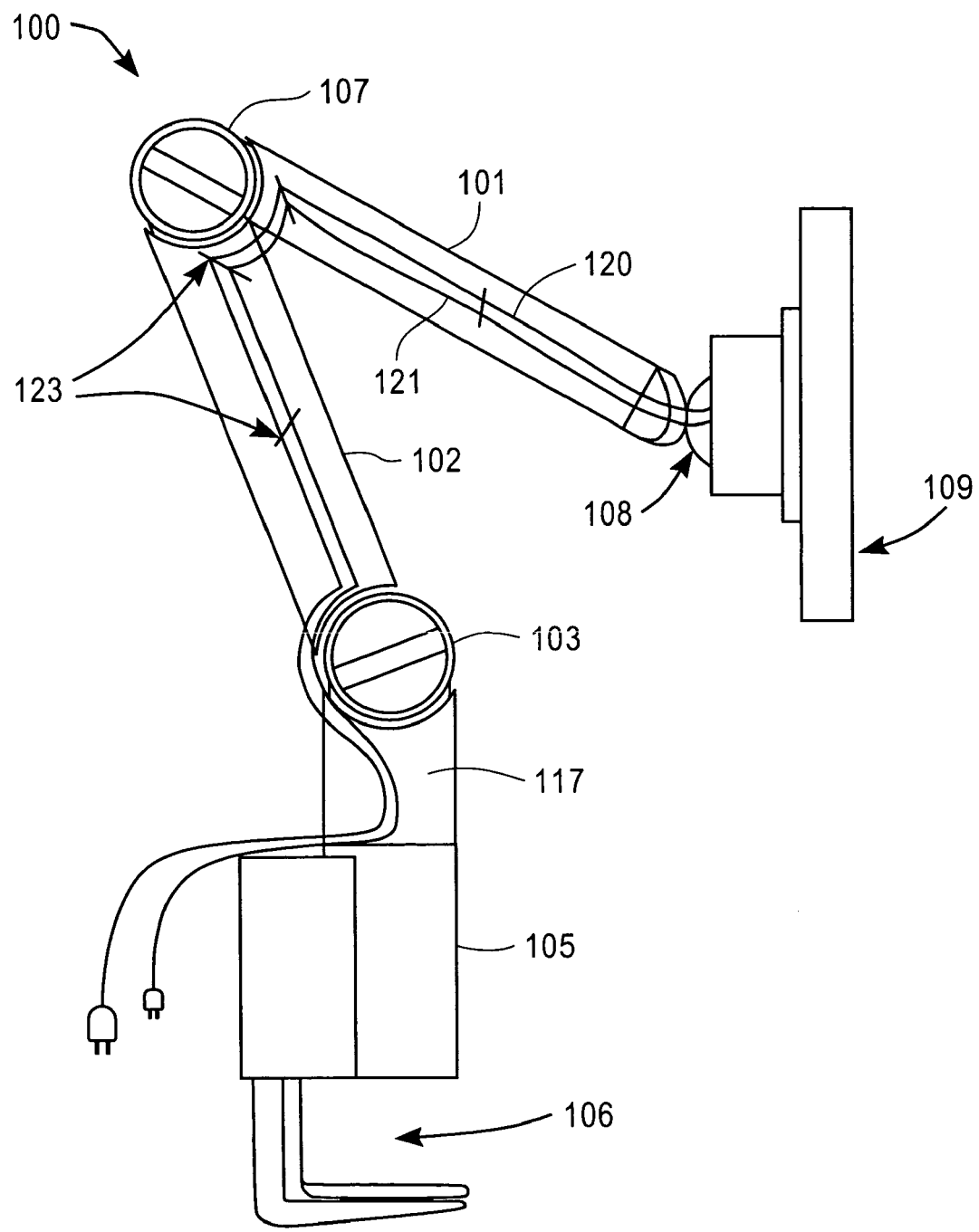
FIG. 1C is a diagram illustrating a side view of the prior art moveable support device 110 shown in FIG. 1A.
Figure 1D:
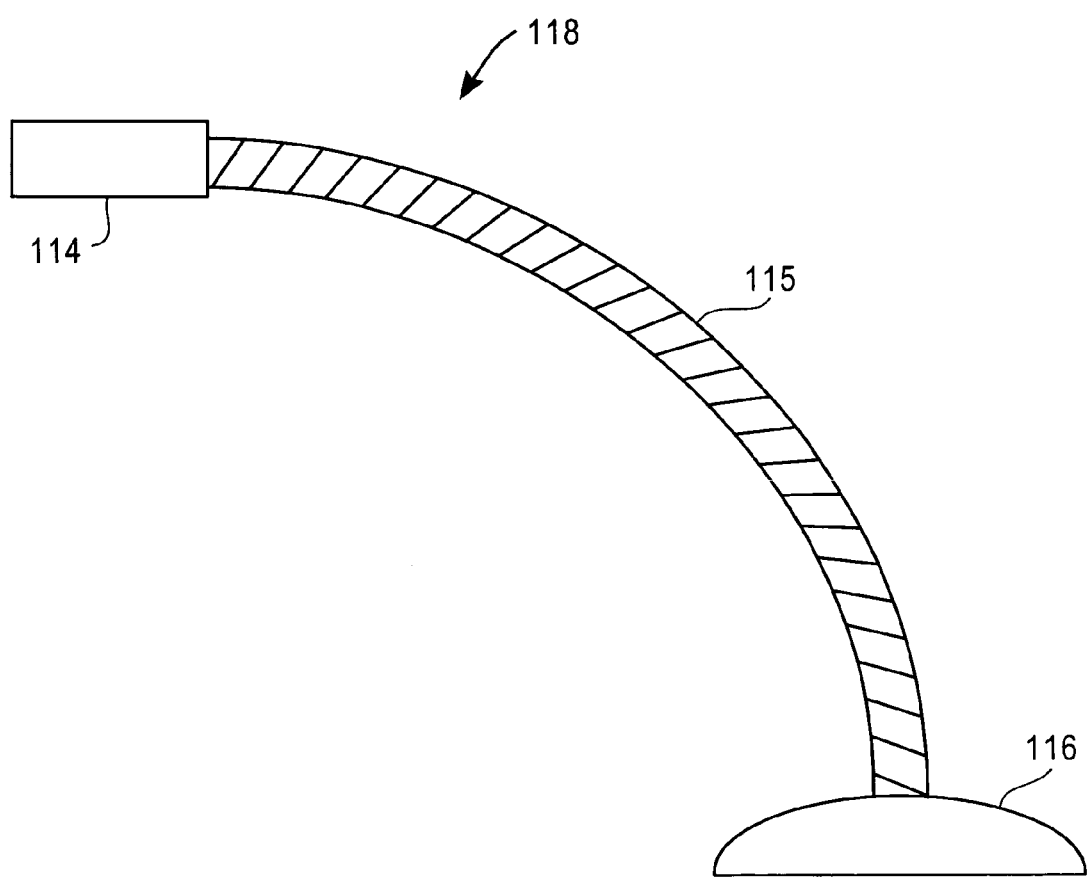
FIG. 1D is a diagram illustrating a side view of a prior art gooseneck lamp.
Figure 1E:
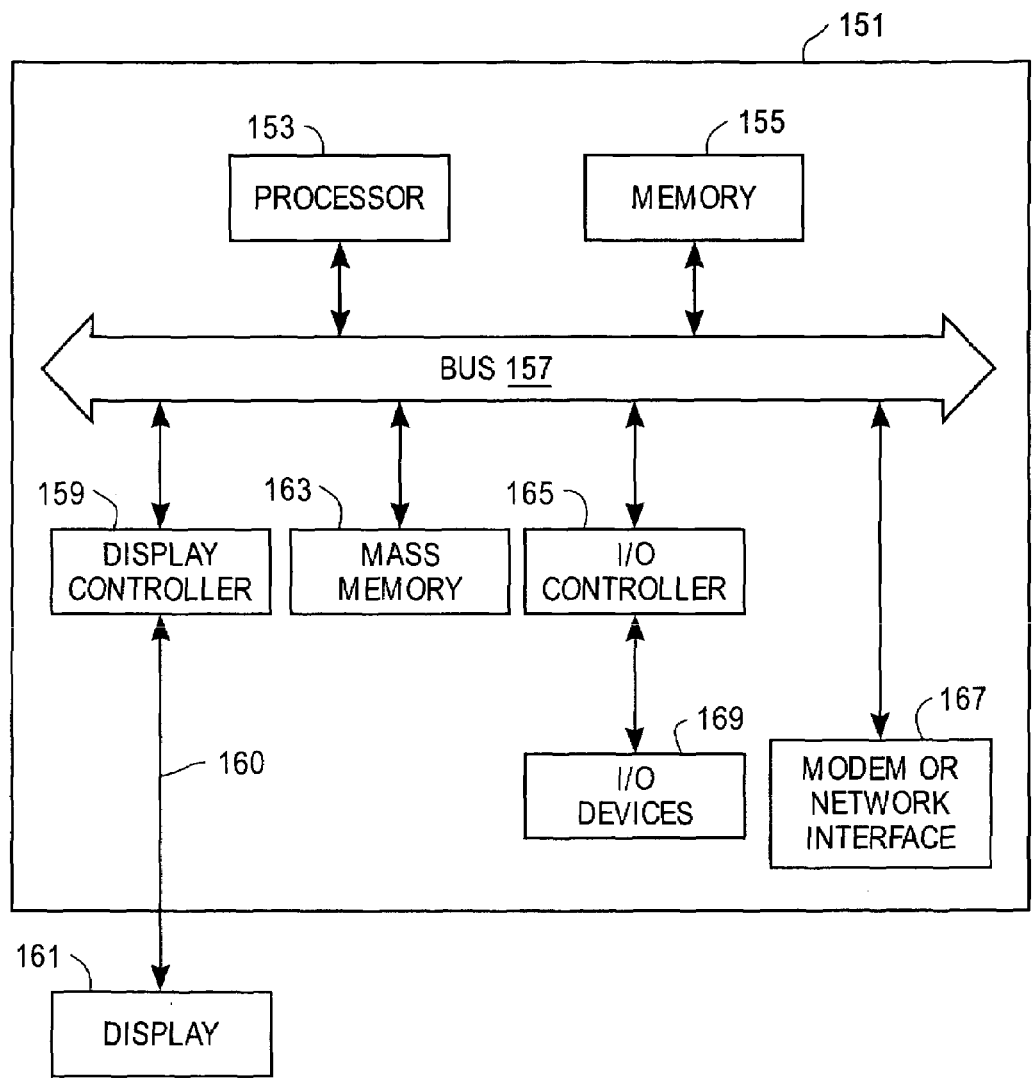
FIG. 1E is a diagram of a conventional computer system which may be used with a moveable support device and flat panel display device (FPDD), according to one embodiment of the present invention.

FIG. 1E depicts one embodiment of a conventional computer system that may be used with a display device as described herein. The computer system 151 interfaces to external systems through a modem or network interface 167. It will be appreciated that the modem or network interface 167 may be considered part of computer system 151. This interface 167 may be an analog modem, an ISDN modem, a cable modem, an Ethernet interface, a satellite transmission interface (e.g. Direct PC), or other network interface for coupling a digital processing system to other digital systems (e.g. the interface 167 couples computer system 151 to a local computer network or to the internet).

The computer system 151 includes a processor 153 which may be a conventional processor, such as a Motorola Power PC microprocessor or an Intel Pentium microprocessor. Memory 155 is coupled to processor 153 by the bus 157. Memory 155 may be dynamic random access memory (DRAM) and may also include static RAM (SRAM). The bus 157 couples the processor 153 to the memory 155 and also to mass memory 163 and to display controller 159 and to the I/O (input/output) controller 165. Display controller 159 controls in the conventional manner a display on the FPDD 161, which may be a liquid crystal display device or other flat panel display device (e.g. organic light emitting diode display, vacuum fluorescent on silicon display, field emissive display, plasma display, etc.). The display controller 159 is coupled to the display 161 through a cable 160, which in one embodiment provides display data and power and control signals between the display 161 and the display controller 159.

The input/output devices 169 may include a keyboard, disk drives, printers, a scanner, a digital camera, and other input and output devices, including a mouse or other pointing device. The display controller 159 and the I/O controller 165 may be implemented with conventional well-known technology. The mass memory 163 is often a magnetic hard disk, an optical disk, or other form of storage for large amounts of data. Some of this data is often written, by a direct memory access process, into memory 155 during the execution of software in the computer system 151. It will be appreciated that the computer system 151 is one example of many possible computer systems which have different architectures. For example, Macintosh or Wintel systems often have multiple buses, at least one of which may be considered to be a peripheral bus.

Network computers may also be considered to be a computer system which may be used with the various display devices described herein. Network computers may not include a hard disk or other mass storage, and the executable programs are loaded from a network connection (e.g. through network interface 167) into the memory 155 for execution by the processor 153. A Web TV system, which is well-known in the art, may be considered to be a computer system according to the present invention, but it may not include certain features shown in FIG. 2B, such as certain input/output devices.

A cell phone, a personal digital assistant, or a digital camera having a suitable display interface (to couple to a display device as described herein) and a processor and memory may also be considered to be a digital processing system or a computer system which may be used with the present invention. A typical computer system will usually include at least a processor, a memory, and a bus coupling the memory to the processor. It will also be appreciated that computer system 151 is typically controlled by an operating system software which includes a file management system and a disk operating system.

Figure 2A:
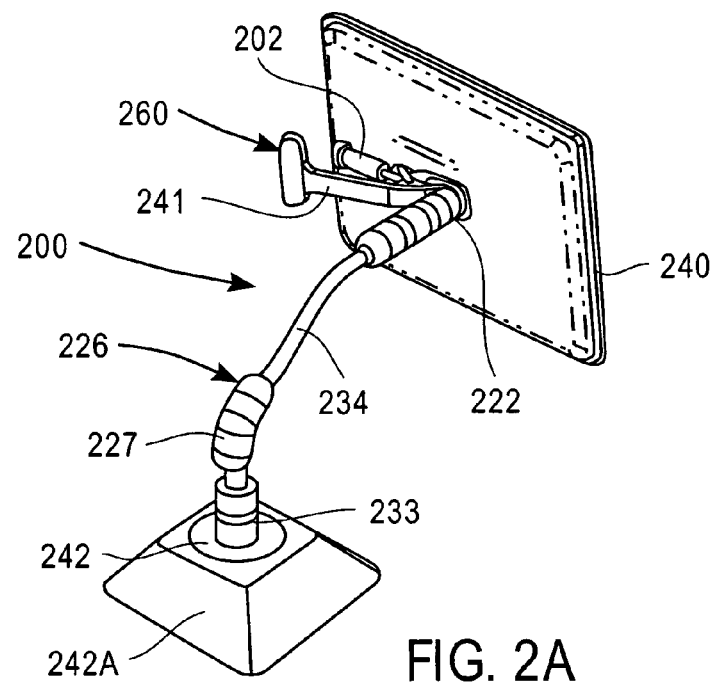
FIG. 2A is a cut-away, perspective view of a moveable assembly and actuator assembly for supporting a FPDD, according to one embodiment of the invention.
Figure 2B:
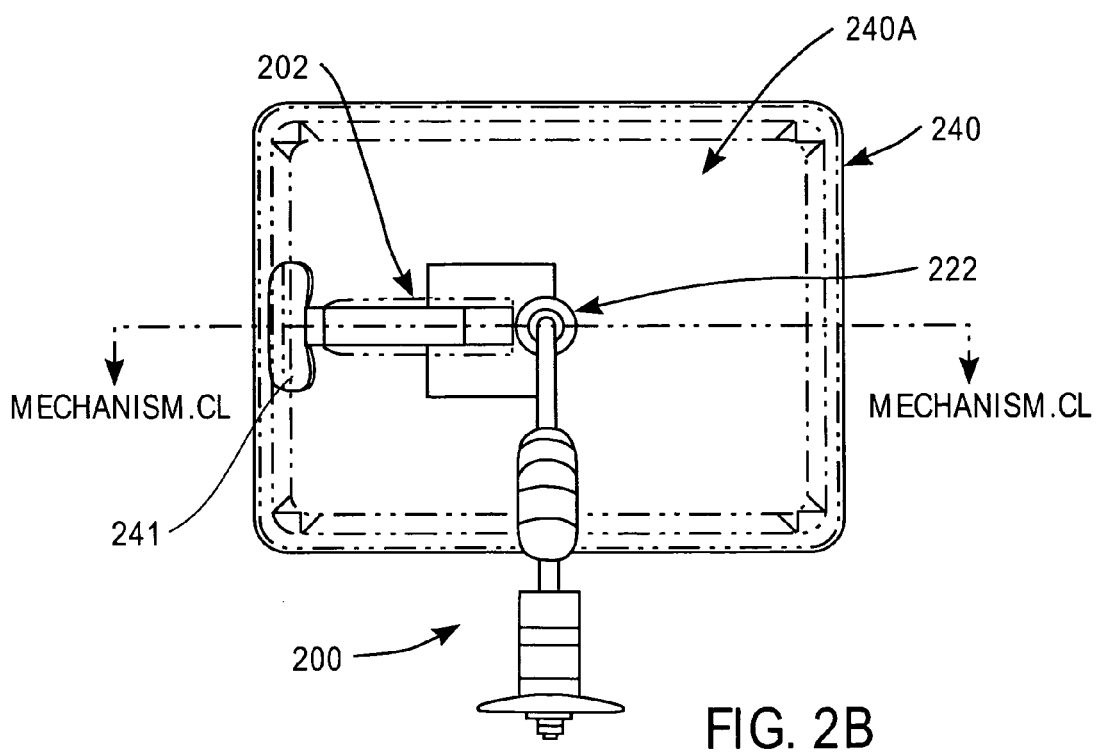
FIG. 2B is a rear view of the actuator assembly and moveable assembly shown in FIG. 2A (without the base), according to one embodiment of the invention.
Figure 2C:
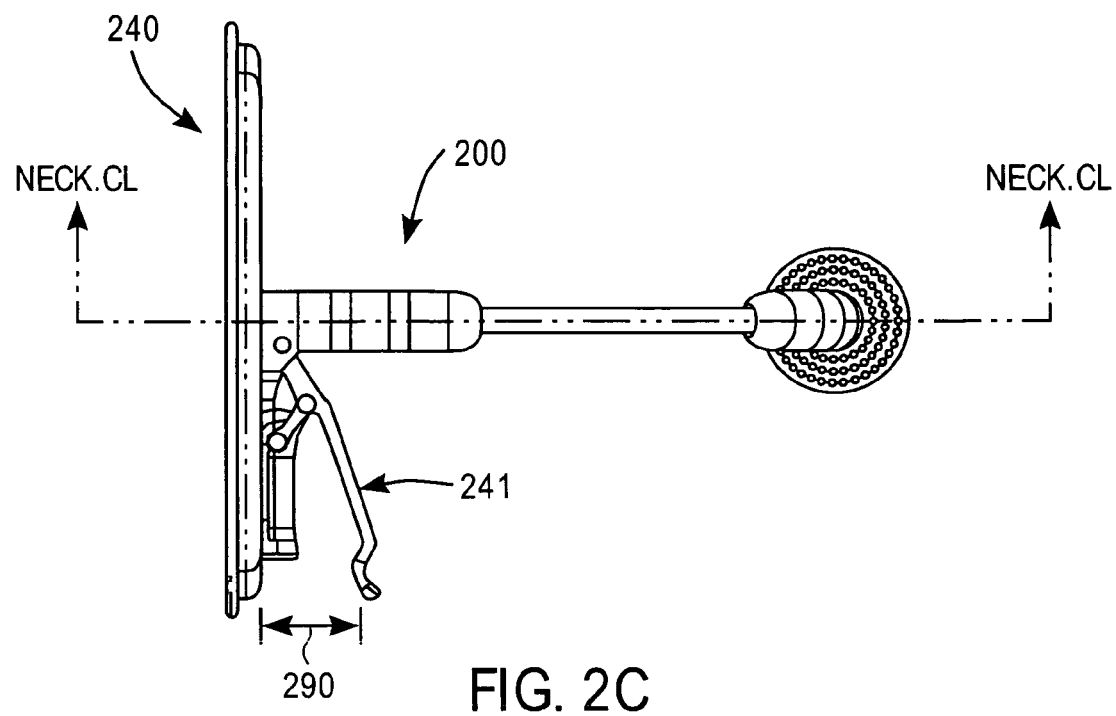
FIG. 2C is a plan view of the actuator assembly and moveable assembly shown in FIG. 2A (without the base), according to one embodiment of the present invention.
Figure 2D:
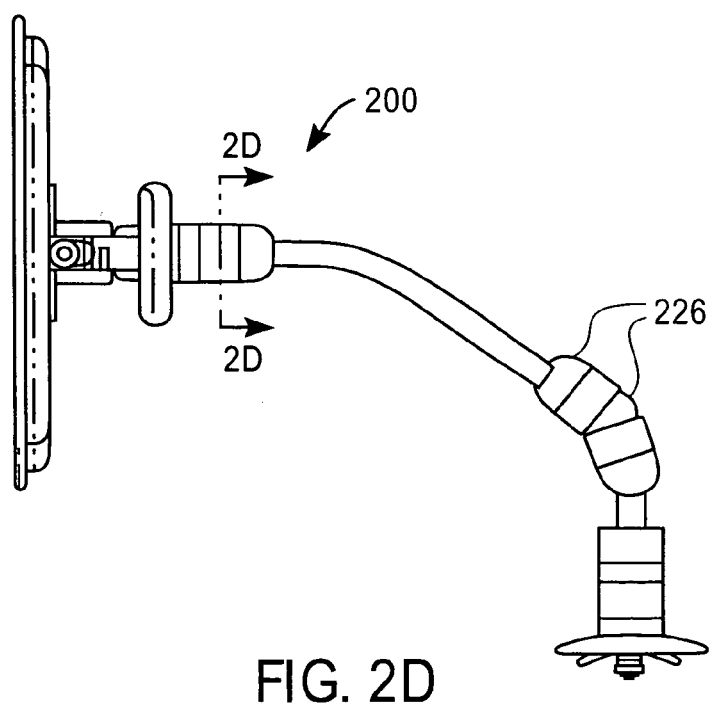
FIG. 2D is a side view of the actuator assembly and moveable assembly shown in FIG. 2A (without the base), according to one embodiment of the present invention.

Referring again to FIGS. 1E and 2A, in one embodiment of the invention, certain elements of the computer system 151 (e.g. processor 153, memory 155, bus 157, mass memory 163, display controller 159, I/O controller 165, an optical drive (not shown), and possibly also interface 167) are housed in a moveable enclosure 242A which is coupled to the base 242 of the moveable assembly (shown in FIGS. 2A–2D as moveable assembly 200). The opposite end of the moveable assembly is coupled with a FPDD (e.g. display 240, which corresponds to display 161). In this one embodiment, a cable is disposed within an interior portion of the moveable assembly 200 and couples the display 240 to the display controller 159, which provides display data to the display 240 through the cable 160. The cable may also provide power and the control signals (if any, such as brightness or contrast signals sent by an input device on the FPDD 240 to the system 151) to the FPDD 240.

In the embodiment of FIG. 2A, the moveable enclosure 242A is small enough and light enough to be picked up and moved by a single adult person, and yet is heavy enough to support the FPDD 240 at various different positions without tipping. The moveable enclosure 242A need not be physically attached (e.g. by clamps or adhesive or other fixtures) to a support surface (such as a desk, shelf, counter, or table) because its size, weight, and shape are sufficient to support the moveable assembly 200 and FPDD 240 at various positions without tipping.

It will be appreciated that the size, shape, and weight of moveable enclosure 242A vary according to the length of the moveable assembly 200 and the weight and size of the FPDD to be supported. Illustratively, a FPDD 240 may measure approximately 6.0 inches or more, as measured diagonally across its viewing surface from one corner to an opposite corner, and may weigh approximately 1.5 pounds or more.

Regardless of the embodiment, the size, shape, and weight of moveable enclosure 242A should be selected such that no tipping occurs when the moveable assembly 200 is bent approximately ninety degrees from vertical. Preferably, no tipping occurs when a downward user force of approximately 2.0 lbs to approximately 3.0 lbs is applied to FPDD 240 when moveable assembly 200 is bent approximately ninety degrees from vertical.

In one embodiment, the bottom surface area of moveable enclosure 242A measures in the range of approximately 0.5 square feet to approximately 4.0 square feet. The system is designed to support a FPDD 240 weighing in the range of approximately 5.0 lbs to approximately 6.0 lbs, at approximately 25.0 lbs of user force. Illustratively, the length of the moveable assembly 200 may range from approximately 7.0 inches to approximately 48.0 inches.

In another embodiment, where moveable assembly 200 and/or display 240 are remotely (e.g. wirelessly or otherwise) coupled with moveable enclosure 242A, the base 242 of moveable assembly 200 may be clamped or otherwise fastened to a ground surface or an overhead surface. Base 242 of moveable assembly 200 may also be clamped or otherwise fastened to a substantially planar surface (e.g. desktop) or vertical surface (e.g. wall or side of a desk). Remote coupling may be accomplished using a wireless system or using extended lengths of power and data cables.

Still referring to FIG. 2A, moveable assembly 200 may be coupled with FPDD 240, as shown. Components of moveable assembly 200 may include: an actuator assembly 202, a display termination ball 222; a friction limit ball 226; a base 242; and a plurality of cables 234, including a tension cable, anti-torsion cable, data, microphone, power supply cables, and other cables.

As shown in FIG. 2A, actuator assembly 202 may be centrally and fixedly coupled with a backside of flat panel display device (FPDD) 240 using any of a number of suitable attachment methods (e.g. bolts, welds, adhesives, etc.) well-known in the art. Actuator assembly 202 is provided to reduce the amount of user force needed to collapse the moveable assembly. Typically, a user force of approximately 180 pounds to approximately 400 pounds is required. However, actuator assembly 202 reduces this force to an amount easily provided by an adult user (e.g. approximately 10.0 pounds to approximately 30.0 pounds). In the views of FIGS. 2A, 2B, 2C, 2D, 4A, and 4B, several of the ball-and-socket components are not shown in order to provide views of the cables which are within the ball-and-socket components.

Actuator assembly 202 may be wholly contained within a housing of FPDD 240 such that handle 241 may afterwards be coupled with a component of actuator assembly 202 via insertion through an opening in the housing. Handle 241 may be formed of a single piece or of multiple pieces of a stiff, durable material such as metal, plastic, or a composite material. Exemplary metals include steel, aluminum, titanium, and alloys thereof.

In one embodiment, a proximal end of handle 241 may be shaped to include (or may be coupled with) a finger support member 260, which provides a first compression surface. Finger support member 260 may be made of the same or a different material that comprises the remainder of handle 241, and may take any suitable aesthetic or ergonomic shape, size, or contour. Similarly, a distal end of handle 241 may be pivotably coupled with one or more components of actuator assembly 202 such that handle 241 functions as a lever arm. As shown in FIG. 2A, handle 241 is angled away from the backside of FPDD 240 such that the proximal end of handle 241 is positioned near an edge of FPDD 240. In one embodiment, the edge may be the left-hand edge of FPDD 240 as viewed from the back (e.g. right-hand edge as viewed from the front).

In one embodiment, a tension cable, coupled at one end with base 242 and coupled with a component of the actuator assembly 202 at the other, functions to keep the balls 226 and sockets 227 generally aligned. When tensed as shown in FIG. 2A, the tension cable locks the moveable assembly 200 in a desired viewing position by forcibly pressing balls 226 against friction inserts in sockets 227. Pulling the proximal end of handle 241 towards the backside of FPDD 240, relaxes the taut tension cable such that spring activated plungers in sockets 227 lift balls 226 away from the friction inserts to allow moveable assembly 200 to be manipulated into a desired configuration. Once achieved, the desired configuration may be "frozen" or locked into position simply by releasing handle 241.

In one embodiment, a user may adjust the viewing position of FPDD 240 by grasping the left-hand and right-hand edges of FPDD 240 with both hands. The user's palms may rest on portions of the front surface of FPDD 240, with the fingers of each hand naturally curling behind FPDD 240 to rest on either its backside or on the finger support member 260. Assuming an embodiment like that shown in FIG. 2A, the user may relax moveable assembly 200 by compressing the fingers of the right-hand against the first compression surface, which is the finger support member 260 previously described, while simultaneously compressing the palm of the right hand against a second compression surface, which is a portion of the front surface 240A of FPDD 240. This compressing moves the proximal end of handle 241 from a first tensioned position towards the back of the FPDD 240, while simultaneously moving the handle's distal end away from the back of FPDD 240. As the distal end moves away from the back of FPDD 240, the tensioned cable relaxes and the formerly rigid moveable assembly becomes flexible.

Once moveable assembly 200 is relaxed, the user may adjust the viewing position of FPDD 240 using one or both hands. For example, in another embodiment, the user may compress handle 241 with one hand, while manipulating moveable assembly 200 with the other. A desired viewing position may be locked in place by opening the fingers of the hand compressing the handle to allow the handle 241 to move from a second relaxed position back to the first tensioned position.

Referring now to FIG. 2B, a back view of moveable assembly 200 is shown. In this view, it can be seen that display termination ball 222 and actuator assembly 202, in one embodiment, are positioned substantially in the center of the back of FPDD 240 in order to provide an axis of rotation substantially near FPDD 240's center-of-mass. In other embodiments, display termination ball 222 and actuator assembly 202 may be non-centrally positioned on the back surface of FPDD 240. As shown in FIG. 2B, the outermost edge of handle 241 may be substantially coterminous with an edge of FPDD 240, or not.

Referring now to FIG. 2C, there is shown, according to one embodiment of the invention, a plan view of FPDD 240 and moveable assembly 200. The gap 290 between handle 241 and a back surface of FPDD 240 is more clearly shown. In one embodiment, this distance measures approximately 50.0 mm to approximately 70.0 mm. Gas 290 represents the distance through which handle 241 moves during a power stroke (e.g. depressing the handle to release the tension holding the FPDD 240). In another embodiment, where actuator assembly 202 is enclosed within a housing of FPDD 240, the gap may measure approximately 50.0 mm to approximately 70.0 mm. The size of gap 290 may be determined based on the average measurements of an adult human hand, which average may be calculated from combined measurements of approximately 10 adult male and approximately 10 adult female hands. Optimally, the size of gap 290 should fall within the range of an adult human's maximum gripping power. Additionally, the size of gap 290 and the length of handle 241 should be coordinated to yield a maximum power stroke from a minimal applied user force. In one embodiment, the applied user force is within the range of approximately 10.0 to approximately 45.0 lbs. However, future developments in technology may reduce the amount of applied user force to approximately 10.0 pounds or less. It will be appreciated that such developments are to be construed as falling within the scope of the present invention.

Referring now to FIG. 2D, there is shown, according to one embodiment of the invention, a side view of moveable assembly 200. As shown in FIG. 2D, moveable assembly 200 may be positioned in a variety of sculpted, curved, bent, or spiral positions. As evident from the above Figures, the cable path length of the centrally-positioned tension cable remains substantially constant when moveable assembly 200 is bent or curved. However, the path length of data and power supply cables may vary because they pass through cable guides that are located non-centrally within the interior of balls 226. Accordingly, an additional length of cable slack approximately equal to about ⅓ of the tension cable length may be included within the moveable assembly 200 for the data and power supply cables. In other embodiments, where the FPDD's power supply is self contained or wirelessly broadcast, and/or where the FPDD's data transmissions are wirelessly broadcast, moveable assembly 200 may contain only tension, torsion, and power cables.

It can be seen from FIGS. 2B, 2C, and 2D that the display surface area 240A of the FPDD 240 (which is usually most (e.g. more than 75%) of the surface area of the front surface of the FPDD) is substantially larger (e.g. at least 10 times larger) than a cross-sectional area of the moveable assembly 200 (which may be referred to as a neck). This cross-sectional area is a cross-section of the moveable assembly taken perpendicularly relative to the length of the moveable assembly (e.g. the cross section obtained at line 2D—2D shown in FIG. 2D). This cross-sectional area is typically a small fraction (e.g. about 1/50 to about ⅙) of the display surface area 240A. It will be appreciated that the display surface area is the surface on which the display data (e.g. a graphical user interface such as the Macintosh OS X or Windows 2000) is displayed to a user of the computer system.

Overturning Momements and General System Data

Figure 3:
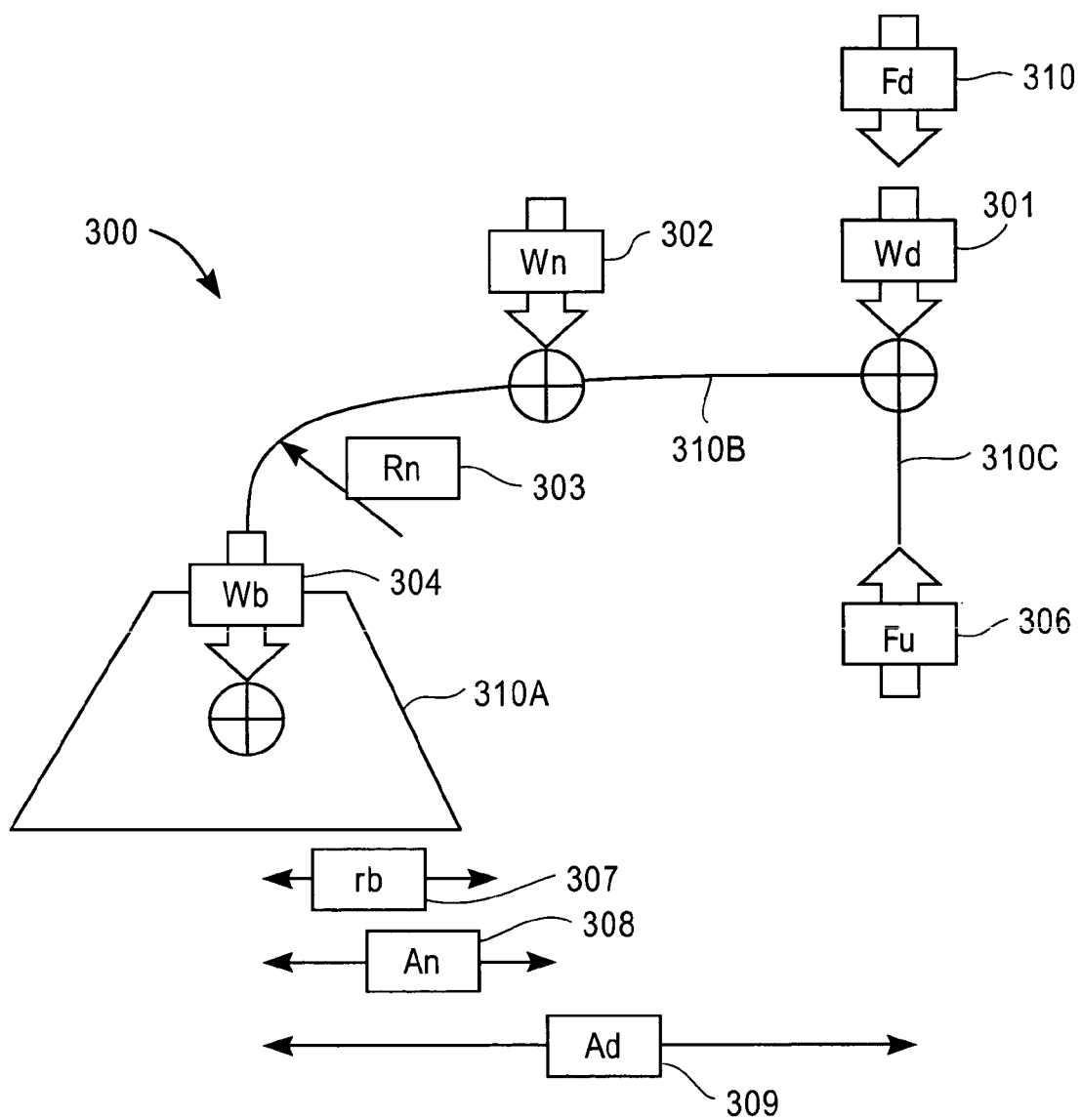
FIG. 3 is a diagram illustrating the overturning moments of a computer display coupled with a moveable assembly and a base, according to one embodiment of the invention.

Referring now to FIG. 3, there is shown a diagram of exemplary torques and overturning moments associated with one embodiment of the invention. The three components of this embodiment, as shown in FIG. 3, are the base computer system 310A, the moveable assembly 310B, and the FPDD 310C. The base computer system 310A corresponds to the moveable enclosure 242A, and also includes a base which secures the moveable assembly 310B to the base computer system 310A. The base computer system 310A, in one embodiment, includes certain elements of the computer system (e.g. referring to FIG. 1E, a processor 153, memory 155, bus 157, mass memory 163, I/O controller 165, interface 167, and a CD-ROM drive or other types of optical drives) and is coupled electrically to the FPDD 310C through a power and data cable (or cables), which provides power to the FPDD 310C and provides data for display on the FPDD 310C (and optionally conveys data, such as control signals, from controls on the FPDD 310C to the computer system in the base computer system 310A. In one embodiment, such cable (or cables) are housed and concealed within the interior of moveable assembly 310B and are not normally visible to a user.

The moveable assembly 310B mechanically couples the base computer system 310A to the FPDD 310C. In one embodiment, this coupling is through a series of ball-and-socket joints which are held together by a tension cable within the ball-and-socket joints. The moveable assembly 310B is mechanically coupled to the base computer system 310A at a base end of the moveable assembly 310B and is mechanically coupled to the FPDD 310C at a display end of the moveable assembly 310B.

Referring to the embodiment of FIG. 3, base radius (rb) 307 measures approximately 4.72 inches, while a neck bend radius (RN) 303 of the moveable assembly measures approximately 3.00 inches. In one embodiment, the total length of the moveable assembly measures approximately 15.00 inches; the weight of the moveable assembly (Wn) 302 measures approximately 1.76 pounds; the weight of FPDD and actuator mechanism (Wd) 301 measures approximately 5.00 pounds; and the weight of the base (Wb) 304 measures approximately 12.00 pounds.

Using these exemplary measurements, together with an estimated distance 309 of approximately 13.29 inches, and an estimated distance 308 of approximately 6.64 inches, the upward force (Fu) 306 at the display needed to overturn the system is calculated to be approximately 9.25 pounds, while the downward force (Fd) 310 needed to overturn is calculated to be approximately 1.22 pounds. In one embodiment, distance 309 is measured from base center-of-mass to display center-of-mass. Similarly, distance 308 is measured from the base's center-of-mass to the moveable assembly's center-of-mass.

It will be appreciated that increasing the weight of the base will tend to improve the stability of the entire assembly. It is preferable that the base, and the rest of the assembly, should not be so heavy that it cannot be easily moved by a single human user (e.g. an adult user). For example, it is preferable that the whole assembly should be less than about 45 pounds (lbs) and have a footprint on the surface on which it rests of less than about four (4) square feet. Normally, the weight and size of the base (including the base computer system) are designed, as described herein, to counterbalance the weight of the moveable assembly and FPDD 310C so that the FPDD 310C can be selectively positioned at many possible positions (X, Y, Z, pitch, yaw, roll), and the whole assembly is still stable (e.g. does not tip or overturn). Thus, there is no need, normally, to require the base computer system to be fixedly attached to the surface on which it rests; no clamps or suction or adhesive are, in a preferred embodiment, normally needed to maintain stability of the entire assembly.

Display

In one embodiment, the FPDD 240 illustratively shown in FIGS. 2A–2D, is a 15 inch LCD panel having a target weight of approximately 4.20 pounds (1.94 kg). The 15.0 inch length is a diagonal distance measured from one corner of the viewing area to an opposite corner.

Moveable Assembly (E.G. Neck Member)

In one embodiment, the weight of the moveable assembly 200 shown in FIGS. 2A–2D is approximately 2.0 pounds (0.907 kg), including the balls, sockets, and cables. In one embodiment, the overall articulation length (as measured along a longitudinal dimension of the member 200) of moveable assembly 200 is approximately 15.5 inches (39.37 cm), and its maximum cantilever distance is approximately 13.5 inches (34.29 cm). The moveable assembly 200 provides the ability to move the FPDD in at least three degrees of freedom and preferably six degrees of freedom (X, Y, Z, pitch, yaw, and roll). Another example of a moveable assembly is described in U.S. patent application Ser. No. 10/035,417 entitled "COMPUTER CONTROLLED DISPLAY DEVICE," filed Nov. 8, 2001, the contents of which are incorporated by reference herein.

Ball-and-Socket Data

In one embodiment, there are 10 sockets, 9 articulated balls, and 2 fixed termination balls. The diameter of each ball measures approximately 38.00 mm, and the target articulation angle between segments measures +/−14 degrees.

Tension Cable Data

In one embodiment, 3/16 inch stainless steel aircraft cable having 7×19 construction (e.g. 0.01 inch strands) is used for the tension cable previously described. The tension cable may be covered in a nylon jacket to approximately 0.25 inch diameter, and may be equipped with a ball shank ferrule on the actuator mechanism end and also equipped with a stop ferrule on the base end. Because the tension cable is centrally positioned within the interior of the moveable assembly, it will be appreciated that the tension cable path length remains substantially constant. It will also be appreciated that the tension cable is not limited to a particular length, but that the length of the tension cable may vary depending on the length of the moveable assembly. (e.g. in one embodiment, the tension cable may be approximately 398.90 mm long).

On the other hand, because data, power, microphone, and other computer system-related cables are routed along the outer interior regions of the moveable assembly, it will be appreciated that the path length of these cables is not constant, but changes as the moveable assembly is twisted or bent. Accordingly, additional lengths of data, power, and communications cables may be provided to accommodate the path length change. Illustratively, the additional lengths may measure approximately 20% to 30% more than the straight line path length. The straight line path length is the path length measured from one end of the moveable assembly to the other when the moveable assembly is in a substantially straight, non-twisted, unbent position.

Friction Inserts

In one embodiment, each abrasive socket assembly contains two abrasive inserts. A first abrasive insert has a base portion containing an internal thread, while the second abrasive insert has a base portion having a corresponding external thread. The interior surfaces of the abrasive inserts are concave and may be coated with granular materials such as silica, aluminum oxide, or tungsten carbide. In one embodiment, the interior surfaces of the abrasive inserts are brazed with tungsten carbide particles having an approximate grain size of about 0.12 mm. In this one embodiment, the friction surface coverage is approximately equivalent to #140 grit. Additionally, travel of the annular plungers is approximately 0.25 mm per interface.

In a further embodiment, a spherical glide ring may be inserted within the socket assembly in place of the abrasive insert. Additionally, one or more rims of the abrasive socket assembly may be equipped with an abrasive ring, as described below.

Actuator Mechanism

In one embodiment, a lever ratio of the actuator mechanism is approximately 11:1; and the mechanism stroke ranges from approximately 0.0 mm to approximately 0.7 mm, with an operating range of approximately 0.0 mm to approximately 0.5 mm. In one embodiment, the user stroke range (nominal) is approximately 50.0 mm to approximately 70.0 mm. The user force, in one embodiment may range from approximately 20.0 to approximately 25.0 pounds. In other embodiments, the user force may be less than approximately 20.0 pounds. The creep adjustment range may be approximately 3.0 mm. The force adjustment range may be approximately +/−60.0 pounds (e.g. 0.25 inch adjustment @ 400 pounds/inch).

Moveable Enclosure (E.G. Base Computer System):

In one embodiment, the moveable enclosure has a weight in the range of approximately 12.0 pounds to approximately 13.0 pounds, with a footprint diameter of approximately 240.0 mm. It will be appreciated that the base is not limited to one particular size, weight, shape, or appearance. Rather, heavier bases may have smaller footprints, and vice versa. Additionally, the bottom surface of the moveable enclosure may be larger or smaller than the top surface. The bottom of the moveable enclosure may also be equipped with a non-slip surface. In one embodiment, the non-slip surface may be a tacky, spongy, rubber-like material. In another embodiment, the non-slip surface may be a rubber suction device. In a further embodiment, the non-slip surface may be a magnetic or electromagnetic device. Additionally, the base may be equipped with one or more input devices (e.g. push buttons, touch sensitive buttons, touch sensitive screens, etc.), peripheral ports, or peripheral devices (e.g. DVD and CD-ROM drives, speakers, etc.). As previously described, one or more components of a computer may be housed within the moveable enclosure.

Loads

It will be appreciated that the moveable assembly 200 is not limited to supporting a particular load, but that moveable assembly 200 may be designed to accommodate a variety of loads. In one embodiment, the moment sum at the base socket is calculated, thus:

Display+Mechanism:5.2 lbs×13.5 inches=70.2 inches*pounds

Moveable Assembly:2.0 lbs×6.5 inches=13.0 inches*pounds

Total:=83.2 inches*pounds.

In one embodiment, an estimated holding torque at the base is approximately 125.0 inches*pounds, with an estimated margin of approximately 1.5.

Moveable Assembly Displacement Estimates

The following table provides exemplary measurements associated with one embodiment of the present invention.

TABLE 1

| Item | mm | % | Notes |
|---|---|---|---|
| Cable Elastic Stretch @ 250 lbf | 0.66 | 11% | Calculated based on datasheets |
| Long Term Stretch | 0.20 | 3% | 0.001 inch per inch per VerSales @ 60% of rated load |
| Compression | 1.20 | 19% | Estimate based on experimental data |
| Geometric Path Length Change | 0.40 | 6% | Calculated based on geometry |
| Cable Bending Stiffness | 0.60 | 10% | Estimates based on empirical data |
| Thermal Expansion temperature change | 0.17 | 3% | Calculated based on 70° C. |
| Plunger Travel (0.25 mm × 12) | 3.00 | 48% | Based on one embodiment |
| Total (Estimated) | 6.23 | 100% | |

Assemblies and Components

Referring now to FIG. 4A, there is shown a cross-sectional top view of a moveable assembly 400, actuator assembly 400A, and FPDD 440, according to one embodiment of the invention. Tension cable 490 runs through central portions of balls 426 and terminates at the display end in a ball ferrule 434, which is coupled with distal end of handle 460. In another embodiment, ball ferrule 434 may be coupled with a crank (not shown), which is coupled with handle 460. In FIG. 4A, the distal end of handle 460 is coupled with a strut 409, which is coupled with a spring or piston assembly 470. The crank, handle 460, strut 409, and spring or piston assembly 470 are further described below.

Principle of Operation

Experiments performed to test the suitability of support mechanisms highlighted two significant drawbacks: substantial holding friction and the need to support the flat panel display device with one hand while manipulating the friction actuating device with the other. Although, gooseneck designs, such as a group of ball-and-socket joints, provide more degrees of freedom and a wider range of viewing positions than traditional support mechanisms, they require large amounts of holding friction to support heavy objects like flat panel display devices (FPDD's) in stable positions. Typically, the amount of holding friction required is greater than an adult user can overcome (e.g. 180–400 lbs or more). In cases where the holding friction is of an amount (e.g. 20–30 lbs) that can be easily overcome by an adult user, the prior art gooseneck-like support mechanisms gradually droop, or suddenly fail altogether, causing damage to the FPDD.

In gooseneck designs, where the friction actuating mechanism is disposed on or near the base of the support mechanism, users must manipulate the friction actuating device with one hand while simultaneously supporting the FPDD with the other to keep the FPDD from dropping and being damaged. The disadvantages of such systems are that they are awkward and time consuming to use.

Figure 7A:
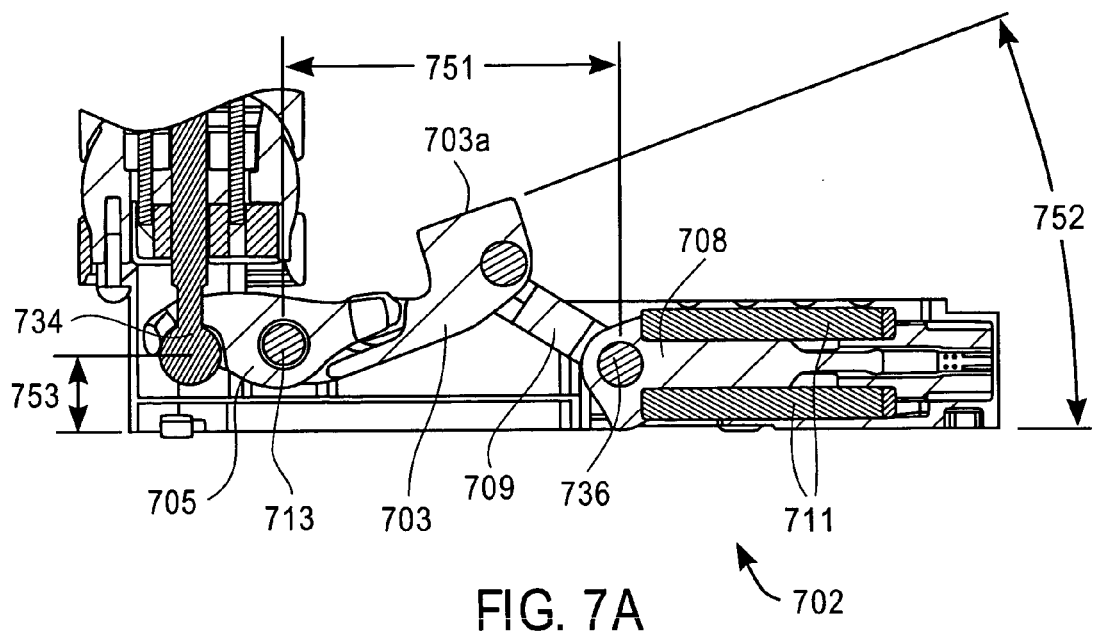
FIG. 7A is a sectional side view of an actuator assembly in a first tensioned position, according to one embodiment of the present invention.
Figure 8:
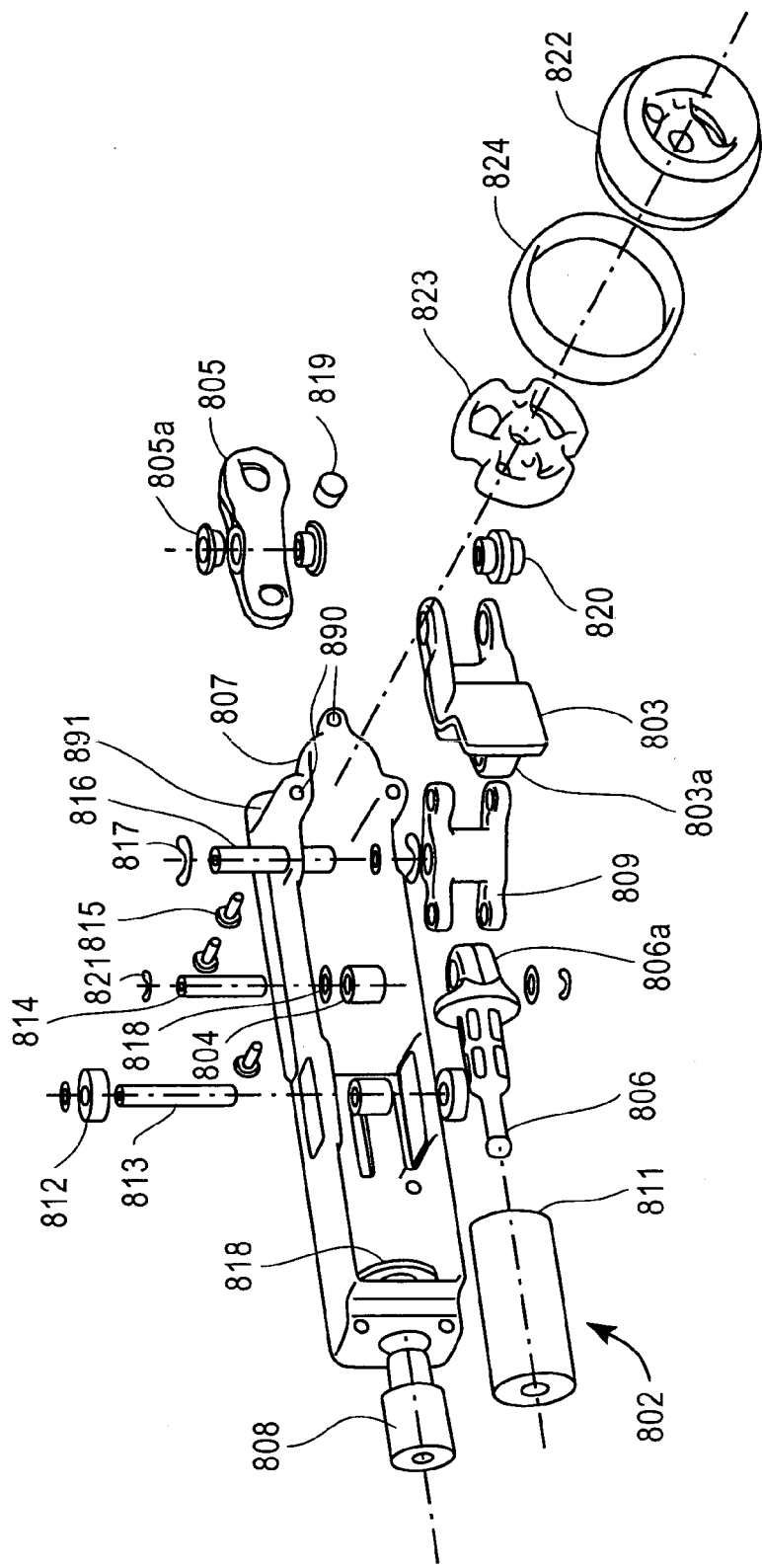
FIG. 8 is an exploded perspective view of an actuator assembly, according to one embodiment of the present invention.

With reference to FIGS. 4, 7A, and 8, operation of the actuating mechanism leverages conservation of energy principles to reduce the amount of user force required to relax the tensioned moveable assembly (e.g. neck) 400. During assembly, tension cable 490 is stretched with an applied force (e.g. tension) of approximately 200.00 to approximately 400.0 pounds. This applied force compresses resilient members (e.g. wave springs) 480 and plungers 428 such that balls 426 contact friction inserts 430 and 431. As the moveable assembly 400 is compressed (e.g. tensioned), kinetic stretching energy associated with an applied user force is converted to elastic potential energy, which is stored in the tensioned cable 490 and in the wave springs 480.

Because the tension cable 490 and the wave springs 480 are not massless and ideal (e.g. having no internal friction when compressed or stretched), a portion of the kinetic stretching energy is "lost" (e.g. converted to other forms of energy, such as heat); however, the overall mechanical energy associated with the system remains constant. The stretched tension cable 490 and the compressed wave springs 480 (e.g. resilient members) exert a restoring force perpendicular to the distal end of handle 460 that tends to pull the stretched cable back into its original unstretched position. Because one end of the tension cable is attached to the distal end of handle 460 (e.g. distal end of tongue 705 in FIG. 7A), the restoring force tends to pull the handle's (or tongue's) distal end upwards, which tends to move the proximal end of handle 460 (or tongue 705) downwards, which tends to move a lower end of strut 409 (or 709 in FIG. 7A) laterally against spring/piston assembly 470 (or spring assembly 711 in FIG. 7A). Thus, in one embodiment, moving the actuator from a second state (e.g. the distance separating the actuator handle from the back of the FPDD is minimized) to a first state (e.g. the distance separating the actuator handle from the back of the FPDD is maximized) transfers a portion of the elastic potential energy stored in a compressed spring/piston assembly into elastic potential energy stored in a tensioned tension cable and in a plurality of resilient members. At the same time, the remaining stored elastic potential energy is converted to work done on the user and to kinetic energy of the actuator.

In a preferred embodiment, the spring constant of spring assembly 711 (FIG. 7A) or 811 (FIG. 8) is chosen such that the spring force exerted by spring or piston assembly 470 (or 711 in FIG. 7A) on strut 409 (or on spring shaft 708 and 806 in FIGS. 7A and 8, respectively) equals or slightly exceeds the restoring force exerted by the tensioned cable and wave springs. In this manner, the moveable assembly 400 (FIG. 4A) remains compressed and rigid. An illustrative range of spring constants may include: approximately 180.0 lbs/in to approximately 200.0 lbs/in, but preferably approximately 190.0 lbs/in.

Referring back to the embodiment shown in FIG. 4A, depressing proximal end 451A of handle 460 moves strut 409 laterally to compress spring/piston assembly 470. Simultaneously, the distal end of handle 460 moves upwards to relax the tension cable 490 and decompress the wave springs. Depressing proximal end 451A of handle 460 converts mechanical energy (e.g. that provided by the user depressing the handle 451) and potential energy (e.g. that stored in the tensioned cable and compressed wave springs) into kinetic energy as strut 409 moves laterally to compress spring/piston assembly 470 (e.g. 711 in FIG. 7A). This kinetic energy is converted into elastic potential energy, which is stored in the compressed spring/piston assembly 470. Likewise, releasing proximal end 451A of handle 451 converts the spring's stored elastic potential energy into kinetic energy as strut 409 moves laterally to depress the distal end of handle 451. This kinetic energy is stored as potential energy in cable 490 is tensioned the wave springs as the moveable assembly is compressed.

Similar conversions of energy occur with respect to the embodiments shown in FIGS. 7A and 8. These conversions of energy allow the moveable assembly to wilt instantly upon depression of the proximal end of handle 460 toward the back of the FPDD, and to stiffen instantly upon release of the proximal end of handle 460. The FPDD, in one embodiment, may be moved/re-positioned over at least three (and up to as many as five or six) degrees of freedom from a single actuation (e.g. depression) of the handle (actuator), rather than having to loosen two or more locks in order to obtain the ability to move the FPDD simultaneously in more than one degree of freedom.

It will be appreciated that the energy stored in the tensioned cable 490 and in the compressed wave springs (e.g. resilient members) 480 significantly reduces the amount of user force required to compress spring/piston assembly 470 (or spring assembly 711 in FIG. 7A). For example, in a preferred embodiment, compression of spring/piston assembly 470 (or 711) requires an applied user force in the range of approximately 10.0 to approximately 30.0 lbs.

With reference to FIG. 7A, it will also be appreciated that the amount of applied user force required to compress the spring/piston assembly 470 (or 711) may be further reduced by modifying the angle at which the distal end of tongue 705 (or handle 751) connects with tension cable 709.

Description of Component Parts

Referring again to FIG. 4A, spring or piston assembly 470 may be one of a number of suitable pre-manufactured metal springs or gas piston assemblies known in the art, so long as the spring or piston assembly 470 exerts a restoring force of approximately 200.0 pounds/inch. In one embodiment, the exterior dimensions of spring or piston assembly 470 measure approximately 2.0 inches to approximately 2.25 inches long. Illustratively, the restoring force exerted by the spring or piston assembly 470 may fall within the range of approximately 180.0 pounds/inch to approximately 400.0 pounds/inch. In one embodiment, the spring or piston assembly 470 may include a resilient member, which when compressed, exerts a restoring force tending to return the compressed resilient member to its uncompressed state. Examples of resilient members include: metal springs, springs made of composite materials, hydraulic pistons, etc.

In FIG. 4A, a display termination ball 424, having a substantially planar mating surface connects moveable assembly 400 to FPDD 440, but any suitable attachment method, such as bolts and/or interlocking grooves, may be used to attach display termination ball to FPDD 440. Anti-torsion cable 491 may be provided to prevent moveable assembly 400 from over-twisting and stretching the data, microphone, and/or the power supply cables.

Additional components of the moveable assembly are now described. In one embodiment, the diameter 459 of balls 426 measures approximately 38.00 mm, while the diameter 458 of tension cable 490 measures approximately 6.25 mm. The center-to-center distance 457 between balls 426 measures approximately 36.00 mm; and the height of socket assembly 427 may measure approximately 24.00 mm. The length 451 of handle 460, measured from a proximal end 461 to a pivot pin 462 measures approximately 169.277 mm. The distance 455, measured from the center of tension cable 490 to the center of pivot pin 462, is approximately 15.830 mm; while the distance 454, measured from the center of tension cable 490 to a proximal end 463 of spring or piston assembly 470, is approximately 153.60 mm. In one embodiment, width 453 of FPDD 440's exterior casing measures approximately 21.162 mm. In another embodiment, the power stroke distance 452, measured from proximal end 461 to the front surface of FPDD 440, is approximately 89.924 mm.

Figure 4B:
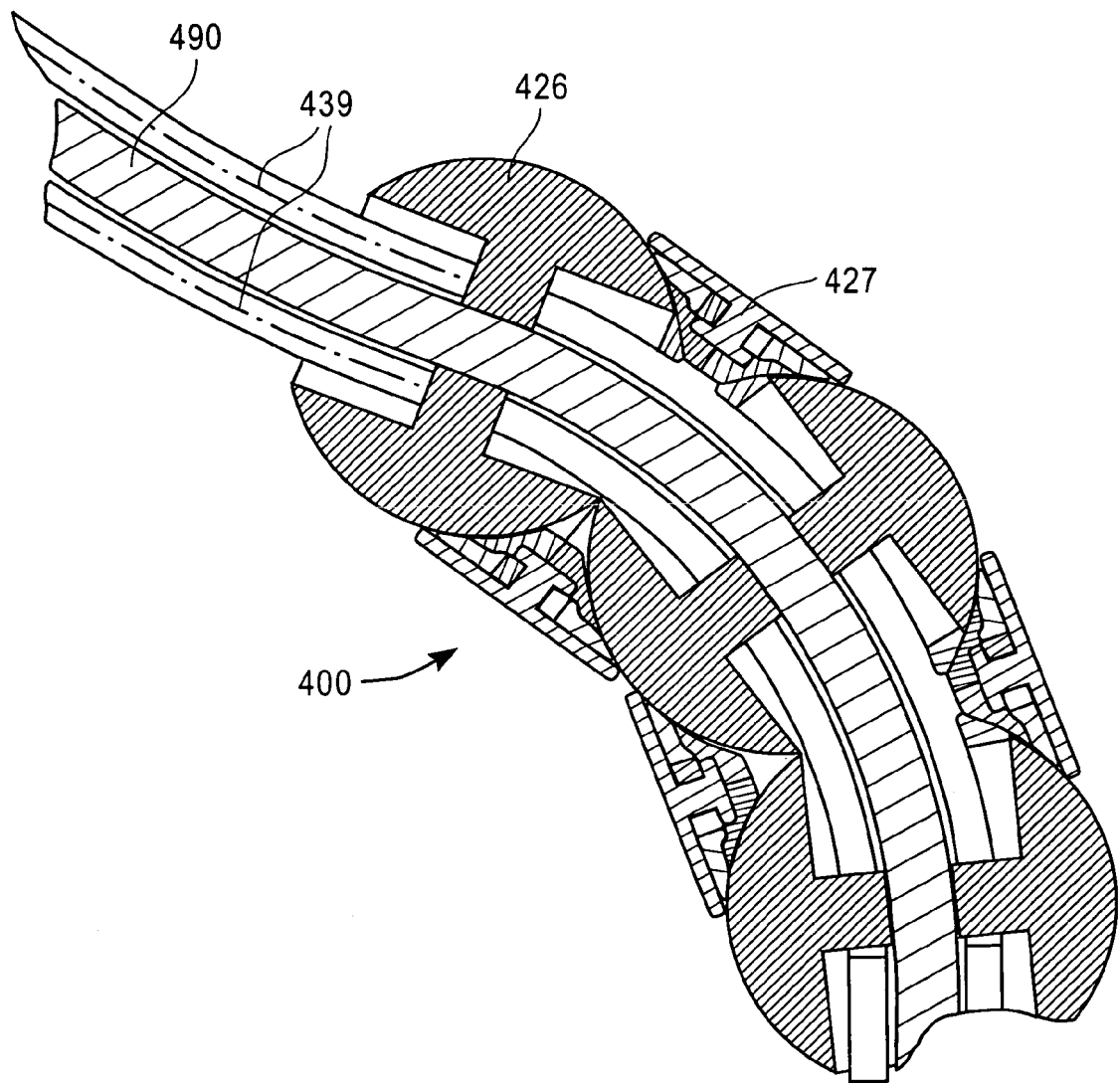
FIG. 4B is an exploded side view of a portion of a moveable assembly in a relaxed state, according to one embodiment of the invention.

Referring now to FIG. 4B, there is shown a cross-sectional view of moveable assembly 400. As shown, tension cable 490 runs through cable guides in the center of balls 426, and anti-torsion cable 439 runs through cable guides spaced apart from the center of balls 426. As shown in FIG. 4B, balls 426 and sockets 427 may bend approximately +/−14.0 degrees to curve moveable assembly 400 into a desired shape. However, in other embodiments, balls 426 and sockets 427 may bend a greater or lesser amount.

Referring now to FIG. 5A, there is shown a side view of an assembled moveable assembly 500, including actuator assembly 502 (but without the FPDD and the base of the moveable assembly and the base computer display). In one embodiment, the length 551 of moveable assembly as measured from surface 503 of base termination ball 533 to surface 504 of display termination ball 522, measures approximately 397.00 mm.

FIGS. 5B and 5C show perspective views of one embodiment of moveable assembly 500.

FIGS. 5A–5C show the moveable assembly with all of the ball-and-socket components (and hence the data, tension, power, and anti-torsion cables are concealed).

Figure 5D:
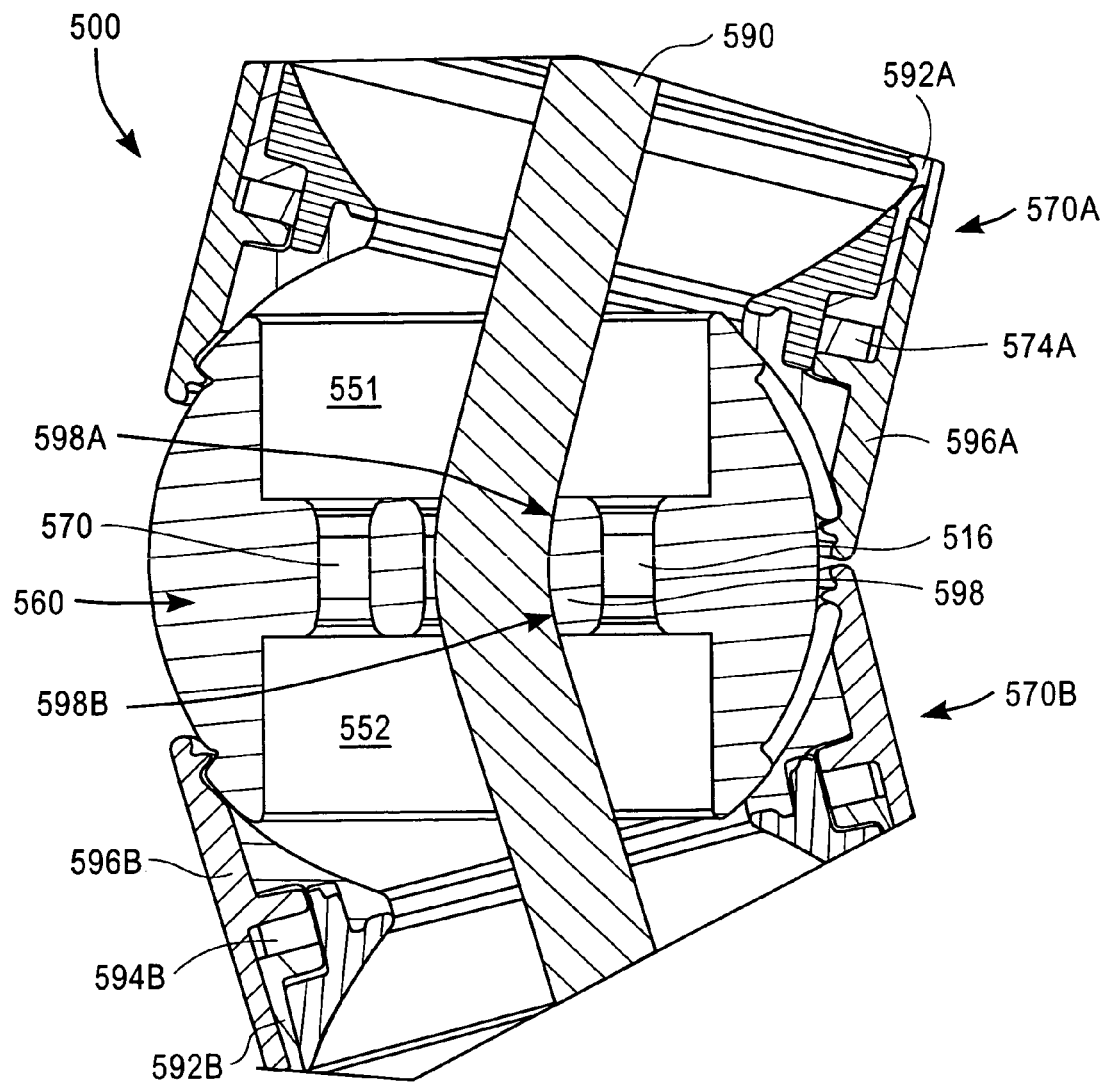
FIG. 5D is a sectional view of one embodiment of a moveable assembly 500 showing the internal placement of a tension cable 590.

FIG. 5D is a sectional view of one embodiment of a moveable assembly 500 showing the internal placement of a tension cable 590. Moveable assembly 500 includes socket assemblies 570A and 570B, and a ball 560 having a first hollow cavity 551 and a second hollow cavity 552 separated by a central wall in which are located an annular ring 598, bore 516, and bore 510, each of which extend from one side of the central wall to the other. In one embodiment, the inside surfaces 598A and 598B of annular ring 598 are bowed slightly to taper outwards such that the sliding friction between a tension cable 590 passing through the interior of annular ring 598 is minimized. Bores 510 and 516 contain a torsion cable, not shown, which prevents data and power cables (not shown) contained within other bores (not shown) from being damaged or stretched by over-rotation. As shown in previous figures, friction socket assembly 570A includes a first plunger 592A, a resilient member 594A, and a second plunger 596A. Similarly, friction socket assembly 570B includes a first plunger 592B, a resilient member 594B, and a second plunger 596B.

Figure 5E:
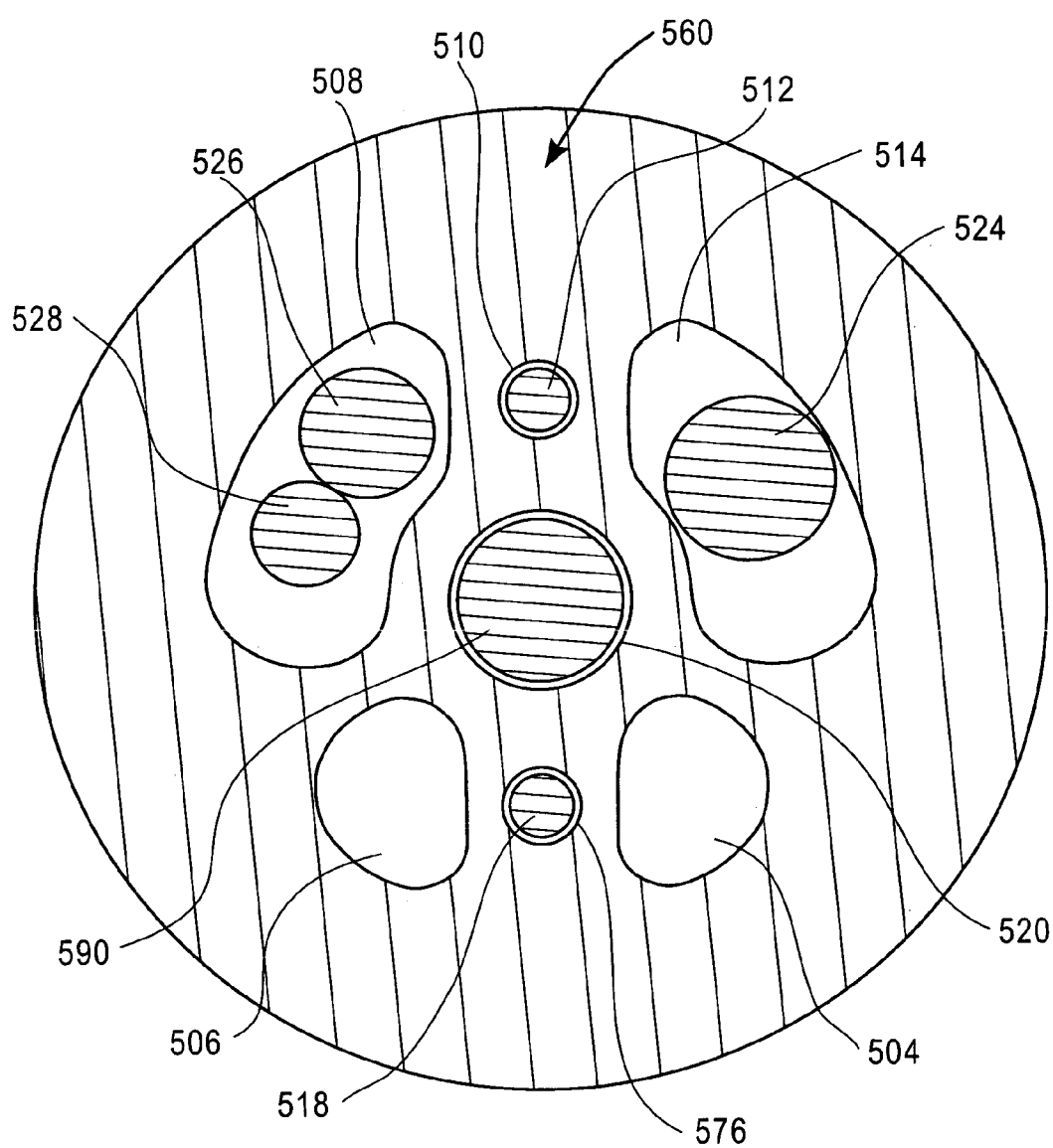
FIG. 5E is a cross-sectional view of a portion 560 of a moveable assembly usable with an embodiment of the present invention showing the placement of data, tension, torsion, power, antenna, and other computer system related cables within one or more apertures of the moveable assembly.

FIG. 5E is a cross-sectional view of a portion 560 of a moveable assembly usable with an embodiment of the present invention showing the placement of data, tension, torsion, power, antenna, and other computer system related cables within one or more apertures 508, 512, 514, 504, 506, 520, and 516 of the moveable assembly. In one embodiment, portion 560 of the moveable assembly is a friction limit ball, having a wall (e.g. brace) containing a plurality of apertures (or bores) centrally located therein. Apertures 510, 516, and 520 are substantially circular in cross-section, while apertures 508, 514, 504, and 506 are irregularly shaped. Anti-torsion cables 512 and 518 extend through apertures 510 and 516, respectively, while torsion cable 590 extends through aperture 520. In one embodiment, one or more of the irregularly shaped apertures may include one or more data, power, antenna, and/or similar computer system-related cables.

As shown in FIG. 5E, aperture 508 includes an inverter cable 528 and a microphone cable 526, while aperture 514 contains a Transmission Minimized Differential Signaling (TDMS) cable 524. The inverter cable 528 powers the LCD flat panel display, while the TDMS provides data signals to the flat panel display. The TDMS cable is made up of four bundles of three wires each. Two wires within each bundle are twin-axial (e.g. helically twisted) signal wires, and the third wire is a drain wire. In one embodiment, the twin axial signal wires and drain wires are individually insulated with aluminum-mylar. Additionally, a plurality (in one embodiment, three) additional Extended Display Identification Data (EDID) wires may be included within TDMS cable 524 to provide additional signals to the flat panel display.

In an alternate embodiment, a Low Voltage Differential Signaling (LVDS) cable may be used. Low Voltage Differential Signaling is a low noise, low power, low amplitude method for high-speed (gigabits per second) data transmission over copper wire. LVDS differs from normal input/output (I/O) in a few ways: Normal digital I/O works with 5 volts as a high (binary 1) and 0 volts as a low (binary 0). When a differential is used, a third option (−5 volts), is added, which provides an extra level with which to encode and results in a higher maximum data transfer rate. A higher data transfer rate means fewer wires are required, as in UW (Ultra Wide) and UW-2/3 SCSI hard disks, which use only 68 wires. These devices require a high transfer rate over short distances. Using standard I/O transfer, SCSI hard drives would require a lot more than 68 wires. Low voltage means that the standard 5 volts is replaced by either 3.3 volts or 1.5 volts.

LVDS uses a dual wire system, running 180 degrees of each other. This enables noise to travel at the same level, which in turn can get filtered more easily and effectively. With standard I/O signaling, data storage is contingent upon the actual voltage level. Voltage level can be affected by wire length (longer wires increase resistance, which lowers voltage). But with LVDS, data storage is distinguished only by positive and negative voltage values, not the voltage level. Therefore, data can travel over greater lengths of wire while maintaining a clear and consistent data stream.

Figure 6:
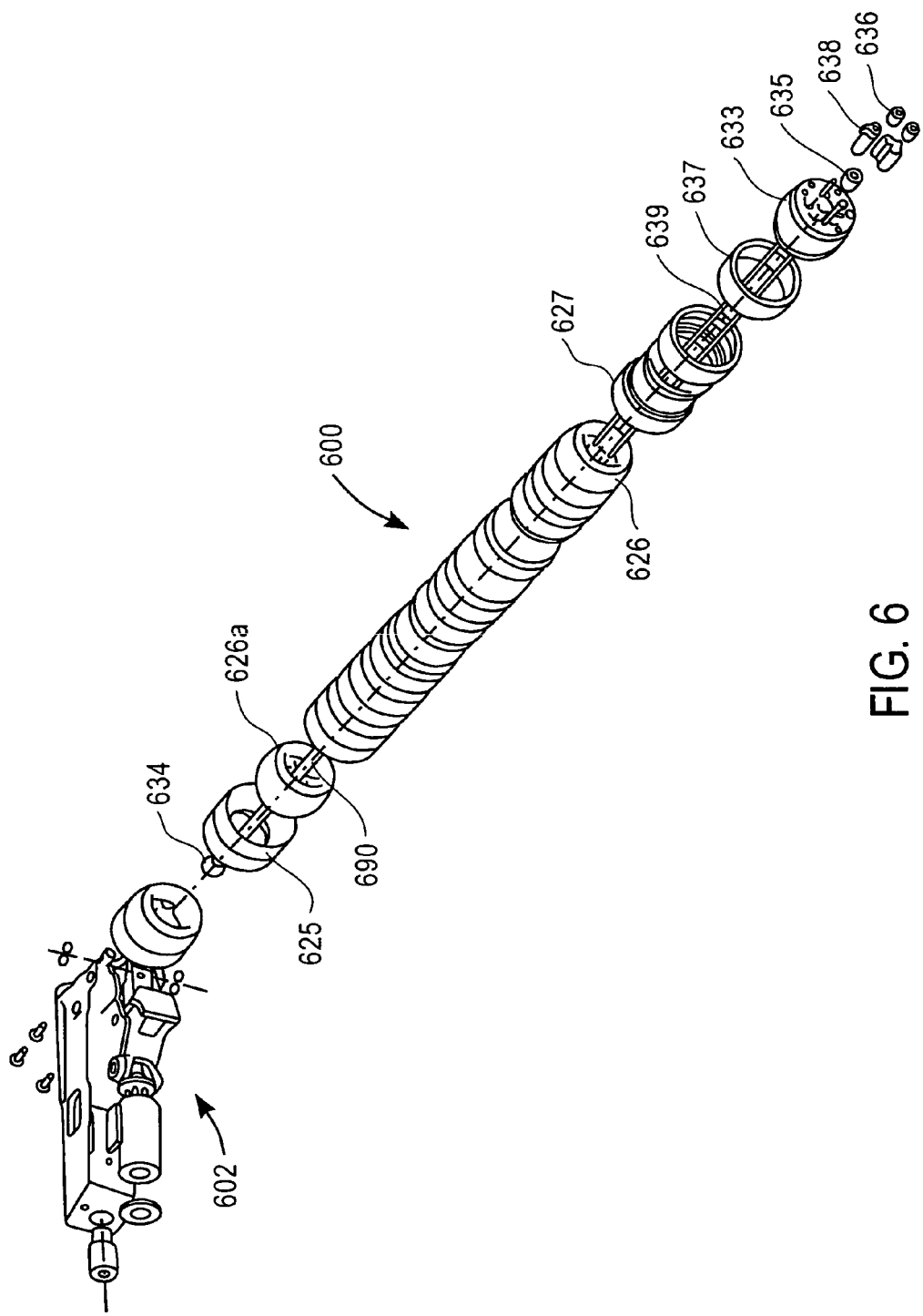
FIG. 6 is a perspective, exploded view of an actuator assembly and moveable assembly, according to one aspect of the present invention.

Referring now to FIG. 6, there is shown an exploded perspective view of a moveable assembly 600 and actuator assembly 602, according to one embodiment of the present invention. In one embodiment, tension cable 690 terminates at the actuator assembly end in a ball ferrule 634. Socket assembly 627 may be equipped with a wave spring (e.g. resilient member), plungers, and friction inserts, such that plungers supportably engaging friction limit ball 626 raise ball 626 from and lower ball 626 to a friction insert when the wave spring (e.g. resilient member) is either expanded or compressed. In one embodiment, moveable assembly 600 may have first friction area provided by a sequential series of socket assemblies 627 and a second friction area provided by a sequential series of friction limit sockets 625, which are not equipped with friction inserts, plungers, or wave springs. Instead, friction limit sockets 625 may be cast or machined out of a single material such as aluminum or stainless steel.

From an engineering point of view, the bottom third of moveable assembly experiences the highest stressing forces, and thus higher friction surfaces are needed to fix ball 626 in position, than are needed to fix ball 626A in position. In other embodiments, moveable assembly may be constructed using only friction limit sockets 625, or using only socket assemblies 627. Alternatively, one or more friction limit sockets 625 may be interspersed between two or more socket assemblies 627. In another embodiment, the concave interior contact surfaces of friction limit sockets 625 may be brazed with tungsten carbide to provide an improved friction surface.

Referring again to FIG. 6, an anti-torsion cable 639 may be provided to limit how much moveable assembly 600 may be twisted. Other components of moveable assembly 600 may include a base termination socket 637, a base termination ball 633, a tension cable ferrule 635, a strain relief 638 for the data cables, and ferrules 636 for the anti-torsion cable. In one embodiment, strain relief 638 is made of rubber or plastic.

Referring now to FIG. 7A there is shown another embodiment of an actuator assembly 702. In this embodiment, an actuator assembly 702 is shown in a first tensioning position. In one embodiment, actuator assembly includes a tongue 705, a crank 703, a strut 709, a spring shaft 708, and a spring assembly 711. Tongue 705 may be coupled to tension cable ferrule 734 at one end, and coupled via a shaft 713 to a crank 703. Proximal end 703A of crank 703 may be angled upwards and coupled with strut 709, which angles downwards to couple with spring shaft 708 via pivot pin 736. Though not shown, a handle may be coupled with crank 703 to form an angle 752 with the horizontal.

In this first tensioning position, the distance 753 between a front surface of actuator assembly 702 and a center of ferrule 734 may measure approximately 14.26 mm. A distance 751 measured from the center of shaft 713 to the center of pivot pin 736 may measure approximately 59.75 mm. In one embodiment, the angle 752 at which crank 703 is angled upward from the horizontal may measure approximately 20.4 degrees.

Figure 7B:
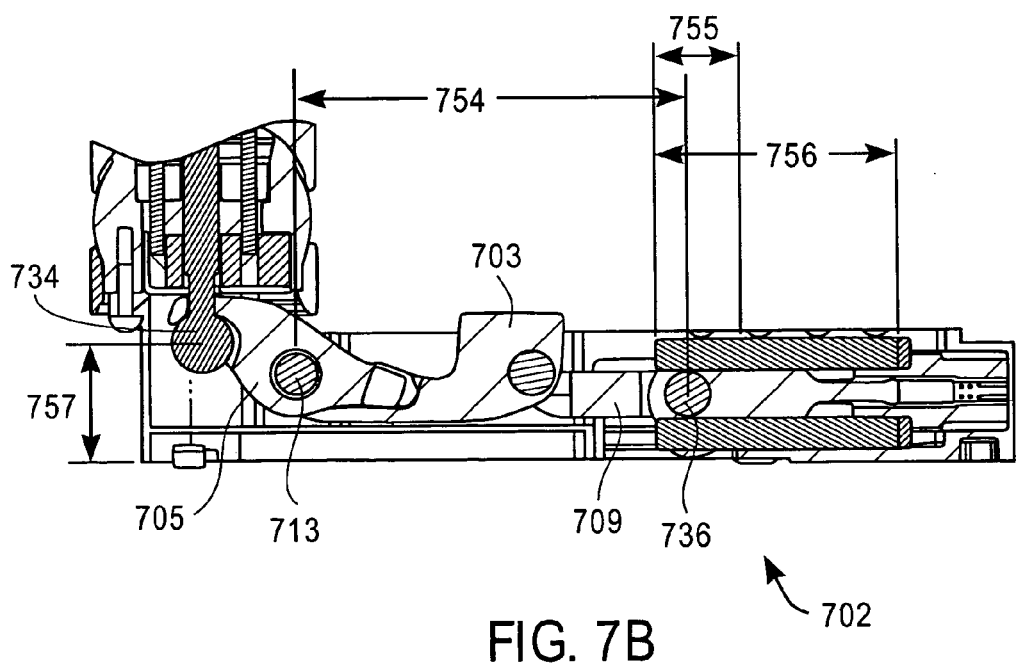
FIG. 7B is a sectional side view of an actuator assembly in a second untensioned position, according to one embodiment of the present invention.

Referring to FIG. 7B, there is shown a cross-sectional view of an actuator assembly 702 in a second relaxed position, according to one embodiment of the invention. In this embodiment, a handle (not shown) coupled with crank 703 has been depressed to flatten crank 703 and strut 709 while raising the distal end of tongue 705 to relax the tensioned cable. As a result of this flattening, spring 711 (FIG. 7A) has been compressed a distance 755, which may measure approximately 15.25 mm in one embodiment of the invention. In one embodiment, the length 756 of spring assembly 711 (FIG. 7A) may measure approximately 43.18 mm, and the distance 754 separating shaft 713 from pivot pin 736 may measure approximately 69.11 mm. Additionally, the distance 757 separating the center of ball ferrule 734 from a front surface of actuator assembly 702 may increase to approximately 21.70 mm.

FIG. 8 is an exploded perspective view of one embodiment of an actuator assembly 802. Actuator housing 807 may be made of any suitable durable material (e.g. metal, plastic, etc.) known in the manufacturing and computer arts. In one embodiment, housing 807 may be machined from a single block of aluminum or stainless steel, or cast from a liquid metal or liquid plastic injected or poured into a mold. It will be appreciated that the exterior and interior contours and protrusions or intrusions of housing 807 may be of any size, shape, or dimension necessary to fit a particular desired application.

For example, as shown in FIG. 8, a proximal end of housing 807 is blocked, with rounded edges and corners, while a proximal end is rounded and drilled to contain three screw holes 890. Additionally, a lip 891 may be formed on the proximal end and bored to allow housing 807 to be bolted to a chassis of a FPDD. In one embodiment, housing 807 is enclosed on three sides with the fourth side left open to allow insertion of various components and sub-assemblies. The sides and blocked end of housing 807 may contain one or more circular or rectangular orifices through which various components (e.g. spring shaft cap 808, shaft 816, shaft 814, and shaft 813) may be inserted to assemble actuator assembly 802. In one embodiment, spring shaft cap 808 covers the end of spring assembly 811, and may be formed of a plastic or metal using the injection molding or machining processes described above.

Similarly, shafts 813, 814, and 816 may be formed of a metal such as stainless steel. The ends of shafts 813, 814, and 816 may be threaded to receive a nut, or equipped with an annular groove to receive a pressure fitted washer (e.g. retaining rings 817 and 821). Thrust washer 818 may be inserted within housing 807, at the blocked end, to provide a support surface for die spring 811. Spring shaft 806 may be coupled with die spring 811, and may be formed of a plastic or metal (e.g. stainless steel) using injection molding or machining processes well-known in the art.

As shown in FIG. 8, rounded and narrowed proximal end 806A of spring shaft 806 may contain an orifice of sufficient size and diameter to receive shaft 813. The outer dimensions of proximal end 806A may such that the proximal end 806A slidably fits between a first pair of arms of H-shaped strut 809. In one embodiment, the first pair of strut arms contain circular orifices corresponding in dimension and placement to circular orifices in proximal end 806A and housing 807, such that shaft 813 may be slid through the aligned orifices to operatively link spring shaft 806 with strut 809. Similarly, the other end of strut 809 may contain a second pair of strut arms that slidably straddle a nubbed portion 803A of crank 803, such that shaft 814, passing through aligned circular orifices in the second pair of strut arms and in housing base 807, operatively couple shaft 809 with crank 803.

Crank 803 may be formed of plastic or metal (e.g. stainless steel) using injection molding or machining processes well known in the art. It will be appreciated that crank 803, like the other components of actuator assembly 802, is not limited to a particular size, weight, configuration, appearance, or shape. Rather, crank 803 may have any size, shape, appearance, or configuration necessary to fit a particular application. At one end, crank 803 is extruded and narrowed to form nubbed portion 803A, through which a circular orifice is formed. In one embodiment, a horizontally disposed flat planar surface forming the top of nubbed portion 803A may cascade down into an open portion between two parallel crank arms, each of which contains an orifice to receive shaft 817.

Formed of a metal (e.g. stainless steel), tongue 805 is an oblong piece of metal, thick in its central portion and tapering to substantially flat ends. Each end may contain a circular orifice extending through its thickness. Similarly, a circular orifice may be bored through the tongue's central portion from one side to the other. The edges of orifice may be recessed such that nylon washers 805A may be inserted into the orifice flush with the outer portions of tongue 805. Tongue 805 may be slidably inserted between the arms of crank 803 such that shaft 817 may be inserted through the orifices in housing 807, the crank arms, and the tongue's central portion, to operatively couple tongue 805 with crank 803. A set screw 819 may be provided to adjust the tilt of tongue 805. Additionally, termination socket 824, equipped with insert 823, may be used to couple termination ball 822 with the proximal end of housing 807. In another embodiment, a flat base portion of display termination ball 822 that contains screw holes corresponding in number, dimension, and placement to the screw holes in the proximal end of housing 807 may be bolted directly to housing base 807.

Figure 9A:
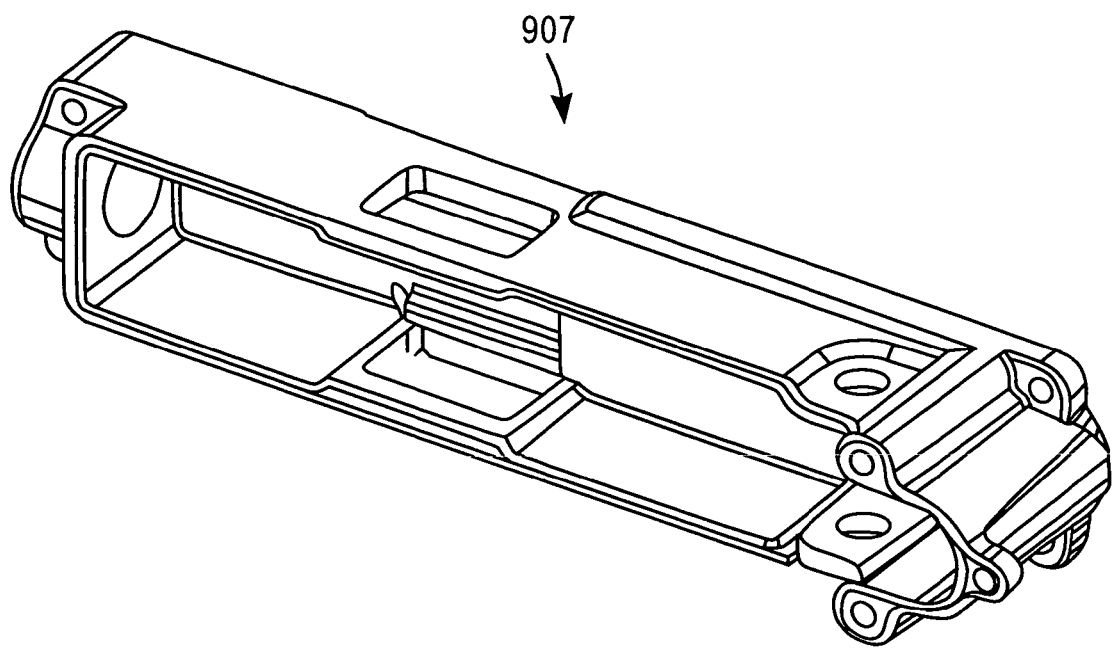
FIG. 9A is a perspective view of an actuator housing, according to one embodiment of the present invention.

FIG. 9A is a perspective view of one embodiment of a housing base 907, which corresponds to housing base 807.

Figure 9B:
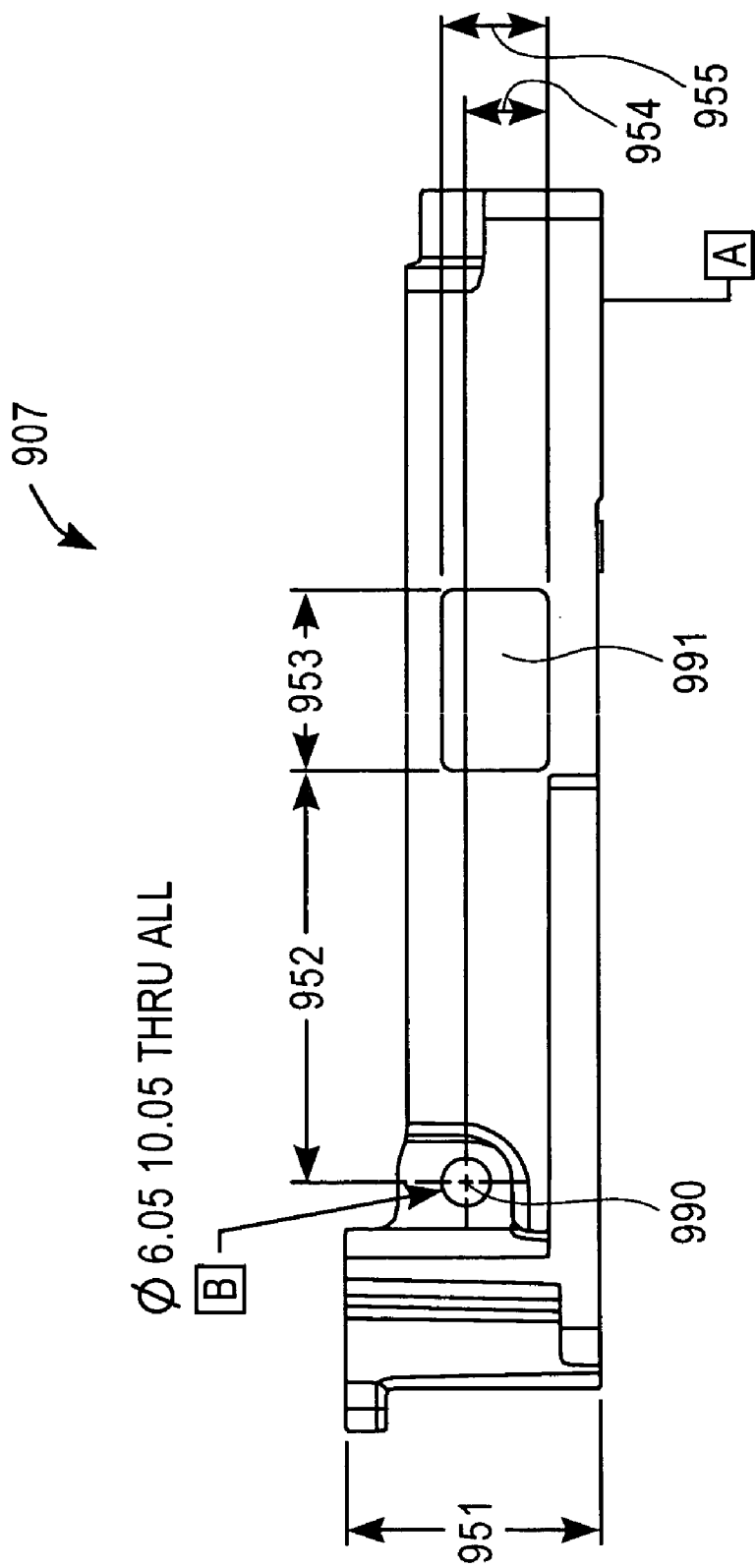
FIG. 9B is another view of the actuator housing of FIG. 9A, according to one embodiment of the present invention.

Referring now to FIG. 9B, there is shown a side view of the housing base 907 shown in FIG. 9A. The height 951 of housing base 907 may be approximately 30.75 mm. The diameter of circular orifice 990 may measure approximately 6.05 mm. The length 953 of rectangular orifice 991 may measure approximately 23.13 mm. A distance 952, measured from the center of circular orifice 990 to a first edge of rectangular orifice 991, may measure approximately 23.13 mm. A distance 954 from the center of circular orifice 990 to the bottom edge of rectangular orifice 991 may measure approximately 10.07 mm. In one embodiment, the depth 955 of rectangular orifice 991 is approximately 12.63 mm.

FIG. 9C is a bottom view of the actuator housing 907. In one embodiment, the distance 957 from a center of holes 992 to the center of holes 966 measures approximately 142.06 mm. Distance 958, measured from the center of holes 993 to the center of holes 966, is approximately 133.69 mm. Distance 959, measured from the center of holes 994 to the center of holes 996, is approximately 42.05 mm. The center-to-center distance 960 of holes 966 is approximately 20.30 mm. The center-to-center distance 964 of holes 993 is approximately 23.11 mm. The center-to-center distance 956 of holes 992 is approximately 22.22 mm. Measurement 965 is approximately 3.18 mm. The diameter 967 of hole 996 may measure approximately 14.0 mm. Width 961 of housing 907 may measure 30.81 mm.

FIG. 9D is a sectional end view of housing 907 taken along line A—A in FIG. 9C. Measurement 962, in one embodiment, is approximately 18.77 mm.

FIG. 9E is a sectional end view of housing 902 taken along line B—B in FIG. 9C. In one embodiment, measurement 963 is approximately 20.40 mm.

Figure 10A:
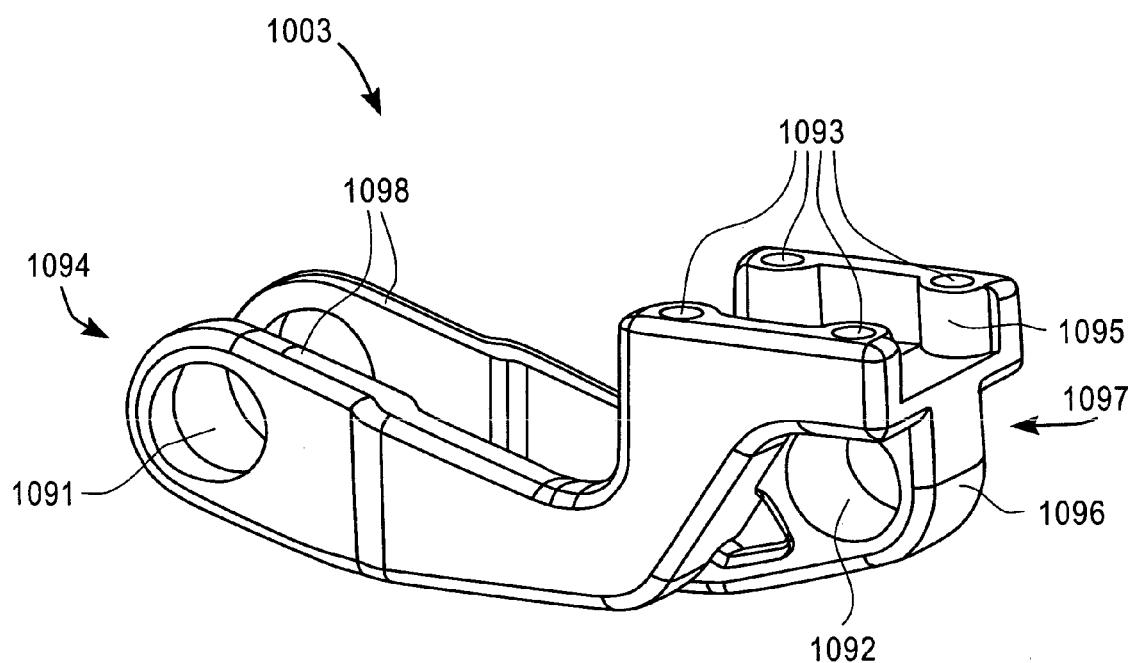
FIG. 10A is a perspective view of a crank, according to one embodiment of the present invention.

FIG. 10A is a perspective view of one embodiment of crank 1003, which corresponds to crank 803. Proximal end 1094 of crank 1003 may include arms 1098, which contain circular orifices 1091. In one embodiment, circular orifices 1091 correspond in size and placement to each other. At the distal end 1097, crank 1003 may include a nubbed portion 1096, which corresponds to nubbed portion 803A. Nubbed portion 1096 may include a circular orifice 1092. Additionally, the top of distal end 1097 may be flat, or equipped with sidewalls to form depression 1095. In one embodiment, the each sidewall is equipped with screw holes 1093.

Figure 10B:
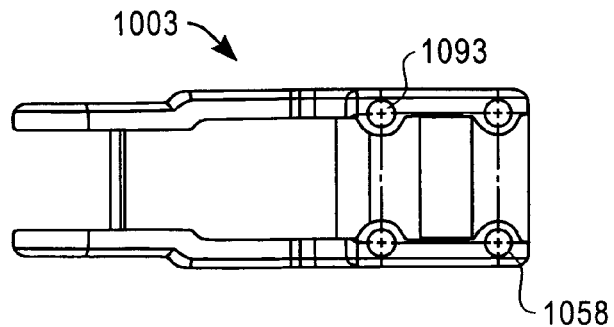
FIG. 10B is a plan view of the crank of FIG. 10A, according to one embodiment of the present invention.

FIG. 10B is a top view of the crank 1003 shown in FIG. 10A illustrating placement of holes 1093. In one embodiment, the diameter 1058 of holes 1093 is approximately 3.0 mm.

Figure 10C:
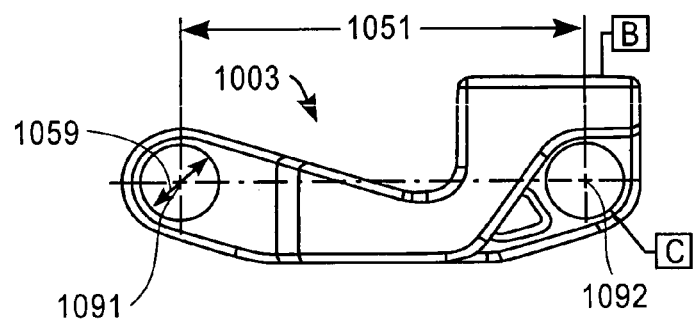
FIG. 10C is a side view of the crank of FIG. 1A, according to one embodiment of the present invention.

FIG. 10C is a side view of the crank 1003 shown in FIG. 10A. Circular orifices 1091 and 1092 have a diameter 1059 of approximately 8.05 mm. The center-to-center distance 1051 of orifices 1091 and 1092 is approximately 41.57 mm.

Figure 10D:
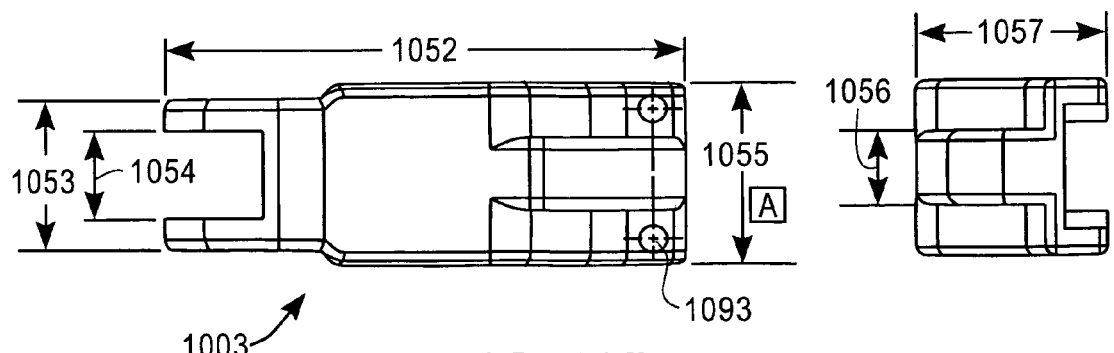
FIG. 10D is a bottom view of the crank of FIG. 1A, according to one embodiment of the present invention.

FIG. 10D is a bottom view of crank 1003. In one embodiment, the length 1052 of crank 1003 is approximately 53.60 mm. At its widest point, the width 1055 of crank 1003 measures approximately 19.25 mm. Similarly, width 1053 measures approximately 16.80 mm, and width 1054 measures approximately 10.78 mm. Length 1057 measures approximately 20.00, and distance 1056 measures approximately 7.98 mm.

Figure 11A:
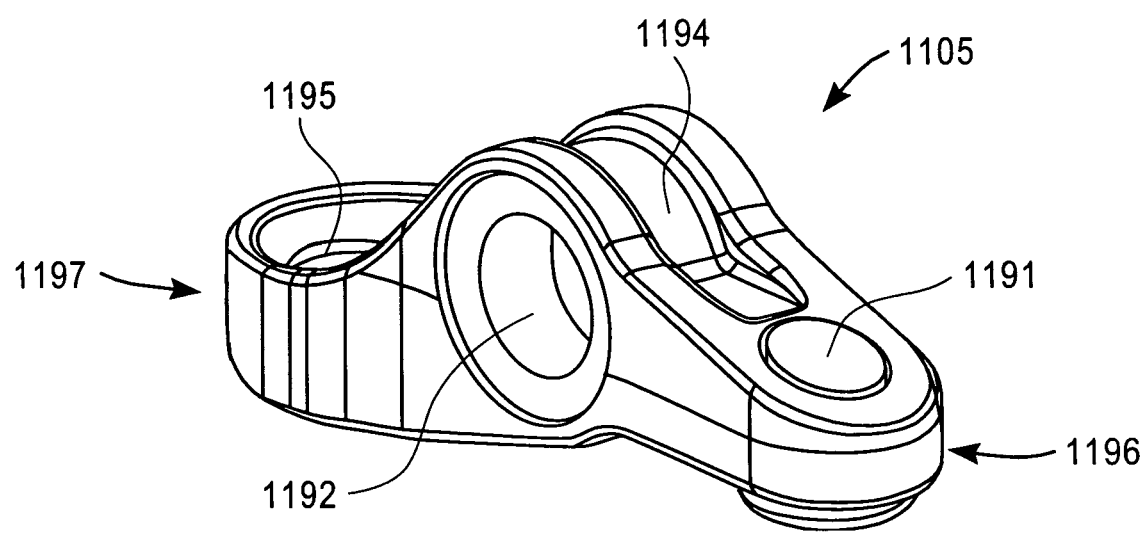
FIG. 11A is a perspective view of a tongue, according to one embodiment of the present invention.

FIG. 11A is a perspective view of one embodiment of a tongue 1105, which corresponds to tongue 805. Proximal end 1197 of tongue 1105 contain an concave orifice 1195, while distal end 1196 may contain a bore 1191 extending through the thickness of distal end 1196. Similarly, a bore 1192 may extend from one side of the tongue's central portion to the other. Additionally, the top central portion of tongue 1105 may be ridged to form convex channel 1194.

Figure 11B:
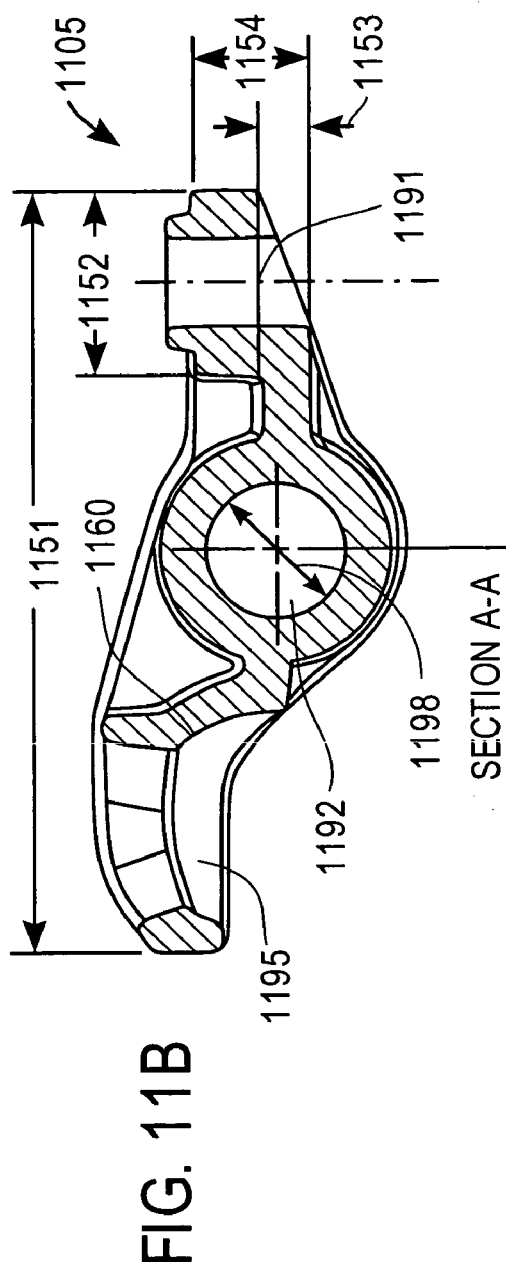
FIG. 11B is a cross-sectional view of a tongue of FIG. 11A, according to one embodiment of the present invention.

Referring now to FIG. 11B, there is shown a side view of tongue 1105. In this figure, tongue 1105 is shown upside down from the position shown in FIG. 11A. The length 1151 of tongue 1105 may measure approximately 44.69 mm. The diameter 1198 of bore 1192 may measure approximately 8.5 mm. The interior surface of orifice 1195 may be curved at an angle of approximately 12.70 degrees. Distance 1152 may measure approximately 11.08 mm. Distance 1154 may measure approximately 7.01 mm. Distance 1153 may measure approximately 3.00 mm. The center-to-center distance between bore 1192 and orifice 1191 is approximately 15.82 mm.

Figure 11C:
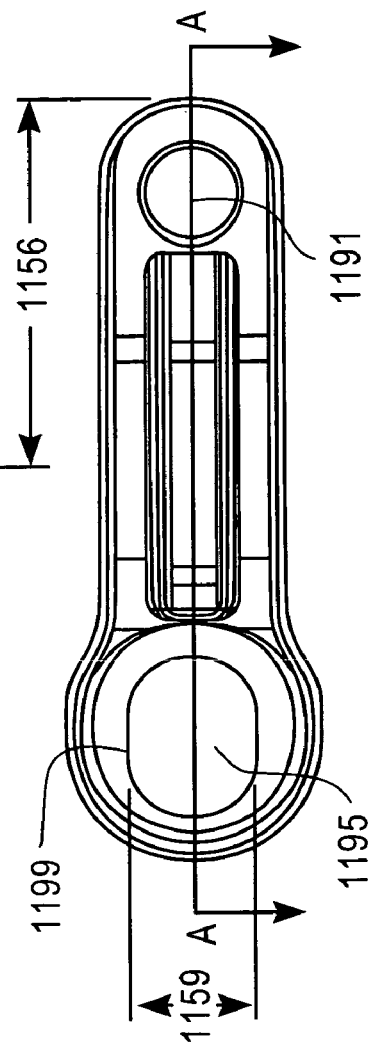
FIG. 11C is a top view of a tongue of FIG. 11A, according to one embodiment of the present invention.

Referring to FIG. 11C, which is a plan view one embodiment of tongue 1105, distance 1156 is approximately 21.38 mm. The diameter of orifice 1191 may measure approximately 6.00 mm. Additionally, within orifice 1195, there may be disposed a substantially oval orifice 1199, the width of which may measure approximately 6.92 mm.

Figure 11D:
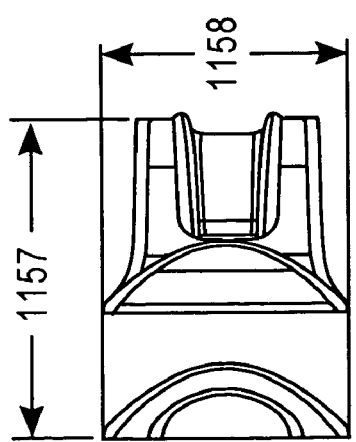
FIG. 11D is an end view of a tongue of FIG. 11A, according to one embodiment of the present invention.

FIG. 11D is an end view of one embodiment of tongue 1105. In this one embodiment, distance 1157 measures approximately 17.88 mm, and width 1158 measures approximately 13.95 mm.

Figure 12A:
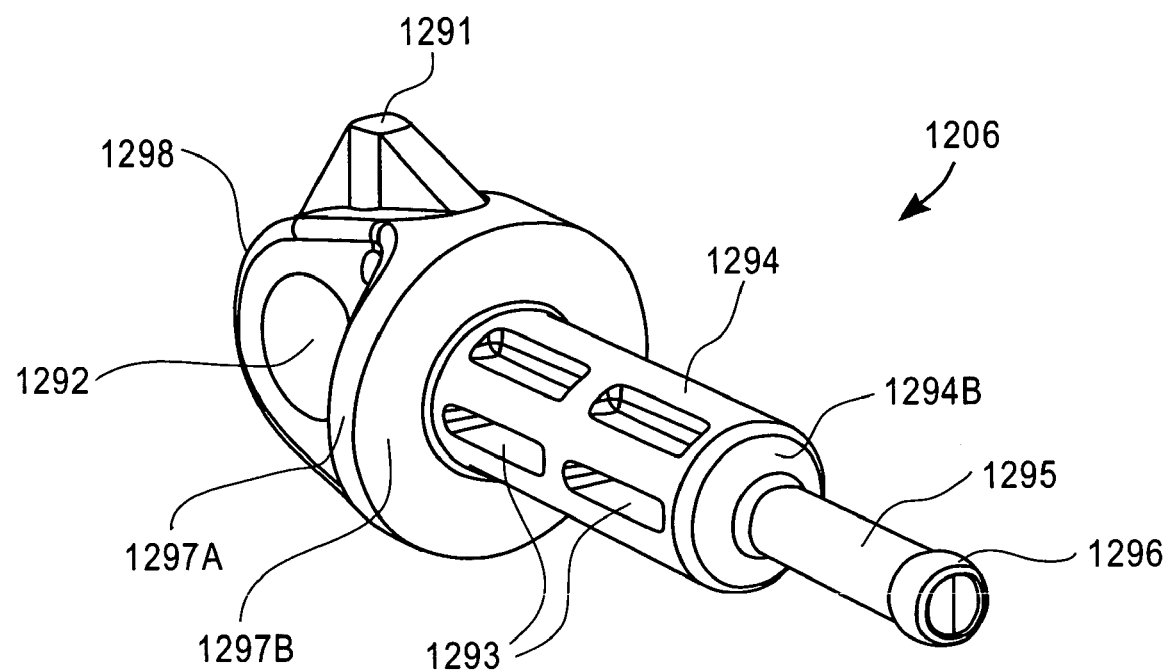
FIG. 12A is a perspective view of a spring shaft, according to one embodiment of the present invention.

FIG. 12A is a perspective view of one embodiment of a spring shaft 1206, which corresponds to spring shaft 906. In this embodiment, spring shaft 1206 has a nubbed portion 1298 at one end that flares to a perpendicularly disposed circular flange 1297A, which terminates in a planar surface 1297B. An orifice 1292 may extend through nubbed portion 1298. A flange 1291 may be disposed on an edge of nubbed portion 1298. Extending from the center of planar surface 1297B is a barrel 1294. Barrel 1294 is cylindrical and of a diameter smaller than the diameter of circular flange portion

1297A. Additionally, barrel 1294 may contain evenly spaced rectangular orifices 1293. Barrel 1294 terminates in a planar surface 1294B. Extending from the center of planar surface 1294B is a second barrel 1295 of smaller diameter than the first, which terminates in knobbed ferrule 1296.

FIG. 12B is a side view of one embodiment of the spring shaft 1206 shown in FIG. 12A. The distance 1257 from the center of orifice 1292 to the edge of planar surface 1297B is approximately 10.00 mm.

FIG. 12C is a cross-sectional side view of spring shaft 1206 taken along the line A—A in FIG. 12B. Distance 1254 measures approximately 7.12 mm. Distance 1255, measured from the center of orifice 1292 to the edge of ferrule 1296, is approximately 46.99 mm. The diameter 1253 of the circular flange portion 1297 measures approximately 19.00 mm. Similarly, the diameter of ferrule 1296 measures approximately 5.00 mm at its widest point. The diameter of barrel 1294 may measure approximately 9.52 mm.

FIG. 12D is an end view of spring shaft 1206. In this one embodiment, the thickness 1256 of flange 1291 may measure approximately 3.00 mm.

Figure 13A:
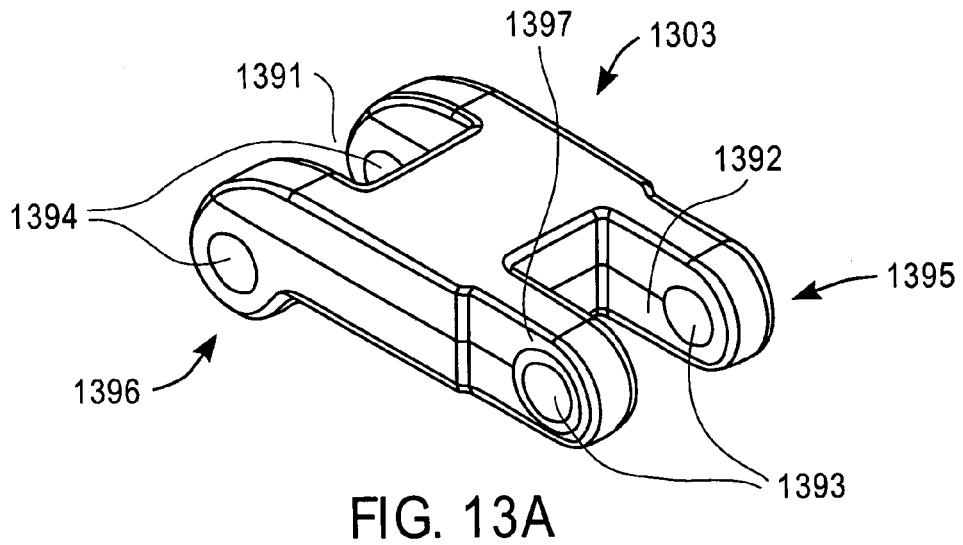
FIG. 13A is a perspective view of a strut, according to one embodiment of the present invention.

FIG. 13A is a perspective view of one embodiment of strut 1303, which corresponds to strut 903. In this one embodiment, strut 1303 is H-shaped. One pair of arms 1396 may curve downwards as shown, while a second pair of arms 1395 may be straight. Arms 1396 may contain orifices 1394 extending through each individual arm. Similar orifices 1393 may extend through the each of arms 1395. In one embodiment, the outside edges of orifices 1393 may be flared to produce annular rings 1397. Disposed between arms 1396 is a first channel 1391. Disposed between arms 1395 is a second channel 1392.

Figures 13B, 13D:
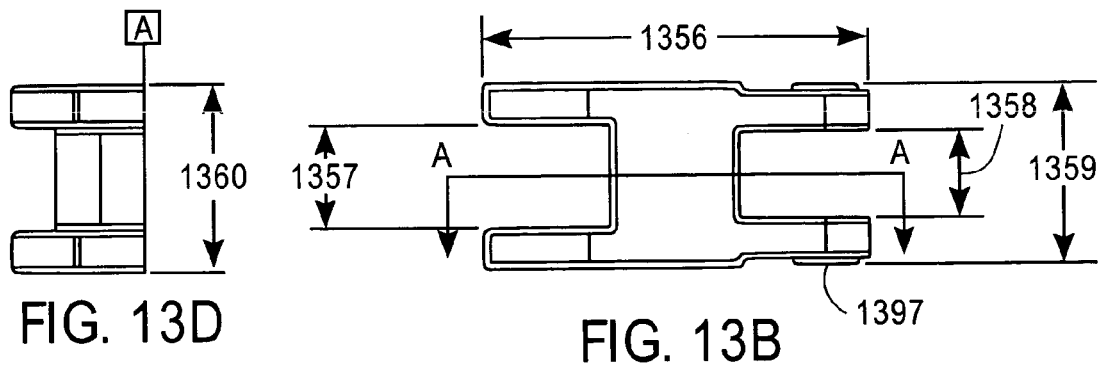
FIG. 13B is a plan view of the strut of FIG. 13A, according to one embodiment of the present invention.
FIG. 13D is an end view of the strut of FIG. 13A, according to one embodiment of the present invention.

FIG. 13B is a plan view of strut 1303 shown in FIG. 13A. Length 1356 of strut 1303 may be approximately 36.59 mm. The width 1359 of strut 1303, as measured from the outer edges of annular rings 1397 may be approximately 17.00 mm. The width 1358 of the second channel may measure approximately 8.50 mm. The width 1357 of the first channel may measure 9.58 mm.

Figure 13C:
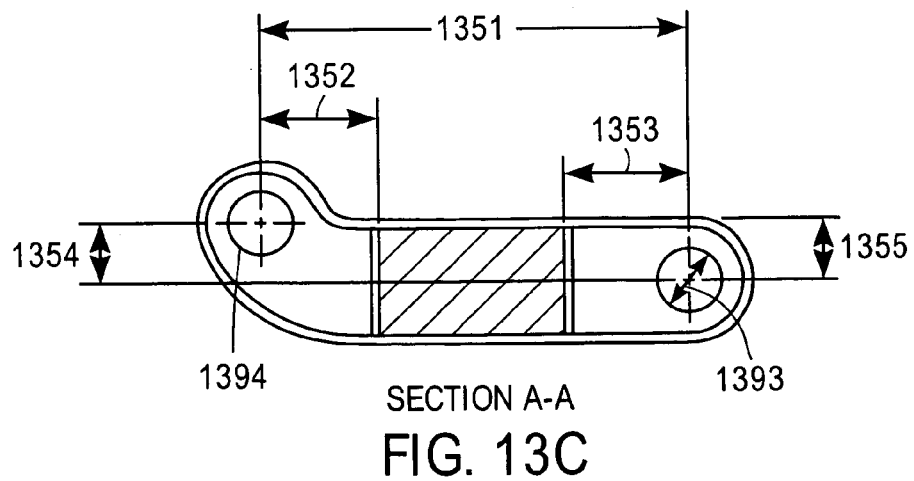
FIG. 13C is a sectional view of the strut of FIG. 13A taken along the line A—A in FIG. 13B, according to one embodiment of the present invention.

FIG. 13C is a cross-sectional side view of strut 1303, taken along the line A—A in FIG. 13B. In one embodiment, the horizontal center-to-center distance 1351 between orifices 1394 and 1393 is approximately 27.54 mm. Distance 1352 measures approximately 7.63 mm. Distance 1353 measures approximately 8.03 mm. Additionally, the vertical center-to-center distance between orifices 1394 and 1393 is approximately 4.03 mm.

FIG. 13D is an end view of strut 1303. In one embodiment, the width 1360 of strut 1303 measures approximately 17.43 mm.

FIG. 14A is a perspective view of one embodiment of a shaft 1416. It will be appreciated that shafts having various lengths and diameters may be used with the present invention, and that the present invention is not limited to the dimensions of one embodiment described herein. Shaft 1416 is generally cylindrical, and may be either solid or hollow. Shaft 1416 includes a barrel portion 1493, and an annular channel 1491 disposed near one end of shaft 1416, and an annular channel 1492 disposed near the opposite end of shaft 1416. In one embodiment, a retaining ring (not shown) fits within annular channel 1492 to secure shaft 1416 in position.

FIG. 14B is a side view of shaft 1416 showing the various measurements thereof. In one embodiment, the length 1451 of barrel portion 1493, measured from the interior edges of annular channels 1491 and 1492, is approximately 17.52 mm. Alternatively, length 1451 may measure approximately 25.12 mm or approximately 24.92 mm. The outer diameter 1452 of shaft 1416 may measure approximately 4.0 mm.

FIG. 15A is a perspective view of one embodiment of a display termination socket 1524. In this one embodiment, socket 1524 is a hollow, annular ring. A first annular lip 1592 may be disposed within one end of socket 1524, and an annular lip 1591 may be disposed inside the socket 1524 near the other end. Socket 1524 is used to couple a display termination ball (not shown) with the actuator assembly previously described.

FIG. 15B is a cross-sectional side view of socket 1524 taken along the line A—A in FIG. 15C, which is a top view of socket 1524. Distance 1551 measures approximately 17.50 mm, and radius 1553 measures approximately 19.00 mm. The interior diameter 1552 of socket 1524 may measure approximately 34.50 mm.

Figure 16:
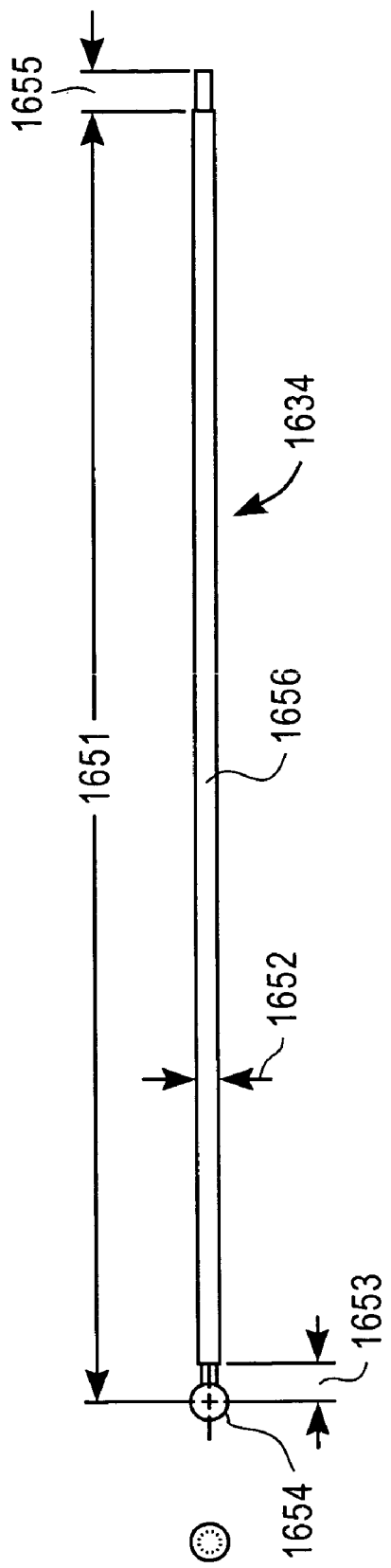
FIG. 16 is a diagram of a tension cable, according to one embodiment of the present invention.

FIG. 16 is a side view of one embodiment of a tension cable 1634. Tension cable 1634 includes a ball ferrule 1654 on one end. The other end may be provided with a compression-fit ferrule (not shown) during assembly of the moveable assembly, as previously described. Additionally, a plastic or nylon sleeve 1656 is centrally disposed about cable 1634. In one embodiment, the distance 1651, measured from the center of ball ferrule 1654 to a first end of sleeve 1656, is approximately 398.90 mm. Approximately a 12.00 mm length 1655 of exposed cable 1634 may extend past the first end of nylon sleeve 1656. A distance 1653, measured from a second end of nylon sleeve 1656 to the center of ball ferrule 1654, is approximately 12.00 mm. In one embodiment, the diameter of ball ferrule 1654 may measure approximately 11.18 mm.

FIG. 17A is a perspective view of one embodiment of a friction limit socket 1725. Socket 1725 may be formed of a metal (e.g. stainless steel or aluminum), and may include a first portion 1793A, a second portion 1793B, and an annular ring (or channel)1791 disposed between the first and second portions. Friction limit socket 1725 is static, meaning that first portion 1793A and second portion 1793B are not moveable. A concave surface 1792A may be formed within first portion 1793A to receive a friction limit ball (not shown). In one embodiment, friction limit socket 1725, including concave surfaces 1792A and 1792B (FIG. 17C), is formed of a single piece of stainless steel. In another embodiment, concave surfaces 1792A and 1792B separate pieces, which may be threaded together at their base portions to form socket 1725. In one embodiment, as previously described, concave surfaces 1792A and 1792B may be coated with a high friction material such as tungsten-carbide or aluminum oxide. Alternatively, concave surfaces 1792A and 1792B may be left uncoated.

FIG. 17B is a plan view of friction limit socket 1725.

FIG. 17C is a cross-sectional side view of socket 1725 taken along the line A—A in FIG. 17B and showing interior concave surfaces 1792A and 1792B. Distance 1753 measures approximately 36.00 mm. Distance 1754 measures approximately 21.50 mm. A first radius 1752 measures approximately 20.00 mm, while a second radius 1751 measures approximately 19.10 mm to form an annular lip about the outer edges of portions 1793A and 1793B.

FIG. 18A is a perspective view of one embodiment of a friction limit ball 1826. Friction limit ball 1826 includes a cosmetic middle portion 1891; a first annular friction ring 1892A disposed on a first end of friction limit ball 1826; a second annular friction ring 1892B disposed on a second end of friction limit ball 1826; and a cable guide insert 1893 centrally located within a bore 1896 running through friction limit ball 1826 from one side to the other. Friction limit ball is formed of a metal (e.g. stainless steel or aluminum). In one embodiment, annular friction rings 1892A and 1892B are manufactured independently of friction limit ball 1826 and are adhered to friction limit ball 1826 using adhesives well-known in the art. In another embodiment, annular friction rings 1892A and 1892B, cable guide insert 1893, and friction limit ball 1826 are machined from a single block of aluminum.

Referring to FIGS. 17A and 18A, in a further embodiment, annular friction rings 1892A and 1892B are coated with a high friction material such as tungsten-carbide to provide a high friction surface as previously described. Alternatively, annular friction rings 1892A and 1892B may be left uncoated. The annular friction rings not only contact concave surfaces 1792A and 1792B when moveable assembly 200 is tensioned, but also serve to limit the friction limit ball's 1826 axis of rotation when moveable assembly 200 is relaxed. For example, friction limit ball 1826 may be tilted within socket 1725 until one of the friction limit rings contacts the inner lip of portion 1793A or 1793B. In embodiment, the axis of rotation is approximately in the range of approximately 10.0 to approximately 25.0 degrees. In other embodiments, the axis of rotation may be greater or lesser than the range illustratively given above.

FIG. 18B is a plan view of friction limit ball 1826. Cable guide insert 1893 may include four perpendicular cross members. Two holes 1895A and 1895B may be centrally disposed in two of the cross members, with the center of each hole located a distance 1861 or 1862, respectively, from the center of friction limit ball 1826. In one embodiment, holes 1895A and 1895B house an anti-torsion cable. Additionally, a central tension cable bore 1894 may be formed in the center of cable guide insert 1893 to house a tension cable. In one embodiment, distances 1861 and 1862 each measure approximately 8.00 mm.

FIG. 18C is a cross-sectional side view of a friction limit ball 1826 taken along the line A—A in FIG. 18B. In one embodiment, the thickness 1851 of friction limit ball is approximately 30.00 mm. The outer diameter 1854 of friction limit ball 1826 may be approximately 38.00 mm. Distances 1855 and 1856, measured from a vertical line extending though the center of friction limit ball 1826 to the edge of annular friction rings 1892A and 1892B, each measure approximately 11.03 mm. The radius 1857 is equivalent to the radius 1858 and measures approximately 35.5 degrees. The diameter 1852 of a first bore is approximately 23.00 mm. The diameter 1853 of a tension cable bore is approximately 6.80 mm.

Figure 19A:
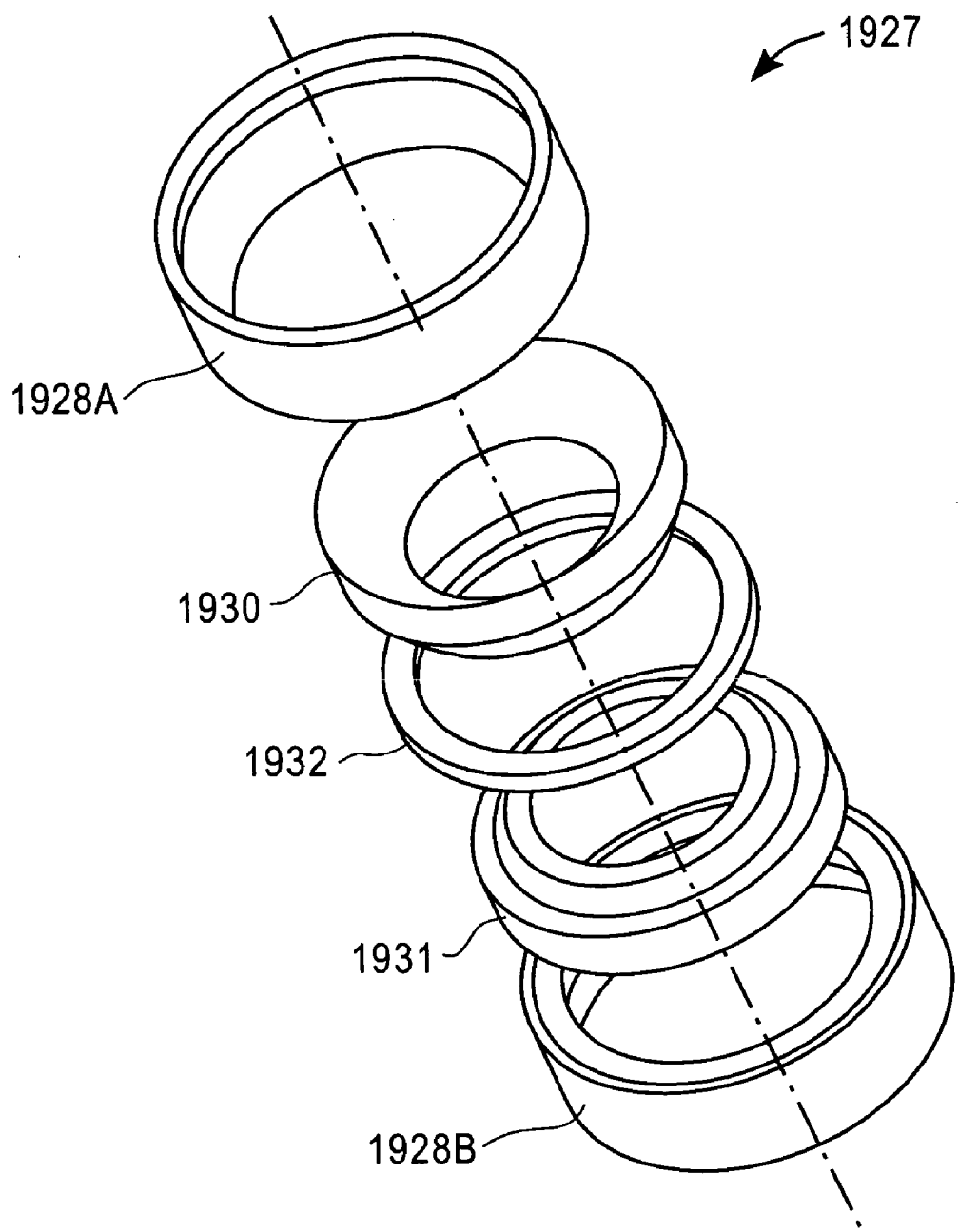
FIG. 19A is a perspective view of a friction socket assembly, according to one embodiment of the present invention.

FIG. 19A is a perspective view of one embodiment of an abrasive socket assembly 1927. A first plunger 1928A slidably fits around first friction insert 1930, which is coupled with a second friction insert 1931, which slidably fits within a second plunger 1928B. The plungers and friction inserts may be made of a metal (e.g. stainless steel or aluminum). Wave spring 1932 is disposed between the first and second plungers to space the plungers apart when moveable assembly 200 is relaxed. When thrust apart by wave spring (resilient member) 1932, plungers 1928A and 1928B lift friction limit balls 1826 out of contact with friction inserts 1930 and 1931, thus allowing friction limit balls 1826 to rotate freely within plungers 1928A and 1928B. In one embodiment, base portions of friction inserts 1930 and 1931 are threaded such that the friction inserts may be screwed together to assemble abrasive socket assembly 1927. Additionally, the concave inner surfaces of friction inserts 1930 and 1931 may be coated with an abrasive material such as tungsten carbide, aluminum oxide, or other abrasive material, as previously described, to provide a high friction support surface.

With reference back to FIG. 2A, in a further embodiment, abrasive socket assemblies 1927 are used in the bottom one-half to one-third portion of moveable assembly 200, while friction limit sockets 1725 are used in the upper one-half to two-thirds of moveable assembly 200. In this manner, moveable assembly 200 is equipped with at least two zones of friction: a high friction zone located near the base of moveable assembly 200, where the most torque occurs; and a low friction zone located towards the display end of moveable assembly 200. Alternatively, abrasive socket assemblies 1927 and friction limit sockets 1725 may be alternated throughout the length of moveable assembly 200.

FIG. 19B is a perspective view of a first friction insert 1930 having a concave interior surface designed to mate with an annular friction ring of a friction limit ball. Base portion 1992 may be threaded to mate with a base portion of a corresponding second friction insert.

FIG. 19C is a cross-sectional side view of the friction insert 1930 of FIG. 19B. Distance 1952 measures approximately 15.25 mm, and distance 1953 measures approximately 5.00 mm. In one embodiment, the outer diameter 1955 of the base portion measures approximately 30.25 mm, and the outer diameter of first friction insert 1930 measures approximately 35.50 mm. Additionally, the interior 1954 of the base portion of first friction insert 1930 may be internally threaded. Second friction insert 1931 (not shown) has corresponding measurements, except that the base portion of second friction insert 1931 may be externally threaded.

FIG. 19D is a top view of first friction insert 1930, showing orifice 1991 bored through the base portion of first friction insert 1930 to allow passage therethough of data, torsion, tension, power, and other computer system-related cables.

FIG. 19E is a side view of first friction insert 1930, showing base portion 1992.

FIG. 19F is a bottom view of first friction insert 1930.

FIG. 19G is a perspective view of a second friction insert 1931, showing a second, externally-threaded base portion 1993.

FIG. 19H is a cross-sectional side view of second friction insert 1931 taken along the line A—A in FIG. 19K. Distance 1961 measures approximately 15.25 mm. Distance 1963 measures approximately 5.00 mm. Outer diameter 1964 of the base portion measures approximately 30.25 mm, and outer diameter 1965 of second friction insert 1931 measures approximately 35.50 mm. The exterior 1966 of the base portion may be threaded such that the base portions of second friction insert 1931 and first friction insert 1930 screw into each other.

FIG. 19I is a plan view of second friction insert 1931 showing an orifice 1994 bored through the base portion of the insert to allow for the passage therethrough of data, power, anti-torsion, tension, power, and other computer system-related cables.

FIG. 19J is a side view of the second friction insert 1931 showing base portion 1993.

FIG. 19K is a bottom view of second friction insert 1931.

Figure 20:
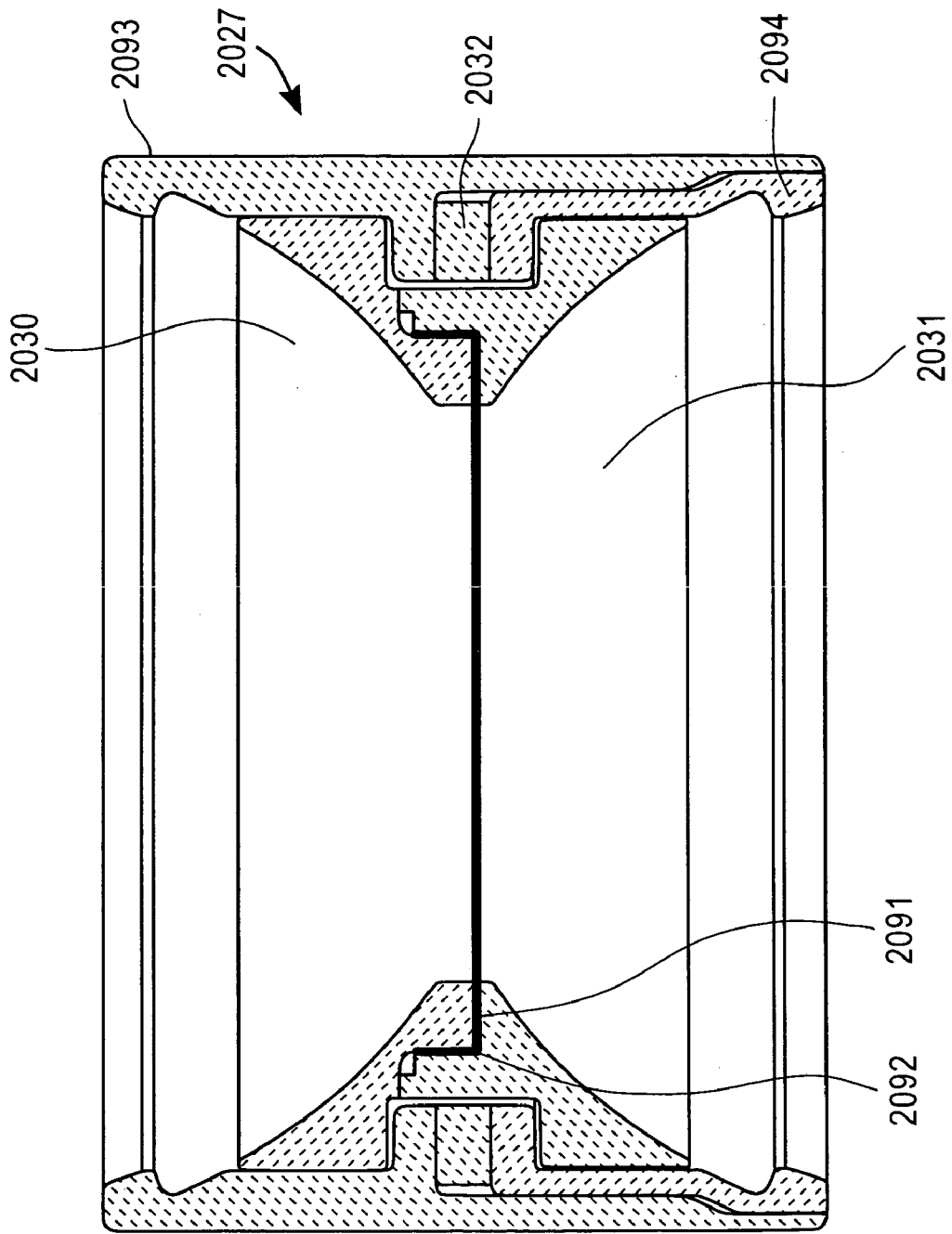
FIG. 20 is a cross-sectional view of a friction assembly, according to one embodiment of the present invention.

FIG. 20 is a cross-sectional side view of an assembled abrasive socket assembly 2027, which corresponds to abrasive socket assembly 1927, according to one embodiment of the invention. In this figure, plunger 2093 corresponds to plunger 1928A and plunger 2094 corresponds to plunger 1928B. In this one embodiment, plunger 2093 has been fashioned to slidably fit around plunger 2094 so as to present a more desirable aesthetic external appearance. Plungers 2093 and 2094 may be made of plastic or a metal (e.g. aluminum or stainless steel), and colored as desired. Annular wave spring 2032, corresponding to wave spring (e.g. resilient member) 1932, is disposed between plungers 2093 and 2094 to space plungers 2093 and 2094 apart when moveable assembly 200 is relaxed. Friction insert 2030, corresponding to friction insert 1930, is screwed into friction insert 2031, which corresponds to friction insert 1931, at thread interface 2092. In one embodiment, the friction inserts may be glued together at glue area 2091 using adhesives well-known in the art.

Figure 21A:
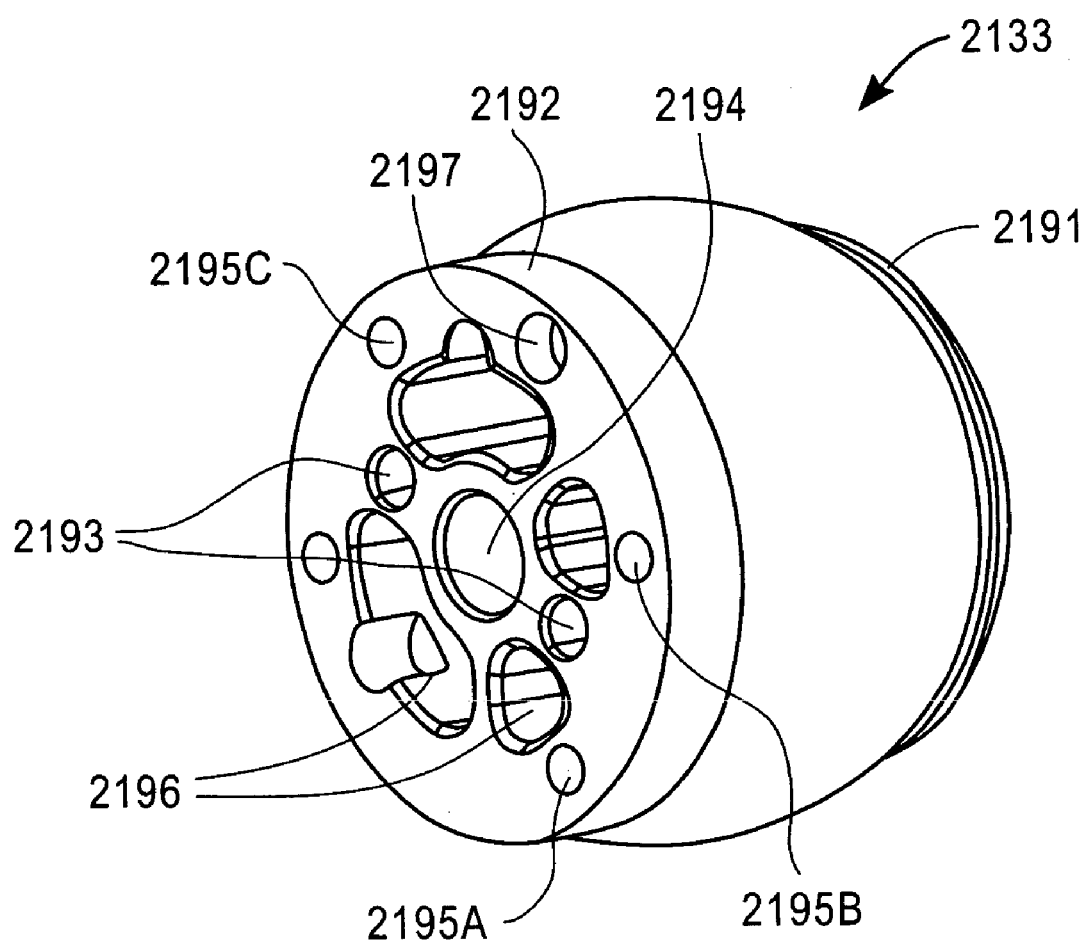
FIG. 21A is a perspective view of a base termination ball, according to one embodiment of the present invention.

FIG. 21A is a perspective view of one embodiment of a base termination ball 2133. Base termination ball 2133 is similar to friction limit ball 1826, except that one end of base termination ball 2133 includes a flattened base portion 2192 to couple moveable assembly to a moveable base structure. An annular friction ring 2191, such as those previously described, is formed or attached at one end of base termination ball 2133. Flattened base portion 2192 may be coupled with a moveable base structure using screw holes 2197, 2195C, 2195A, and 2195B. Additionally, flattened base portion 2192 may include a central tension cable guide orifice 2194, a pair of anti-torsion cable orifices 2193, and a plurality of cable guide orifices 2196. Like friction limit balls 1826, base termination ball 2133 may be made of metal (e.g. stainless steel or aluminum).

FIG. 21B is a bottom view of base termination ball 2133. The horizontal center-to-center distance 2151 between orifice 2195C and 2195B is approximately 24.00 mm. Orifice 2195B is located a distance 2152 of approximately 12.00 mm from a vertical line running through the center of tension cable guide orifice 2194, and located a distance 2154 of approximately 7.50 mm from a horizontal line running through the center of tension cable guide orifice 2194. The vertical center-to-center distance 2155 between orifice 2195B and 2195A is approximately 15.00 mm. In one embodiment, distance 2156 measures approximately 14.50 mm.

FIG. 21C is a cross-sectional side view of base termination ball 2133 taken along the line A—A in FIG. 21B. Outer diameter 2157 of the flattened base portion measures approximately 34.45 mm. Distance 2158 measures approximately 13.50 mm. Arc 2159 measures approximately 36.0 degrees. Distance 2162 measures approximately 23.00 mm. The diameter 2161 of the tension cable guide orifice measures approximately 6.80 mm. Distance 2160 measures approximately 11.17 mm. The outer diameter 2164 of base termination ball 2133 measures approximately 38.00 mm.

Figure 22A:
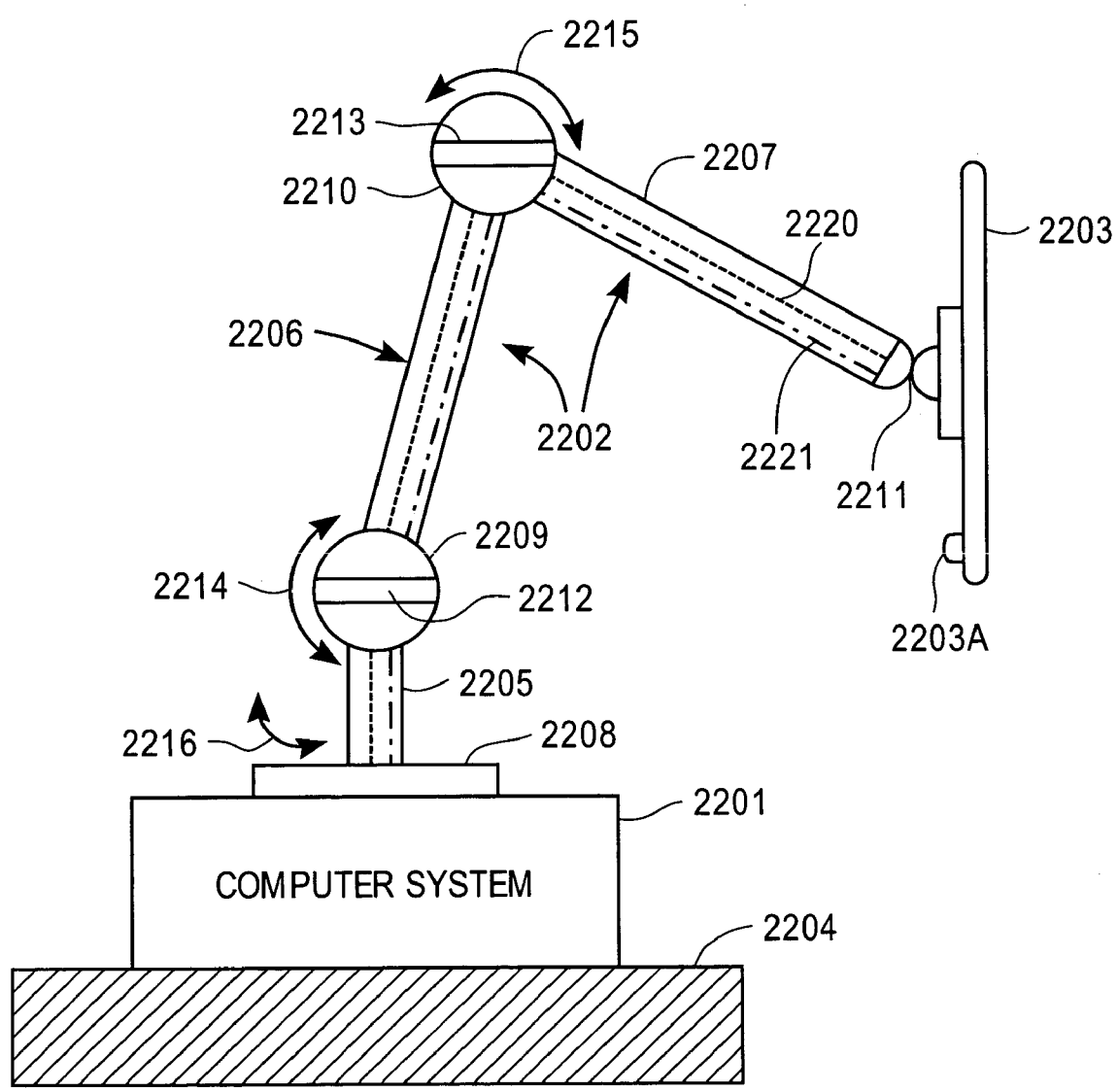
FIGS. 22A–22C are side views showing examples of moveable assemblies which incorporate aspects of the present invention.
Figure 22B:
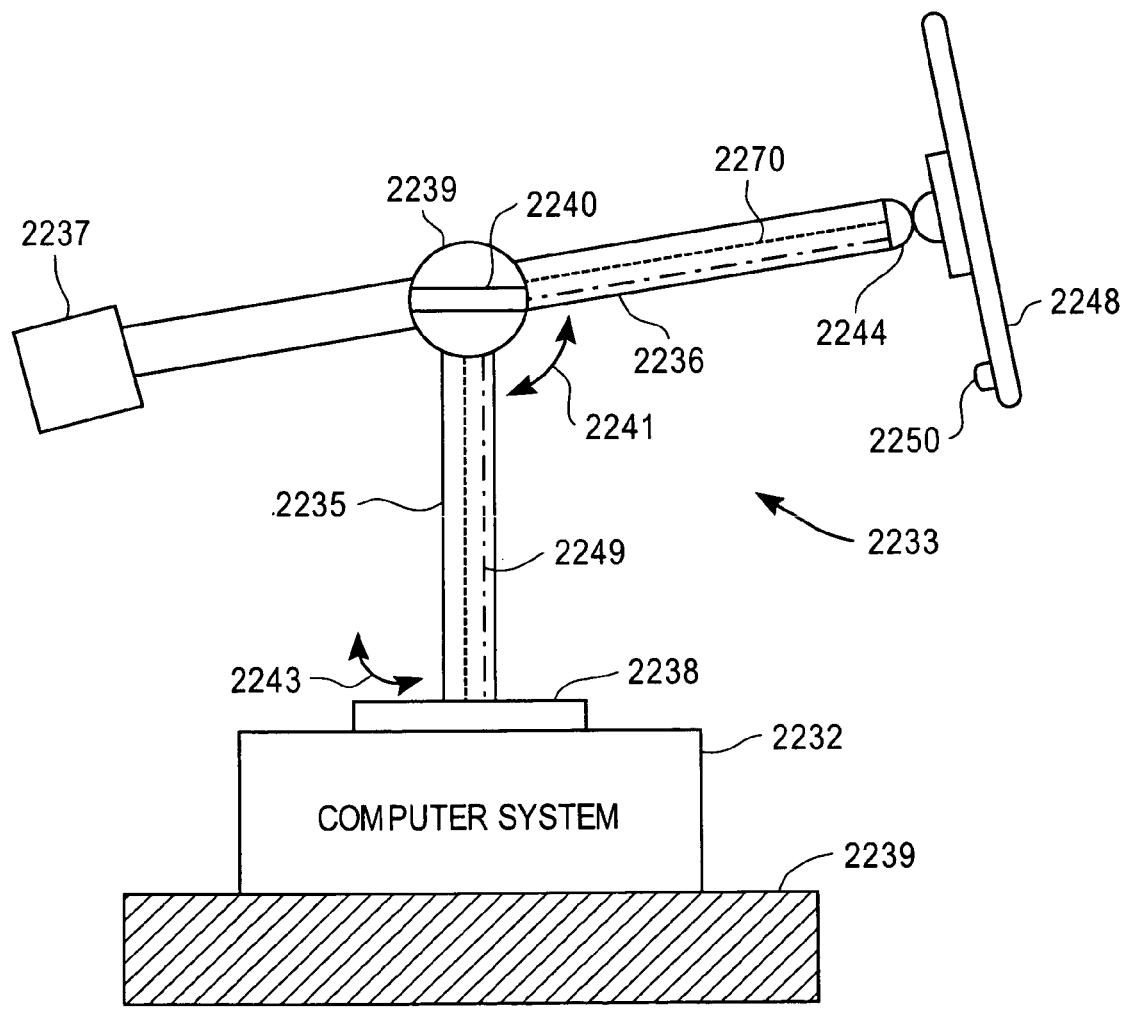
Figure 22C:
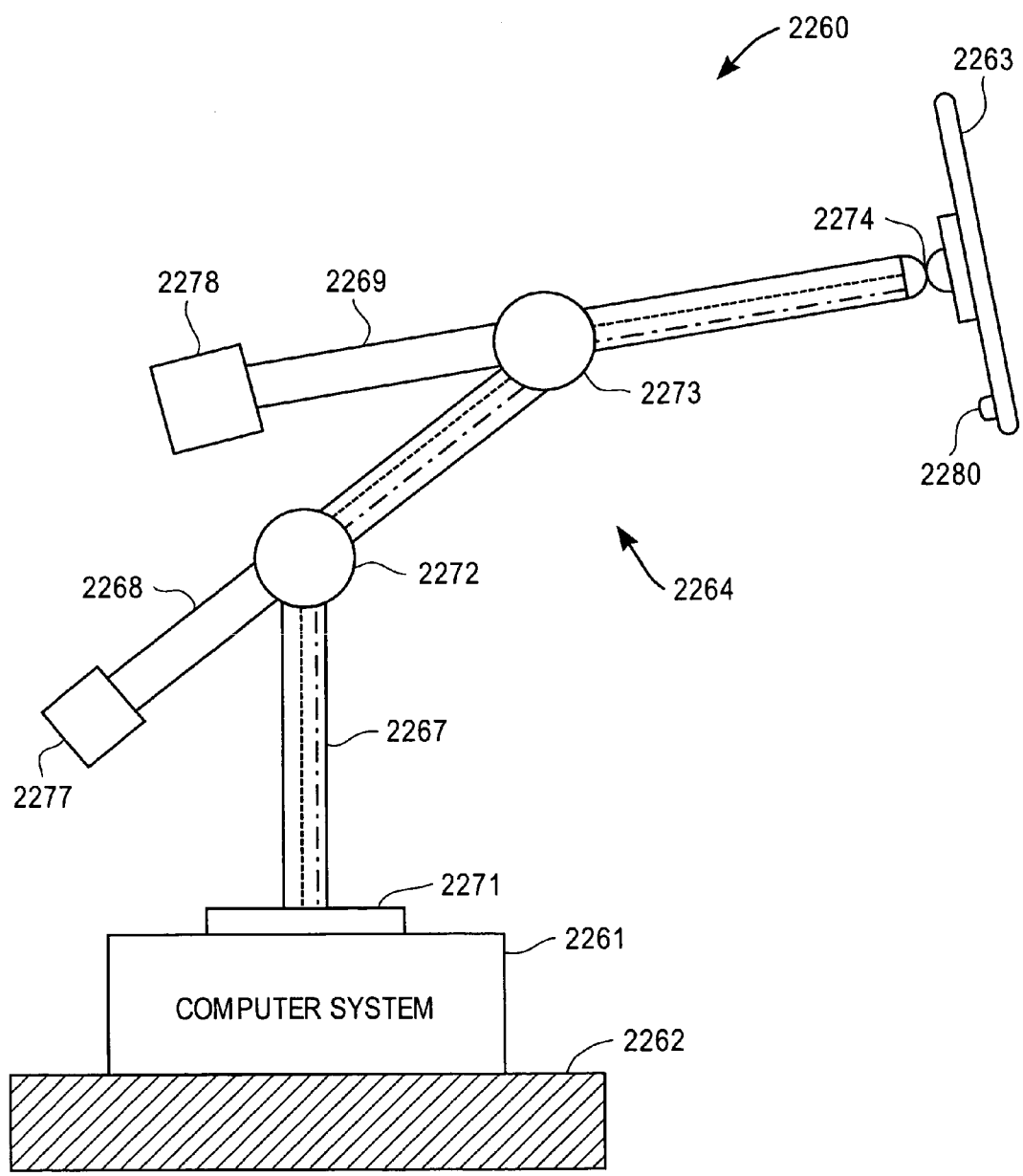

It will be appreciated that aspects of the present invention may be used with a variety of moveable assemblies which allow for selectable positioning of a flat panel display device (FPDD). FIGS. 22A, 22B, and 22C show examples of such moveable assemblies which incorporate aspects of the present invention. Examples of these aspects include a base computer system which is moveable by a person and is not physically attached to a surface (except through the weight of the system due to gravity), or the use of a single actuator on the back of the FPDD in order to control the repositioning of the FPDD without requiring the actuation or loosening of multiple locks for the various joints, or a data cable which is housed within the structure of the moveable assembly.

FIG. 22A shows an example of a moveable assembly 2202 which is coupled to an FPDD 2203 at one end of the moveable assembly and is coupled to a base computer system 2201 at another end of the moveable assembly 2202. The base computer system 2201 is similar to the base computer system 242A. It includes many of the typical components of a computer system and has been designed in both size and weight to adequately and stably support the FPDD at a variety of different positions. For example, the base computer system 2201 is designed with sufficient weight such that, without physically attaching the base computer system 2201 (except through gravity) to the surface 2204, the base computer system 2201 will allow the FPDD 2203 to be extended out beyond the edge of the computer system 2201 as shown in FIG. 22A without causing the whole system to overturn. Thus the entire system 2200 allows the FPDD 2203 to be positioned at any one of a multitude of locations in which the FPDD 2203 can be positioned given the extent of reach provided by the moveable assembly 2202.

The moveable assembly 2202 includes a post (e.g. arm member) 2205, a post 2206, and a post 2207 which are coupled to each other through joints 2210 and 2209 as shown in FIG. 22A. The post 2205 is coupled to the base computer system 2201 through the rotatable joint 2208 which allows the post 2205 to rotate as shown by arrow 2216 around the joint 2208. The joint 2209 allows post 2206 to rotate relative to post 2205, allowing an angular displacement along the arrow 2214 as shown in FIG. 22A. Similarly, the angle between post 2206 and 2207 may be varied as these two posts are moved through the joint 2210, allowing motion along the arrow 2215. Both joints 2209 and 2210 include locking mechanisms 2212 and 2213 respectively, allowing the relative angular position between the corresponding posts to be fixed.

In the embodiment shown in FIG. 22A, articulation of both joints simultaneously will require loosening of both joints in order to allow complete control of the movement of the FPDD. In an alternative embodiment of the system shown in FIG. 22A, a single locking actuation control may be disposed on the surface of the FPDD 2203 in a manner which is similar to the handle 241 described above. In one embodiment, this single actuation control may be an electromagnetic control which loosens or tightens the joints electromagnetically under the control of the single actuation switch disposed on the FPDD 2203. The post 2207 terminates in a gimbal joint 2211 which is coupled to the FPDD to allow movement of the FPDD relative to the post 2207. Within the interior portions of the posts 2205, 2206 and 2207, there are disposed data and power cables 2220 and 2221. In one embodiment, these cables are concealed within the interior of the posts, which represent another form of a moveable assembly for supporting an FPDD. It will be appreciated that other computer system-related cables may be housed within the interior portions of posts 2205, 2206, and 2207.

FIG. 22B shows another example of a moveable assembly 2233 in a system 2233 which includes a base computer system 2232 and an FPDD 2248. The entire system 2233 rests, through gravity, on the surface 2239 without being physically attached to the surface except through gravity. As noted above, the bottom of the computer system 2232 may include a non-slip surface, such as rubber feet. Given that the weight and size of the base computer system 2232 is designed according to the teachings of the present invention to allow the support of the FPDD 2248 in a variety of selectable positions of the FPDD 2248, there is no need for the base computer system 2232 to be physically attached to the surface 2239 through the use of clamps or glues or bolts or screws, etc.

In one embodiment of the example shown in FIG. 22B, the computer system 2232 has a weight and size which allows a single human user to be able to move the computer system without assistance from another person or from a mechanical assistance. The base computer system 2232 is attached to post 2235 through a rotatable joint 2238, which allows the post 2235 to rotate around the base computer system along the arrow 2243. Post 2236 is coupled to post 2235 through the joint 2239, which will be locked through the locking mechanism 2240. The joint 2239 allows the angle between post 2235 and 2236 to be varied by moving the post 2236 along the arrow 2241. One end of the post 2236 supports a counterweight 2237 and another end of the post terminates in a gimbal joint 2244 which is attached to the back of the FPDD 2248. Posts 2235 and 2236, in the embodiment shown in FIG. 22B, include power and data cables 2270 and 2249, respectively, which are disposed within these posts and thereby concealed by these posts. A single actuating device or switch 2250 may optionally be located on the FPDD 2248 to allow for the release of one or more lockable joints in order to allow the selectable positioning or repositioning of the FPDD.

FIG. 22C shows another example of a moveable assembly 2264 in a system 2260 which includes the moveable assembly as well as an FPDD 2263 and a base computer system 2261 which rests on a surface 2262, which may be a desk surface. As noted above, the base computer system 2261 is typically designed to have a weight and size such that it will support the selectable positioning and repositioning of the FPDD 2263 over a large range of movement of the FPDD 2263. The moveable assembly 2264 includes three posts, 2267, 2268 and 2269, and also includes three joints 2271, 2272 and 2273, and also includes two counterweights 2277 and 2278. The moveable assembly 2264 also includes a gimbal joint 2274 which couples the post 2269 to the FPDD 2263. An optional single actuator control 2280 may be disposed on the FPDD 2263 in order to unlock or lock one or more of the joints. The embodiment shown in FIG. 22C may also optionally include the use of power and data cables, which are disposed within the posts 2267, 2268, and 2269.

Figure 23A:
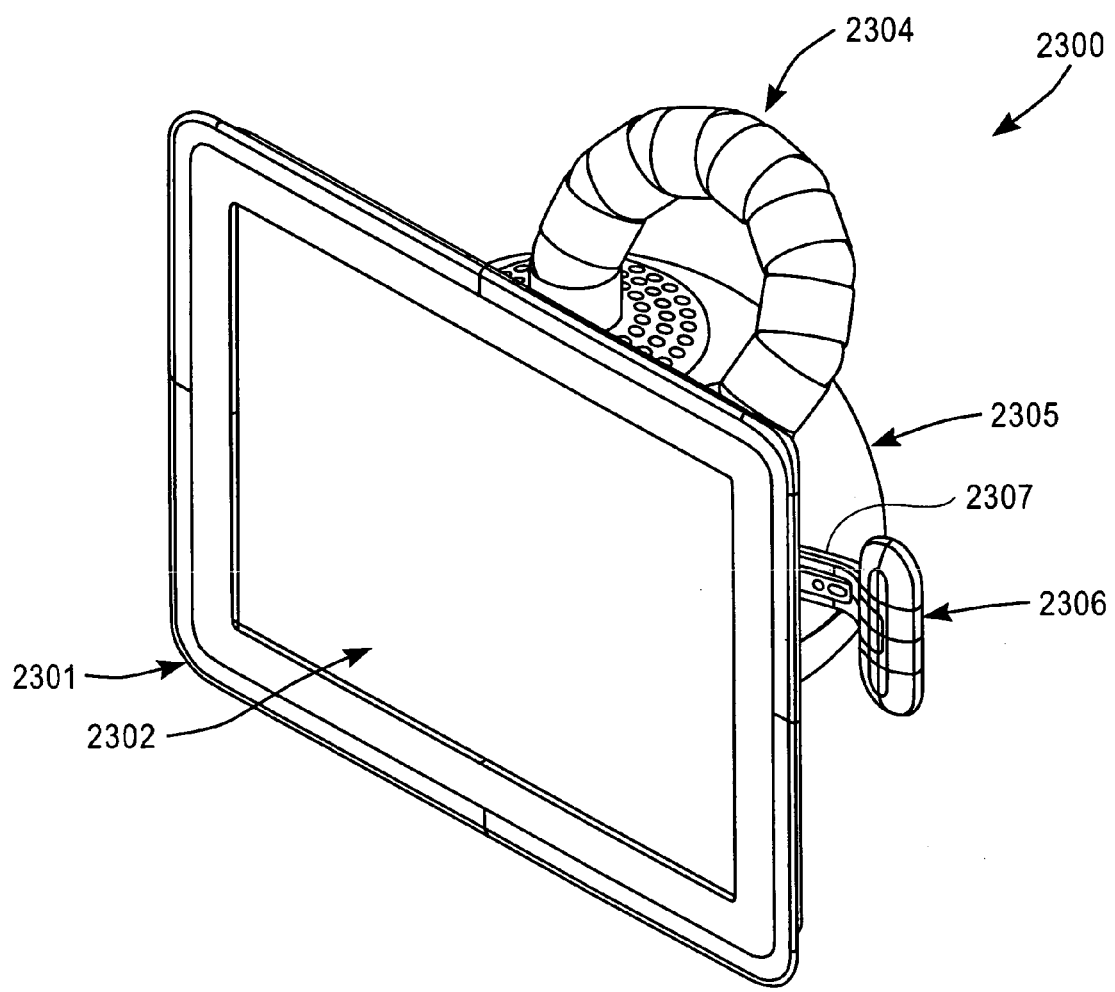
FIG. 23A is a perspective view of a computer system 2300 having a base 2305 and a moveable assembly 2304 that supports flat panel display device 2301.

In FIG. 23A, the computer controlled display system 2300 includes: a flat panel display device 2301 having a display surface 2302 and an input 2303 for receiving display data to be displayed on the display surface 2302. A moveable assembly 2304 is mechanically coupled to the flat panel display 2301. The moveable assembly 2304 has a cross-sectional area, which is substantially less than an area of the display surface 2302. Moveable assembly 2304 is moveable when handle 2307 is depressed, to allow the flat panel display device 2301 to be selectively positioned in space relative to a user of the computer controlled display system 2300. A base (e.g. moveable enclosure) 2305 is coupled mechanically to the moveable assembly 2304 and to the flat panel display device 2301 through the moveable assembly 2304. In one embodiment, the base houses concealed computer components, which include, but are not limited to: a microprocessor, a memory, a bus, an I/O (input/output) controller, optical drive, network interface, and I/O port. In such an embodiment, the microprocessor is coupled to the input of the flat panel display 2301. In a preferred embodiment, the cross-sectional area is defined by a cross-section taken perpendicularly to a longitudinal dimension of the moveable assembly 2304.

In one embodiment, the moveable assembly 2304 is moveable such that the FPDD 2301 has at least three degrees of movement. In one embodiment, the overall weight of the entire system is less than about 45.0 lbs and a footprint size of the base 2305 is less than an area of about 4.0 square feet.

In a further embodiment, an actuator 2306 is attached to the flat panel display 2301 and coupled to a force generator (e.g. spring/piston assembly) which maintains the moveable assembly 2304 in a rigid mode when the actuator (handle) 2306 is in a first state, and which allows the moveable assembly 2304 to be moveable when the actuator (handle) 2306 is in a second state. In a preferred embodiment, the actuator 2306, through a single actuation, allows simultaneous positioning of the flat panel display 2301 and moveable assembly 2304 in multiple degrees of freedom.

In one embodiment, a data cable (not shown) is coupled to the input of the flat panel display 2301 at a first end, and coupled to a display controller (not shown) housed within the base 2305, the cable being disposed (and/or concealed) within the moveable assembly 2304. In a further embodiment, an anti-torsion cable (not shown) is coupled to (and preferably within) the moveable assembly 2304 to restrain the flat panel display (and the moveable assembly 2304) from being rotated beyond a pre-determined amount.

In a further embodiment, the longitudinal dimension of the moveable assembly 2304 extends from the flat panel display 2301 to the base 2305, and a weight of the system 2300 is less than about 25.0 lbs and a footprint size of the base 2305 is less than an area of about 500.0 square centimeters.

In a further embodiment, the base 2305 is not fixedly secured to a supporting surface under the base 2305.

Figure 23B:
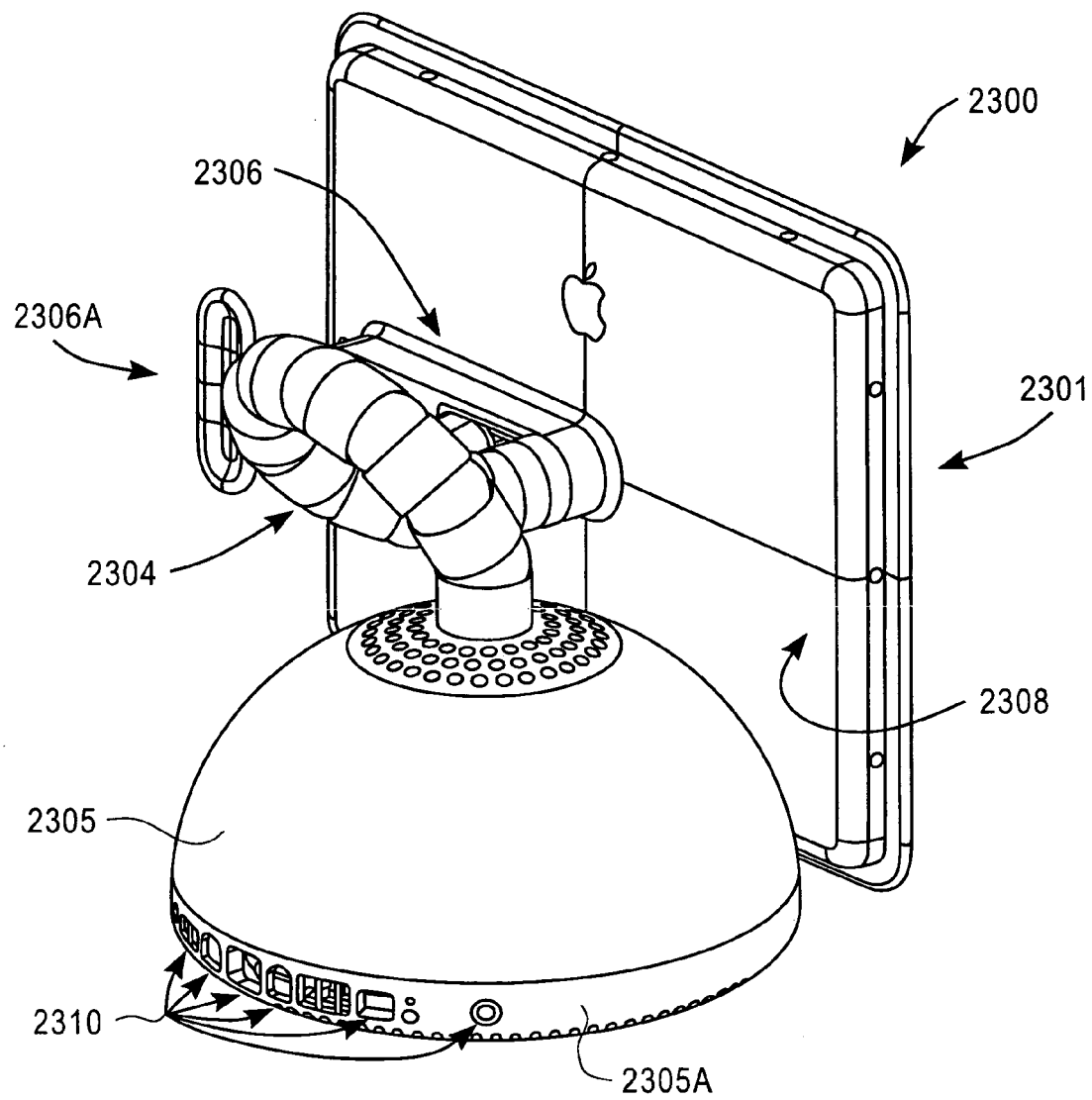
FIG. 23B is a perspective view of another embodiment of a computer controlled display device including a FPDD 2301 coupled with a moveable assembly 2304, which is coupled with a base 2305.

FIG. 23B is a perspective view of another embodiment of a computer controlled display device including a FPDD 2301 coupled with a moveable assembly 2304, which is coupled with a base 2305. As shown, actuator assembly 2306 is mounted on or contained within the rear housing 2308 of FPDD 2301. In one embodiment, the internal structure of FPDD is strengthened to withstand the compressive user forces applied simultaneously to handle 2306A and the front surface of FPDD 2301. The external shape of base 2305, in one embodiment, forms a toroid, as shown, and includes an inner metal Faraday cage, concealed by a layer of plastic, which repels external Electromagnetic Frequencies (EMF) that may interfere with operation of the computer components concealed within the base 2305. The Faraday cage also contains internal EMF generated by the concealed computer components. In one embodiment, the concealed metal Faraday cage, like the outer plastic layer, is manufactured in two pieces, a top portion and a bottom portion, which when fitted together form a toroid. The Faraday cage may be made of zinc, zinc alloys, or other suitable metals known in the art.

In one embodiment, the base 2305 and its internal components weighs approximately 13.0 pounds, while the FPDD 2301 weighs approximately 4.5 pounds. Additionally, the moveable assembly 2304, base 2305, and FPDD 2301 are manufactured such that a user can safely lift computer system 2300 using moveable assembly 2304 as a carrying handle. Additionally, the system is manufactured such that a user can safely hoist the entire system simply by grasping the FPDD 2301 and lifting. The terms "safely lift" and "safely hoist" mean that the various system components suffer minimal or no external or internal damage as a result of the user's lifting actions.

As shown in FIG. 23B, the exterior plastic housing of base 2305 may be formed of two parts, a top portion and a bottom portion 2305A, which, when fitted together, form a toroid. The bottom portion 2305A may contain a plurality of peripheral ports and/or computer system-related controls 2310. Such ports and controls illustratively include, but are not limited to one or more of: a Firewire port, an Ethernet port, a modem jack, a power button, a reset button, a USB port, an infrared port, and similar computer system-related ports and controls.

Figure 23C:
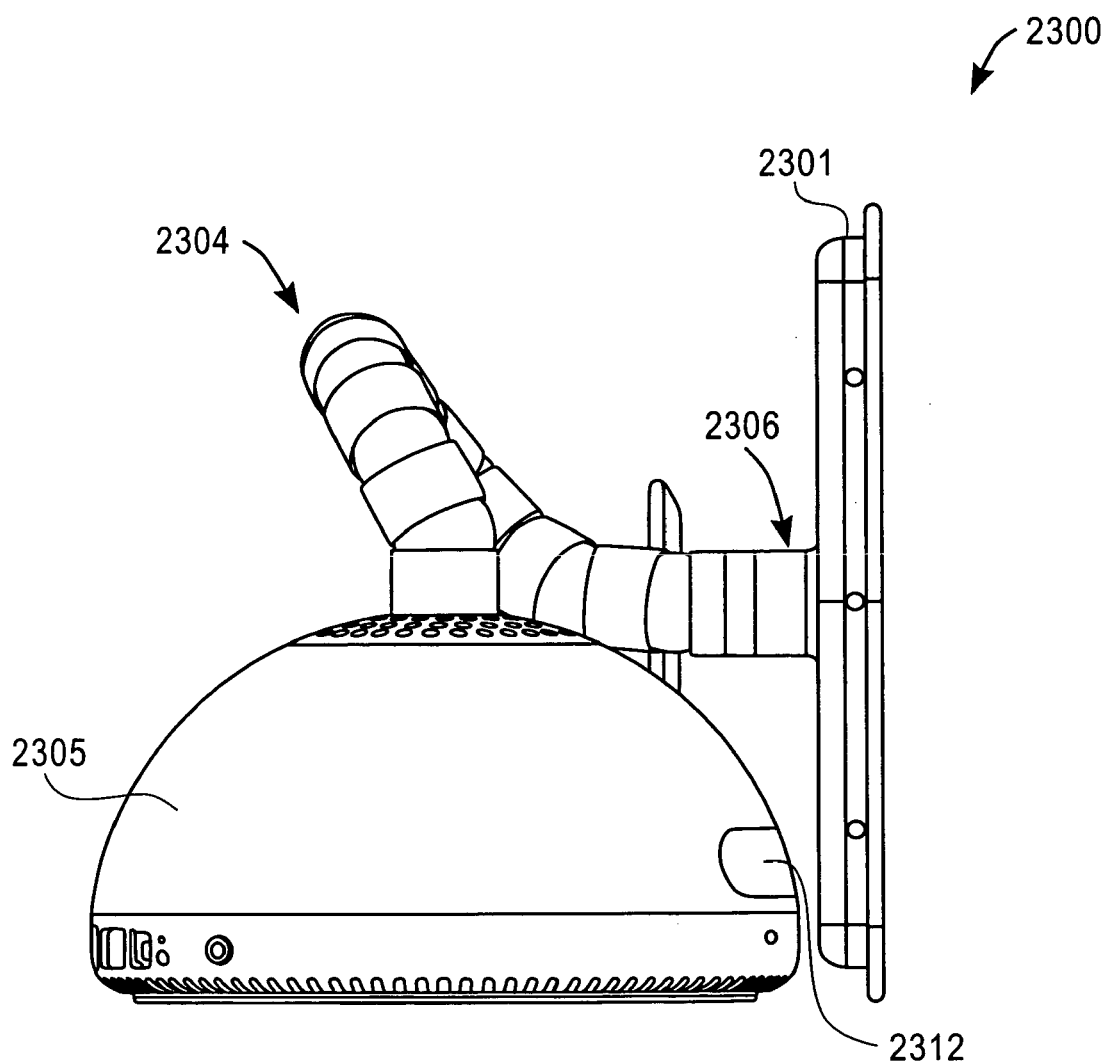
FIG. 23C is a side view of the computer system 2300 shown in FIGS. 23A and 23B, according to one embodiment of the invention.

FIG. 23C is a side view of the computer system 2300 shown in FIGS. 23A and 23B, according to one embodiment of the invention. System 2300 includes a FPDD 2301 having an actuator assembly 2306 attached thereto; a moveable assembly 2304 attached to the actuator assembly 2306, and a base 2305 attached to the moveable assembly 2304. In this embodiment, moveable assembly 2304 is a snake-like ball-and-socket assembly; however, it will be appreciated that other types of assemblies may also be used. Additionally, an optical drive (e.g. CD and/or DVD) aperture 2312 is provided in the top portion of base 2305. Aperture 2312, in one embodiment, includes an electronically activated fold-down door and an electronically activated slide-out optical disk tray. In one embodiment, pressing a button on a keyboard coupled with base 2305 activates the fold-down door and slide-out tray.

Figure 23D:
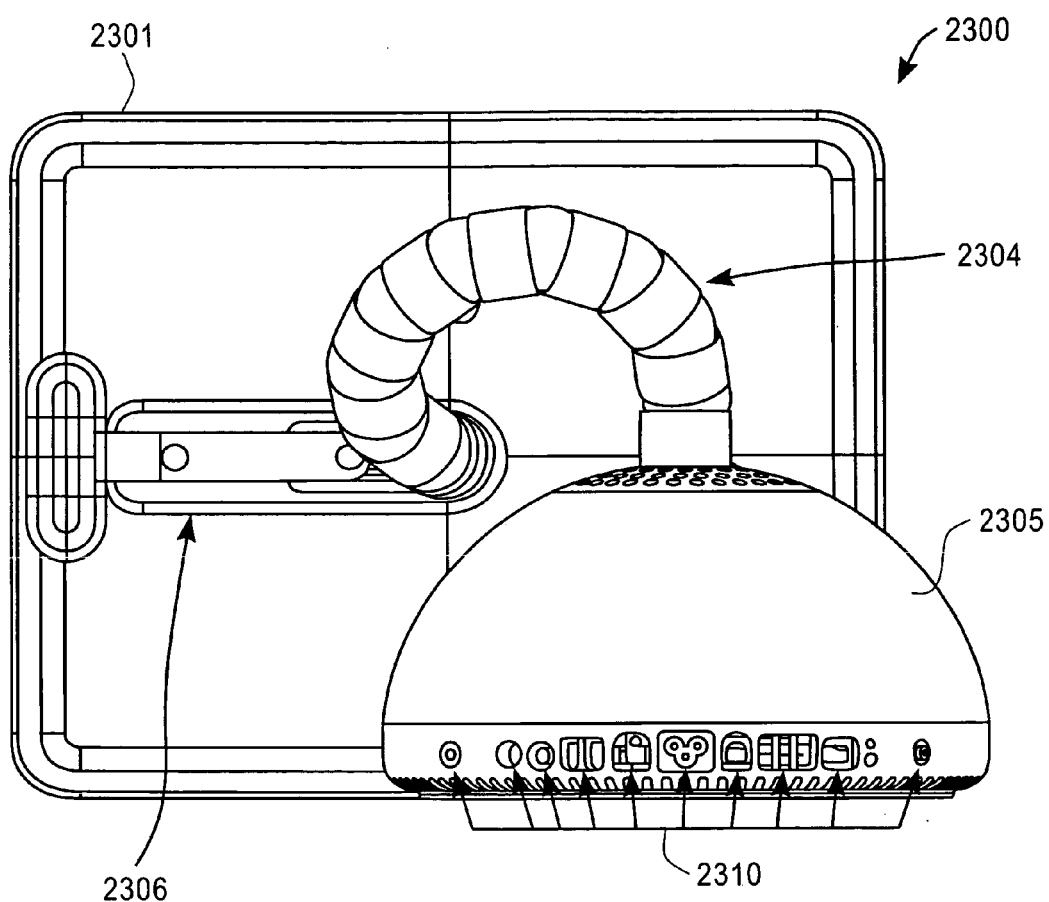
FIG. 23D is a rear-view of the computer system 2300 shown in FIGS. 23A–23C, according to one embodiment of the invention.

FIG. 23D is a rear-view of the computer system 2300 shown in FIGS. 23A–23C, according to one embodiment of the invention. As shown, system 2300 includes FPDD 2301, actuator assembly 2306, moveable assembly 2304, and base 2305, which includes a plurality of peripheral ports and computer system-related controls 2310, as described above.

Figure 23E:
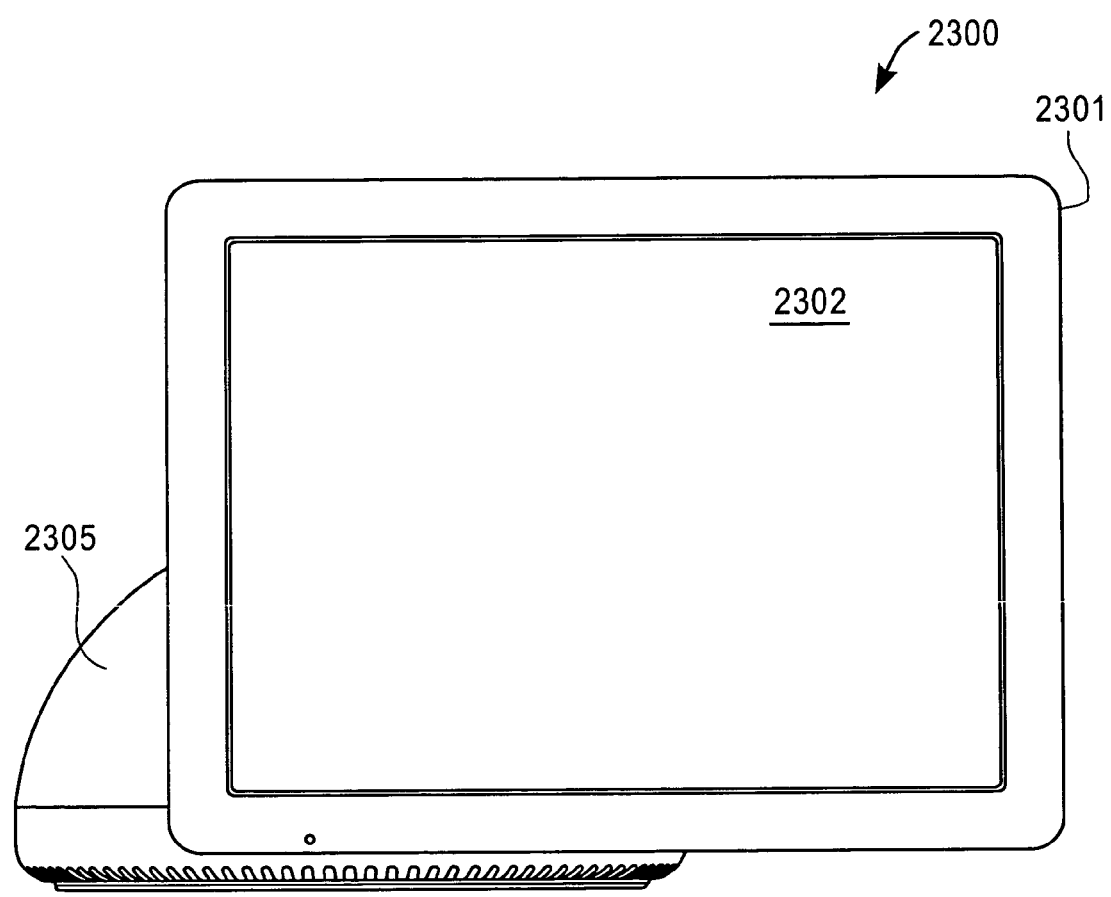
FIG. 23E is a front view of the computer system 2300 of FIGS. 23A–23D, according to one embodiment of the invention, and showing FPDD 2301, viewing surface 2302, and base 2305.

FIG. 23E is a front view of the computer system 2300 of FIGS. 23A–23D, according to one embodiment of the invention, and showing FPDD 2301, viewing surface 2302, and base 2305.

Figure 23F:
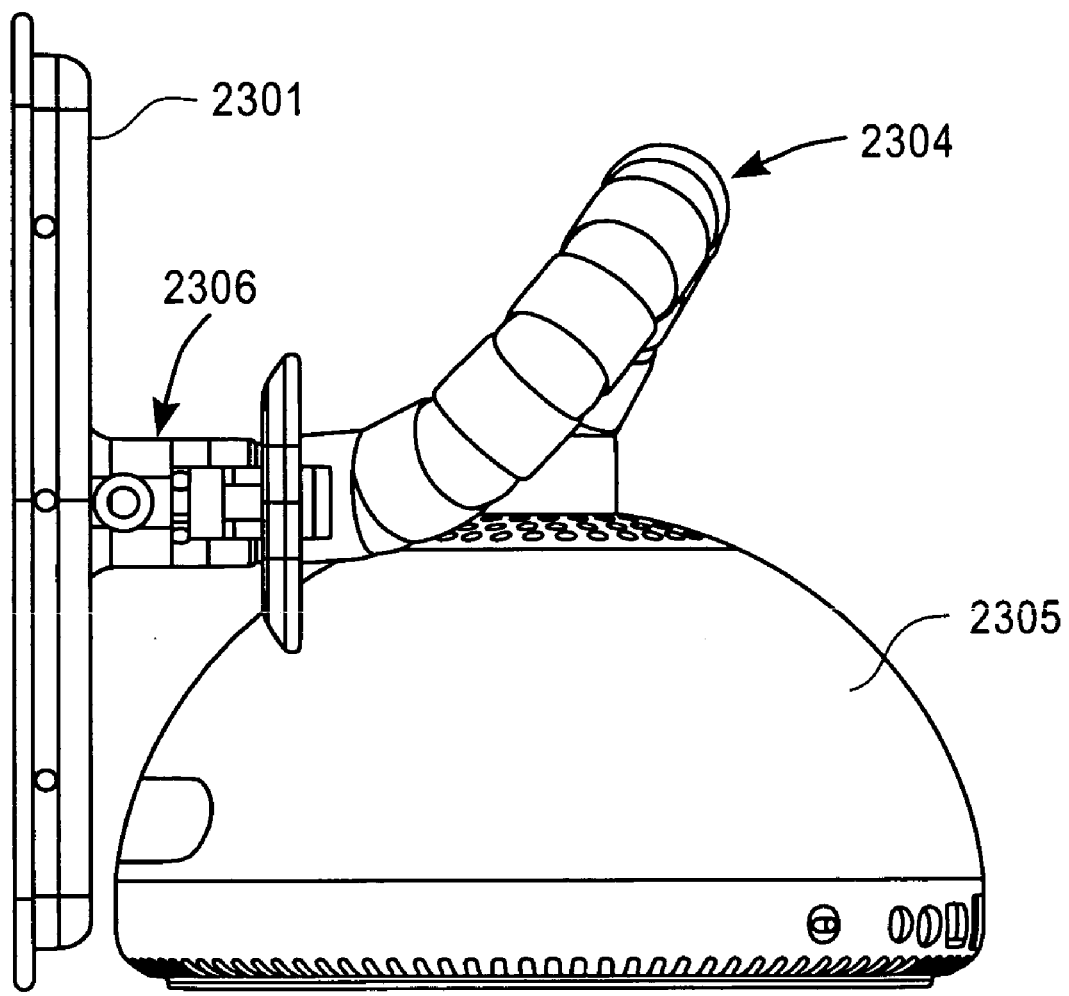
FIG. 23F is another side view of the computer system 2300 of FIGS. 23A–23E, according to one embodiment of the invention, and showing FPDD 2301, actuator assembly 2306, moveable assembly 2304, and base 2305.

FIG. 23F is another side view of the computer system 2300 of FIGS. 23A–23E, according to one embodiment of the invention, and showing FPDD 2301, actuator assembly 2306, moveable assembly 2304, and base 2305.

Figure 23G:
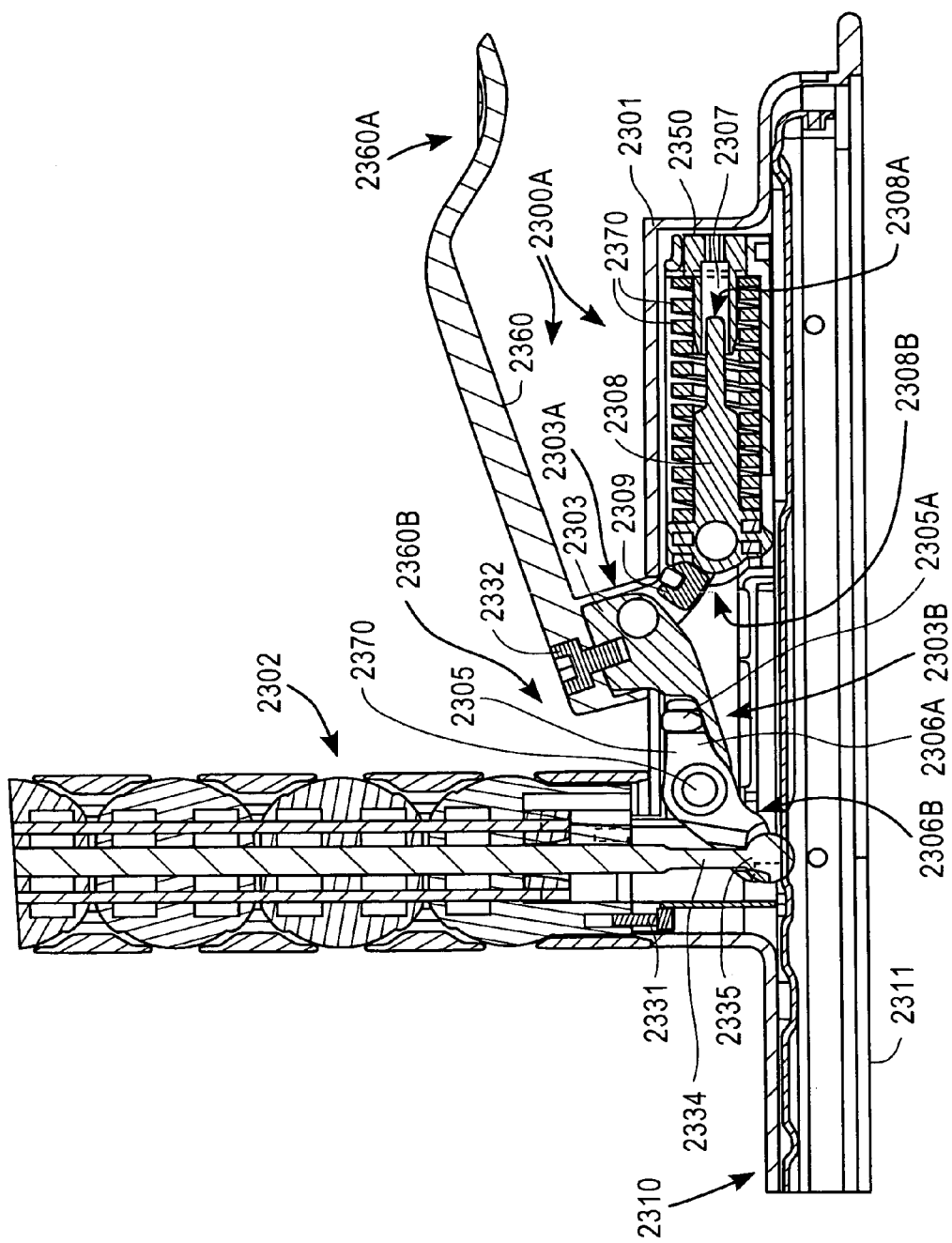
FIG. 23G is a side view of another embodiment of a moveable assembly 2302 coupled with a FPDD 2310 and with an actuator assembly 2300A, according to one embodiment of the invention.

Referring now to FIG. 23G, a moveable assembly 2302 similar to that previously described with reference to FIGS. 4A and 4B is shown coupled with a flat panel display 2310, which, in one embodiment, includes a housing 2301 attached to a portion of the flat panel display obverse from a viewing portion 2311 of the flat panel display 2310. Housing 2301 is coupled to moveable assembly 2302 using at least one screw 2331 or a plurality of screws 2331. Within housing 2301 are various components of actuator assembly 2300A. Illustratively, such components include a tongue 2305, a crank 2303, a strut 2309, a spring guide 2308, and a spring 2370. Tongue 2305 has a distal end 2306B coupled with a ball ferrule 2335, which is attached to a tension cable 2334 extending through an interior portion of moveable assembly 2302. A proximal end 2306A of tongue 2305 is coupled with a distal end 2303B of crank 2303. The proximal end 2303A of crank 2303 is operatively coupled with the distal end of a strut 2309, and a proximal end of strut of 2309 is coupled with a distal end 2308B of spring guide 2308, which is inserted within the interior of a spring 2370. In one embodiment, spring guide 2308 progressively narrows or tapers downwards from the distal end 2308B to its proximal end 2308A, which includes a bushing 2350, which helps reduce friction and wear as proximal end 2308A slides within channel 2307. In one embodiment, tongue 2305 may include at its proximal end 2306A a channel extending therethrough into which a set screw or other screwlike mechanism 2305A is placed. Set screw 2305A may be adjusted to vary the angle at which the distal end of tongue 2305 contacts the ball ferrule of tension cable 2334.

In one embodiment, a handle 2360 having a distal end 2360B and a proximal end 2360A may be operatively coupled with the actuator assembly 2300. In one embodiment, distal end 2360B of handle 2360 is coupled with a top portion of crank 2303 using a set screw 2332. In one embodiment, proximal end 2360B is fashioned into an ergonomic design.

Referring again to FIGS. 4A and 23G, it will be appreciated that the actuator assembly 2300 shown in FIG. 23G differs from the actuator assembly 400, shown in FIG. 4A. In FIG. 4A the distal end of handle 460 was coupled with ball ferrule 434 attached to tension cable 490, whereas in FIG. 23G, the distal end 2360B of handle 2360 is coupled crank 2303, which is operatively coupled with tongue 2305. Tongue 2305, in turn, is coupled with the ball ferrule 2335 attached to tension cable 2334.

Comparing FIGS. 4A and 23G, it will be appreciated that the angle at which tongue 2305 contacts ball ferrule 2335 is greater than the angle at which distal end of handle 460 contacts ball ferrule 434. In FIG. 23G, the changed tongue angle provides the tensioning mechanism (e.g. actuator assembly 2300A), with increased mechanical advantage as the cable 2334 becomes tighter, which reduces the amount of user force required to relax moveable assembly 2302. In one embodiment, an angle measured between a first horizontal line drawn through the center of pivot 2370 and a second oblique line extending from the center of pivot 2370, centrally through the distal end 2306B of tongue 2305, measures in the range of approximately 40.0 degrees to approximately 85.0 degrees, preferably approximately 70.0 degrees.

FIG. 24A is a perspective view of a tongue 2400, which corresponds to tongue 2305 in FIG. 23G. In FIG. 24A tongue 2400 includes a distal end 2497 and a proximal end 2496. A cylindrical bore 2492 extends through the middle portion of tongue 2400 in one embodiment. In one embodiment, the distal end 2497 of tongue 2400 includes a bore (or cavity) 2495 extending from a top surface of tongue 2400 downward towards a bottom surface of tongue 2400. Similarly, at proximal end 2496 of tongue 2400 there is included a cylindrical bore 2491 extending from a top surface of tongue 2400 to a bottom surface of tongue 2400. These features are better shown with reference to FIG. 24B, which is a cross-sectional side view of tongue 2400 shown in FIG. 24A.

In FIG. 24B tongue 2400 has an overall length 2451 of approximately 41.47 mm. A distance 2452, as measured from the center point of bore 2491 to a center point of horizontal bore 2492 measures approximately 15.83 mm. A center-to-center distance 2454 from bore 2492 to bore 2495 measures approximately 13.64 mm. A distance 2453 from a bottom surface of distal end 2497 to a horizontal line 2499 extending through the midpoint of bore 2492 measures approximately 14.63 mm. In one embodiment, the radius 2455 of bore 2492 measures in the range of approximately 11.100 mm to approximately 11.125 mm. Similarly, an interior beveled portion of cavity 2495 has a radius of approximately 11.40 mm plus or minus 0.25 mm.

With reference to FIG. 24D, which is an end view of tongue 2400. It will be appreciated that tongue 2400 in one embodiment, has a depth (or height) 2459 of approximately 22.63 mm as measured from a top surface 2400A to a bottom surface 2400B of tongue 2400. FIG. 24C shows a top view of tongue 2400 according to one embodiment of the invention. In FIG. 24C tongue 2400 has a width 2456 of approximately 11.15 mm minus 0.15 mm. Width of 2456 is measured from a first side 2492A to a second side 2492B of bore 2492 extending through a mid portion of tongue 2400. In one embodiment, a bottom portion of cavity 2495 is substantially elliptical in shape and has a width 2457 of approximately 6.97 mm. A width 2458 of distal end 2497 as measured from a first side 2497A to a second side 2497B measures in one embodiment, approximately 13.50 mm.

Referring now to FIG. 25A there is shown a perspective view of a glide ring 2500, which in one embodiment is inserted within a friction socket plunger to preserve the cosmetic finish of the balls. As shown in FIG. 25A, glide ring 2500 is substantially spherical in shape having a base portion 2505 which in one embodiment is an annular ring attached to a bottom surface of glide ring 2500. In one embodiment, glide ring 2500 has a first diameter 2501 which is larger than a second diameter 2502, wherein the interior and exterior surfaces of glide ring 2500 curvingly taper from the first diameter 2501 toward the second diameter 2502. In one embodiment, the upper sidewall portions of glide ring 2500 may include a plurality of slots 2503 extending downward from a top surface of glide ring 2500 towards the second diameter 2502. In one embodiment, a plurality of pegged feet 2504, may be attached to the outer bottom portion of glide ring 2500. These pegged feet 2504 may be used to hold glide ring securely within an abrasive socket plunger (not shown) by inserting one or more of feet 2504 within a corresponding plurality of holes positioned within an abrasive socket plunger (not shown).

Figure 25B:
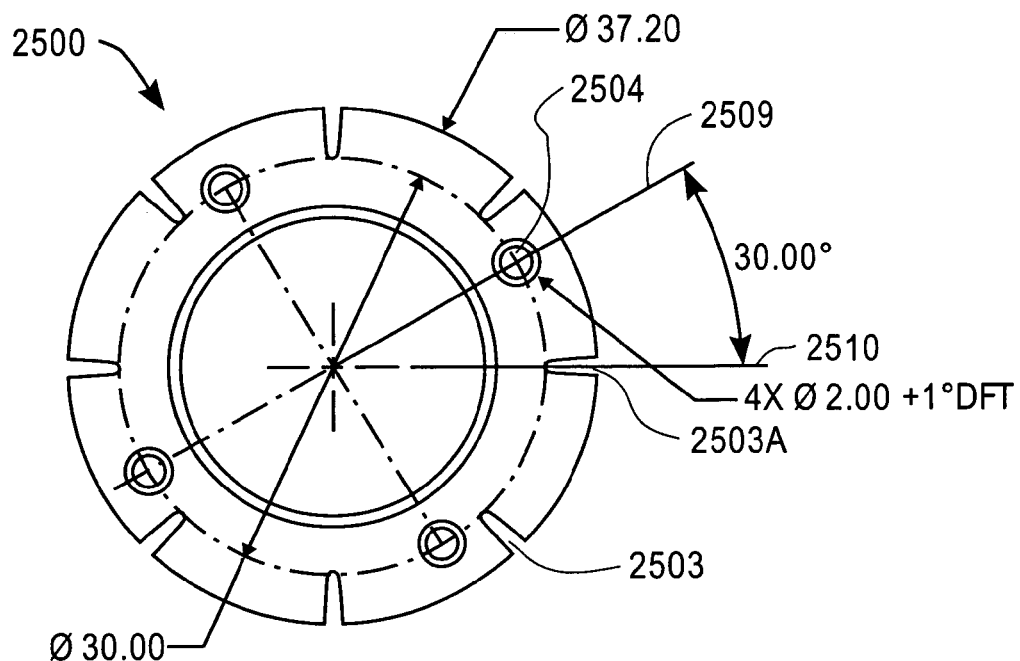
FIG. 25B is a bottom view of a spherical glide bearing 2500 according to one embodiment of the invention.

FIG. 25B is a bottom view of glide ring 2500, shown in FIG. 25A. In one embodiment, an angle as measured from a line 2509 extending from a center point of glide ring 2500 through a pegged foot 2504 to a second line 2510 extending through the midpoint of glide ring 2500 through the center of a slot 2503A measures approximately 30.0 degrees.

Figure 25C:
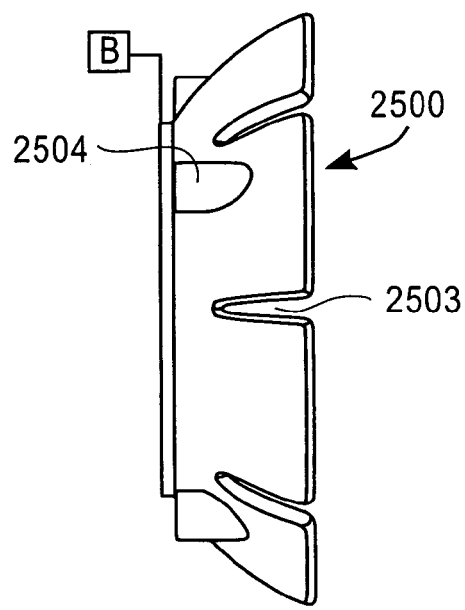
FIG. 25C is a side view of a spherical glide bearing of FIG. 25A, according to one embodiment of the invention.

FIG. 25C is a side view of glide ring 2500, shown in FIG. 25A, further illustrating placement of slots 2503 and pegged feet 2504.

FIG. 25D is a top view of glide ring 2500.

FIG. 25E is a cross-sectional side view glide ring 2500 taken along the line A—A in FIG. 25D. In FIG. 25E a focal point 2557 is centered a distance 2556 of approximately 17.875 mm above the base of glide ring 2500 as measured from a vertical line 2556A extending through focal point 2557 to a second parallel line 2556B. In FIG. 25E, a line 2555B, perpendicular to line 2556A extends from focal point 2557 through the center portion of glide ring 2500.

Angle 2555, as measured between lines 2555A and 2555B, measures, in one embodiment, approximately 63.70 degrees. The outer radius 2551 of the outer wall of glide ring 2500 measures approximately 41.500 mm minus 0.025 mm, while the inner wall 2552 has a radius measuring approximately 40.000 mm minus 0.025 mm. In one embodiment, the inner diameter 2553 of base portion of glide ring 2500 measures approximately 21.50 mm while the outer diameter 2554 measures approximately 23.00 mm minus 0.025 mm.

Glide ring 2500 may be made of various materials, including but not limited to: plastics, polymers, metals, glass, and fiberglass. Preferably, glide ring 2500 is made of Ryton®, having a nominal wall thickness of approximately 3.0 mm. In one embodiment, the material comprising glide ring 2500 may include an abrasive material or a lubricating material. For example, fiberglass strands may be incorporated within a glide ring formed of plastic, to increase the frictional qualities of glide ring 2500. Similarly, a lubricant such as (but not limited to) Teflon® may be incorporated within a glide ring formed of a polymer or a plastic. In one embodiment, a plurality of plastic glide rings 2500 may be manufactured, each having a different frictional quality. For example, Teflon® may be incorporated into a first glide ring positioned within a first socket assembly coupled with a flat panel display, while fiberglass may be incorporated within a second and third glide rings positioned within corresponding second and third socket assemblies operatively coupled with the first socket assembly. In one embodiment, glide rings 2500 are only used in the three socket assemblies nearest the flat panel display. In alternate embodiment, a plurality of glide rings 2500, having the same or different frictional qualities, may be used throughout the length of a moveable assembly.

Glide ring 2500 should be manufactured such that its straight edges have a straightness tolerance of 0.05 per centimeter, not to exceed 0.4 over the entire surface; and such that its flat surfaces have a flatness tolerance of 0.05 per centimeter, not to exceed 0.4 over the entire surface.

Where glide ring 2500 is molded, the mold should be designed to minimize ejection pin marks, gate blush, lines, and weld marks. Mold construction should conform to good molding industry practices as stated in the current edition of "Standard Practices of Custom Molders" by the Society of Plastic Industry, Inc. Similarly all exterior surfaces should be free of sinks, gate marks, ejection marks, and other type of cosmetic defects including but not limited to splay, included particles, burn marks, and similar imperfections.

Figure 26A:
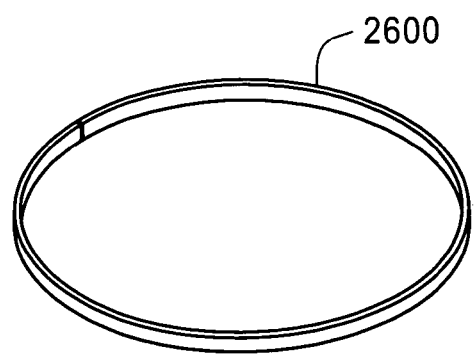
FIG. 26A is a perspective view of a socket glide bearing, according to one embodiment of the invention.

FIG. 26A shows an abrasive socket bearing 2600, which in one embodiment, may be inserted within the rim of a friction socket (not shown). In one embodiment, abrasive socket bearing 2600 may be brazed or coated with an abrasive material such as silica, aluminum oxide, tungsten-carbide, or other abrasive material.

Figure 26B:
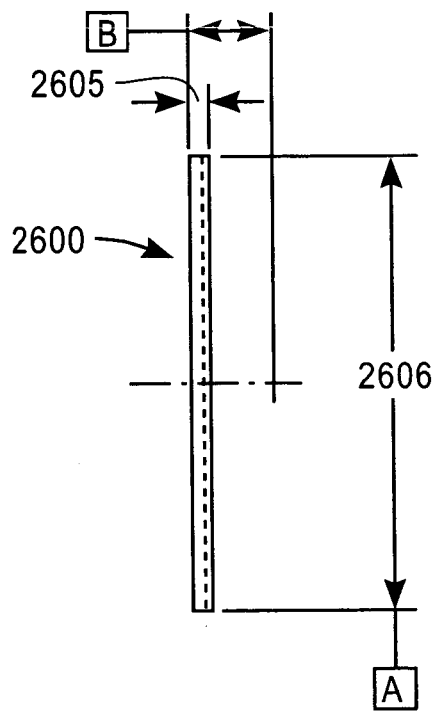
FIG. 26B is a side view of a socket glide bearing, according to one embodiment of the invention.

Referring now to FIG. 26B, there is shown a side view of an abrasive socket bearing 2600 In one embodiment, abrasive socket bearing 2600 has a thickness 2605 measuring approximately 1.40 mm. In one embodiment, an outer diameter 2606 of abrasive socket bearing 2600 measures approximately 37.300 mm.

Figure 26C:
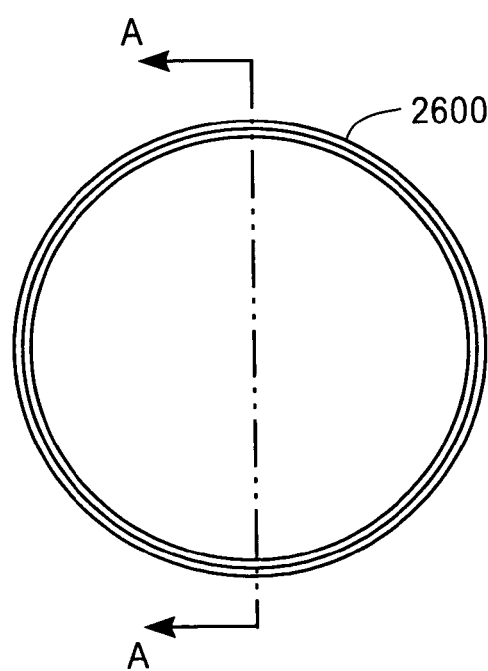
FIG. 26C is a plan view of a socket glide bearing of FIG. 26A, according to one embodiment of the invention.

FIG. 26C is a top view of abrasive socket bearing 2600, shown in FIG. 26A.

Figure 26D:
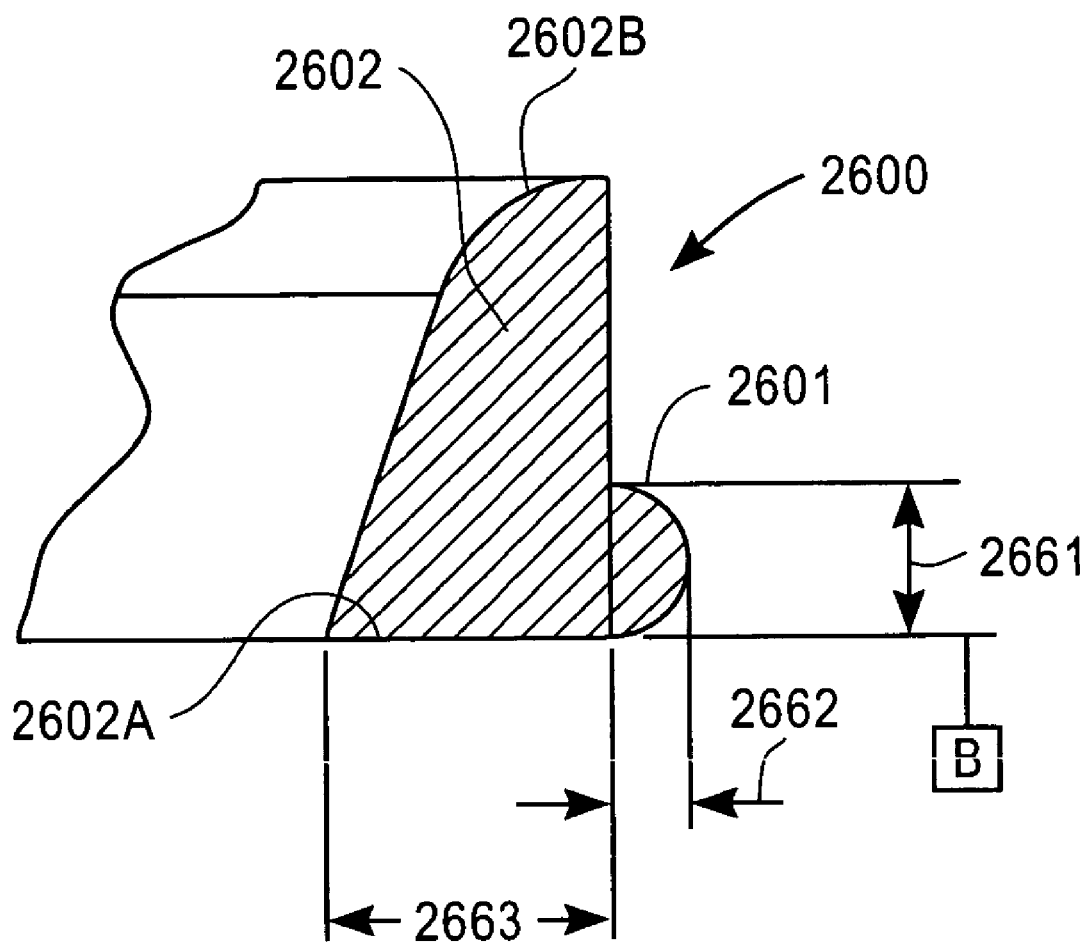
FIG. 26D is a cross-sectional view of a socket glide bearing of FIG. 26A taken along the line A—A in FIG. 26C, according to one embodiment of the invention.

Referring now to FIG. 26D, there is shown a cross-sectional side view of abrasive socket bearing 2600 of FIG. 26A taken along the line A—A in FIG. 26C. As shown in FIG. 26D, abrasive socket bearing 2600 has a wall 2602 whose outer surface is substantially perpendicular and whose inner top surface slightly curves toward a base portion 2602A, which in one embodiment, is wider than a curved top portion 2602B. In one embodiment, a rim 2601 may have a thickness 2661 of approximately 0.48 mm and a width 2662 approximately 0.24 mm. In one embodiment, a base portion of rim 2601 is attached to the substantially perpendicular side of wall 2602. A base portion 2602A of wall 2602 has a width 2663 of approximately 0849 mm, plus or minus 0.015 mm.

Abrasive socket bearings 2600 may be comprised of various materials including, but not limited to: glass, metals, plastics, polymers, or fiberglass. In one preferred embodiment, abrasive socket bearing 2600 is comprised of Delrin® 500, AF, white; and has a nominal wall thickness of approximately 3.0 mm. In one embodiment, straight edges have a straightness tolerance of 0.05 per centimeter not to exceed 0.4 over the entire surface, and the flat surfaces have a flatness tolerance of 0.05 per centimeter, not to exceed 0.4 over the entire surface. The abrasive socket bearing 2600 may be added to a friction socket (not shown) to provide an improved and more stable friction performance than can be obtained using the friction inserts shown in FIGS. 19A–19C.

Figure 27A:
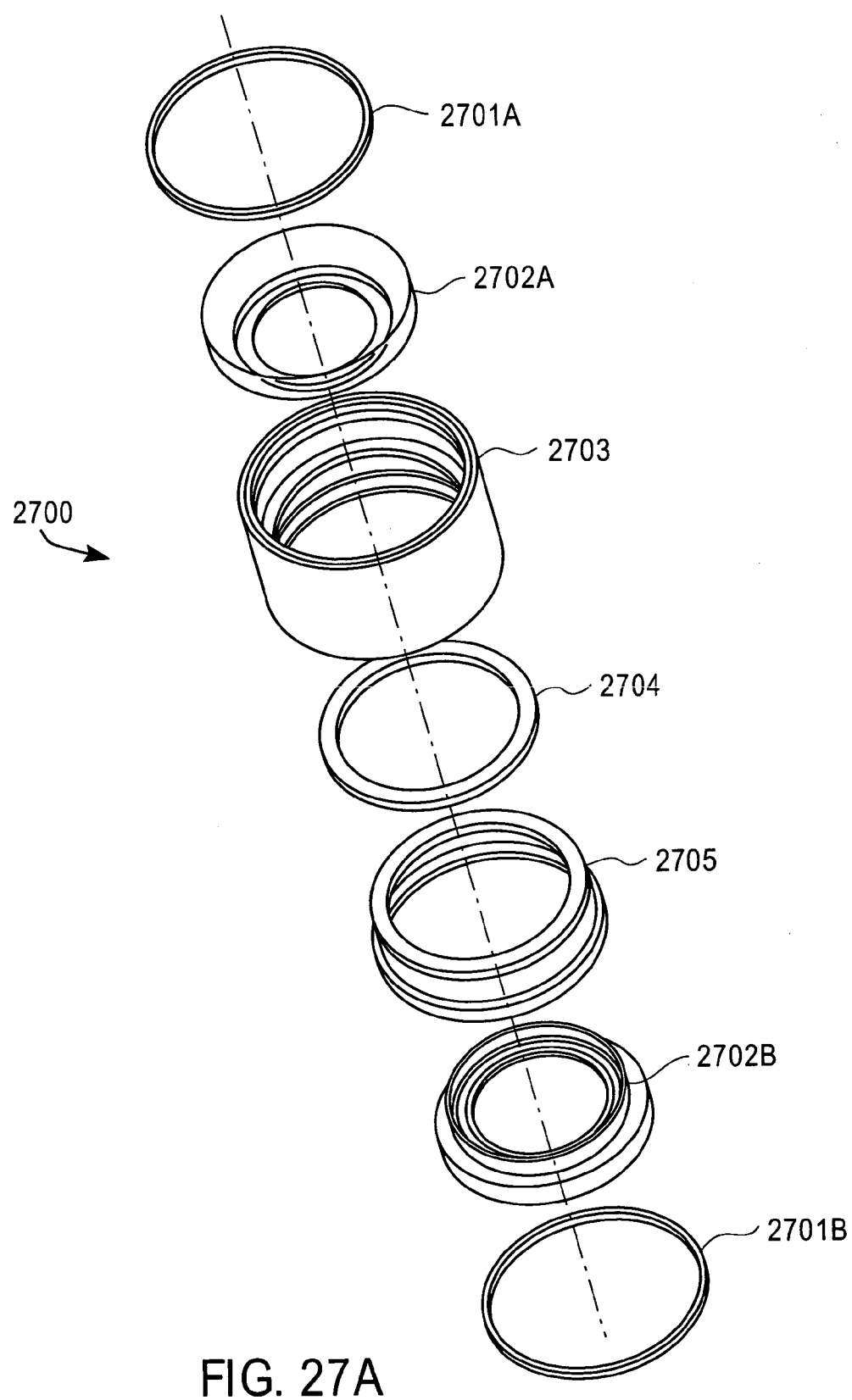
FIG. 27A is an exploded perspective view of a socket assembly 2700, according to one embodiment of the invention.

FIG. 27A is an exploded perspective view of a friction socket assembly 2700, according to another embodiment of the present invention. Socket assembly 2700 is similar to socket assembly 1927 shown in FIG. 19A. Referring again to FIG. 27A, socket assembly 2700 includes abrasive socket bearings 2701A and 2701B, abrasive inserts 2702A and 2702B. In one embodiment, abrasive insert 2702A couples with abrasive insert 2702B to hold socket assembly 2700 together.

Referring again to FIG. 27A, socket assembly 2700 further includes an outer socket plunger 2703, an inner socket plunger 2705, and a resilient member (wavespring) 2704, which may be used to store potential energy when plungers 2703 and 2705 are compressed. The stored potential energy may later be used to reduce the amount of a user force needed to change a state of a moveable assembly in which socket assembly 2700 is incorporated. In one embodiment, the components of socket assembly 2700 may be manufactured using the materials and methods used to manufacture the components of socket assembly 1927 in FIG. 19A.

Figure 27B:
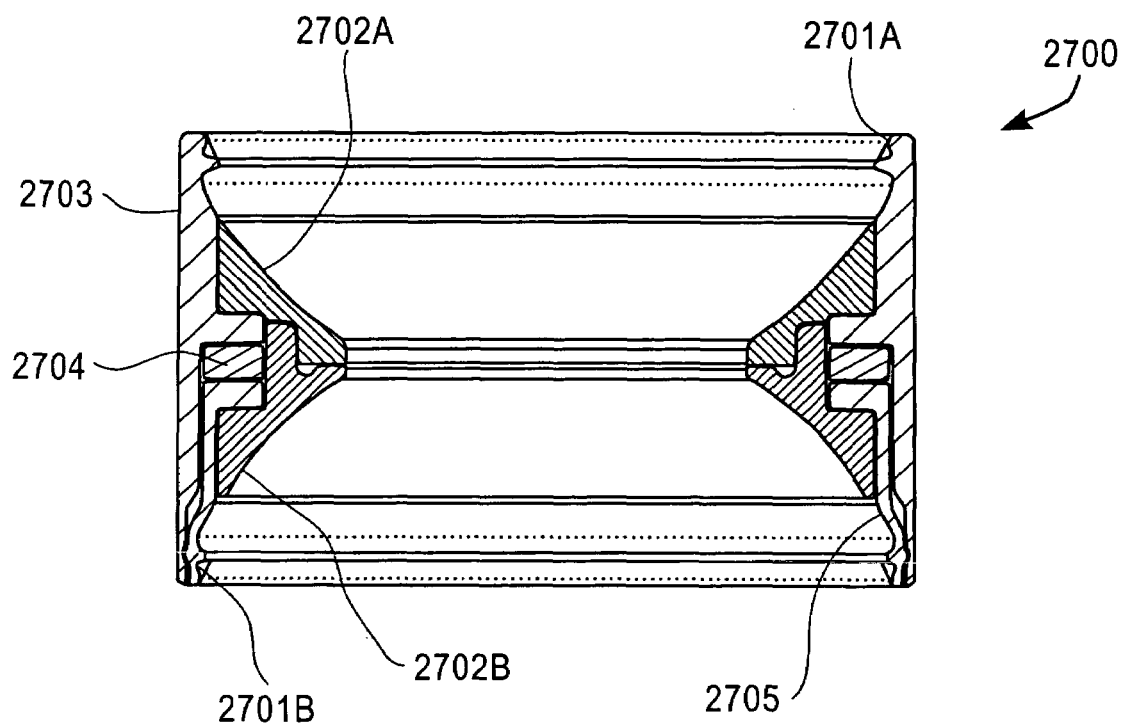
FIG. 27B is cross-sectional view of an assembled socket assembly of FIG. 27A, according to one embodiment of the invention.

Referring now to FIG. 27B, there is shown a cross-sectional side view of an assembled socket assembly 2700 In one embodiment, abrasive insert 2702A is coupled with abrasive insert 2702B, such that outer socket plunger 2703 and inner socket plunger 2705 compressively contact resilient member 2704, which in one embodiment may be a wavespring. Also included in assembled socket assembly 2700 shown in FIG. 27B are abrasive socket bearings 2701A and 2701B. Abrasive socket bearing 2701A is disposed within an outer rim of outer socket plunger 2703. Similarly, abrasive socket bearing 2701B is disposed within an outer rim of inner socket plunger 2705.

Figure 28:
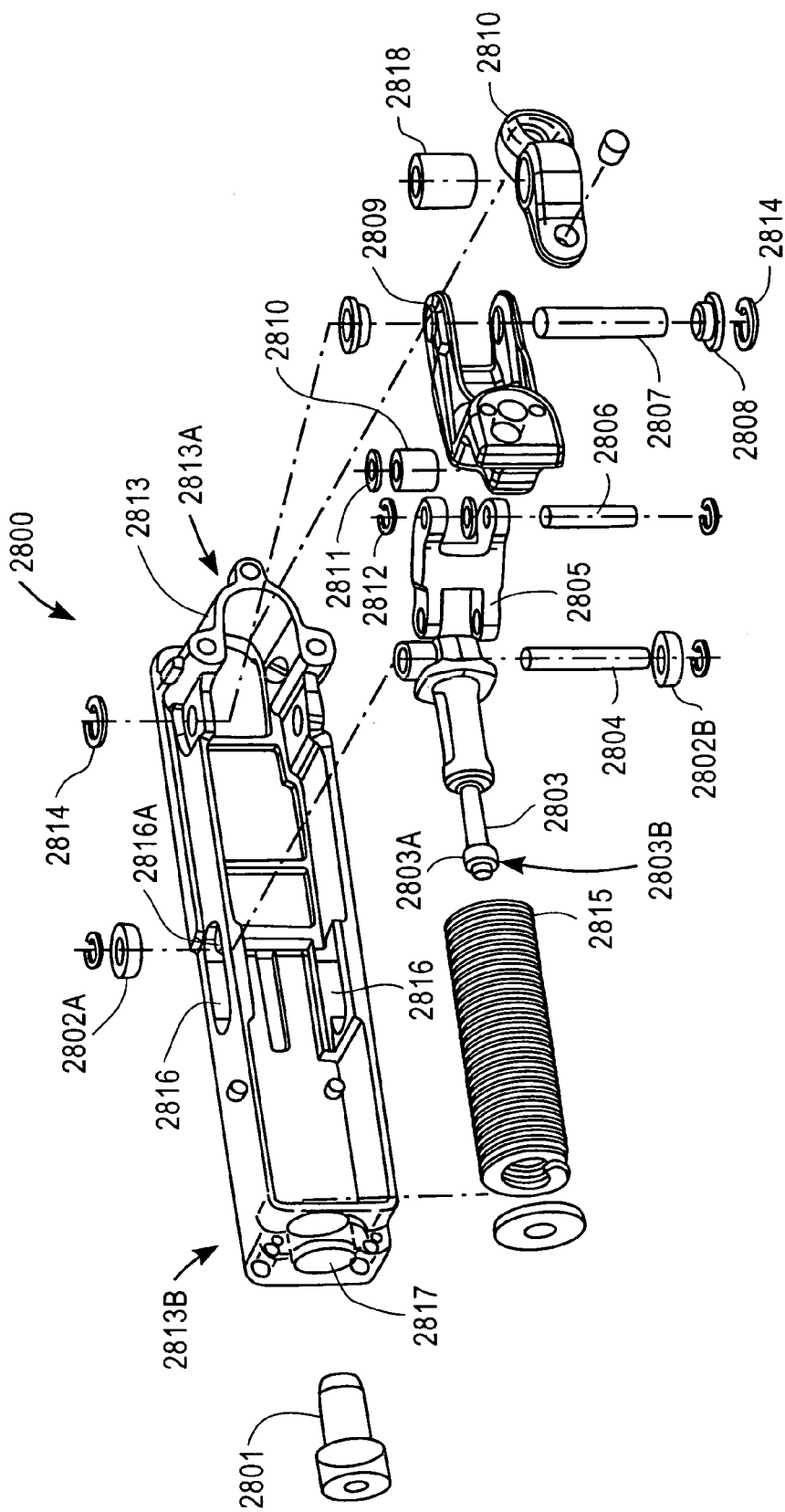
FIG. 28 is an exploded perspective view of an actuator assembly 2800, according to one embodiment of the invention.

FIG. 28 shows an exploded perspective view of an actuator assembly 2800, similar to the actuator assembly shown in FIG. 8. Referring again to FIG. 28, actuator assembly 2800 includes a housing 2813, having a distal end 2813A and a proximal end 2813B. In one embodiment, the end of proximal end 2813B of housing 2813 includes a bore 2817, into which a dogpoint self-locking hex socket screw 2801 may be inserted to retain spring 2815 within housing 2813.

A spring shaft 2803, having a bushing 2803A located on its proximal end 2803B, may be inserted within the interior of spring 2815. Bushing 2803A, in one embodiment, may slide within a channel formed in an end of screw 2801. A shaft 2804 may be used to couple the distal end of spring shaft 2803 with a proximal end of strut 2805. Similarly, shaft 2806, retaining pin 2812, needle bearing 2810, and retaining end nylon washer 2811 may be used to couple the distal end of strut 2805 with the proximal end of crank 2809. Likewise, a needle tongue bearing 2818, a lever bushing 2808, a shaft 2807, and a retaining ring 2814 may be used to couple the distal end of crank 2809 with a center portion of tongue 2810.

In one embodiment, the distal end of spring shaft 2803 contains a bore through which shaft 2804 may be inserted. Track bearing 2802A and track bearing 2802B may be coupled with ends of shaft 2804 such that the track bearings slide within apertures 2816 when actuator assembly 2800 is actuated. As shown in FIG. 28, apertures 2816 may be substantially rectangularly shaped openings disposed substantially horizontally within the sides of housing 2813. In other embodiments, however, aperture 2816 may be inclined toward the proximal end 2813B of housing 2813, or inclined toward distal end 2813A of housing 2813. Similarly, front portions 2816A of apertures 2816 may be inclined upward, such that apertures 2816, when viewed from the side, resemble a substantially "L" or "J" shape. Other configurations of apertures 2816 will be readily apparent to those skilled in the art, and the shape and placement of apertures 2816 should be designed to minimize the user force required to compress spring 2815.

In one embodiment, the components of actuator assembly 2800 may be manufactured using the materials and methods used to manufacture the components of the actuator assembly shown in FIG. 8.

Figure 29A:
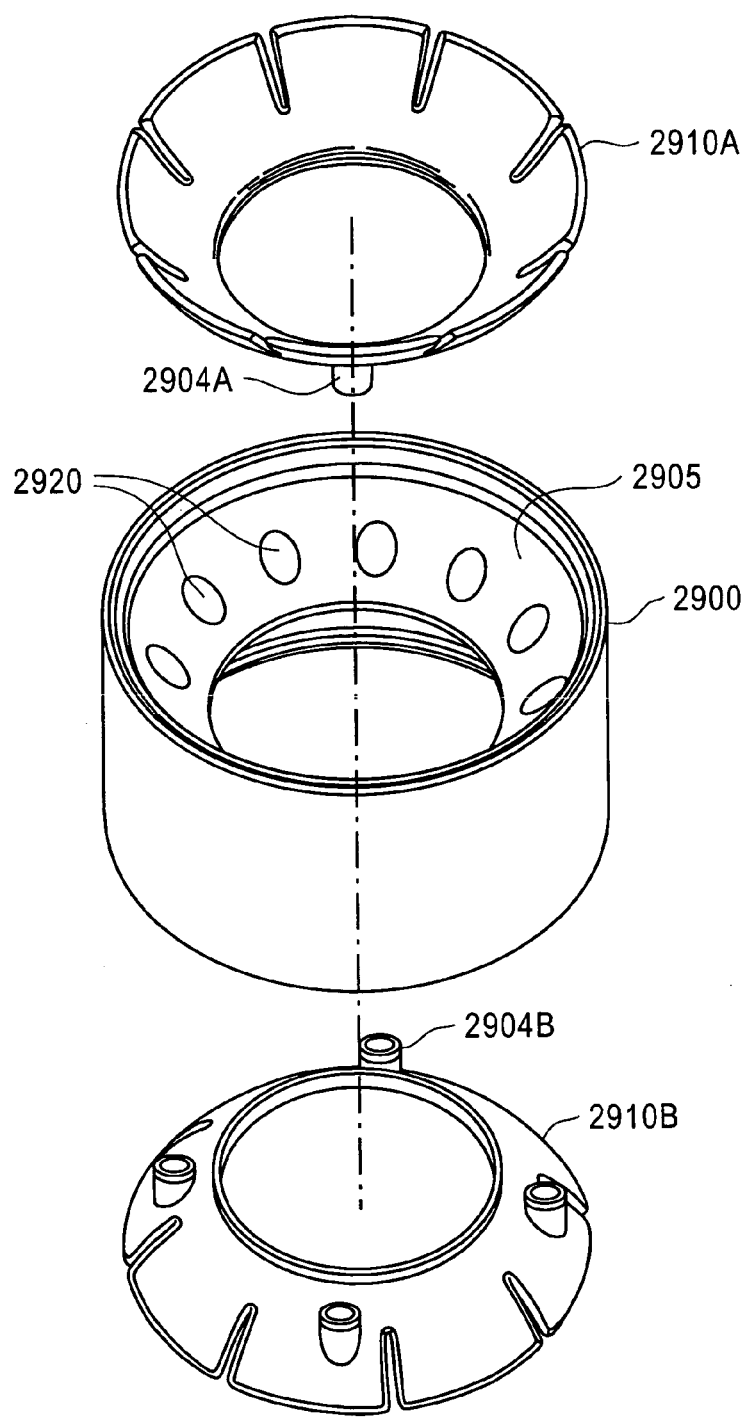
FIG. 29A is a perspective view of a socket assembly 2900, according to another embodiment of the invention.

Referring now to FIG. 29A, there is shown a perspective view of a friction socket 2900, into which glide rings 2910A and 2910B may be inserted. In one embodiment, an interior diameter 2905 includes a plurality of holes or apertures 2920, into which one or more pegged feet 2904A and 2904B may be inserted to secure glide rings 2910A and 2910B within socket 2900. In one embodiment, socket 2900 is manufactured using aluminum, and in one embodiment, inner diameter 2905 is made of the same material as socket 2900 In one embodiment, holes or apertures 2920 extend through inner diameter 2905.

Figure 29C:
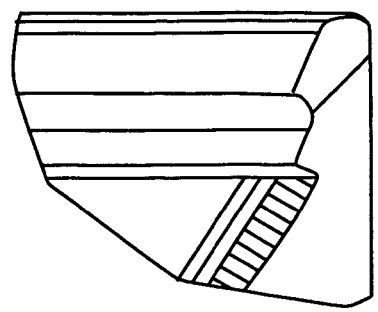
FIG. 29C is a detailed view of area A circled in FIG. 29B.
Figure 29B:
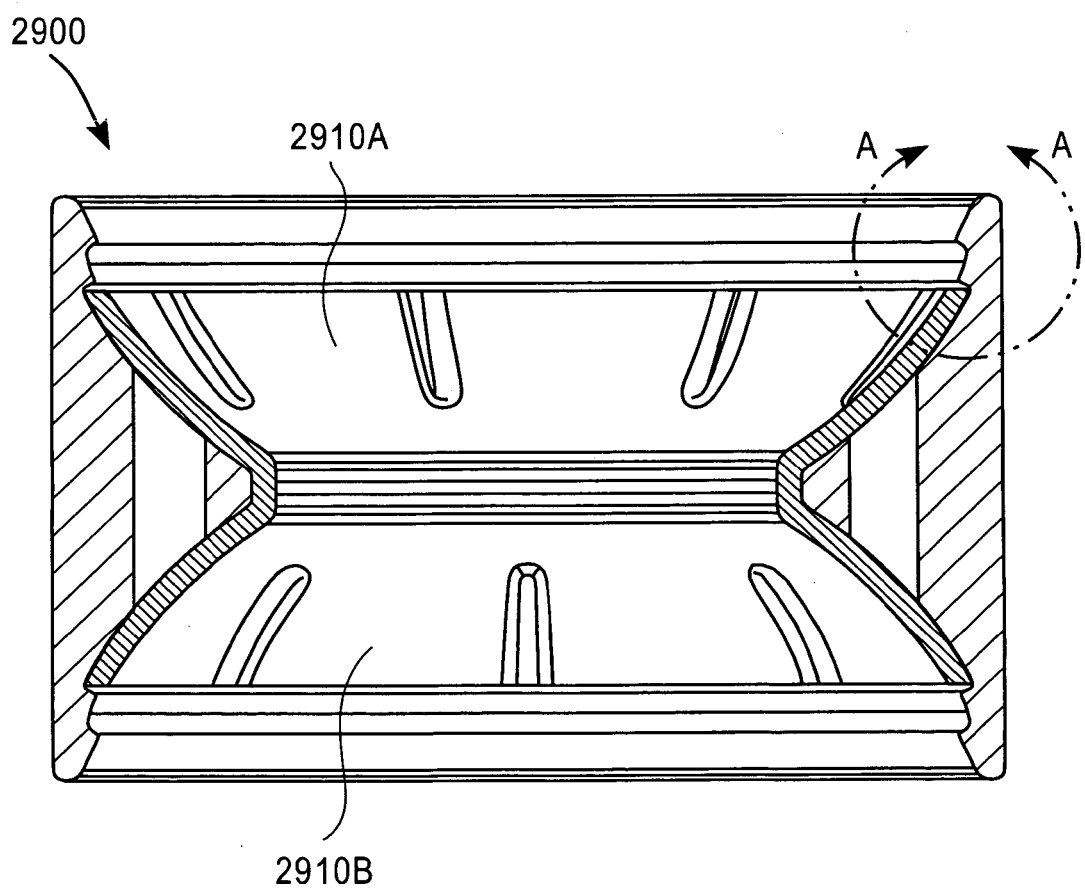
FIG. 29B is a cross-sectional view of a socket assembly 2900 of FIG. 29A, according to one embodiment of the invention.

Referring now to FIG. 29B, there is shown a cross-sectional side view of an assembled socket 2900, showing placement of glide rings 2910A and 2910B therein.

FIG. 29C is a detailed view of section A shown in FIG. 29B.

Figure 30A:
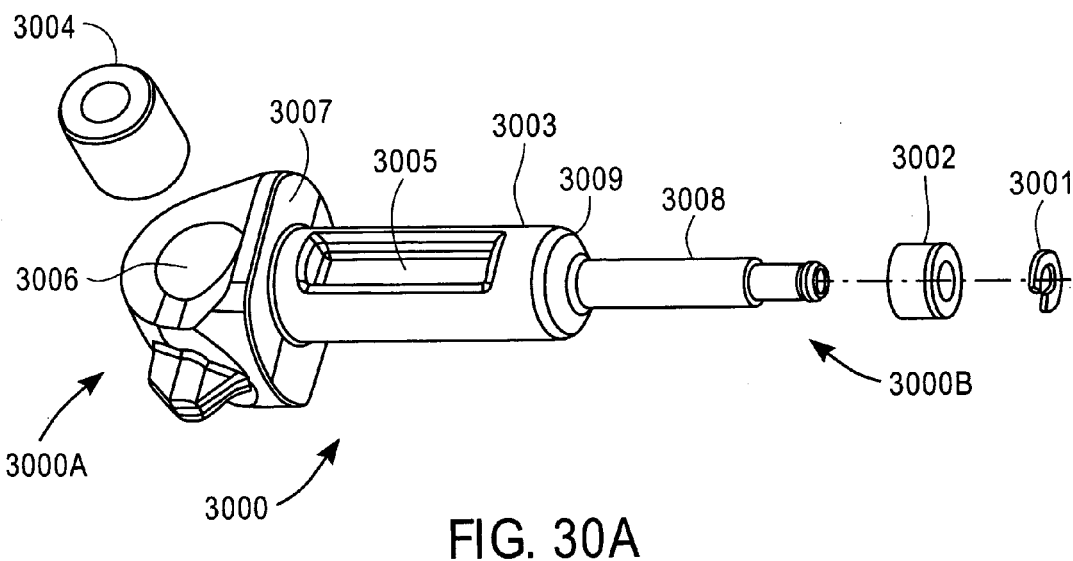
FIG. 30A is a perspective view of a spring shaft assembly 3000, according to one embodiment of the invention.

Referring to FIG. 30A, there is shown a perspective view of a spring guide (e.g. spring shaft) 3000, according to one embodiment of the present invention. Spring guide 3000 includes a proximal end 3000A and a distal end 3000B. Proximal end 3000A includes a bore 3006 extending therethrough, into which a needle bushing 3004 may be inserted. Proximal end 3000A terminates in a substantially planar face 3007, from the center of which extends a cylindrical barrel portion 3003, having at least a recessed portion 3005 therein. Cylindrical barrel portion 3003 terminates in a concave face 3009, from which extends another cylindrical barrel portion 3008, having a smaller diameter than the first cylindrical barrel portion 3003. Spring guide 3000 terminates at its distal end 3000B. In one embodiment, a plastic bushing 3002 may be placed on the distal end 3000B and secured with a retaining ring 3001.

Figure 30B:
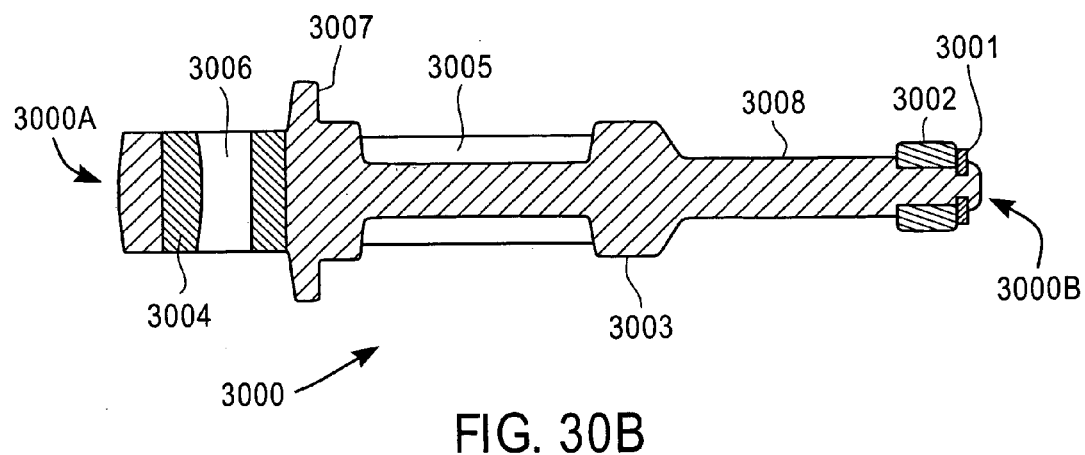
FIG. 30B is a cross-sectional view of a spring shaft assembly 3000 of FIG. 30A, according to one embodiment of the invention.

Referring now to FIG. 30B, there is shown a cross-sectional side view of the spring guide 3000 shown in FIG. 30A. As shown in FIG. 30B, spring guide 3000 includes a proximal end 3000A and a distal end 3000B. Proximal end 3000A is shown, including a bore 3006, into which a needle bushing 3004 is inserted. Again, proximal end 3000A terminates at the substantially planar face 3007, from which extends a cylindrical barrel portion 3003, having one or more recessed portions 3005 therein. Extending from the proximal end 3000A of cylindrical barrel portion 3003 is a second cylindrical barrel portion 3008, having a small diameter than cylindrical barrel portion 3003. At the proximal end 3000B of spring guide 3000 is disposed a plastic bushing 3002, secured in place with a retaining ring 3001.

Figure 31A:
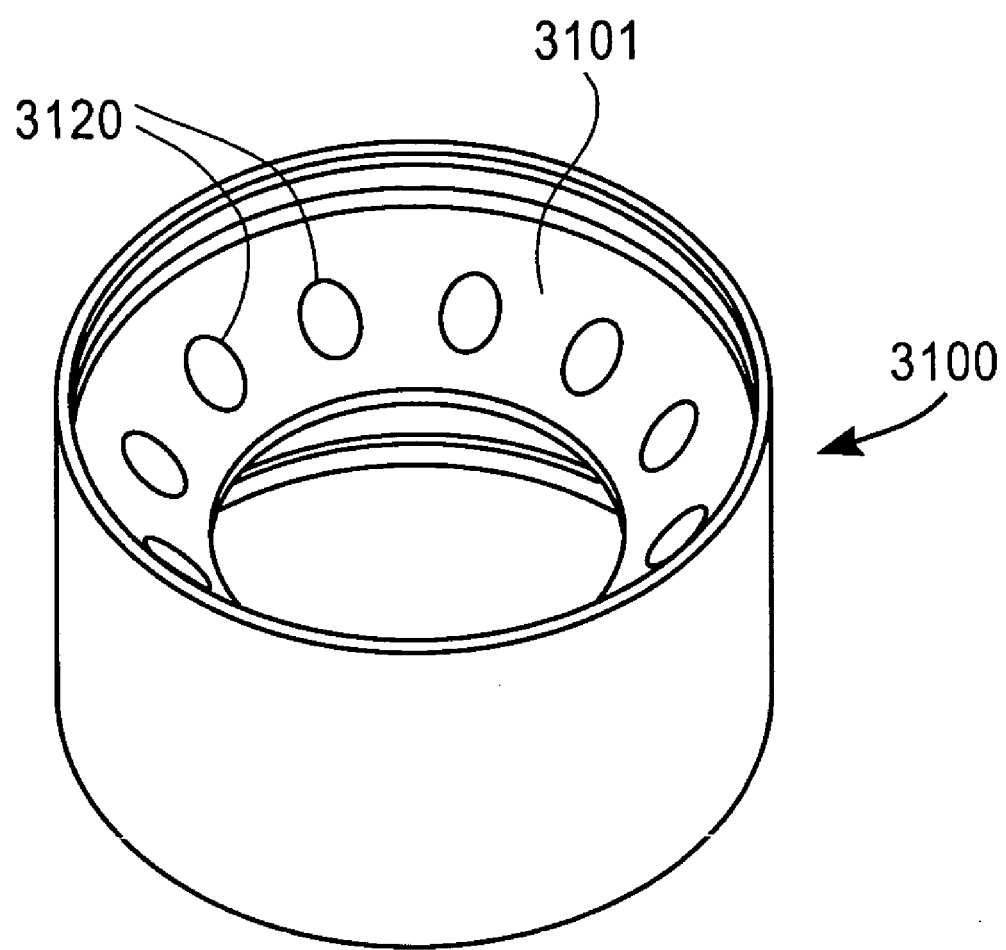
FIG. 31A is a perspective view of a friction limit socket, according to another embodiment of the invention.

Referring now to FIG. 31A, there is shown a perspective view of a socket 3100, having an interior diameter 3101, which contains a plurality of apertures or holes 3120 In one embodiment, socket 3100, including annular ring 3101, is manufactured of aluminum or similar metal.

Referring now to FIG. 31B, there is shown a top view of the socket 3100 shown in FIG. 31A. In one embodiment, annular ring 3101 contains approximately 12 holes (or apertures) 3120, each hole having a diameter of approximately 3.0 mm, plus 0.20 mm. In one embodiment, the centers of holes 3120 are centered within the annular ring 3101, which has a radius of approximately 30.0 mm as measured from the center point 3130 of socket 3100 In one embodiment, a line 3160A passing through the center of hole 3120A makes an angle 3160, with a horizontal line 3160B passing through center point 3130 of socket 3100, of approximately 30.0 degrees.

Referring now to FIG. 31C, there is shown a cross-sectional side view of socket 3100 taken along the line A—A in FIG. 31B. In one embodiment, the diameter 3162 of annular ring 3101 measures approximately 23.10 mm. The focal point 3166 is located on a line 3165 passing through the center of socket 3100, approximately a distance 3167 of 5.243 mm, plus or minus 0.015 from an outer edge of socket 3100.

Distance 3161, extending from focal point 3166 to focal point 3168, measures approximately 36.0 mm. A radius 3164, extending from focal point 3166, measures in one embodiment approximately 20.750 mm, minus 0.025 mm. Similarly, a second radius 3163, extending from focal point 3166, measures approximately 20.15 mm, plus 0.15 mm. A third radius, shown in FIG. 31D as radius 3169, as measured from focal point 3166, measures in one embodiment approximately 19.50 mm, plus or minus 0.8 mm.

Figure 32A:
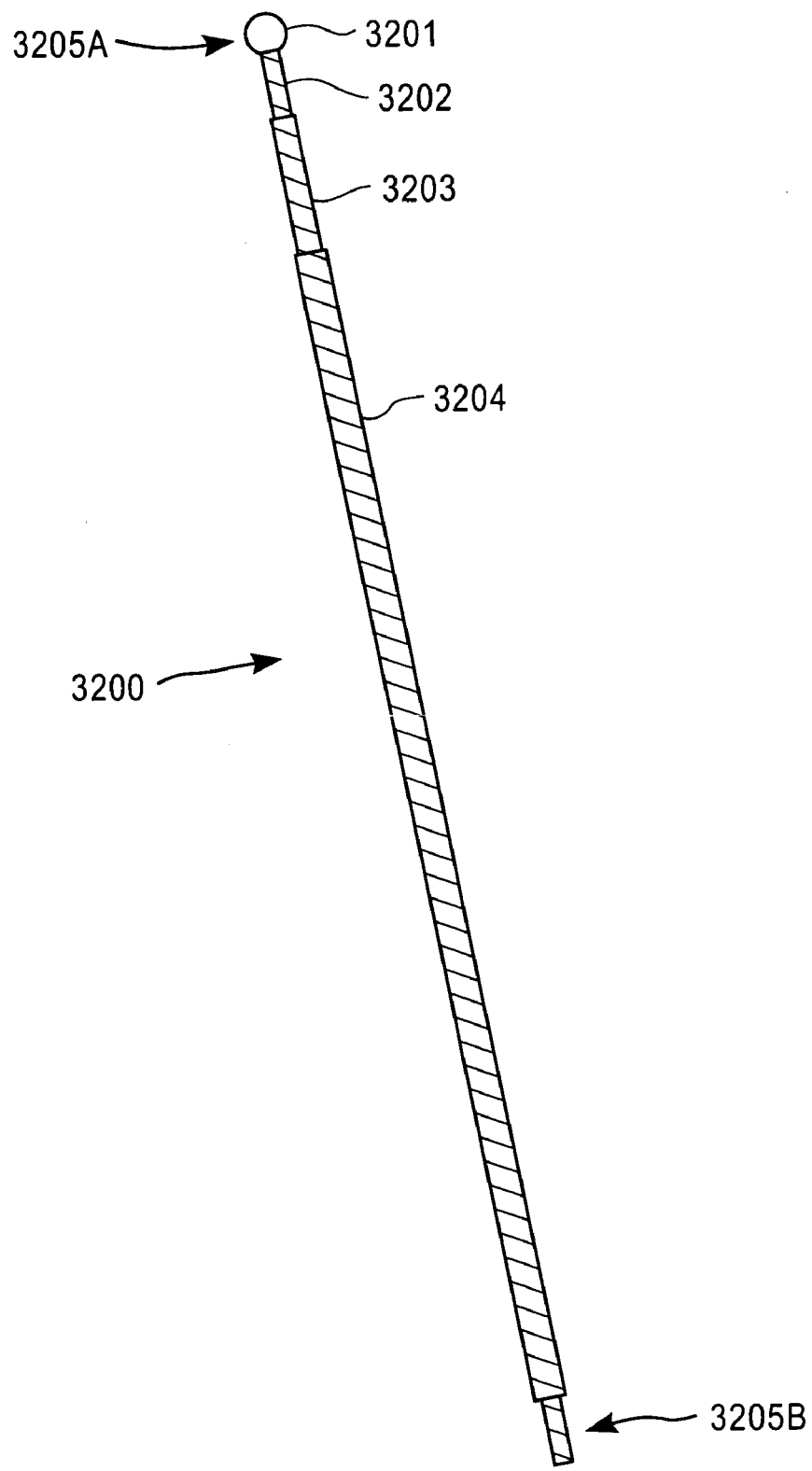
FIG. 32A is a perspective view of a tension cable assembly 3200, according to one embodiment of the invention.

Referring now to FIG. 32A, there is shown a perspective view of a tension cable assembly 3200, according to an embodiment of the present invention. Tension cable assembly 3200 may include a tension cable 3202, having a proximal end 3205A and distal end 3205B. In one embodiment, proximal end 3205A may include a ball ferrule 3201 attached to tension cable 3202.

In one embodiment, a nylon sleeve 3203 may be fitted over tension cable 3202, and a Teflon® sheath 3204 may be fitted over the nylon sleeve 3203. Use of the nylon sleeve 3203 and the Teflon® sheath 3204 reduces sliding friction as tension cable 3202 passes through a moveable assembly (not shown). The reduced friction lessens the amount of work a user must provide on a state of the moveable assembly.

In one embodiment, sheath 3204 may be formed of a slippery (e.g. low friction) material such as polyethylene or delron. Sheath 3204 may be comprised entirely of Teflon® or a structural material forming sheath 3204 may be coated with a Teflon® coating.

In one embodiment, friction is generated between tension cable 3202 and interior parts of a moveable assembly whenever tension cable 3202 is tensioned. To reduce sliding friction and even out the load, a lubricant such as a dry grease may be applied between nylon sleeve 3203 and sheath 3204. In one embodiment, the lubricant has a high molecular weight and is of a type which is compatible with nylon, Teflon®, and plastics. The lubricant should be non-migrating, meaning that it has a high viscosity, because it is important that whatever lubricant is used does not escape the sheath 3204 to contaminate the friction surfaces of the sockets comprising a moveable assembly (not shown).

In one embodiment, migration of sheath 3204 and sleeve 3203 during movement of the moveable assembly may be prevented by crimping and/or melting sheath 3204 and sleeve 3203 at various points along tension cable 3202. Additionally, a rib (not shown) may be formed on the outer portion of sleeve 3204 to contact a sheath stop located within the interior of the moveable assembly.

Figure 33A:
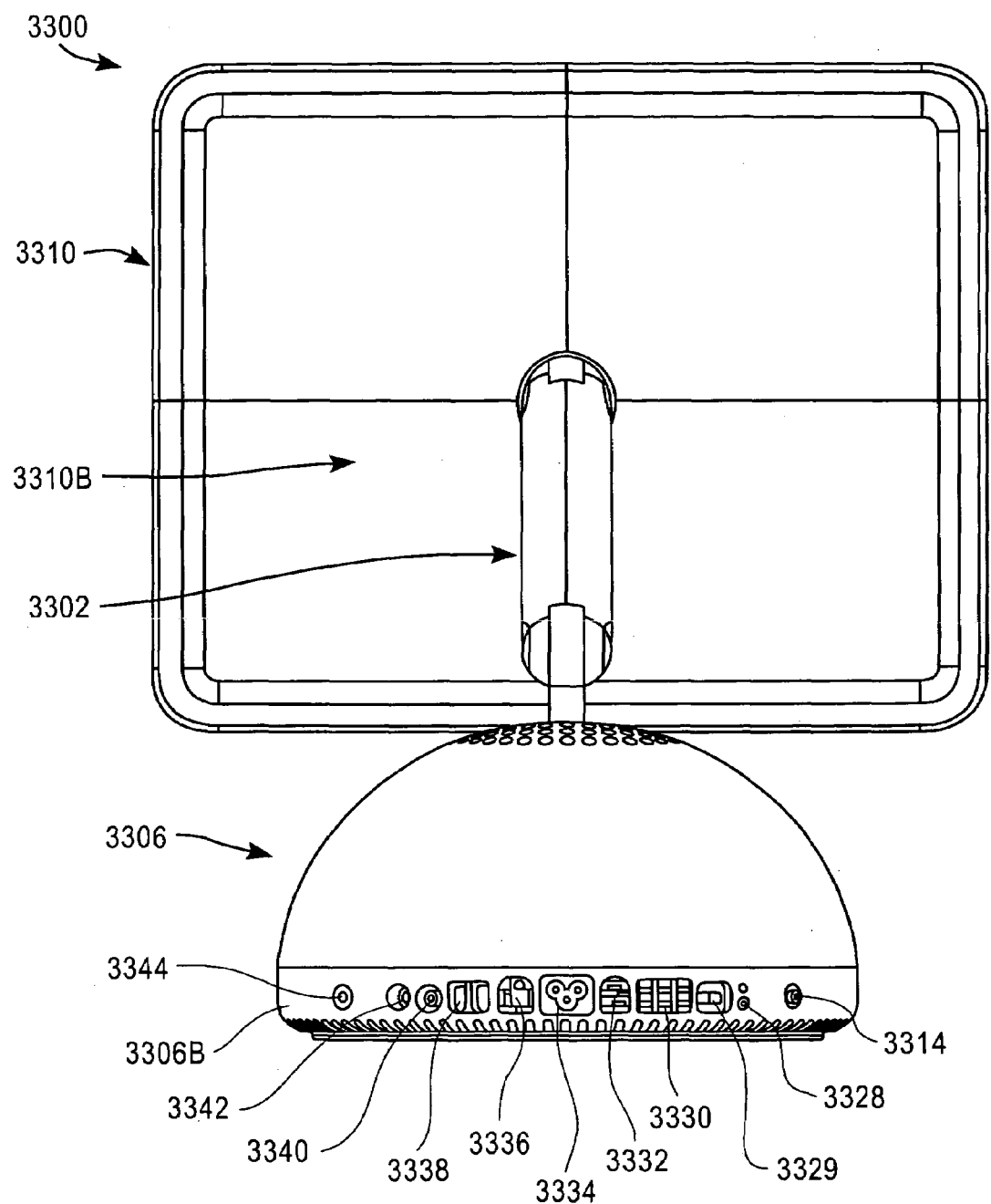
FIG. 33A is a perspective frontal view of a computer system 3300 including a flat panel display 3310 and a moveable base 3306 coupled with a moveable assembly 3302, according to another embodiment of the invention.

FIG. 33A is a perspective frontal view of a computer system 3300 including a flat panel display 3310 and a moveable base 3306 coupled with a moveable assembly 3302, according to another embodiment of the invention. In FIG. 33A, moveable assembly 3302 is coupled with a flat panel display 3310 to support the flat panel display 3310 at a designated space around the base 3306. In the embodiment shown, moveable base 3306 is hemispherical or toroidal in shape, and has a substantially flat, substantially circular, bottom portion 3306B from which a curved housing 3306A rises. The apex of housing 3306A is substantially centered at a pre-determined vertical distance above the center of the substantially circular bottom portion 3306B. In one embodiment, bottom portion 3306B is formed of a single piece of material and shaped so as to operatively couple with the hemispherical (or toroidal) top portion of housing 3306A. It will be appreciated that though the moveable base 3310 illustratively shown has a hemispherical shape, other designs, such as squarish shapes, rectangular shapes, cylindrical shapes, substantially pyramidal shapes, or other geometric shapes (together with modifications and/or combinations thereof) may be used. Thus, such designs, regardless of shape are to be construed as falling within the scope of the present invention.

The moveable base, together with the rest of the computer system 3300, weighs in the range of about 10.0 lbs to about 45.0 lbs, and is moveable by a single, unaided person. The moveable base is not required to be fixedly attached to the surface on which it rests. The size and weight of the moveable base is designed, in the manner described above, to allow the selective positioning of display 3310 at a wide variety of different positions without causing the system to overturn or flip over.

The outer and inner sections of top portion 3306A and bottom portion 3306B of base 3306 may be formed of the same or different materials. Illustrative materials, which may be used in various embodiments of the invention, include but are not limited to metals, plastics, polymers, glass, and fiberglass. Illustrative metals include stainless steel, aluminum, titanium, similar metals, and composites thereof. It will be appreciated that various plastics, polymers, and composites thereof suitable for making the outer and inner portions of base 3306 will be known to persons skilled in the engineering and manufacturing arts.

In one embodiment, top portion 3306A and bottom portion 3306B are coupled together using snap fittings, screws, and/or adhesives. In another embodiment, base 3306 is substantially formed (e.g. 80% or more) of a single piece of material. In such embodiments, base 3306 may contain one or more access ports (not shown) to permit user or technician access into the interior of base 3306.

plurality of holes 3304 may perforate the top of the hemispherical top portion of housing 3306A to allow airflow to flux in and out of the interior of base 3306 to cool electronic components housed within moveable base 3306. Such components may include, but are not limited to: a central processing unit, a memory, a display driver, and an optical drive (e.g. DVD and/or CD-rom drive).

In one embodiment, an elongated aperture 3308 is substantially horizontally disposed within base 3306. Aperture 3308 may be equipped with a protective covering, aesthetically pleasing to the eye, which, in alternate embodiments, may take the form of sliding doors, flip-up or flip-down doors, side-opening doors, a slide-out loading tray, a protective membrane, or a dust curtain. In one embodiment, aperture 3308 houses a loading slot and/or tray for an internal DVD/CD rom drive. In another embodiment, aperture 3308 houses sound, volume, brightness, contrast, and other controls. Aperture 3308 may also include a wireless port.

Flat panel display device 3310, which may be of any type suitable for use with computer systems, includes a front viewing surface 3310. Its overall size and weight are chosen in coordination with the footprint and weight of the base 3306, such that base 3306 does not tilt when flat panel display 3310 is supported beyond the perimeter of base 3306 by moveable assembly 3302, which is attached to a rear surface of flat panel display 3310 and to a top portion 3306A of base 3306. The weight of base 3306 is chosen such that base 3306 adequately supports moveable assembly 3302 and flat panel display 3310 attached thereto without tipping; and such that a user can easily move computer system 3300. Thus, in one embodiment, the weight of base 3306 is in the illustrative range of approximately 10.0 to approximately 25.0 pounds.

Figure 33B:
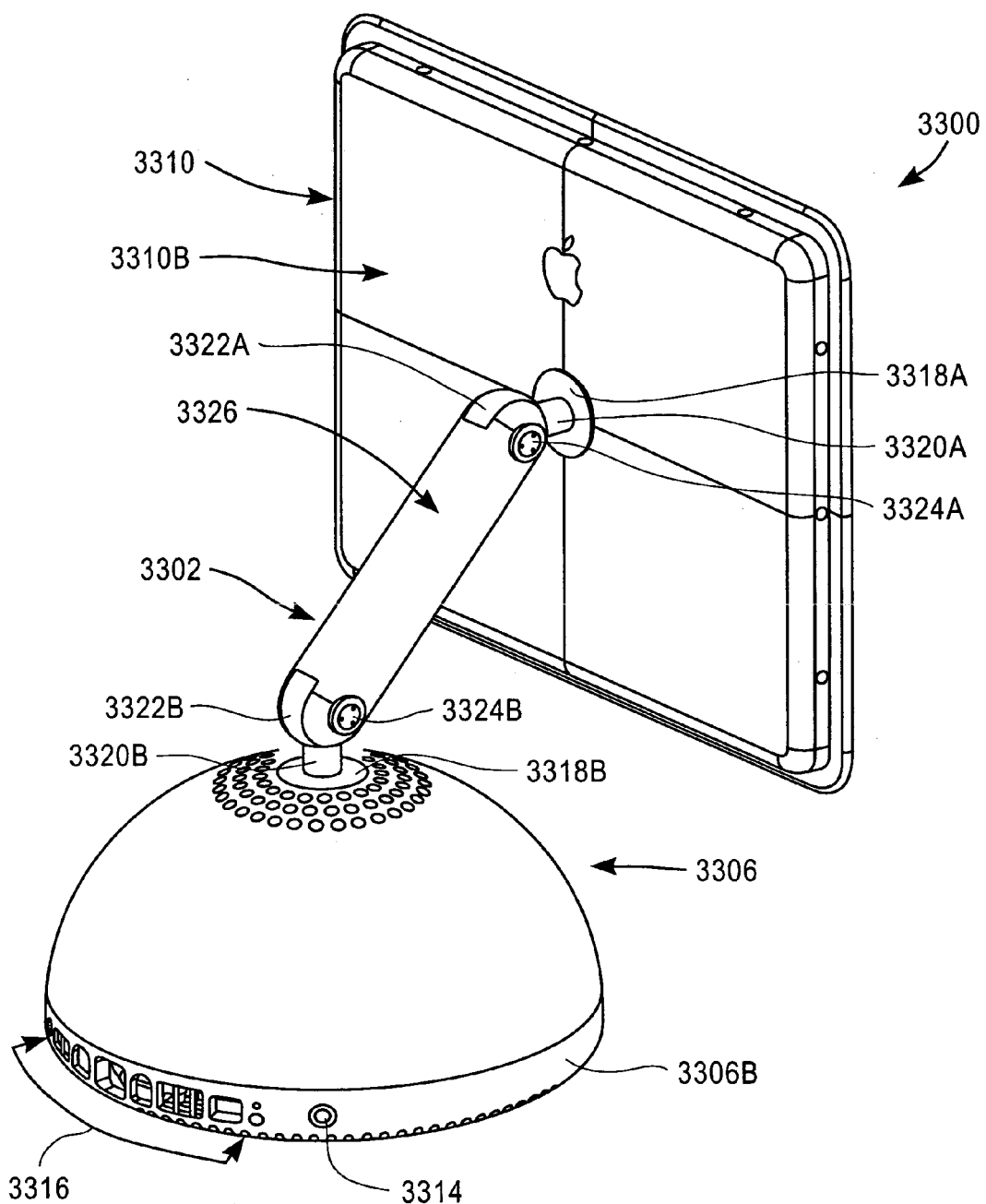
FIG. 33B is perspective rear view of a computer system 3300 including a flat panel display 3310 and a moveable base 3306 coupled with a moveable assembly 3302, according to one embodiment of the invention.

FIG. 33B is perspective rear view of a computer system 3300 including a flat panel display device 3310 and a moveable base 3306 coupled with a moveable assembly 3302 according to one embodiment of the invention. In the embodiment shown in FIG. 33B, moveable assembly 3302 includes a tubular member 3326 having a distal end coupled with the rear portion 3310B of flat panel display 3310 and a proximal end coupled with the base 3306. The distal end of tubular member 3326 may include a flexible joint 3322A, secured to the distal end of tubular member 3326 by retaining assembly 3324A, which, in one embodiment, includes a tubular shaft and a retaining pin. Flexible joint 3322A may terminate in or be attached to a shaft 3320A, which is coupled to the rear portion 3310B through washer 3318A. The proximal end of tubular member 3326 may include a flexible joint 3322B, secured to the proximal end of tubular member 3326 by retaining assembly 3324B. Flexible joint 3322B may terminate in or be attached to a shaft 3320B, which is coupled to base 3306 through washer 3318B. Additionally, a gimbal (not shown) may be used to attach shafts 3320A and/or 3320B with flat panel display 3310 and/or base 3306, respectively. Retaining assembly 3324B secures flexible joint 3322A to tubular member 3326.

Also shown in FIG. 33B, are a plurality of peripheral ports 3316 and a power button 3314, located within the rear exterior portion of the bottom portion 3306 of base 3306. Particular types of ports are detailed with respect to FIG. 33E, below.

Figure 33C:
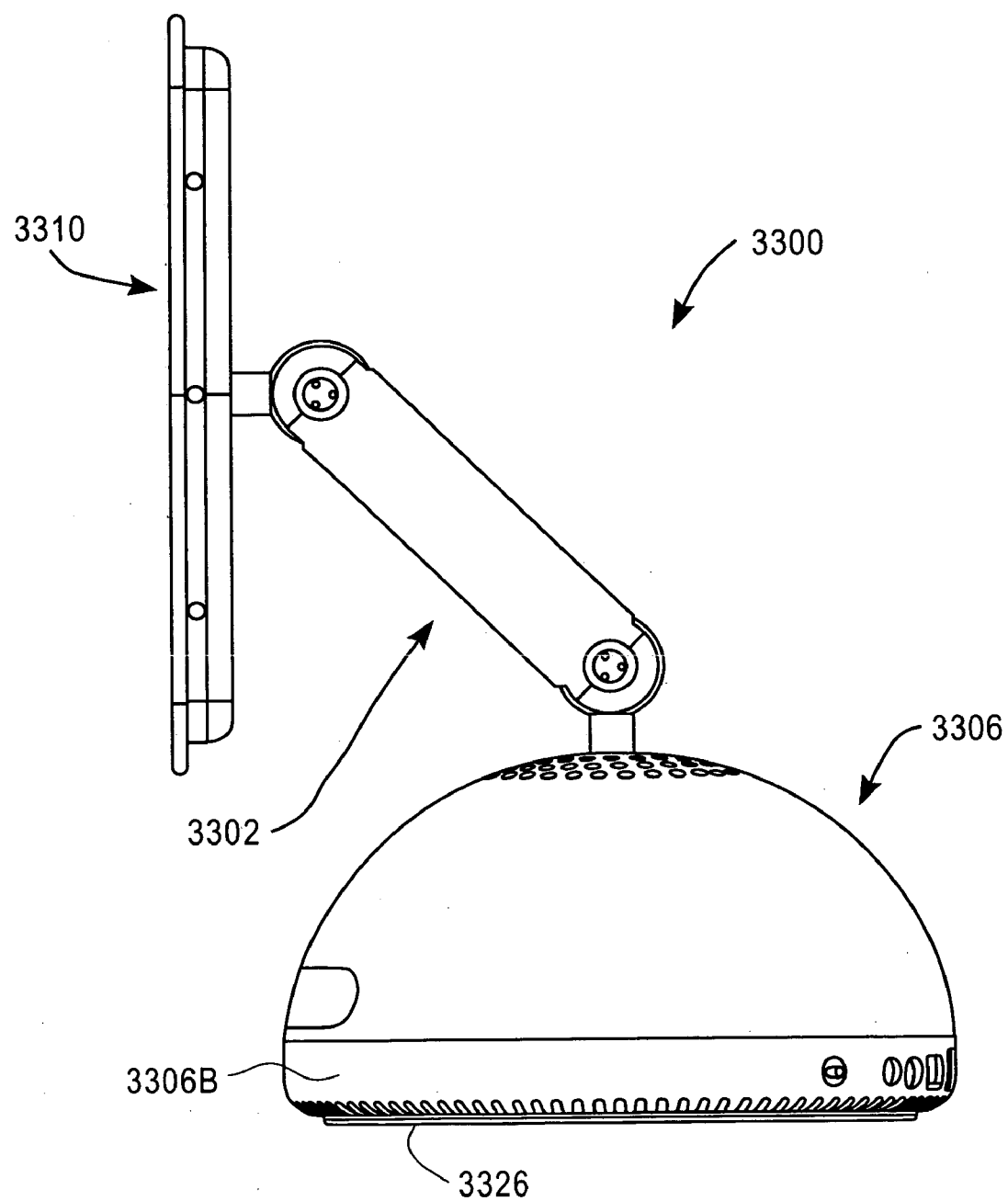
FIG. 33C is a side view of a computer system 3300 including a flat panel display 3310 and a moveable base 3306 coupled with a moveable assembly 3302, according to one embodiment of the invention.

FIG. 33C is a side view of a computer system 3300 including a flat panel display 3310 and a moveable base 3306 coupled with a moveable assembly 3302 according to one embodiment of the invention. In FIG. 33C, computer system 3300 is viewed from the right hand side. Bottom portion 3306B of base 3306 may include a plurality of ventilation apertures 3326 used to cool the electronic components housed within the interior of base 3306.

Figure 33D:
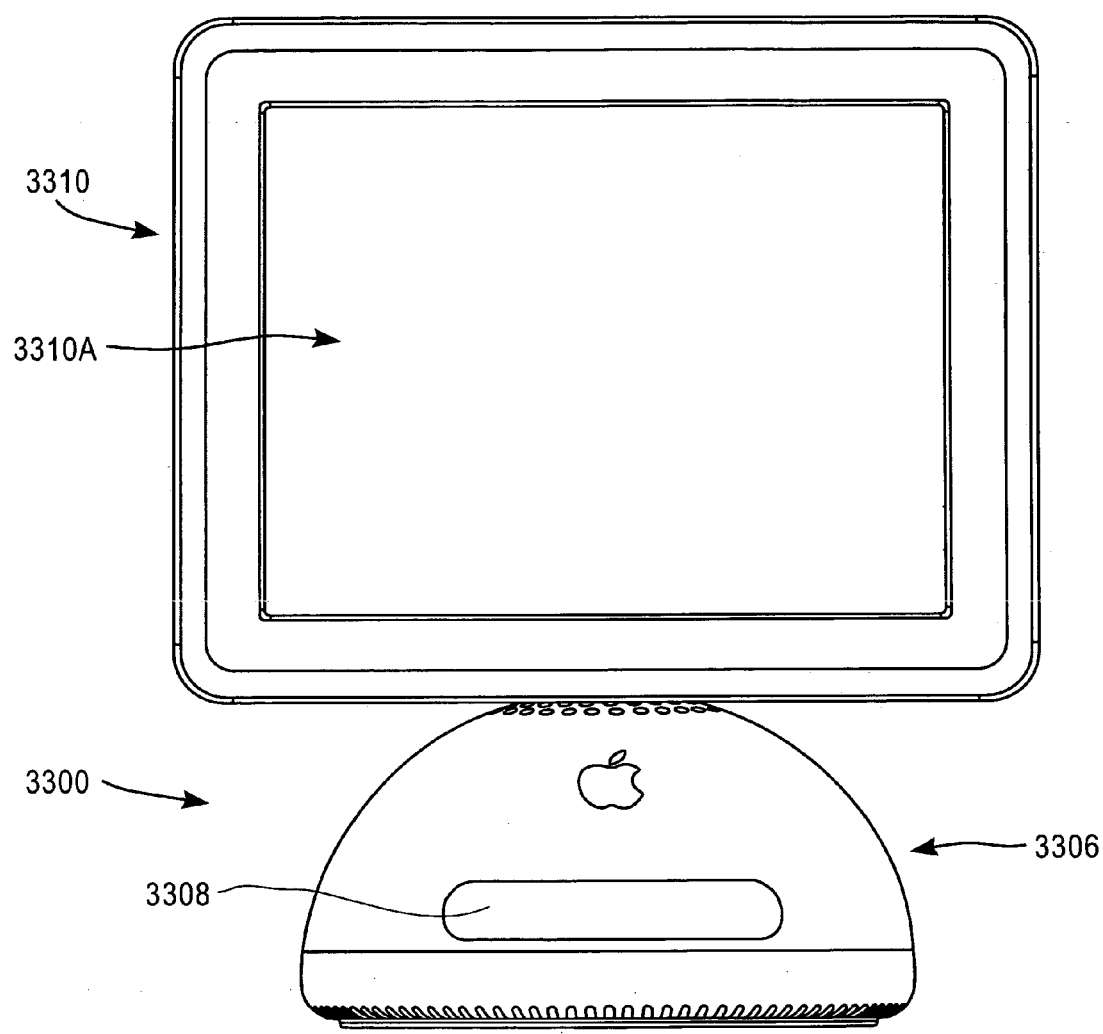
FIG. 33D is a front view of a computer system 3300 including a flat panel display 3310 and a moveable base 3306 coupled with a moveable assembly 3302, according to one embodiment of the invention.

FIG. 33D is a front view of a computer system 3300 including a flat panel display 3310 and a moveable base 3306 coupled with a moveable assembly (not shown) according to one embodiment of the invention. Flat panel display 3310 includes a viewing area 3310A. Base 3306 includes an aperture 3308, as previously described.

Figure 33E:
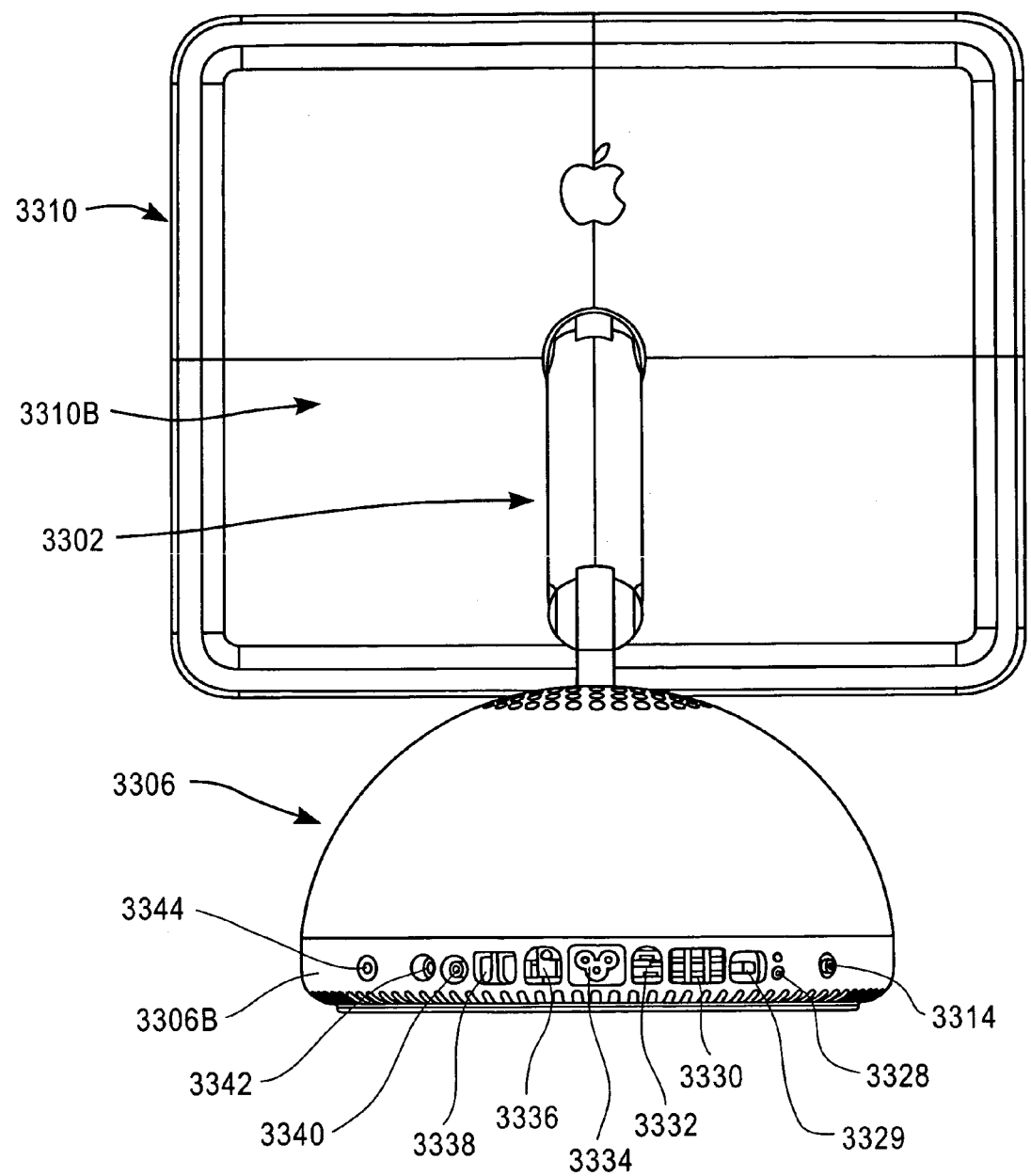
FIG. 33E is a rear view of a computer system 3300 including a flat panel display 3310 and a moveable base 3306 coupled with a moveable assembly 3302, according to one embodiment of the invention.

FIG. 33E is a rear view of a computer system 3300 including a flat panel display 3310 and a moveable base 3306 coupled with a moveable assembly 3302 according to one embodiment of the invention. Flat panel display 3310 includes a rear portion 3310B to which a distal end of moveable assembly 3302 is attached. As shown, a plurality of peripheral ports and system controls 3314, 3328, 3329, 3330, 3332, 3334, 3336, 3338, 3340, 3342, and 3344 may be included within base portion 3306B. Such ports and controls include but are not limited to: power button, microphone jack, speaker jack, Ethernet port, power plug, analog or digital telephone jack, infrared port, USB port, Firewire port, system reset button, and other computer system-related ports and controls.

Figure 33F:
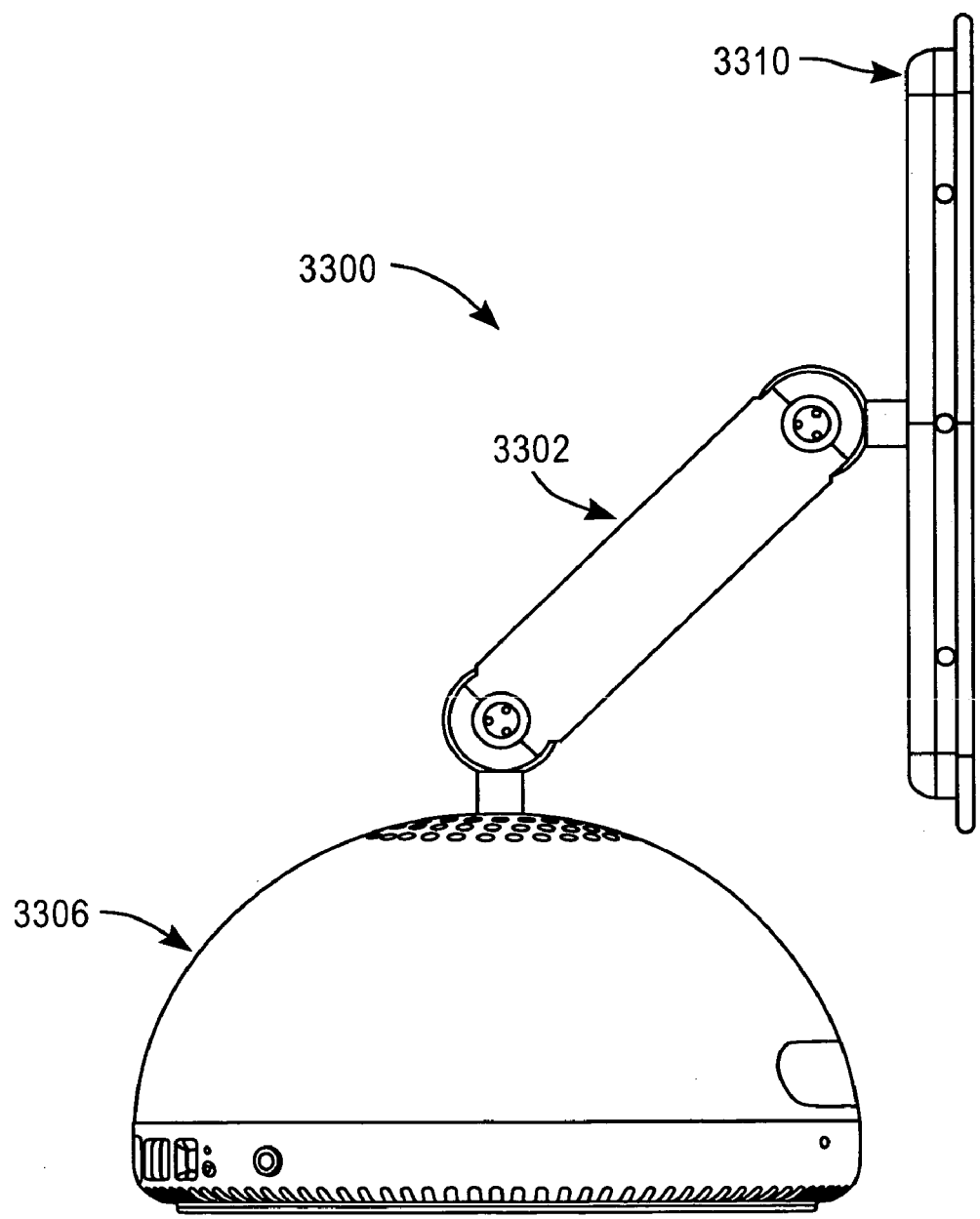
FIG. 33F is another side view of a computer system 3300 including a flat panel display 3310 and moveable base 3306 coupled with a moveable assembly 3302, according to one embodiment of the invention.

FIG. 33F is another side view of a computer system 3300 including a flat panel display 3310 and moveable base 3306 coupled with a moveable assembly 3302 according to one embodiment of the invention. In FIG. 33F, computer system 3300 is viewed from the left hand side.

Figure 34:
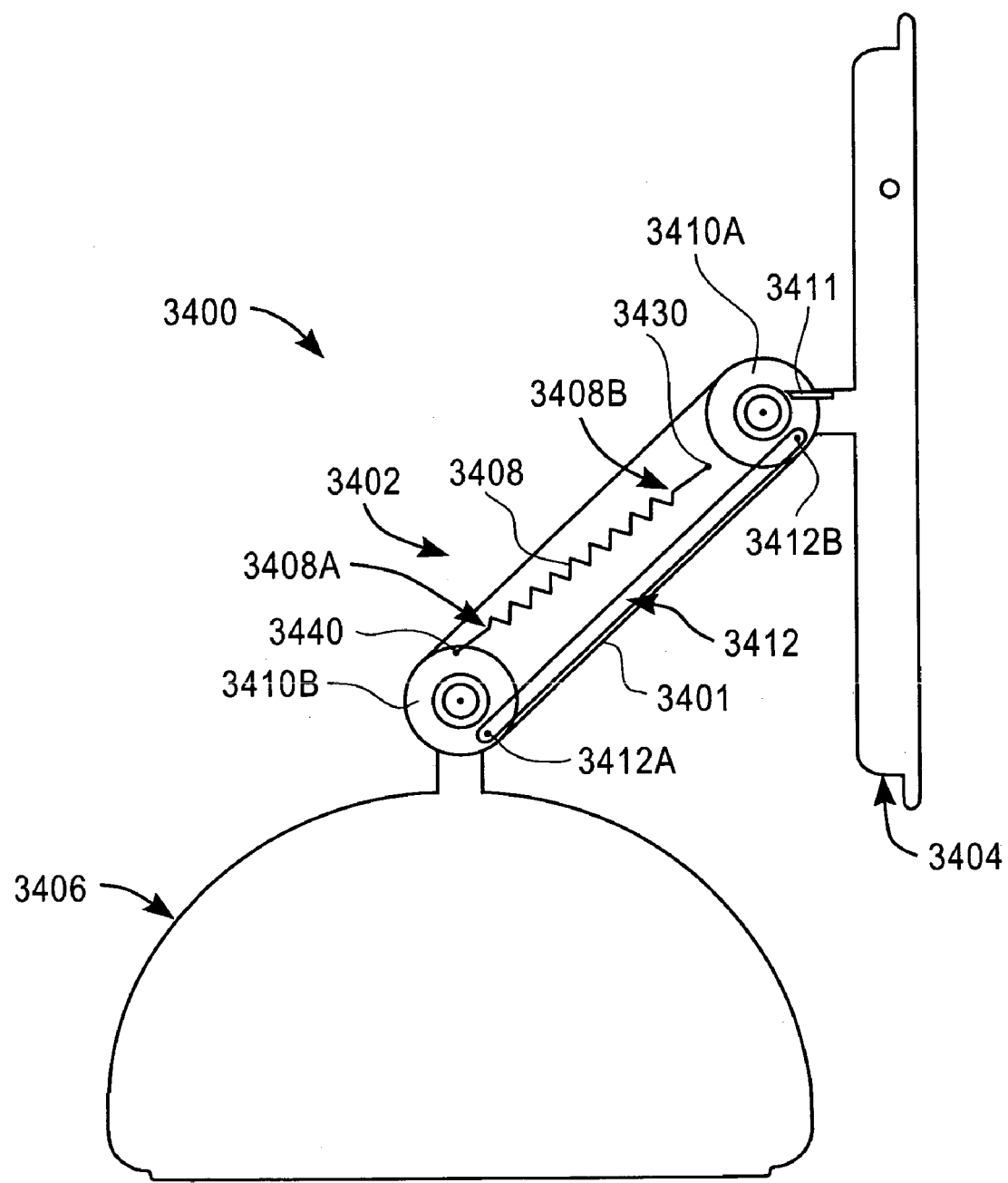
FIG. 34 depicts a simplified sectional side view of a computer system 3400 usable with an embodiment of the present invention.

Referring now to FIG. 34, there is shown a simplified sectional side view of a computer system 3400 usable with an embodiment of the present invention. Computer system 3400 includes a base 3406 to which is attached one end of a moveable assembly 3401. The other end of moveable assembly 3401 is attached to a flat panel display device (FPDD) 3404. In the embodiment shown in FIG. 34, the moveable assembly 3401 is a mechanical linkage that supports the weight of FPDD 3404 as it is moved in one or more degrees of freedom relative to a weighted, moveable base 3406, which rests on a support surface such as a desk, table, or other substantially planar support surface. Alternatively, the end of moveable assembly 3401 attached to base 3406 (or the base 3406 itself) could be mounted on a wall or other support device.

It will be appreciated that the embodiments of the invention shown in FIGS. 34–39, and described below, use a novel four-bar linkage (e.g. closed loop mechanism), which generally includes three moving links, one fixed link, and four pin joints. For example, one embodiment of the invention includes a ground link (e.g. base biscuit) 3410B, an input link (e.g. canoes) 3401 (which correspond to canoes 3502A and 3502B in FIG. 35), an output link (e.g. compression rod) 3412, and a coupler link (e.g. display biscuit) 3410A. The uniqueness of the disclosed and claimed embodiments is that the packaging creates an illusion that an apparatus other than a four-bar linkage is used because the output link (e.g. compression rod) 3412 is hidden inside the structure of the input link (e.g. canoes) 3401.

It will be appreciated that a variety of relative motions of the coupler link (e.g. display biscuit) relative to the ground link (e.g. base biscuit) can be generated by varying the lengths of each of the lengths and the relative angles at which they attach to each other. Thus, the lengths of the input link (e.g. canoes) 3401 and output link (e.g. compression rod) 3412 may have the same or different lengths. Preferably, however, the lengths of the input link (e.g. canoes) 3401 and the output link (e.g. compression rod) 3412 are approximately the same. In such a configuration, the coupler link (e.g. display biscuit) 3410A maintains its orientation relative to the ground link (e.g. base biscuit) 3410B throughout the range of motion.

One embodiment of the invention uses connector links 3410A and 3410B on either end of the four-bar linkage (e.g. moveable assembly). The moveable assembly may be made by coupling round, disk shaped members 3410A and 3410B, together with an input link (e.g. compression rod) 3412, and an output link (e.g. canoes) 3401 to form a closed-loop apparatus. In a unique embodiment, the output link (e.g. canoes) 3401 forms the exterior of the mechanism (e.g. moveable assembly), and conceals the compression rod 3412 and counterbalance spring 3408 assembly within its interior. The output link 3401 may be formed of two, semi-cylindrical sections (e.g. canoes) (3502A and 3502B in FIG. 35) with half-spheres on either end. When the canoes are fastened together, the result is an outside skin that functions both as an aesthetic cover and as the output link for the four-bar mechanism.

One of several unique features associated with the embodiment shown in FIG. 34, is that the counterbalancing spring 3408 and a moveable link (e.g. compression rod) 3412 of the four-bar mechanical linkage are housed within a cosmetic arm 3402 that acts as a fixed link. Cosmetic arm 3402 is formed of canoes 3502A and 3502B assembled together. The term "moveable link" means a link that moves relative to a fixed link. Unlike a fixed link, the angle(s) at which a moveable link attaches to a coupler link (e.g. display biscuit) 3410A and to a ground link (e.g. base biscuit) 3410B change as the four-bar linkage is raised and lowered. In the unique four-bar linkage shown in FIG. 34, canoes 3401 function as a fixed link when coupled to the center portions of display biscuit 3410A and ground biscuit 3410B. Thus, the angle at which canoes 3401 contact biscuits 3410A and 3410B remains substantially constant as the four-bar linkage is raised and lowered.

On the other hand, end 3412A of internal compression rod 3412 is attached to an off-center portion of ground biscuit 3410B. The other end of rod 3412 is attached at a corresponding off-center portion of display biscuit 3410A. When the four bar linkage is moved up and down, the lengths of compression rod 3412 and canoes 3401 do not change. However, the angle(s) at which compression rod 3412 attaches to biscuits 3410A and 3410B change relative to the angle(s) at which canoes 3401 attach to biscuits 3401A and 3410B. Thus, compression rod 3412 is said to "move" relative to canoes 3401. This movement occurs, in part, because compression rod 3412 is mounted to each biscuit a distance off center of the biscuit's center, which creates a path length change.

Referring to FIGS. 34, 35, 39A and 39B, spring 3408 includes an end 3408B and an end 3408A. Spring 3408 is a compression spring compressed between a spring core 3430 attached to canoes 3401 (which correspond to canoes 3502A and 3502B in FIG. 35) and a pair of spring struts 3440 attached to an off center portion of ground biscuit 3410B (which corresponds to biscuit 3503 in FIG. 35). Spring core 3430 includes a first end 3431 that attaches to a rod 3416 which attaches to the interior of canoes 3502A and 3502B. A second end 3432 of spring core 3430 contains a flanged portion 3433 that mates with end 3408A of spring 3408. Spring struts 3440 include first ends 3441 that attach to an off center portion of base biscuit 3410B (which corresponds to base biscuit 3503 in FIG. 35), and second ends 3442 having eared portions 3443 that mate with end 3408B of spring 3408. In this manner, pre-tensioned spring 3408 exerts a restoring force along the length of spring core 3430 and spring struts 3440 that acts to push flanged portion 3433 and eared portion 3443 apart.

Referring again to FIG. 34, it will be appreciated that the spring 3408 is not necessary to the operation of the four-bar linkage. Rather spring 3408 is provided, in one embodiment to counterbalance the weight of a flat panel display 3404 attached to display biscuit 3410A, such that the display feels substantially weightless to a user when the user grabs the display and attempts to move it. It will also be appreciated that the path length of spring 3408 changes as the four-bar linkage (e.g. moveable assembly) is moved up and down. For example, in one embodiment, spring 3408 expands as the four-bar linkage is raised, and contracts as the four-bar linkage is lowered. In its contracted state, spring 3408 stores potential energy. This stored energy is released to assist the user when spring 3408 expands during upward movement of display 3404.

Figure 35:
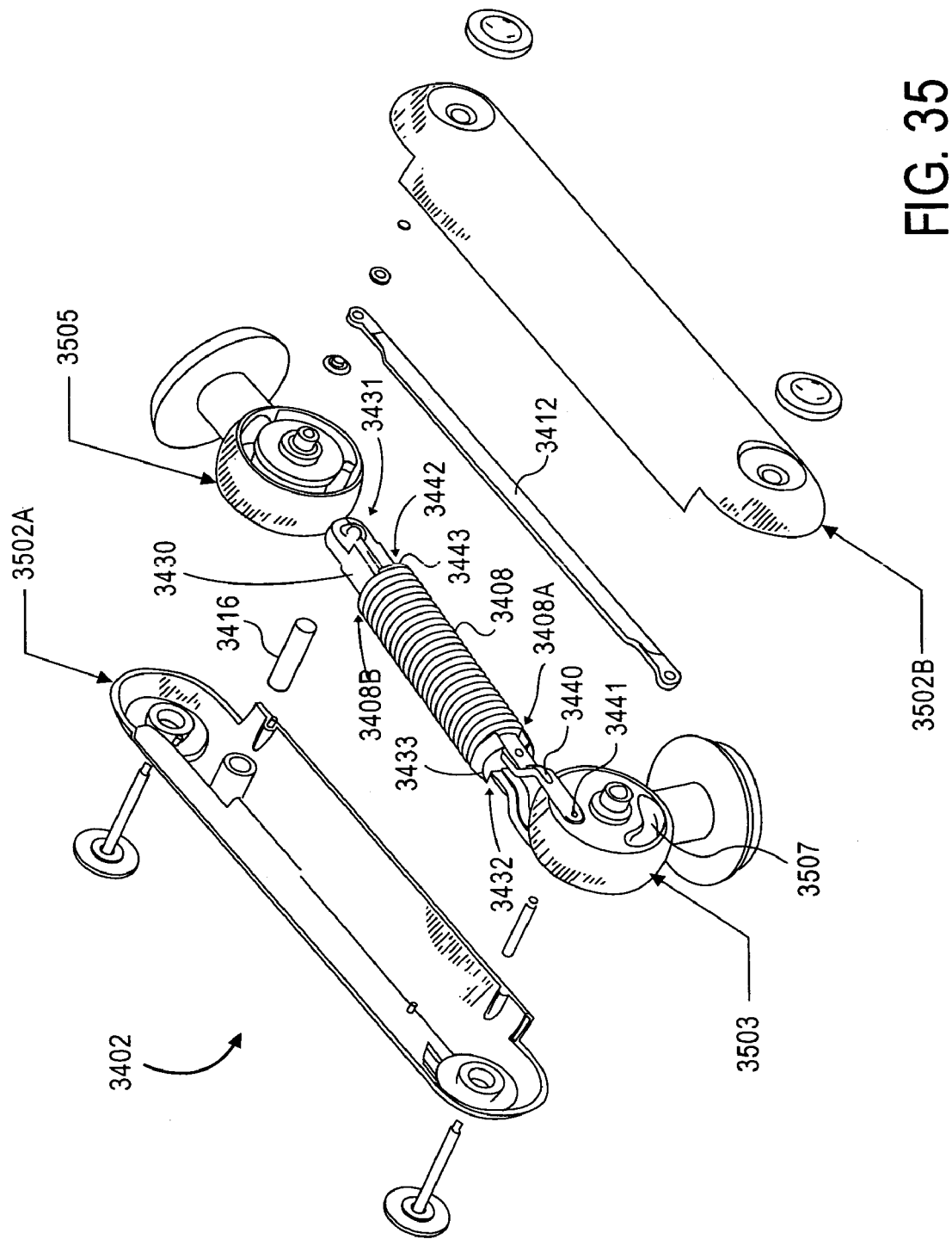
FIG. 35 is an exploded perspective view of one embodiment of the moveable assembly 3401 of FIG. 34.

Referring again to FIG. 34, cosmetic arm 3402 may also enclose and conceal a display data cable and a power cable for providing display data and power to the FPDD 3404. As shown in FIG. 35, base biscuit 3503 may include a channel 3507 through which the data and power cable may run.

Figure 39:
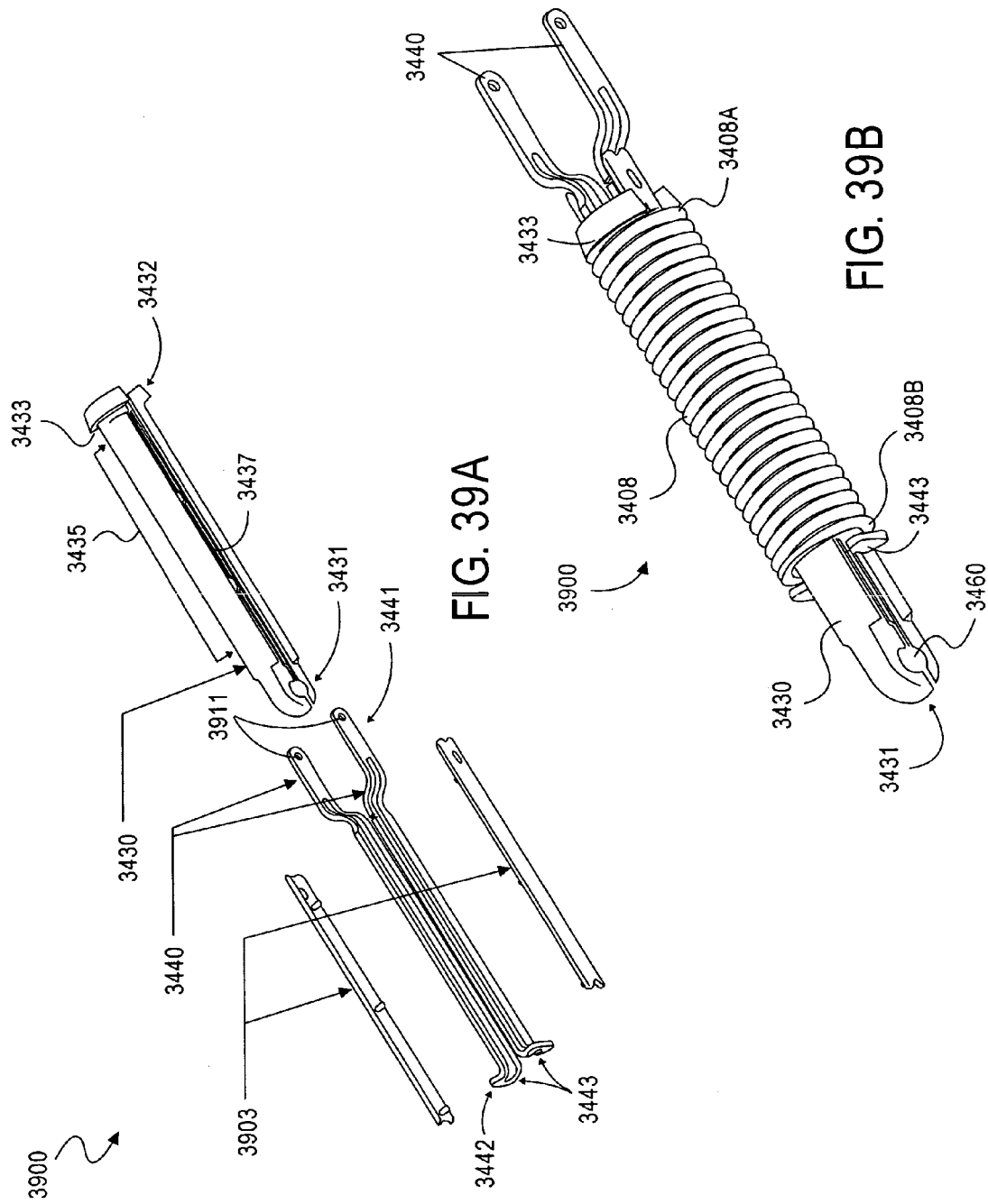
FIG. 39A is an exploded, perspective view of one embodiment of a spring assembly 3900, according to one embodiment of the invention, showing various internal component parts associated therewith.
FIG. 39B is a perspective view of an assembled spring assembly 3900, according to one embodiment of the invention.

It will be appreciated that the embodiments shown in FIGS. 34, 35, and 39 are illustrative only in that they can be scaled or modified to accommodate a wide variety of FPDD's 3404 of different weights and sizes. Additionally, the cosmetic appearance of the embodiment of FIG. 34 may be modified to fit the needs of a particular user or consumer.

In one embodiment, the physical specifications associated with computer system 3400 are as follows: Arm 3402 has a diameter of approximately 42.0 mm; rotational frictional elements (biscuits) 3410A and 3410B have centers spaced approximately 160.0 mm apart; and FPDD 3404 weighs approximately 4.94 lbs +/−10%. Regarding the range of motion provided in one embodiment, moveable assembly 3401 may yaw approximately +/−90.0 degrees from side to side; arm 3402 may pitch up and down approximately +/−90.0 degrees from the horizontal to the vertical; and FPDD 3404 may pitch approximately −5.0 degrees to approximately +30.0 degrees from vertical display orientation.

When manufacturing a computer system 3400 such as that shown in FIG. 34, it is desirable, but not necessary, that the system have one or more of the following characteristics. The display 3404 should be easily moved throughout the entire range of motion (when it is desired to move it). When the user has stopped moving the display, display 3404 should remain fixed at any point within the range of motion without noticeable sagging or backlash. During movement of display 3404, the motion of the moveable assembly 3402 should be smooth and silent (e.g. no "spronging" or other spring noises) and the friction feel should be constant, regardless of position or direction of motion. The moveable assembly 3402 should have no pinch points, and all cabling (e.g. display, data, and power cables) should be internal to the mechanism and not visible. Additionally, the moveable assembly 3402 should be designed for at least a 15,000 cycle lifetime without degradation of performance. The weight and size of the base 3406, arm 3402 and display 3404 should be light enough that one adult person, and even a child, can move the whole computer system (base, containing the majority of the electrical components of the computer system, arm and display) without any assistance and the base should be sufficiently heavy that it can support the whole computer system, with the display at a wide variety of locations, without requiring that the base be fixedly attached to the surface (e.g., a desk) on which it rests.

FIG. 35 is an exploded perspective view of one embodiment of the moveable assembly 3402 of FIG. 34. As shown in FIG. 35, component parts of moveable assembly 3402 include a first canoe 3502A designed to couple with a second canoe 3502B, and in so doing, to conceal various inner parts such as base rotation assembly 3503 and display mounting assembly 3505. A spring 3408 and a compression link 3412 may also be concealed within canoes 3502A and 3502B. Rod 3416 may be used to coupled spring core 3430 to canoes 3502A and 3502B.

Figure 36:
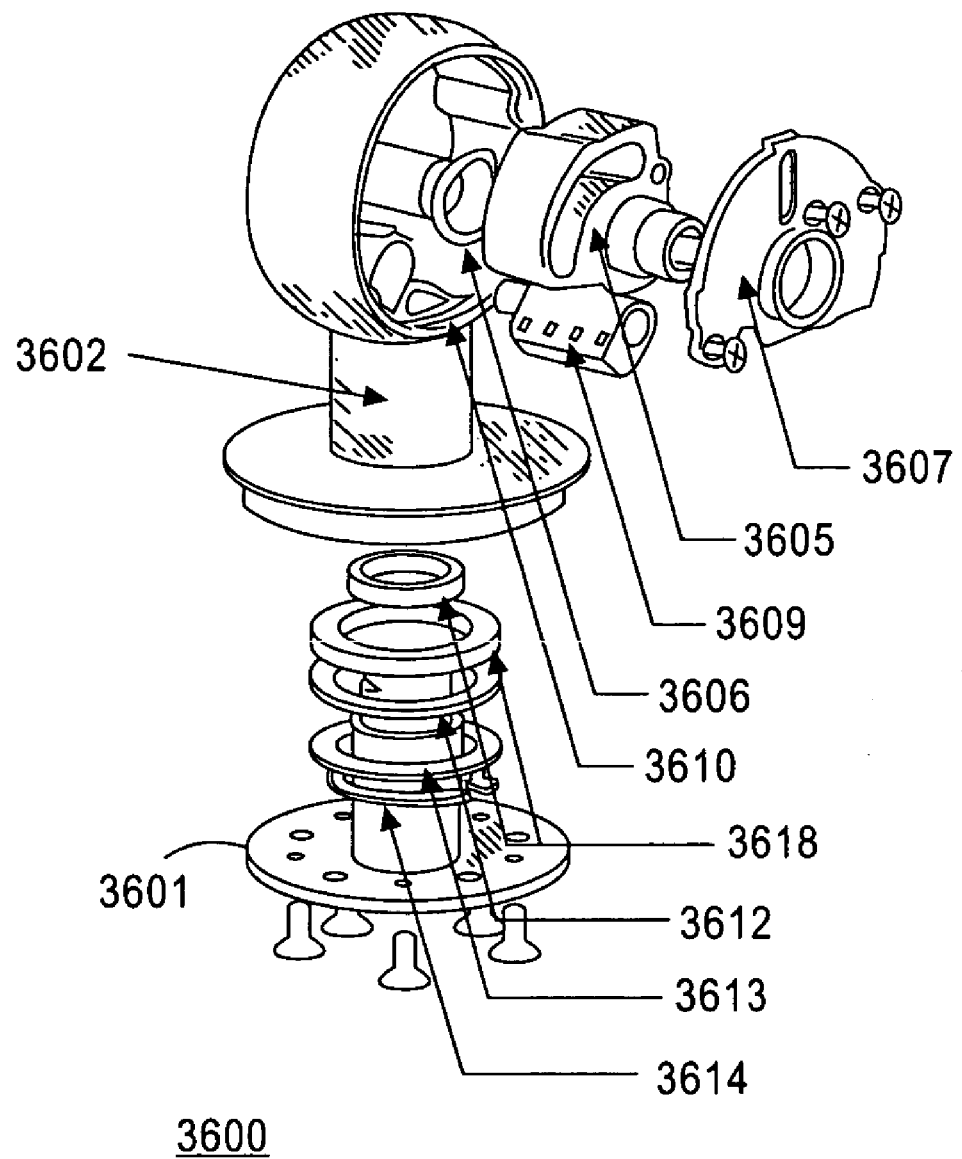
FIG. 36 shows an exploded perspective view of one embodiment of a base rotation assembly 3600, according to one embodiment of the invention.

FIG. 36 shows an exploded perspective view of one embodiment of a base biscuit assembly 3600 (which corresponds to base biscuit 3410B). Biscuit plate 3607 contains an adjustment mechanism and incorporates ratcheting features of that mechanism. Positioned behind the biscuit plate 3607, the counterbalance adjustment cam 3605 provides a way to change the effective moment arm of the counterbalance spring to allow for differences in display weight due to manufacturing tolerances. The operation of this cam is described in more detail in FIGS. 43A and 43B.

Friction element 3606, in one embodiment, is a conventional pivoting element that provides enough friction in the display pitch motion to effectively mask any inaccuracies in the counterbalance. The base arm pitch joint housing (e.g. biscuit) 3610 provides pivot joints for the arm, parallelogram linkage, and counterbalance spring. In one embodiment, a base yaw joint (not shown) includes a pair of plane bearings preloaded against each other to minimize bearing slop and to provide joint friction to control the motion of the flat panel display device. An extension post 3662 extends from the biscuit 3610 to visually separate the arm (not shown) from the base (not shown). During yaw rotation, the base flange 3601 remains fixed, while the extension post rotates. Base flange (or mounting flange) 3601 provides an interface for attaching the extension to the base (not shown). Various sub-components of base rotation assembly 3600 further include a wave washer 3609, wave spring 3612, washers 3613 and 3618, and retaining ring 3614.

Figure 37:
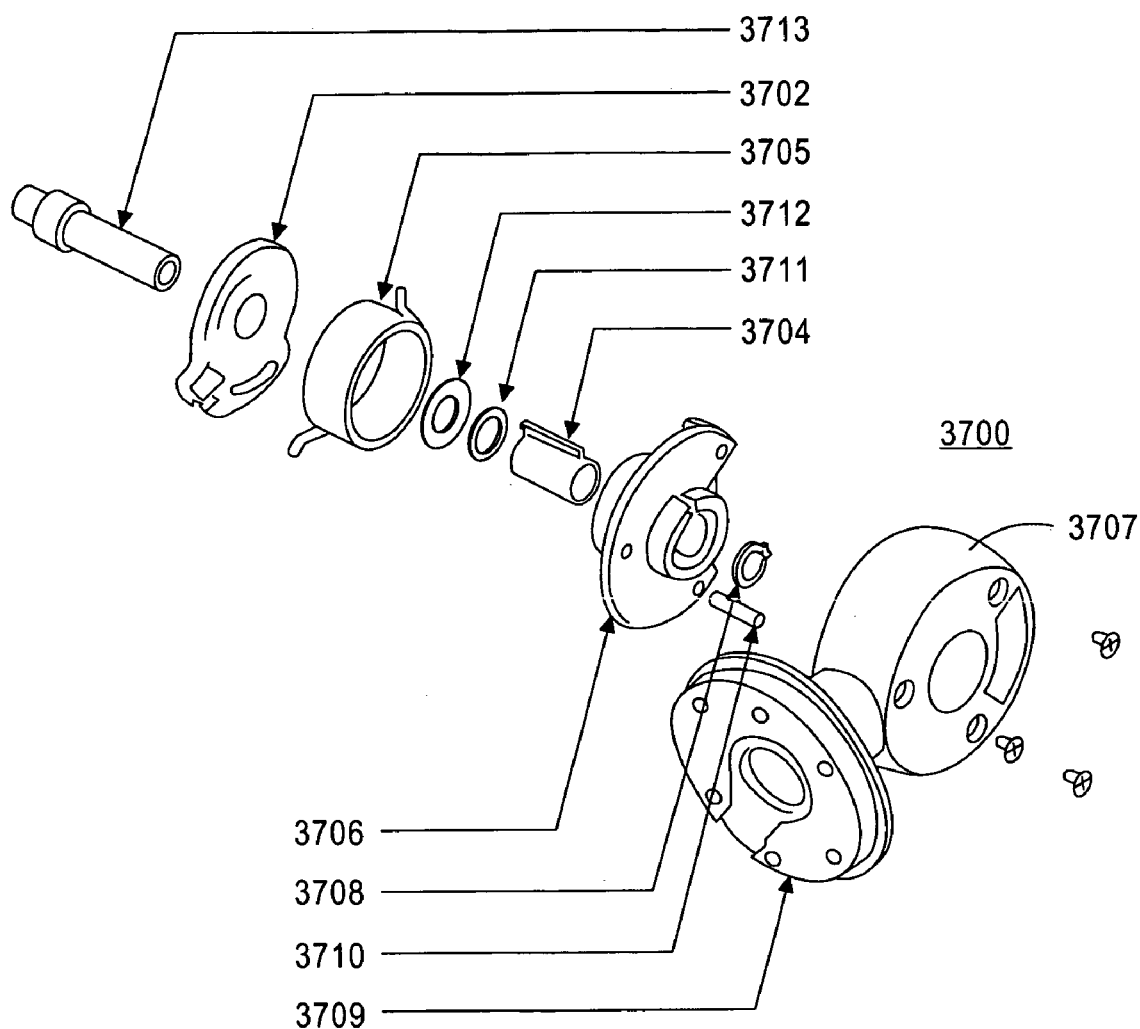
FIG. 37 is an exploded perspective view of a display mounting assembly 3700, according to one embodiment of the invention.

FIG. 37 is an exploded perspective view of a display mounting assembly 3700, according to one embodiment of the invention, the major components of which are: a display hub 3702, a friction element 3704, a counterbalance spring 3705, a display joint housing (biscuit) 3707, and a mounting flange 3709 and extension tube 3713. Display hub 3702 is a portion of the display mounting assembly 3700 that remains rotationally fixed relative to the base 3406 (not shown in FIG. 37) and provides a horizontal reference frame for display pitch rotation. Friction element 3704 includes an extension tube 3713 and friction elements contained within a friction housing 3706. Friction element 3704 is fixed relative to the biscuit 3707. Counterbalance spring 3705 is a torsion spring that biases the display upwards to counteract the downward gravitational moment. Display joint housing (biscuit) 3707 provides a housing for the pitch friction and counterbalance elements, and the display hub. The mounting flange 3709 and extension tube 3713 are integral to the biscuit 3707, and the display (not shown) does not rotate about axis of extension tube 3713. Also included within assembly 3700 are nylon washer 3712, steel washer 3711, retaining ring 3708, and limit stop 3710.

Figure 38:
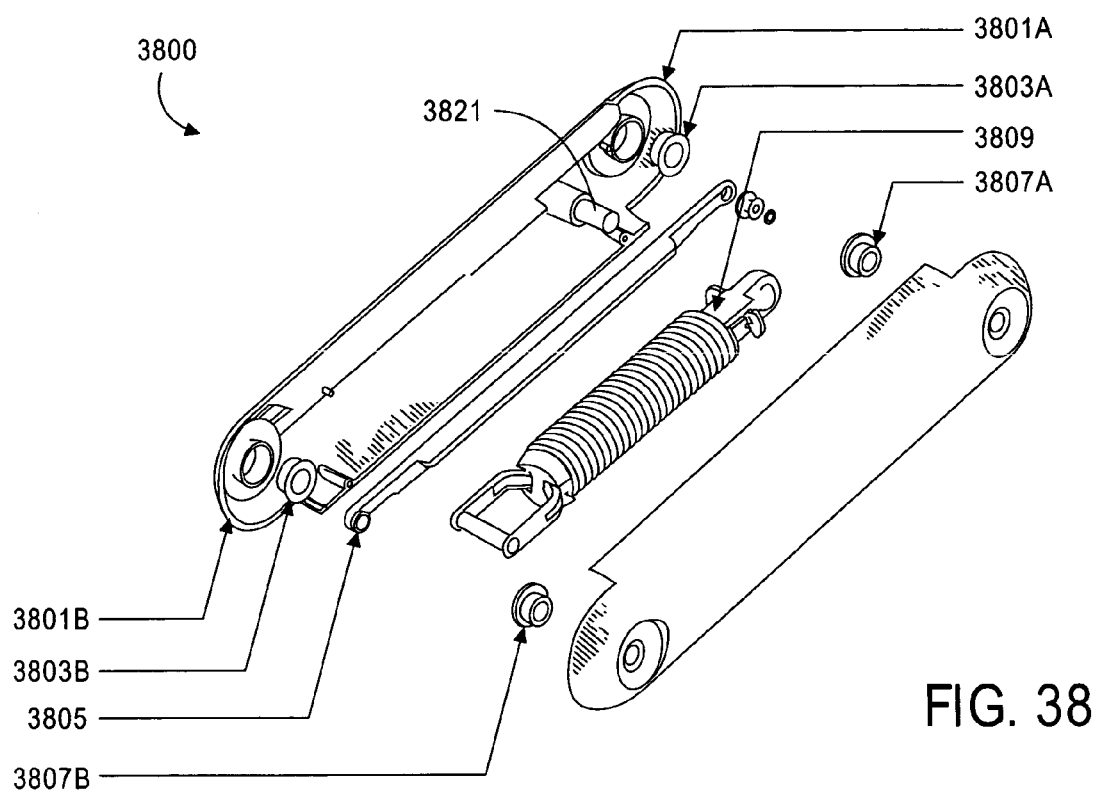
FIG. 38 is an exploded, perspective view of a moveable assembly 3800, according to one embodiment of the invention.

FIG. 38 is an exploded, perspective view of a moveable assembly 3800 according to one embodiment of the invention. Moveable assembly 3800 corresponds to moveable assembly 3402 in FIG. 34. In one embodiment, moveable assembly 3800 includes a first canoe 3801A, a second canoe 3801B, bearings 3803A, 3803B, 3807A, 3807B, spring assembly 3809, and compression link 3805. Canoes 3801A and B are hollow, rectangular, half-tubular sections having rounded exterior ends. When assembled, canoes 3801A and 3801B couple with the biscuit of a base rotation assembly (not shown) and with the biscuit of a display mounting assembly (not shown) to conceal compression link 3805 and spring assembly 3809. Additionally, one or more data, power, or other computer system-related cables may be concealed within the hollow portion of canoes 3801A and 3801B.

Also called "case halves", canoes 3801A and 3801B mate together to form the main structural element of the extension. Bearings 3803A, 3803B, 3807A, and 3807B, are pressed into bores in the canoes 3801A and 3801B to provide rotational joints for the biscuits (not shown). Compression link 3805, together with the moveable assembly 3800 itself, couples the rotation of the upper and lower biscuits, and also supports the moment loads at the display end. One end of spring assembly 3809 is attached to the lower biscuit of the base rotation assembly (not shown), while the other end is attached to an inner portion of canoes 3801A and 3801B via rod 3821. Spring assembly 3809 provides a force to counteract the gravitational moment on the arm and the display. Spring assembly 3809 compresses as the moveable assembly 3800 moves downwards, but extends as the moveable assembly 3800 moves upwards.

FIGS. 39A and 39B show views of the spring assembly 3900 (which corresponds to the spring assemblies 3408 and 3809 of FIG. 34 and FIG. 38, respectively). FIG. 39A is an exploded, perspective view of one embodiment of a spring assembly 3900, showing various internal component parts associated therewith. Such parts include, but are not limited to: a spring core 3430, spring struts 3440, glide bearings 3903, and spring 3408 (as shown in FIG. 39B). FIG. 39B is a perspective view of an assembled spring assembly 3900, according to one embodiment of the invention.

As shown in FIGS. 39A and 39B, spring core 3430 is a rectangular, tubular shaped member having a proximal end 3432, a distal end 3431, and a middle portion 3435. An annular flange (or lip) 3433 is provided on the proximal end 3432 to mate with one end 3408A of spring 3408, when spring core 3430 is inserted within the interior of spring 3408. The spring core's distal end 3431 protrudes past the opposite end 3408B of spring 3408 and contains a bore 3460 therethrough, which is used to couple spring core 3430 with canoes 3502A and 3502B. A pair of spring struts 3440 fit within a corresponding pair of grooves 3437 running longitudinally along the sides of spring core 3430. A corresponding pair of glide bearings 3903 mate with the exterior surfaces of spring struts 3440 such that spring 3408 smoothly and easily compresses and expands along the middle portion 3435 of spring core 3430.

Spring struts 3440 have a proximal ends 3441 and distal ends 3442. The distal ends 3441 are bowed slightly outwards to form a pair of ears 3443 separated by an empty space into which a biscuit (not shown) may slidably and rotatably fit. A corresponding set of bores 3911 is provided in the proximal ends 3441 to attach spring struts 3440 to the biscuit of a base mounting assembly. The distal ends 3442 are flared outwards to mate with the end 3408B of spring 3408 as shown in FIG. 39B.

Referring again to FIG. 34, in one embodiment, the torsion spring 3411 (not shown) used to counter-balance a display pitch has an outer diameter of approximately 0.840 inches (free), a wire diameter of approximately 0.075 inches, and a spring rate of approximately 0.067 in-lbs/degree. Additionally, a right-hand wind spring having an inner diameter of approximately 0.767 inches and a 0.403 inch body length at a approximately a 9.0 in-lb working load may be used.

In one embodiment, a left-hand wound compression spring 3408 has an outer diameter of approximately 0.75 inches, a wire diameter of approximately 0.095 inches, a spring rate of 17 lbs/in, and a free length of approximately 7.0 inches. It will be appreciated that the spring specifications given are meant only as illustrations, and that various springs having other specifications may be used in various embodiments of the invention.

Figure 40:
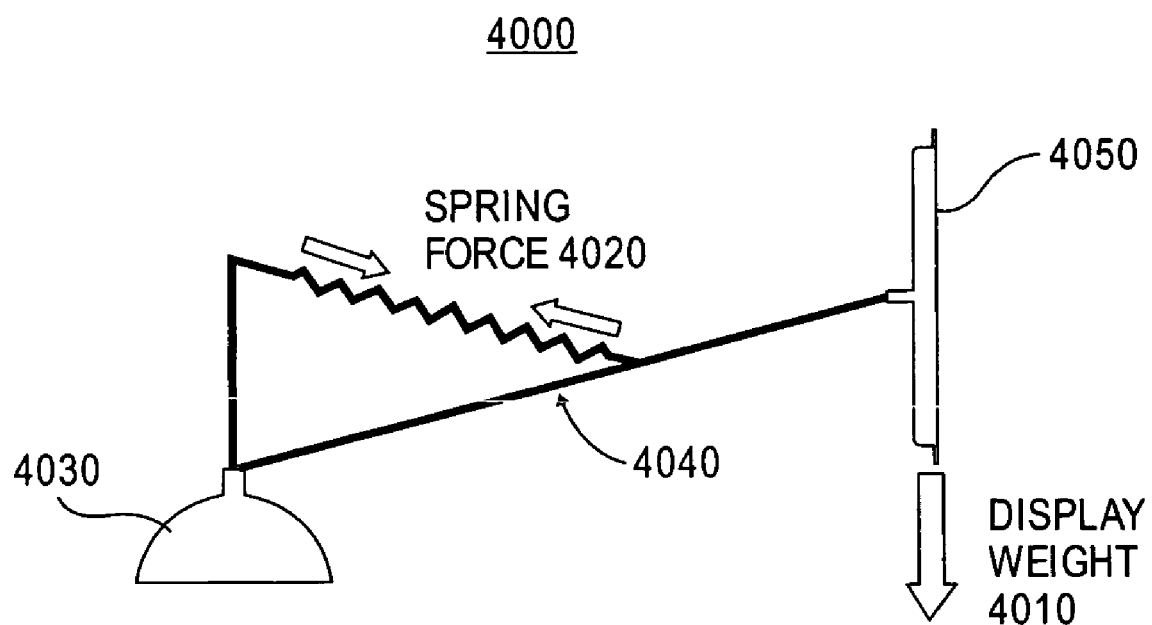
FIG. 40 is a force diagram illustrating one embodiment of a computer system 4000 that includes a base 4030 attached to one end of a moveable assembly 4040 and a flat panel display device 4050 attached to the other end of the moveable assembly 4040, in which a display weight 4010 is counterbalanced using a spring force 4020.

FIG. 40 is a force diagram illustrating one embodiment of a computer system 4000 that includes a base 4030 attached to one end of a moveable assembly 4040 and a flat panel display device 4050 attached to the other end of the moveable assembly 4040, in which a display weight 4010 is counterbalanced using a spring force 4020.

In FIG. 40, a spring counterbalance mechanism is used to support the weight of the display 4050 and its moveable assembly 4040. This configuration allows adjustment of the display position with minimal user effort. One of several illustrative advantages associated with this approach is that, for the linkage geometry shown, it is theoretically possible to precisely counterbalance the gravity load for all arm positions. If a spring with precisely the required rate and preload is used, and the linkage geometry is correct, the resulting spring force will always generate a moment around the base pivot that is equal and opposite to the moment of the display gravity load. In other words, the display will seem to "float", restrained only by the resisting effects of bearing friction. (Some non-zero joint friction in the mechanism is a desirable feature, so that the display position will remain stable in spite of minor bumps or other disturbances). The characteristics of the ideal compensation are shown in FIG. 40.

In practice, the spring characteristics, linkage geometry, and display weight cannot be precisely controlled, and some counterbalancing errors will always occur. Accordingly, the moveable assembly 4040 includes an adjustment mechanism that allows each system to be adjusted to minimize compensation errors, and also employs joint friction to stabilize the display and to mask any remaining errors.

Figure 41:
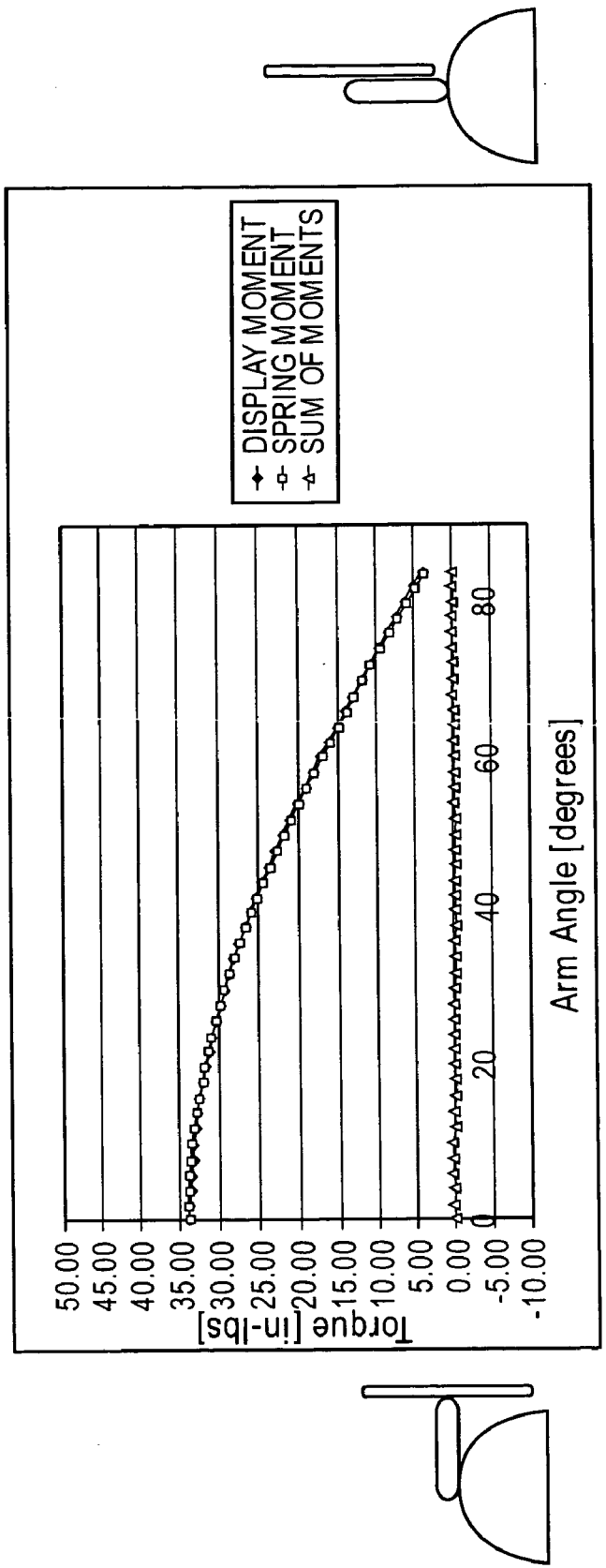
FIG. 41 is a graph depicting illustrative counter-balance sum of moments for a moveable assembly, according to one embodiment of the invention.

FIG. 41 is a graph depicting illustrative counter-balance sum of moments for one embodiment of a moveable assembly. As shown, in FIG. 41, the most torque is experienced when moveable assembly is in the substantially horizontal position (e.g. approximately 0.0 degrees). As the moveable assembly is raised, torque decreases, as indicated by the downward curving data line.

Figure 42:
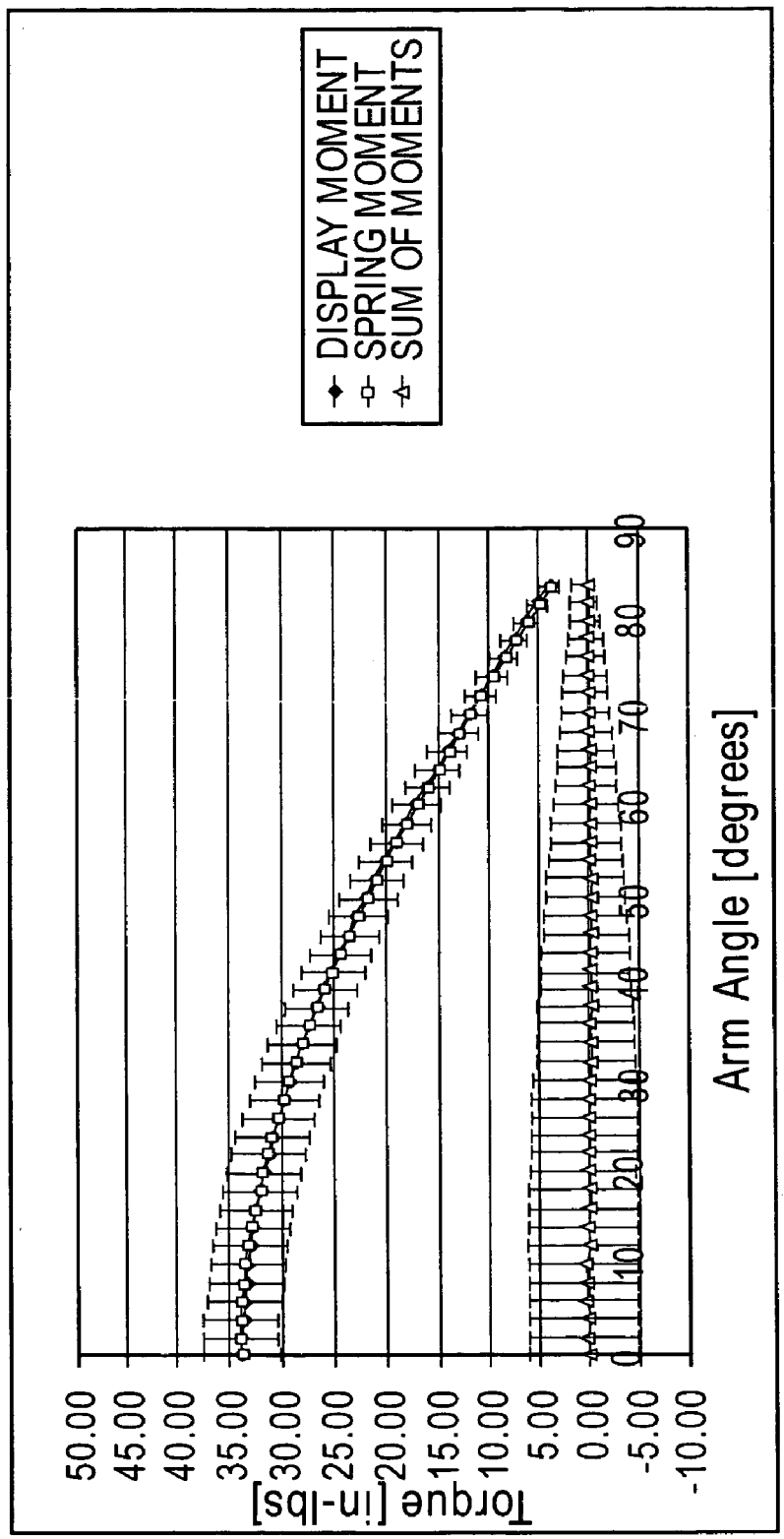
FIG. 42 is a graph depicting illustrative counter-balance sum of moments with error bars for a moveable assembly, according to one embodiment of the invention.

FIG. 42 is a graph depicting illustrative counter-balance sum of moments with error bars for one embodiment of a moveable assembly. As shown, in FIG. 42, the most torque is experienced when moveable assembly is in the substantially horizontal position (e.g. approximately 0.0 degrees). As the downward curving data line indicates, the torque decreases as the moveable assembly is raised.

In one embodiment, the moveable assembly is very sensitive to movement because the moment mismatch between the display and the spring has been reduced as much as possible. Although when viewing the graph in FIG. 41 the mismatch appears small, the error can become quite large as soon as some reasonable manufacturing tolerances are introduced. Sources of error include manufacturing tolerances in display weight, spring constant, spring free length, as well as dimensional tolerances in the mechanism.

Figure 43A:
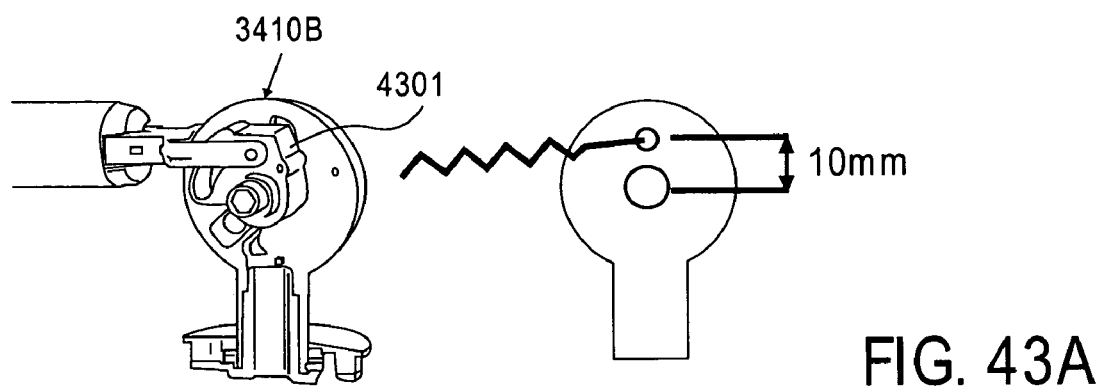
Figure 43B:
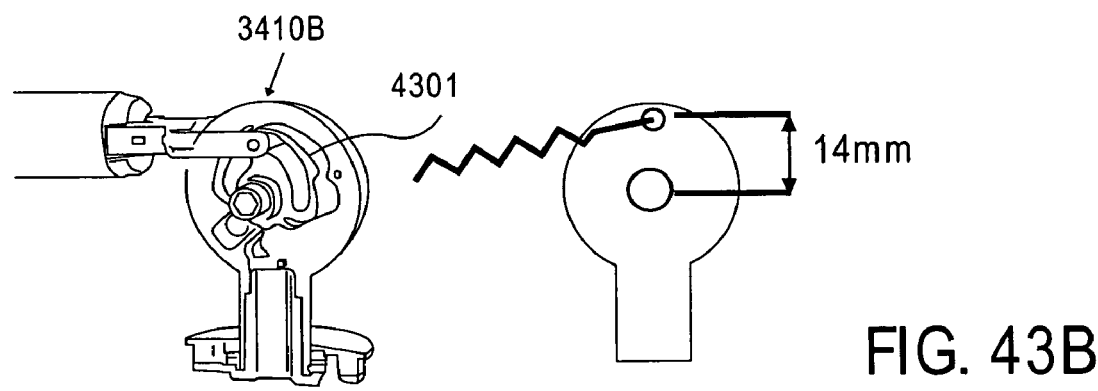

In order to compensate for tolerances, the moveable assembly may be tunable. After each unit is assembled in production, it may be adjusted to compensate for the particular spring, display, and every other part that went into it. By doing this, the error bars in FIG. 42 can be drastically reduced. With reference to FIGS. 43A and 43B, the tuning is performed by rotating the spring pivot cam 4301 (which corresponds to cam 3605) in the base biscuit. This moves the anchor point of the spring assembly up and down, thereby increasing or decreasing the moment arm (length) of the spring 3408 (not shown in these figures). Adjusting the moment arm of the spring allows the four-bar linkage (e.g. moveable assembly) to be optimally tuned to the weight of a particular flat panel display attached to the other end of the moveable assembly. Positioning cam 4301 in a first position about 10.0 mm off center of the base biscuit 3410B, as shown in FIG. 43A, creates a shorter moment arm, which creates additional compression of spring 3408, and thus stores more potential energy. The additional potential energy may be useful in counterbalancing heavier flat panel displays. On the other hand, positioning cam 4301 in a second position about 14.0 mm off center of base biscuit 3410B, as shown in FIG. 43B, lengthens the moment arm, which lessens the compression of spring 3408 (of FIG. 34), and thus stores less potential energy. The lesser potential energy may be useful in counterbalancing lighter flat panel displays.

Figure 44:
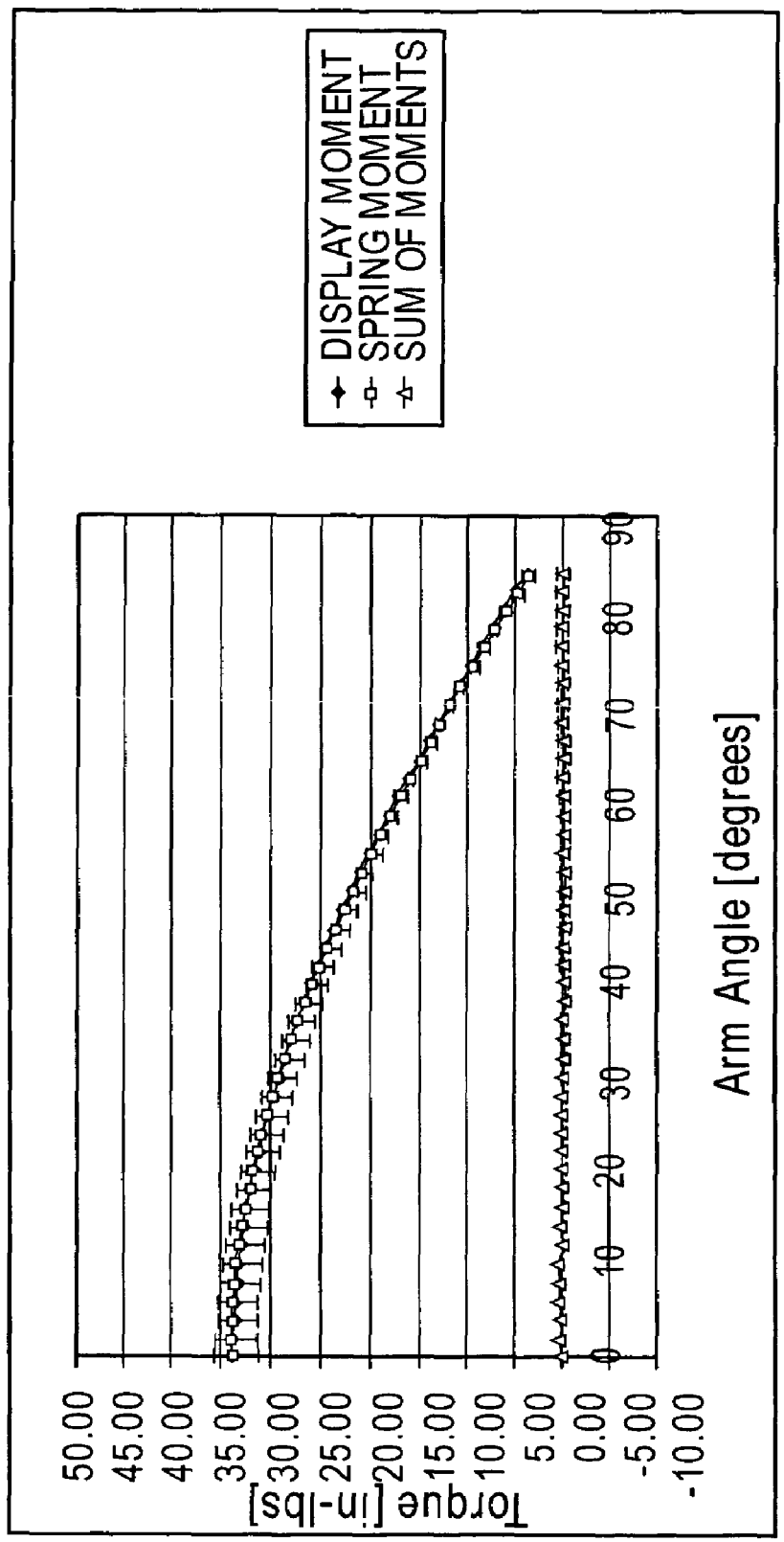

FIG. 44 is a graph depicting counter-balance with manufacturing error bars after tuning for one embodiment of a moveable assembly. As shown in FIG. 44, tuning greatly reduces the error bars.

It will be appreciated that the user force when operating various embodiments of the moveable assembly must be carefully controlled. In a frictionless system, the sum of moments varies between 0.19 and −0.28 in-lbs, meaning that the force required to move the display varies between around 0.03 and 0.04 lbs, depending upon the arm angle. In an absolute sense, there is a very small difference between the two values, but the sign change alone results in a very perceivable variance in feel. This effect is magnified when reasonable manufacturing tolerances are considered. However, the effect is diminished as extra friction is added. If an extra 5 in-lbs of friction were added to the system, the resulting sum of moments would range between 5.03 and 4.96 in-lbs, and the corresponding user force would range between approximately 0.80 and approximately 0.79 lbs. In which case, the same absolute difference is only about 1.4% of the total user force.

Figure 45:
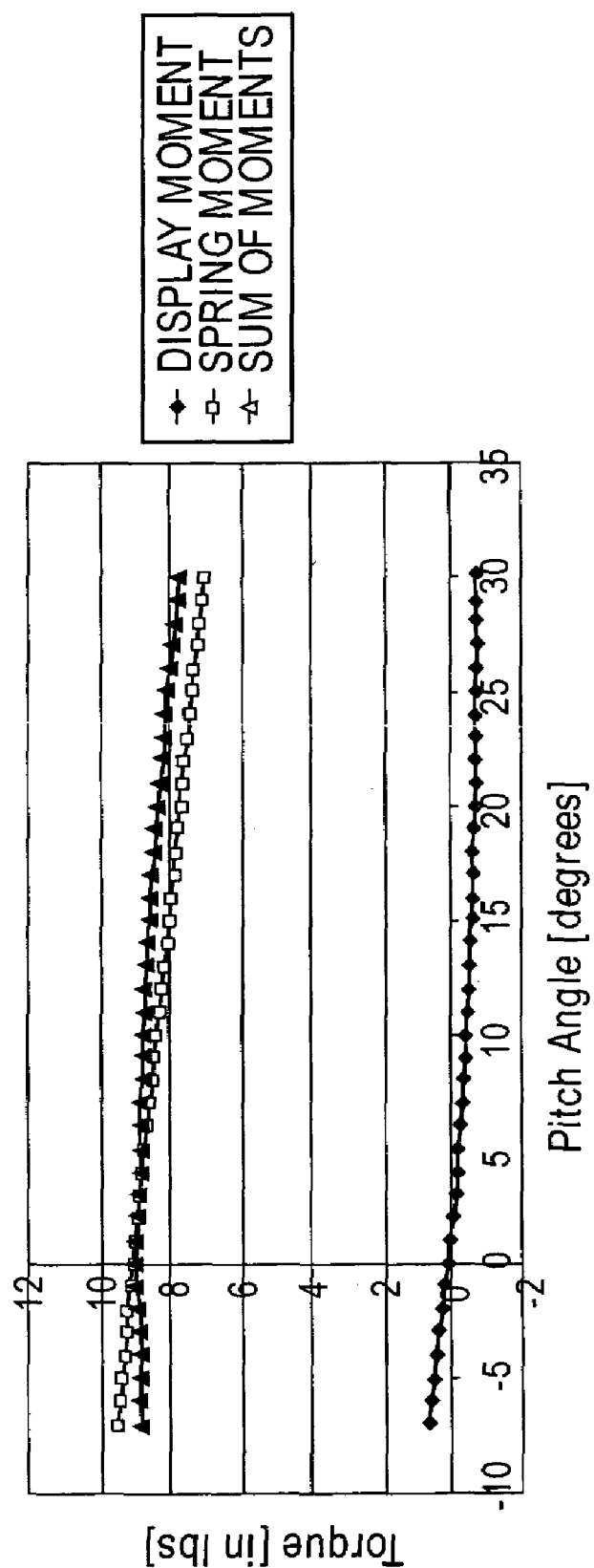

FIG. 45 is a graph depicting the pitch counter-balance sum of moments for one embodiment of a moveable assembly. Pitch refers to tilting the flat panel display device without moving the moveable assembly. As shown in FIG. 45, the torque decreases as the angle of tilt increases.

In addition to the moveable assembly being counter-balanced, the pitch angle of the display is also counter-balanced, but with a torsion spring, given the size constraints and the smaller moment load. Although this approach cannot counter-balance as well as the approach used for the main arm, reasonable friction in the joint is more than adequate to mask any errors that may arise.

Figure 46:
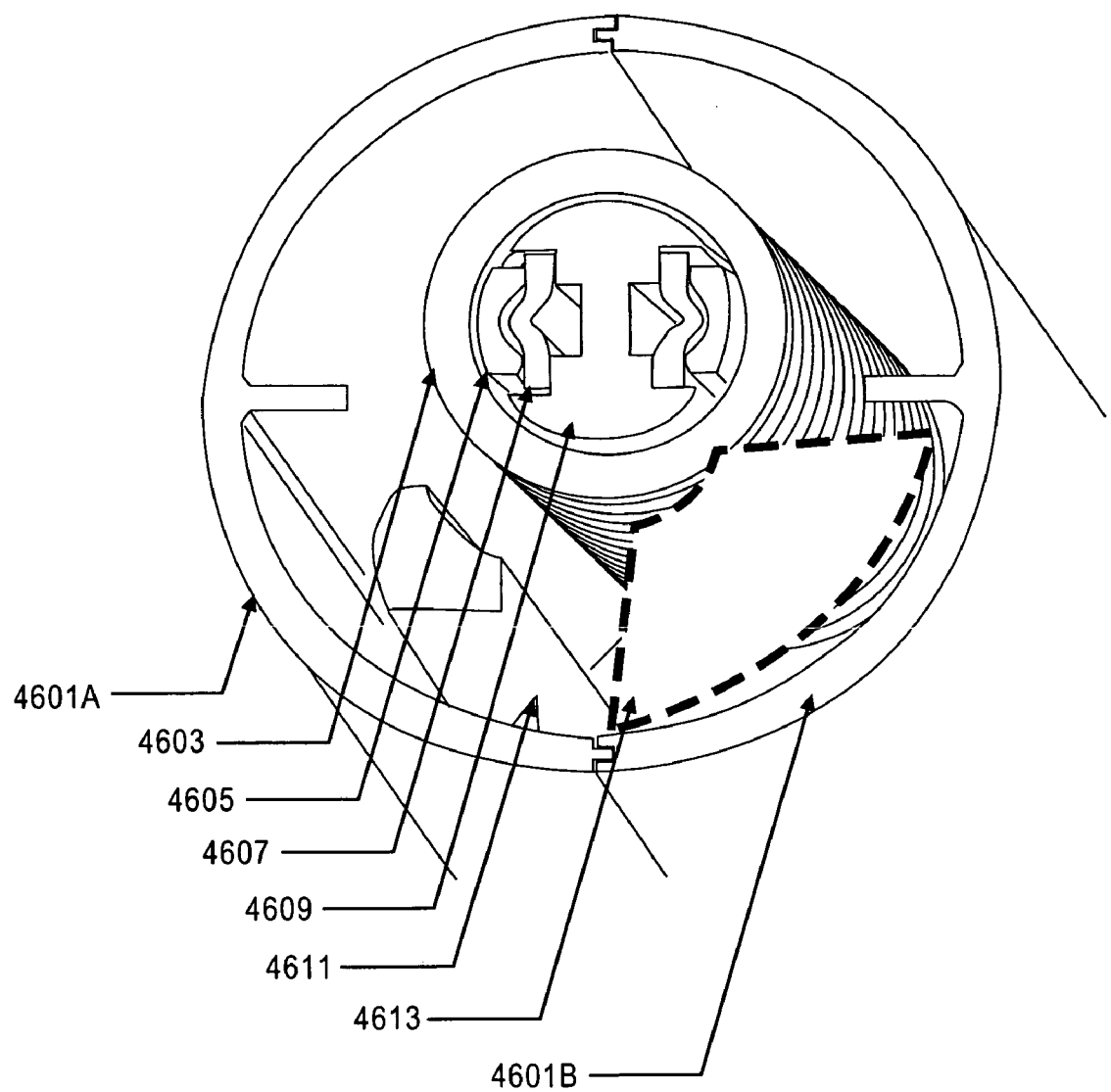

FIG. 46 is a sectional, perspective view of an assembled moveable assembly 4600 according to one embodiment of the invention. Left canoe 4601A and right canoe 4601B are mated together to form a hollow tubular structure, within which are housed spring 4603, spring guide bearings 4605, spring strut 4607, spring core 4609, and compression rod 4611. One or more data, power, or other computer system-related cables may be positioned within the area 4613 between the exterior of spring 4603 and the interior wall of canoe 4601B. It will be appreciated that the size, shape, and positioning of area 4613 is illustrative only, and that other sizes, shapes, and positioning are included within the scope and spirit of the present invention.

It will be appreciated that many kinds and combinations of materials may be used to manufacture the various components of the moveable assembly depicted in FIGS. 34–39. Illustratively, the biscuits may be machined from aluminum, while the canoes may be cast from aluminum. Other components, such as washers and the compression rod, may be manufactured of such materials as nylon and stainless steel, respectively. The materials used to manufacture various other component parts will be well known to persons skilled in the engineering and manufacturing arts.

FIG. 47 shows another example of one embodiment of a moveable assembly 4702 which may be used with an embodiment of the present invention. Computer controlled display system 4700 includes a base computer system 4703, a moveable assembly 4702, and a flat panel display device (FPDD) 4701. Moveable assembly 4702 includes a series of stacked ball-and-socket assemblies 4705.

Base computer system 4703 may be similar to the base computer system 242A of FIG. 2A. It includes many of the typical components of a computer system and has been designed in both size and weight to adequately and stably support the FPDD 4701 at a variety of different positions. For example, the base computer system 4703 may be designed with sufficient weight such that, without physically attaching the base computer system 4703 (except through gravity) to the surface 4704, the base computer system 4703 will allow the FPDD 4701 to be extended out beyond the edge of the base computer system 4703 as shown in FIG. 47 without causing the whole system 4700 to overturn. Thus the entire system 4700 allows the FPDD 4701 to be positioned at any one of a multitude of locations in which the FPDD 4701 can be positioned given the extent of reach provided by the moveable assembly 4702.

Moveable assembly 4702 provides the ability to move the FPDD in at least three degrees of freedom and preferably six degrees of freedom (X, Y, Z, pitch, yaw, and roll). The term "pitch" includes a movement of the top edge of the flat panel display toward or away from a user. The term "yaw" includes a movement of a left edge or a right edge of the flat panel display toward or away from a user. The term "roll" includes a rotational movement of a top left corner or a top right corner of the flat panel display about an axis orthogonal to a display surface of the flat panel display. In one embodiment, moveable assembly 4702 terminates in a gimbal joint 4706 which may be coupled to the FPDD 4701 to allow movement of the FPDD 4701 relative to the moveable assembly 4702. In one embodiment, at least one cable (not shown) may be disposed within moveable assembly 4702. In one embodiment, the cable may include a data, tension, torsion, power, antenna, and other computer system related cables. In another embodiment, at least one tube (not shown) may be disposed within moveable assembly 4702. In one embodiment, the tube may provide a pressurized fluid with moveable assembly 4702.

In one embodiment, the system 4700 may be designed to support a FPDD 4701 weighing in the range of approximately 5.0 lbs to approximately 6.0 lbs, at approximately 25.0 lbs of user force. In other embodiments, the system 4700 may be designed to support lighter or heavier loads. Illustratively, the length of the moveable assembly 4702 may range from approximately 7.0 inches to approximately 48.0 inches. In one exemplary embodiment, the moveable assembly 4702 may be approximately 15.0 inches in length. In other embodiments, other lengths of moveable assembly 4702 may be used.

Figure 48B:
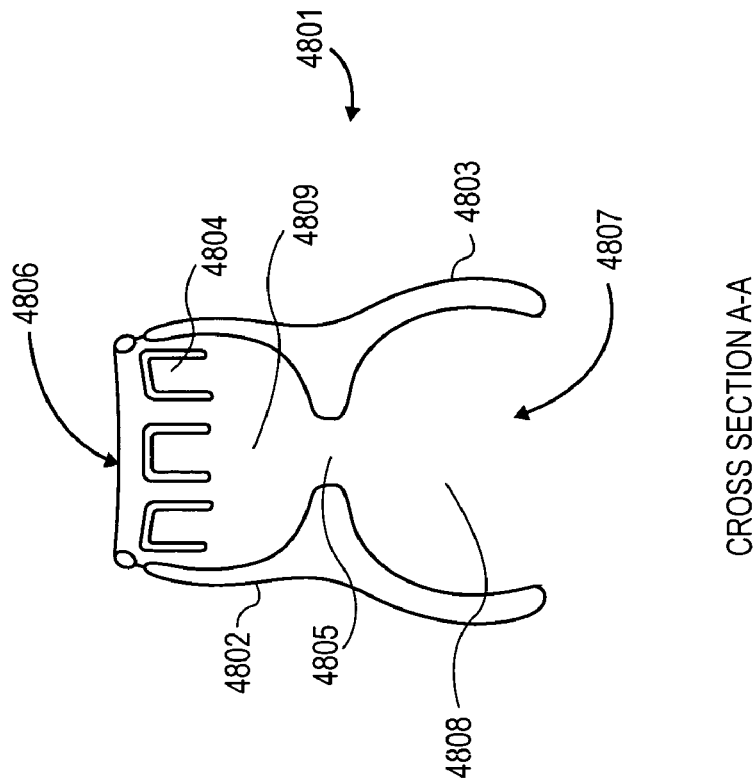
Figure 48A:
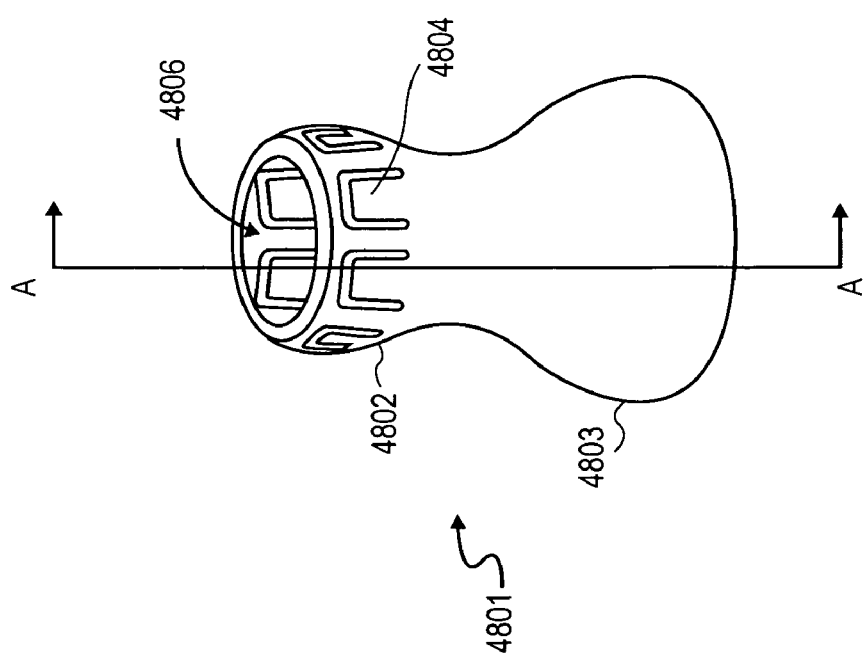

FIG. 48A shows a perspective view of one embodiment of a link 4801 of the moveable assembly 4702 shown in FIG. 47. Link 4801 includes a ball 4802, a bore 4806, at least one leaf 4804, and a socket 4803. In one embodiment, link 4801 may be made of a metal, a metal alloy, a ceramic, a plastic, or combinations thereof. In alternative embodiments, other rigid materials may be used.

FIG. 48B is a cross-sectional side view of link 4801 taken along the line A—A in FIG. 48A. FIG. 48B shows link 4801, bore 4806, ball 4802, leaf 4804, bore 4805, socket 4803, bore 4807, cavity 4809 and cavity 4808.

Referring to FIGS. 48A, 48B, in one embodiment, link 4801 may be made of a metal, a metal alloy, a ceramic, a plastic, or combinations thereof. In alternative embodiments, other rigid materials may be used. In one embodiment, ball 4802 of link 4801 may be substantially spherical and substantially hollow, defining a cavity 4809. Bore 4806 provides an opening in ball 4802. Ball 4802 may be coupled to socket 4803, so that link 4801 may have a ball 4802 at one end and a socket 4803 at another end. Socket 4803 may be substantially spherical and substantially hollow, defining a cavity 4808. In one embodiment, socket 4803 may have a diameter that is greater than a diameter of ball 4802. Socket 4803 includes a bore 4807, providing an opening in socket 4803. Bore 4805 may be provided between cavity 4809 and cavity 4808. In one embodiment, at least one cable or tube (not shown) may be disposed within bore 4805. Leaf 4804 may be flexibly coupled to ball 4802. In one embodiment, a plurality of leaves 4804 may be coupled to ball 4802. In one embodiment, leaf 4804 may be made of a different material than ball 4802. In one embodiment, ball 4802 may be provided with a friction pad. A friction pad may be an area of material that is capable of generating more friction with a socket than the material of which the rest of ball 4802 is composed of. In one embodiment, leaf 4804 may be provided with a friction pad.

Figure 49:
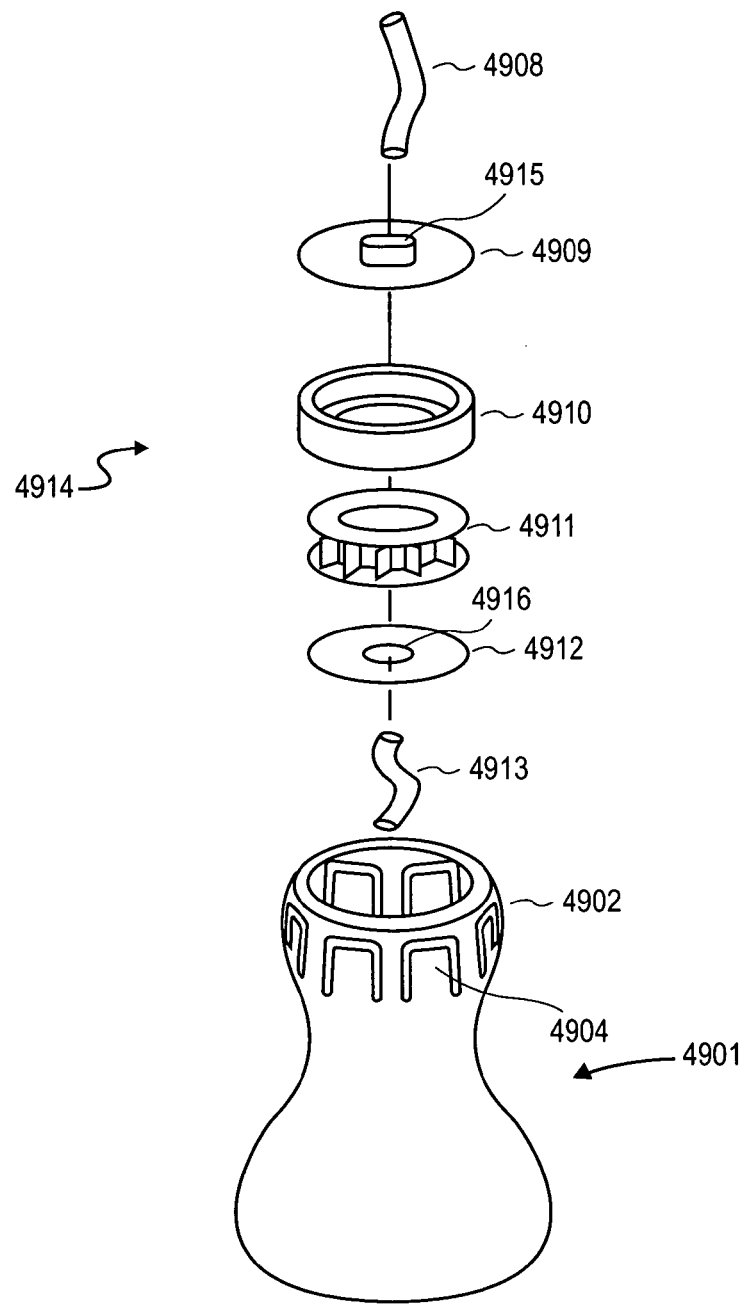

FIG. 49 shows an exploded perspective view of an embodiment of a link 4901 and brake assembly 4914. Brake assembly 4914 may be disposed within ball 4902 of link 4901. Brake assembly 4914 includes tubing 4908, seal plate 4909, bladder 4910, structural member 4911, seal plate 4912, and tubing 4913.

Tubing 4908 may be coupled to seal plate 4909 near bore 4915 of seal plate 4909. Seal plate 4909 may be coupled to bladder 4910. Structural member 4911 may be disposed within bladder 4910. Bladder 4910 may be coupled to seal plate 4912. Tubing 4913 may be coupled to seal plate 4912 near bore 4916. In one embodiment, tubing 4908 and 4913, seal plates 4909 and 4912, and bladder 4910 may be coupled such that a sealed chamber is formed, so that a common pressure may be maintained within tubing 4908, 4913 and bladder 4910.

Tubing 4908 and 4913 may be flexible cylindrical structures which may be suitable to convey fluids within them, without expanding substantially under pressure. In one embodiment, tubing 4908 and 4913 may be made of plastic, rubber, vinyl, or other materials which are flexible and suitable for conveying fluids under pressure. Seal plates 4909 and 4912 may be substantially disk shaped, each having a bore 4915, 4916, respectively, disposed near their centers. In one embodiment, seal plates 4909, 4912 serve to axially constrain bladder 4910 within ball 4902, so that bladder 4910 may be disposed near leaf 4904. Seal plates 4909, 4912 may be made of a metal, a metal alloy, a ceramic, a plastic, or combinations thereof. In alternative embodiments, other rigid materials may be used. Bladder 4910 may be substantially cylindrical, and may be disposed between seal plates 4909 and 4912. Bladder 4910 may be made of a material capable of expansion under pressure. In one embodiment, bladder 4910 may be made of rubber. In alternative embodiments, other expandable materials may be used. Structural member 4911 may be disposed within bladder 4910 to provide structural support to bladder 4910 when bladder 4910 is in a relaxed state. In another embodiment, structural member 4911 may serve to direct force radially outward from the center of bladder 4910. Structural member 4911 may be made of a metal, a metal alloy, a ceramic, a plastic, or combinations thereof. In alternative embodiments, other rigid materials may be used.

FIG. 50A shows a side view of one embodiment of a ball-and-socket assembly 5001 of the moveable assembly 4702 shown in FIG. 47. FIG. 50B is a cross-sectional side view of ball-and-socket assembly 5001 taken along the line A—A in FIG. 50A. FIG. 50B shows ball-and-socket assembly 5001, tubing 5018, bore 5025, seal plate 5019, bladder 5020, structural member 5021, bore 5026, tubing 5023, link 5002, cavity 5006, socket 5004, leaf 5014, ball 5005, seal plate 5022 and link 5003.

Referring now to FIGS. 50A, 50B, ball-and-socket assembly 5001 includes ball 5005 of link 5003 disposed within cavity 5006 of socket 5004 of link 5002. Link 5002 and link 5003 may be adjacently stacked links in the moveable assembly 4702 shown in FIG. 47. When bladder 5020 is in a relaxed state, ball 5005 may rotate freely within socket 5004, so that moveable assembly 4702 may be positioned into a desired configuration by adjusting the angle and rotation between adjacently stacked links 5002, 5003. Once a desired shape of moveable assembly 4702 is achieved, the shape may be retained by applying a pressure within moveable assembly 4702. Pressure may be applied to bladder 5020 through tubing 5018 and/or tubing 5023. In one embodiment, tubing 5018, 5023, seal plates 5019, 5022 and bladder 5020 are coupled so that a common pressure may be maintained within tubing 5018, 5023 and bladder 5020, so that an increase of pressure within tubing 5018 or tubing 5023 will result in an increased pressure within bladder 5020. An increased pressure within bladder 5020 may cause bladder 5020 to expand. In one embodiment, a pressure within bladder 5020 may be increased, causing bladder 5020 to expand radially outwards against leaf 5014, thereby forcing leaf 5014 to flex outwards from ball 5005 against the inner surface of socket 5004. Pressure within bladder 5020 may continue to be increased until the friction generated between leaf 5014 and socket 5004 may be sufficient to suspend movement of ball 5005 within socket 5004. In one embodiment, leaf 5014 may be made of a different material than ball 5005. In one embodiment, leaf 5014 may be provided with a friction pad. For example, in one embodiment leaf 5014 may be made of a material that may be capable of generating more friction with socket 5004 than the material of which ball 5005 may be made of.

In one embodiment, the pressure applied to bladder 5020 may be a hydraulic pressure. In one embodiment, water may be used to generate pressure within bladder 5020. In alternative embodiments, other liquids may be used. In yet another embodiment, the pressure applied to the bladder 5020 may be a pneumatic pressure.

Pressure within bladder 5020 may be generated by an actuation device. The actuation device may suspend movement of the moveable assembly when a pressure is applied within bladder 5020, and may permit movement of the moveable assembly when the pressure within bladder 5020 is lessened. In one embodiment, the actuation device may be a pump. When a user wants to change the shape of moveable assembly 4702, the actuation device may momentarily release the pressure within the moveable assembly 4702, thereby unlocking the moveable assembly, and permitting movement of balls within their respective sockets. The decreased pressure may cause bladder 5020 to relax, thereby reducing the radial force applied to leaf 5014. As the force exerted by bladder 5020 on leaf 5014 decreases, leaf 5014 may return to its relaxed position, thereby reducing the amount of friction between ball 5005 and socket 5004. As the friction between ball 5005 and socket 5004 reduces, ball 5005 may rotate within socket 5004, so that moveable assembly 4702 may be moved. Once the desired shape is attained, the user may activate the actuation device, and a pressure may be applied within moveable assembly 4702, thereby suspending movement of the moveable assembly 4702 by increasing the amount of friction between ball 5005 and socket 5004.

Figure 51A:
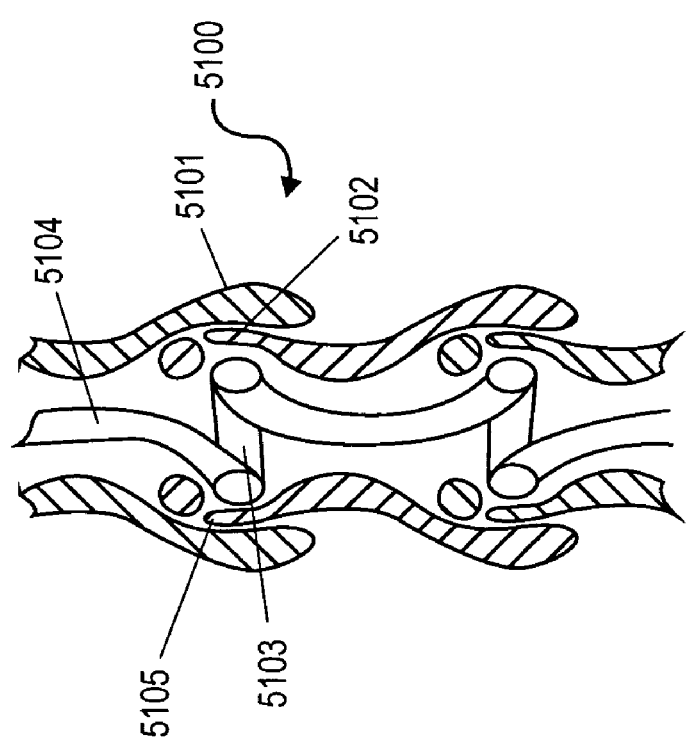

FIG. 51A shows a cross-sectional view of an embodiment of an alternative configuration of a bladder 5103 within a ball-and-socket assembly 5100. Ball-and-socket assembly 5100 includes tubing 5104, bladder 5103, socket 5101, ball 5105 and leaf 5102. Ball 5105 may be disposed within socket 5101. Bladder 5103 may be disposed within ball 5105. Bladder 5103 may be substantially toroidal, and may be coupled to tubing 5104. Bladder 5103 may be expandable, so that when pressure is applied within bladder 5103 via tubing 5104, bladder 5103 may expand radially outward against leaf 5102. In one embodiment, tubing 5104 may couple adjacent bladders of adjacent ball-and-socket assemblies. In one embodiment, tubing 5104 may couple adjacent ball-and-socket assemblies so that a common pressure may be maintained between adjacent bladders. In another embodiment, tubing 5104 may be substantially coiled, with toroidal bladders 5103 interspersed between tubing 5104 at each ball-and-socket assembly 5100.

FIG. 51B shows a cross-sectional view of an embodiment of an alternative configuration of a bladder 5113 within a ball-and-socket assembly 5110. Ball-and-socket assembly 5110 may include tubing 5114, bladder 5113, socket 5111, ball 5115 and leaf 5112. Bladder 5113 may be substantially spherical, and may be disposed within ball 5115. Bladder 5113 may be coupled to tubing 5114. Bladder 5113 may be expandable under pressure, so that when pressure is applied within bladder 5113 via tubing 5114, bladder 5113 expands radially outward against leaf 5112. In one embodiment, tubing 5114 fluidly interconnects adjacent bladders 5113 of adjacent ball-and-socket assemblies 5110. In one embodiment, a cable 5116 may be disposed within tubing 5114. Cable 5116 may be one of a data, tension, torsion, power, antenna, and other computer system related cables.

FIG. 52A shows a side view of one embodiment of a ball-and-socket assembly 5201 of the moveable assembly 4702 shown in FIG. 47. FIG. 52B shows a cross-sectional side view of ball-and-socket assembly 5201 taken along the line A—A in FIG. 52A. Referring now to FIGS. 52A, 52B, ball-and-socket assembly 5201 includes links 5208, 5209, balls 5210, 5206, sockets 5205, 5211, bores 5203, 5204, and cavities 5213, 5207, 5212. Bores 5203 and 5204 may fluidly interconnect cavities 5213, 5207, 5212.

In one embodiment, links 5208, 5209 may be made of a metal, a metal alloy, a ceramic, a plastic, or combinations thereof. In alternative embodiments, other rigid materials may be used. In one embodiment, balls 5206, 5210 may be substantially spherical and substantially hollow, defining cavities 5207 and 5213, respectively. Ball 5206 may be coupled to socket 5211, so that link 5209 may have a ball 5206 at one end and a socket 5211 at another end. Ball 5210 may be coupled to socket 5205, so that link 5208 has a ball 5210 at one end and a socket 5205 at another end. Sockets 5205 and 5211 may be substantially spherical and substantially hollow. In one embodiment, socket 5205 may have a diameter that is greater than a diameter of ball 5206. Link 5208 may include a bore 5203 which fluidly couples cavities 5213 and 5207. Link 5209 may include a bore 520.4 which fluidly couples cavities 5207 and 5212. In one embodiment, at least one cable (not shown) may be disposed within bores 5203 and 5204. In one embodiment, the cable may include a data, tension, torsion, power, antenna, and other computer system related cables.

Ball 5206 may be disposed within socket 5205 so that a sealed cavity 5207 may be formed. In one embodiment, ball-and-socket assembly 5201 has at least one seal (not shown) disposed between ball 5207 and socket 5205 to create a sealed cavity 5207. In one embodiment, ball 5206 may be composed of a material that may be capable of flexing under pressure. In one exemplary embodiment, ball 5206 may be composed of a plastic. When moveable assembly 4702 is in an unlocked state, ball 5206 may rotate freely within socket 5205, thereby permitting adjustment of moveable assembly 4702 into a desired position by varying the angles and rotations of adjacent links 5208, 5209. The moveable assembly 4702 may be locked into the desired position by increasing the pressure within sealed cavity 5207. In one embodiment, as the pressure within cavity 5207 increases, ball 5206 may flex so that ball 5206 frictionally contacts the inner surface of socket 5205. Pressure within cavity 5207 may increase until the friction between ball 5206 and socket 5205 may be strong enough to suspend movement of ball 5206 within socket 5205. In one embodiment, the pressure applied to cavity 5207 may be a pneumatic pressure. In another embodiment, the pressure applied to the bladder 5207 may be a hydraulic pressure.

In another embodiment, ball 5206 includes at least one leaf (not shown) capable of flexing outwards from ball 5206 under pressure. An increased pressure within cavity 5207 may cause a leaf coupled to ball 5206 to flex outwards from ball 5206 against socket 5205. The pressure within cavity 5207 may be increased until the friction between the leaf and socket 5205 may be strong enough to suspend movement of ball 5206 within socket 5205.

Pressure within cavity 5207 may be generated by an actuation device. The actuation device may suspend movement of the moveable assembly 4702 when a pressure is applied within cavity 5207, and may permit movement of the moveable assembly 4702 when the pressure within cavity 5207 is lessened. In one embodiment, the actuation device may be a pump. To change a shape of moveable assembly 4702, the actuation device may momentarily release the pressure within the moveable assembly 4702, thereby unlocking the moveable assembly, and permitting movement of a ball 5206 within its respective socket 5205. Once the desired shape of the moveable assembly 4702 is attained, the user may activate the actuation device, and a pressure may be applied within the moveable assembly 4702 thereby suspending movement of the moveable assembly.

In one embodiment, a cable (not shown) may be disposed within ball-and-socket assembly 5201. In one embodiment, a cable passes through bores 5203 and 5204. In one embodiment, the cable 5116 may be one of a data, tension, torsion, power, antenna, and other computer system related cables.

Selected Terms

It will be appreciated that at various points in the specification and claims, various terms are used interchangeably. Accordingly, such terms are to be interpreted consistently with each other. Terms that are used interchangeably include: "flexible support mechanism", "flexible neck", "neck", and "moveable assembly". Additional terms include "base" and "moveable enclosure". Further additional terms include: "flat panel display device", "flat panel display", and "display". Further additional terms include "spring/piston assembly", "spring", "piston", and "force generator". It will be appreciated that additional terms not specified here, but appearing within the specification and/or claims, may also be used interchangeably.

Thus, a computer controlled display device is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A computer controlled display device, comprising:
a flat panel display having an input for receiving display data;
a moveable assembly coupled to said display, said moveable assembly providing at least three degrees of freedom of movement for said flat panel display device and having a cross-sectional area which is substantially less than a cross-sectional area of a display structure of said flat panel display, wherein said moveable assembly comprises a plurality of stacked ball-and-socket assemblies, wherein a ball-and-socket assembly includes a substantially spherical socket, said socket having a cavity defining an inner surface of said socket, and a substantially spherical ball within said cavity; and
a brake device within said ball-and-socket assembly, said brake device comprising a bladder within said ball and coupled to an actuation device to provide a pressure to said bladder, said bladder being expandable, said bladder to suspend movement of said ball within said cavity when said bladder is in an expanded state, wherein said actuation device suspending movement of said moveable assembly when a pressure is applied within said actuation device and permitting said movement when said pressure is lessened, wherein said actuation device includes flexible tubing within said ball-and-socket assembly, said flexible tubing coupled to said bladder, and wherein said brake device comprises a structural member disposed within said bladder, said structural member to provide support for said bladder.

2. The computer controlled display device of claim 1, wherein said pressure is hydraulic pressure.

3. The computer controlled display device of claim 1, wherein said pressure is pneumatic pressure.

4. The computer controlled display device of claim 1, wherein said brake device comprises a first seal plate and a second seal plate, said bladder disposed between said first and second seal plates, said first and second seal plates to axially constrain said bladder when said bladder is in said expanded state.

5. The computer controlled display device of claim 1, wherein said bladder is substantially toroidal.

6. The computer controlled display device of claim 1, wherein said bladder is substantially spherical.

7. The computer controlled display device of claim 1, wherein said flexible tubing substantially coiled.

8. The computer controlled display device of claim 1, wherein said ball comprises a leaf said leaf being capable of flexing outward from said ball when said bladder is in said expanded state.

9. The computer controlled display device of claim 8, wherein said leaf includes a friction pad to apply a force against said inner surface of said socket when said bladder is in said expanded state.

10. The computer controlled display device of claim 1, wherein said actuation device includes a pump to generate said pressure.

11. The computer controlled display device of claim 1, wherein disposed within said moveable assembly is one of a data cable and a power cable.

12. The computer controlled display device of claim 1, wherein said ball-and-socket assembly is comprised of a material selected from the group consisting of a metal, a metal alloy, a ceramic, a plastic, and combinations thereof.

13. A computer controlled display system, comprising:
a flat panel display having a display surface and an input for receiving display data to be displayed on said display surface;
a moveable assembly coupled mechanically to said flat panel display, said moveable assembly having a cross-sectional area which is substantially less than an area of said display surface, said moveable assembly being moveable to allow said flat panel display to be selectively positioned in space relative to a user of said computer controlled display system, said moveable assembly including a plurality of stacked ball-and-socket assemblies, wherein a ball-and-socket assembly includes a substantially spherical socket, said socket having a cavity defining an inner surface of said socket, and a substantially spherical ball within said cavity;

a brake device within said ball-and-socket assembly, said brake device comprising a bladder within said ball and coupled to an actuation device to provide a pressure to said bladder, said bladder being expandable, said bladder to suspend movement of said ball within said cavity when said bladder is in an expanded state; and a base coupled mechanically to said moveable assembly and to said flat panel display through said moveable assembly, said base housing computer components comprising a microprocessor, a memory, a bus, an I/O (input/output) controller, and an I/O port, wherein said microprocessor is coupled to said input of said flat panel display, wherein said actuation device suspending movement of said moveable assembly when a pressure is applied within said actuation device and permitting said movement when said pressure is lessened, wherein said actuation device includes flexible tubing within said ball-and-socket assembly, said flexible tubing coupled to said bladder, and wherein said brake device comprises a structural member disposed within said bladder, said structural member to provide support for said bladder.

14. The computer controlled display system of claim 13, wherein said pressure is hydraulic pressure.

15. The computer controlled display system of claim 13, wherein said pressure is pneumatic pressure.

16. The computer controlled display system of claim 13, wherein said brake device comprises a first seal plate and a second seal plate, said bladder disposed between said first and second seal plates, said first and second seal plates to axially constrain said bladder when said bladder is in said expanded state.

17. The computer controlled display system of claim 13, wherein said bladder is substantially toroidal.

18. The computer controlled display system of claim 13, wherein said bladder is substantially spherical.

19. The computer controlled display system of claim 13, wherein said flexible tubing substantially coiled.

20. The computer controlled display system of claim 13, wherein said ball comprises a leaf, said leaf being capable of flexing outward from said ball when said bladder is in said expanded state.

21. The computer controlled display system of claim 20, wherein said leaf includes a friction pad to apply a force against said inner surface of said socket when said bladder is in said expanded state.

22. The computer controlled display system of claim 13, wherein said actuation device includes a pump to generate said pressure.

23. The computer controlled display system of claim 13, wherein disposed within said moveable assembly is one of a data cable and a power cable.

24. The computer controlled display system of claim 13, wherein said ball-and-socket assembly is comprised of a material selected from the group consisting of a metal, a metal alloy, a ceramic, a plastic, and combinations thereof.

25. A computer controlled display system, comprising:
a flat panel display having a display surface and an input for receiving display data to be displayed on said display surface;

a moveable assembly coupled mechanically to said flat panel display, said moveable assembly having a cross-sectional area which is substantially less than an area of said display surface, said moveable assembly being moveable to allow said flat panel display to be selectively positioned in space relative to a user of said computer controlled display system, said moveable assembly including a plurality of stacked ball-and-socket assemblies, wherein a ball-and-socket assembly includes a substantially spherical socket, said socket having a cavity defining an inner surface of said socket, a substantially spherical ball within said cavity, and a seal disposed between said socket and said ball, wherein said socket and said ball are coupled such that movement of said ball within said cavity is capable of being suspended by increasing a pressure within said cavity, said pressure provided by an actuation device coupled to said moveable assembly; and a base coupled mechanically to said moveable assembly and to said flat panel display through said moveable assembly, said base housing computer components comprising a microprocessor, a memory, a bus, an I/O (input/output) controller, and an I/O port, wherein said microprocessor is coupled to said input of said flat panel display, wherein said actuation device suspending movement of said moveable assembly when said pressure is applied within said actuation device and permitting said movement when said pressure is lessened, wherein said actuation device includes flexible tubing within said ball-and-socket assembly, said flexible tubing coupled to said bladder, and wherein said brake device comprises a structural member disposed within said bladder, said structural member to provide support for said bladder.

26. The computer controlled display system of claim 25, wherein said ball comprises a leaf, said leaf being capable of flexing outward from said ball when said pressure within said cavity is increased.

27. The computer controlled display system of claim 26, wherein said leaf includes a friction pad to apply a force against said inner surface of said socket when said pressure within said cavity is increased.

28. The computer controlled display system of claim 25, comprising:
a ball of a first ball-and-socket assembly coupled to a socket of a second ball-and-socket assembly; and
a bore between said ball of said first ball-and-socket assembly and said socket of said second ball-and-socket assembly, said bore to fluidly interconnect said ball of said first ball-and-socket assembly and said socket of said second ball-and-socket assembly.

29. The computer controlled display system of claim 25, wherein said pressure is hydraulic pressure.

30. The computer controlled display system of claim 25, wherein said pressure is pneumatic pressure.

31. The computer controlled display system of claim 25, wherein said actuation device includes a pump to generate said pressure.

32. The computer controlled display system of claim 25, wherein disposed within said moveable assembly is one of a data cable and a power cable.

33. The computer controlled display system of claim 25, wherein said ball-and-socket assembly is comprised of a material selected from the group consisting of a metal, a metal alloy, a ceramic, a plastic, and combinations thereof.

* * * * *